US012784509B2

(12) United States Patent
Merg et al.

(10) Patent No.: US 12,784,509 B2
(45) Date of Patent: *Nov. 3, 2026

(54) METHOD AND SYSTEM FOR SERVICING A VEHICLE USING A TEST SET

(71) Applicant: Snap-on Incorporated, Kenosha, WI (US)

(72) Inventors: Patrick S. Merg, Hollister, CA (US); Roy S. Brozovich, Campbell, CA (US); Jacob G. Foreman, Hollister, CA (US); Joshua C. Covington, San Juan Bautista, CA (US); Brett A. Kelley, San Jose, CA (US); Joseph R. Grammatico, El Dorado Hills, CA (US); Bradley R. Lewis, Gilroy, CA (US); Thomas J. Ward, Old Mill Creek, IL (US); Damien J. Coleman, Cork (IE)

(73) Assignee: Snap-on Incorporated, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/426,731

(22) Filed: Dec. 19, 2025

(65) Prior Publication Data

US 2026/0162467 A1 Jun. 11, 2026

Related U.S. Application Data

(63) Continuation of application No. 17/667,997, filed on Feb. 9, 2022.

(51) Int. Cl.

| | |
|---|---|
| ***G07C 5/00*** | (2006.01) |
| ***G07C 5/02*** | (2006.01) |
| ***H04W 4/46*** | (2018.01) |

(52) U.S. Cl.
CPC ............. *G07C 5/006* (2013.01); *G07C 5/008* (2013.01); *G07C 5/02* (2013.01); *H04W 4/46* (2018.02)

(58) Field of Classification Search
CPC .......... G07C 5/006; G07C 5/008; G07C 5/02; H04W 4/46
See application file for complete search history.

(56) References Cited

U.S. PATENT DOCUMENTS

| | | | |
|---|---|---|---|
| 4,679,808 | A | 7/1987 | Ito et al. |
| 4,831,539 | A | 5/1989 | Hagenbuch |

(Continued)

FOREIGN PATENT DOCUMENTS

| | | | |
|---|---|---|---|
| JP | 4375487 | B2 | 12/2009 |
| JP | 2009282804 | A | 12/2009 |
| KR | 102001900 | B1 | 7/2019 |

OTHER PUBLICATIONS

Smog-Tech-Training; Testing O2 Sensor 2017 Update Class; downloaded from the world wide web at https://www.smog-tech-training.com/TestingO2Sensor.html on Jul. 7, 2021; 8 pages*.

(Continued)

*Primary Examiner* — Faris S Almatrahi
*Assistant Examiner* — Moises Gasca Alva
(74) *Attorney, Agent, or Firm* — McDonnell Boehnen Hulbert & Berghoff LLP

(57) ABSTRACT

A method for performing test set. After determining the test set and a vehicle identifier, a processor of a computing system determines: (1) a component test (CT) and a functional test command (FTC), (2) the CT and a first set of parameter identifiers (PIDs), or (3) the FTC and a second set of PIDs. The CT corresponds to a particular vehicle component. The FTC is for requesting control of a controllable vehicle component. If the CT is determined, a test device is configured to be in a mode to perform the CT. If the FTC is (Continued)

determined, a GUI including a user-selectable control corresponding to the FTC is displayed. If the first or second set of PIDs is determined, a set of parameter values corresponding to the determined set of PIDs is received and displayed in response to vehicle data messages transmitted by the computing system.

22 Claims, 76 Drawing Sheets

(56) References Cited

U.S. PATENT DOCUMENTS

| | | | | |
|---|---|---|---|---|
| 5,032,821 | A | 7/1991 | Domanico et al. | |
| 5,396,427 | A | 3/1995 | Piehl et al. | |
| 5,524,078 | A | 6/1996 | Kolb et al. | |
| 5,764,524 | A | 6/1998 | Andersson et al. | |
| 5,852,789 | A | 12/1998 | Trsar et al. | |
| 5,935,187 | A | 8/1999 | Trsar et al. | |
| 6,092,016 | A | 7/2000 | Sarangapani et al. | |
| 6,459,968 | B1 | 10/2002 | Kochie | |
| 6,484,080 | B2 | 11/2002 | Breed | |
| 7,254,469 | B2 | 8/2007 | Robb et al. | |
| 7,953,530 | B1 | 5/2011 | Pederson et al. | |
| 8,135,508 | B1 | 3/2012 | Thompson et al. | |
| 9,008,854 | B2 | 4/2015 | Breed | |
| 9,043,073 | B2 | 5/2015 | Ricci | |
| 9,342,934 | B2 | 5/2016 | Chen | |
| 10,163,280 | B1 | 12/2018 | Covington | |
| 11,227,452 | B2 | 1/2022 | Rosenbaum | |
| 12,579,851 | B2 | 3/2026 | Gutlein | |
| 2002/0138185 | A1 | 9/2002 | Trsar et al. | |
| 2004/0172177 | A1 | 9/2004 | Nagai et al. | |
| 2005/0027403 | A1 | 2/2005 | Nagai | |
| 2006/0030981 | A1 | 2/2006 | Robb et al. | |
| 2008/0245440 | A1 | 10/2008 | Boreham et al. | |
| 2008/0256440 | A1 | 10/2008 | Boreham et al. | |
| 2009/0259358 | A1 | 10/2009 | Andreasen | |
| 2011/0035094 | A1 | 2/2011 | Van Den Berg et al. | |
| 2012/0215491 | A1 | 8/2012 | Theriot et al. | |
| 2013/0221973 | A1 | 8/2013 | Whisenand et al. | |
| 2014/0075356 | A1 | 3/2014 | Gray et al. | |
| 2014/0244213 | A1 | 8/2014 | Theriot et al. | |
| 2015/0121275 | A1 | 4/2015 | Marshall et al. | |
| 2015/0371457 | A1 | 12/2015 | Bakfan et al. | |
| 2016/0055686 | A1 | 2/2016 | Ukai et al. | |
| 2016/0124587 | A1 | 5/2016 | Covington et al. | |
| 2016/0124605 | A1 | 5/2016 | Covington et al. | |
| 2016/0124609 | A1 | 5/2016 | Covington et al. | |
| 2016/0124612 | A1 | 5/2016 | Covington et al. | |
| 2016/0124635 | A1 | 5/2016 | Covington et al. | |
| 2017/0039059 | A1 | 2/2017 | Gintz et al. | |
| 2017/0134537 | A1 | 5/2017 | O'Mahony et al. | |
| 2017/0372533 | A1 | 12/2017 | Merg et al. | |
| 2018/0047222 | A1* | 2/2018 | Lewis .................... | G07C 5/008 |
| 2018/0047223 | A1 | 2/2018 | Lewis et al. | |
| 2018/0201236 | A1 | 7/2018 | Merg et al. | |
| 2018/0314255 | A1 | 11/2018 | Nistler et al. | |
| 2018/0357614 | A1 | 12/2018 | Merg et al. | |
| 2019/0050458 | A1 | 2/2019 | Merg et al. | |
| 2019/0311556 | A1 | 10/2019 | Thron et al. | |
| 2020/0134933 | A1 | 4/2020 | Covington et al. | |
| 2020/0134934 | A1 | 4/2020 | Covington et al. | |
| 2020/0184743 | A1 | 6/2020 | Merg et al. | |
| 2020/0184745 | A1 | 6/2020 | Merg et al. | |
| 2020/0242860 | A1 | 7/2020 | Merg et al. | |
| 2021/0049836 | A1 | 2/2021 | Covington et al. | |
| 2021/0049844 | A1 | 2/2021 | Covington | |
| 2021/0173016 | A1 | 6/2021 | Whisenand et al. | |
| 2021/0264383 | A1 | 8/2021 | Kleinhans et al. | |
| 2021/0279155 | A1 | 9/2021 | Theriot et al. | |
| 2022/0027023 | A1 | 1/2022 | Merg et al. | |
| 2022/0375274 | A1 | 11/2022 | Chen et al. | |
| 2023/0192112 | A1 | 6/2023 | Merg et al. | |
| 2023/0196850 | A1 | 6/2023 | Weiland et al. | |
| 2023/0252824 | A1 | 8/2023 | Merg et al. | |
| 2023/0252830 | A1 | 8/2023 | Merg et al. | |
| 2024/0331464 | A1 | 10/2024 | Weiland et al. | |
| 2025/0239108 | A1* | 7/2025 | Merg .................. | G07C 5/0808 |

OTHER PUBLICATIONS mechanics.stackexchange.com; Motor Vehicle Maintenance & Repair, Difference between banks for AFR & O2 sensor values; downloaded from the World Wide Web at https://mechanics.stackexchange.com/questions/67962/difference-between-banks-for-afr-o2-sensor-values on Jul. 7, 2021; 6 pages*.

Snap-On Incorporated; Zeus User Manual, ZEEMS342A, Rev. F; 117 pages; Jun. 26, 2018; copy of document provided via 2 PDF files*.

Tektronix; XYZs of Oscilloscopes, Primer; 60 pages; Jan. 2016*.

Tektronix; User Manual, TDS1000- and TDS2000-Series Digital Storage Oscilloscope 071-1064-00; 206 pages; Feb. 6, 2002*.

Marinucci, Dan; Shotgun diagnosis often counterproductive; Tire Business; downloaded from the world wide web at https://www.tirebusiness.com/article/20140929/ISSUE/309299980/shotgun-diagnosis-often-counterproductive; 6 pages; Sep. 29, 2014*.

International Searching Authority; Notification of transmittal of the international search report and the written opinion of the International Searching Authority, or the declaration, the international search report, and the written opinion, all for international application No. PCT/ US2022/081612; 32 pages; dated Jun. 9, 2023*.

International Searching Authority; Invitation to pay additional fees, and where applicable protest fee, along With: (i) Annex to Form PCT/ISA/206 with results of the partial international search, and (ii) provisional opinion for PCT application No. PCT/US2022/081612; 25 pages; dated Apr. 12, 2023*.

International Searching Authority; Notification of transmittal of the international search report and the written opinion of the International Searching Authority, or the declaration; the international search report, and the written opinion regarding international patent application No. PCT/US2023/064903; 16 pages; dated Jun. 12, 2023*.

International Searching Authority of World Intellectual Property Office; Invitation to pay additional fees and, where applicable, protest fee on Form PCT/ISA/206 for corresponding PCT application No. PCT/US2023/062201; 15 pages; dated Jul. 6, 2023*.

International Searching Authority of World Intellectual Property Office; Notification of transmittal of the international search report and the written opinion of the international searching authority, or the declaration; the international search report; and written opinion of the international searching authority; all for international application No. PCT/US2023/062201; 21 pages; mailed Aug. 29, 2023*.

Snap-On Incorporated; BMW Vehicle Communication Software Manual, EAZ0025B42B Rev. B; 131 pages; Feb. 2013*.

Alyssa Walker; JSON Tutorial: Learn with Simple File Format Example; downloaded from world wide web at https://web.archive.org/web/20211122120401/https://www.guru99.com/json-tutorial-example.html; 14 pages; Oct. 8, 2021*.

MDN Web Docs; Working with JSON; downloaded from world wide web at https://web.archive.org/web/20220208085926/https://developer.mozilla.org/en-US/docs/Learn/JavaScript/Objects/JSON; 11 pages; Feb. 8, 2022, *.

W3 Schools; JavaScript if . . . else; downloaded from the world wide web at https://web.archive.org/web/20220204065407/https://www.w3schools.com/jsref/jsref_if.as; 9 pages; Feb. 4, 2022 ;*.

JSON ORG: JSON Example; downloaded at world wide web at https://web.archive.org/web/20220121030538/https://json.org/example.html; Jan. 21, 2022; 10 pages*.

Stack Overflow Community; If . . . Then . . . Else using XML; downloaded from world wide web at https://web.archive.org/web/20170202104131/http://stackoverflow.com/questions/6061470/if-then-else-using-XML; 4 pages; Feb. 2, 2017*.

Napa Institute of Automotive Technology; Obdii and Generation Scan Tools; 144 pages; 1998*.

(56) References Cited

OTHER PUBLICATIONS

W3 Schools; JSON Object Literals; downloaded from the world wide web at https://web.archive. org/web/20220101095825/https://www.w3schools.com/js/js_json_ojbects.asp; 8 pages; Jan. 1, 2022*.

* cited by examiner

380

265

360

| Oscilloscope settings | | | Address |
|---|---|---|---|
| Channel 1 | | | |
| | Sample rate | 1 GS/sec. | $0F4240 |
| | Vertical scale | 1 volt / division | $0F4241 |
| | Horizontal scale | 100 msec / division | $0F4242 |
| | Trigger mode | Normal | $0F4243 |
| | Trigger position | Origin | $0F4244 |
| | Trigger source | Channel 1 | $0F4245 |
| Channel 2 | | | |
| | Sample rate | 1 GS/sec. | $0F4246 |
| | Vertical scale | 1 volt / division | $0F4247 |
| | Horizontal scale | 100 msec / division | $0F4248 |
| | Trigger mode | Normal | $0F4249 |
| | Trigger position | Origin | $0F424A |
| | Trigger source | Channel 1 | $0F424B |

363 (Channel 1 rows), 364 (Channel 2 rows), 362 (all settings rows)

361

| Oscilloscope settings | | | Address |
|---|---|---|---|
| Channel 1 | | | |
| | Sample rate | 1 GS/sec. | $0F4240 |
| | Vertical scale | 5 volt / division | $0F4241 |
| | Horizontal scale | 500 msec / division | $0F4242 |
| | Trigger mode | Automatic | $0F4243 |
| | Trigger position | 4 divisions left of origin | $0F4244 |
| | Trigger source | Channel 1 | $0F4245 |
| Channel 2 | | | |
| | Sample rate | 1 GS/sec. | $0F4246 |
| | Vertical scale | 1 volt / division | $0F4247 |
| | Horizontal scale | 100 msec / division | $0F4248 |
| | Trigger mode | Normal | $0F4249 |
| | Trigger position | Origin | $0F424A |
| | Trigger source | Channel 1 | $0F424B |

363 (Channel 1 rows), 364 (Channel 2 rows), 362 (all settings rows)

FIG. 41

SYMPTOM-TO-PID MD ← 70
SYMPTOM S1 (P0171, P0101): PID19
SYMPTOM S2 (P0171, P0101): PID6
SYMPTOM S3 (FOULED SPARK PLUG): PID17
SYMPTOM S4 (P0174):PID12, PID19

SYMPTOM-TO-COMPONENT-TEST MD ← 72
SYMPTOM S1 (P0171, P0101): CT1, CT4
SYMPTOM S2 (P0171, P0174): CT1, CT4
SYMPTOM S3 (FOULED SPARK PLUG): NULL
SYMPTOM S4 (P0174): CT1, CT4

SYMPTOM-TO-FUNCTIONAL-TEST MD ← 74
SYMPTOM S1 (P0171, P0101): FT5, FT6, FT7, FT8
SYMPTOM S2 (P0171, P0174): FT5, FT6, FT7, FT8
SYMPTOM S3 (FOULED SPARK PLUG): FT5, FT6, FT7, FT8
SYMPTOM S4 (P0174): FT5, FT6, FT7, FT8

SYMPTOM-TO-RESET-PROCEDURE MD ← 76
SYMPTOM S1 (P0171, P0101): RP5
SYMPTOM S2 (P0171, P0174): RP5
SYMPTOM S3 (FOULED SPARK PLUG): NULL
SYMPTOM S4 (P0174): RP5
SYMPTOM S5 (THEFT DETERRENT – NO START): RP2, RP3
SYMPTOM S6 (OIL CHANGE OCCURRED): RP1
SYMPTOM S7 (ABS ECU NEEDS CALIBRATION): RP6
SYMPTOM S8 (AIRBAG ECU NEEDS CALIBRATION): RP8
SYMPTOM S9 (POWERTRAIN ECU NEEDS CALIBRATION): RP9

SYMPTOM-TO-TEST-SET MD ← 83
SYMPTOM S1 (P0171, P0101): TS3, TS5
SYMPTOM S2 (P0171, P0104): TS5, TS7
SYMPTOM S3 (FOULED SPARK PLUG): TS5
SYMPTOM S4 (P0174): TS7
SYMPTOM S5 (P0171): TS5

FIG. 51

COMPONENT-TO-PID MD ← 71
COMPONENT C1 (EGR VALVE): PID13, PID14, PID24
COMPONENT C2 (FUEL TANK): PID6, PID15, PID17
COMPONENT C3 (THERMOSTAT): PID3, PID27
COMPONENT C4 (VEHICLE SPEED SENSOR): PID9

COMPONENT-TO-COMPONENT-TEST MD ← 73
COMPONENT C1 (EGR VALVE): CT1, CT4
COMPONENT C2 (FUEL TANK): CT1, CT4, CT5
COMPONENT C3 (THERMOSTAT): CT5, CT8, CT11
COMPONENT C4 (VEHICLE SPEED SENSOR): CT1, CT4
COMPONENT C5 (CATALYTIC CONVERTER): CT10

COMPONENT-TO-FUNCTIONAL-TEST MD ← 75
COMPONENT C1 (EGR VALVE): FT13, FT14
COMPONENT C2 (FUEL TANK): NULL
COMPONENT C3 (THERMOSTAT): FT3, FT4
COMPONENT C4 (VEHICLE SPEED SENSOR): NULL
COMPONENT C5 (CATALYTIC CONVERTER): NULL
COMPONENT C6 (FUEL PUMP): FT1

COMPONENT-TO-RESET-PROCEDURE MD ← 77
COMPONENT C1 (EGR VALVE): NULL
COMPONENT C2 (FUEL TANK): NULL
COMPONENT C3 (THERMOSTAT): NULL
COMPONENT C4 (VEHICLE SPEED SENSOR): NULL
COMPONENT C5 (CATALYTIC CONVERTER): NULL
COMPONENT C6 (FUEL PUMP): NULL
COMPONENT C7 (THEFT DETERRENT): RP2, RP3
COMPONENT C8 (ENGINE CONTROL ECT): RP5, RP10

COMPONENT-TO-TEST-SET MD ← 84
COMPONENT C1 (EGR VALVE): TS3, TS7
COMPONENT C2 (FUEL TANK): TS1, TS6, TS14, TS15
COMPONENT C3 (THERMOSTAT): TS13
COMPONENT C4 (VEHICLE SPEED SENSOR): NULL
COMPONENT C5 (CATALYTIC CONVERTER): TS3
COMPONENT C6 (FUEL PUMP): TS1, TS6, TS14, TS15
COMPONENT C7 (THEFT DETERRENT): TS9
COMPONENT C8 (ENGINE CONTROL ECT): TS13

FIG. 53

FUNCTIONAL-TEST-TO-PID MD ←78
FT1 (FUEL PUMP ENGAGEMENT): PID6, PID31, PID32, PID49
FT2 (CLOSE EVAPORATOR CANISTER VENT VALVE): PID18
FT3 (ENGINE COOLING FAN HIGH): PID3
FT4 (ENGINE COOLING FAN LOW): PID3
FT5 (FUEL INJECTOR #1 OFF): PID8, PID21, PID30
FT6 (FUEL INJECTOR #2 OFF): PID8, PID21, PID30
FT7 (FUEL INJECTOR #3 OFF): PID8, PID21, PID30
FT8 (FUEL INJECTOR #4 OFF): PID8, PID21, PID30
FT9 (FUEL INJECTOR #5 OFF): PID8, PID21, PID30
FT10 (FUEL INJECTOR #6 OFF): PID8, PID21, PID30
FT11 (FUEL INJECTOR #7 OFF): PID8, PID21, PID30
FT12 (FUEL INJECTOR #8 OFF): PID8, PID21, PID30
FT13 (EGR VALVE OPEN): PID8, PID13, PID14
FT14 (EGR VALVE CLOSED): PID8, PID13, PID14
FT15 (SPARK PLUG COIL # 1 OFF): PID2, PID8, PID29
FT16 (SPARK PLUG COIL # 2 OFF): PID2, PID8, PID29
FT17 (SPARK PLUG COIL # 3 OFF): PID2, PID8, PID29
FT18 (SPARK PLUG COIL # 4 OFF): PID2, PID8, PID29
FT19 (AIR CONDITIONING SWITCH COMMAND ON/OFF): PID34, PID35, PID36

FIG. 54

RESET-PROCEDURE-TO-PID MD ←79
RP1 (OIL CHANGE INTERVAL RESET): PID42
RP2 (VEHICLE THEFT DETERRENT RESET): NULL
RP3 (IGNITION KEY IDENTIFIER RESET): NULL
RP4 (VIN LEARN RESET): NULL
RP5 (CALIBRATE ENGINE CONTROL ECU): PID43
RP6 (CALIBRATE ANTI-LOCK BRAKE ECU): PID44
RP7 (CALIBRATE TRACTION CONTROL ECU): PID45
RP8 (CALIBRATE AIRBAG SYSTEM ECU): PID46
RP9 (CALIBRATE POWERTRAIN CONTROL ECU): PID47
RP10 (CLEAR ENGINE CONTROL ECU DTC): PID37
RP11 (CLEAR ANTI-LOCK BRAKE ECU DTC): PID38
RP12 (CLEAR TRACTION CONTROL ECU DTC): PID39
RP13 (CLEAR AIRBAG SYSTEM ECU DTC): PID40
RP14 (CLEAR POWERTRAIN CONTROL ECU DTC): PID41
RP15 (BATTERY RESET): PID76
RP16 (BRAKE PAD WEAR SENSOR RESET): PID77

FIG. 55

COMPONENT-TEST-TO-PID MD ← 81
CT12 (FUEL PUMP VOLTAGE TEST): PID31, PID32, PID33, PID6
CT13 (HVAC ACTUATOR VOLTAGE TEST): PID6
CT14 (FUEL PUMP SIGNATURE TEST): PID31, PID32, PID49, PID6
CT15 (HVAC ACTUATOR TEMPERATURE TEST): PID19
CT16 (EXHAUST GAS CYLINDER BALANCE TEST): PID7
CT17 (AIR CONDITIONING PRESSURE TEST): PID7
CT18 (AC PRESS. TEST DURING RECYCLE AND RECHARGE): PID7

FIG. 56

TEST-SET-TO-PID MD ← 82
TS1 (FUEL PUMP TEST SET): PID31, PID32, PID4, PID6, PID1, PID15
TS2 (HVAC ACT. TS – VOLT. TEST): PID50, PID51, PID52, PID53, PID35, PID36
TS3 (EXHAUST GAS TEST SET): PID2, PID8, PID14, PID24
TS4 (AIR CONDITIONING TEST SET): PID61, PID60, PID59, PID25, PID57, PID58
TS5 (CYLINDER BALANCE TS): PID63, PID64, PID65, PID66, PID62, PID49
TS6 (FUEL PUMP/TAR. SIG. TS: FUEL PUMP VOLT.): PID31, PID32, PID4, PID6
TS7 (EGR TEST SET): PID13, PID14, PID24, PID25, PID26
TS8 (MASS AIR FLOW TEST SET): PID7, PID12, PID19
TS9 (DOOR LOCK TEST SET): PID72, PID73, PID74, PID75
TS10 (HORN TEST SET): PID71
TS11 (AUDIO SPEAKER TEST SET): PID68, PID69, PID70
TS12 (AIR CONDITIONING TS – PRESSURE TEST): PID34, PID35, PID36, PID58
TS13 (COOLING FAN TEST SET): PID3, PID57, PID67
TS14 (FUEL PUMP TS – VOLT. SIG. TEST): PID1, PID31, PID32, PID49, PID6
TS15 (FUEL PUMP TEST SET – VOLTAGE TEST): PID31, PID32, PID49, PID6
TS16 (HVAC ACT. TS – TEMP. TEST): PID50, PID51, PID52, PID55, PID3, PID56
TS17 (BATTERY VOLTAGE TEST SET): PID76

PID6 (FUEL PUMP PRESSURE): TS6
PID31 (FUEL PUMP VOLTAGE): TS6, TS14, TS15
PID32 (FUEL PUMP RELAY): NULL
PID76 (BATTERY VOLTAGE): TS17
} 261

FIG. 57

PID INDEX ← 90

PID1: 1 – FUEL SYSTEM STATUS
PID2: 2 – CALCULATED ENGINE LOAD
PID3: 3 – ENGINE COOLANT TEMPERATURE
PID4: 4 – SHORT TERM FUEL TRIM – BANK 1
PID5: 5 – LONG TERM FUEL TRIM – BANK 1
PID6: 6 – FUEL PUMP PRESSURE
PID7: 7 – INTAKE MANIFOLD ABSOLUTE PRESSURE
PID8: 8 – ENGINE RPM
PID9: 9 – VEHICLE SPEED
PID10: 10 – TIMING ADVANCE
PID11: 11 – INTAKE AIR TEMPERATURE
PID12: 12 – MAF AIR FLOW RATE
PID13: 13 – COMMANDED EGR
PID14: 14 – EGR ERROR
PID15: 15 – FUEL TANK LEVEL INPUT
PID16: 16 – RELATIVE THROTTLE POSITION
PID17: 17 – FUEL TYPE
PID18: 18 – EVAPORATOR SYSTEM VAPOR PRESSURE
PID19: 19 – MASS AIR FLOW SENSOR
PID20: 20 – INTAKE AIR TEMPERATURE SENSOR
PID21: 21 – FUEL INJECTION TIMING
PID22: 22 – ENGINE OIL TEMPERATURE
PID23: 23 – BOOST PRESSURE CONTROL
PID24: 24 – EXHAUST GAS RECIRCULATION TEMPERATURE
PID25: 25 – TURBOCHARGER RPM
PID26: 26 – WASTEGATE CONTROL
PID27: 27 – ENGINE RUN TIME
PID28: 28 – FUEL PRESSURE CONTROL SYSTEM
PID29: 29 – ENGINE PERCENT TORQUE DATA
PID30: 30 – INJECTION PRESSURE CONTROL SYSTEM
PID31: 31 – FUEL PUMP VOLTAGE
PID32: 32 – FUEL PUMP RELAY
PID33: 33 – SHORT TERM FUEL PUMP TRIM
PID34: 34 – AIR CONDITIONING COMPRESSOR STATE
PID35: 35 – AIR CONDITIONING HIGH SIDE PRESSURE
PID36: 36 – AIR CONDITIONING LOW SIDE PRESSURE
PID37: 37 – ENGINE CONTROL ECU DTC
PID38: 38 – ANTI-LOCK BRAKE ECU DTC
PID39: 39 – TRACTION CONTROL ECU DTC
PID40: 40 – AIRBAG SYSTEM ECU DTC
PID41: 41 – POWERTRAIN CONTROL ECU DTC
PID42: 42 – OIL CHANGE LIFE
PID43: 43 – ENGINE CONTROL ECU CALIBRATION NUMBER
PID44: 44 – ANTI-LOCK BRAKE ECU CALIBRATION NUMBER
PID45: 45 – TRACTION CONTROL ECU CALIBRATION NUMBER
PID46: 46 – AIRBAG SYSTEM ECU CALIBRATION NUMBER
PID47: 47 – POWERTRAIN CONTROL ECU CALIBRATION NUMBER
PID48: 48 – A/C SWITCH VOLTAGE

↑91 ↑92 ↑93

FIG. 58A

PID INDEX (CONTINUED) ← 90
PID49: 49 – FUEL RAIL PRESSURE
PID50: 50 – HVAC ACTUATOR DIRECTION
PID51: 51 – HVAC FAN MOTOR SWITCH
PID52: 52 – HVAC MOTOR SPEED PERCENTAGE
PID53: 53 – HVAC INTERIOR AMBIENT AIR TEMPERATURE
PID54: 54 – FUEL PUMP STATE
PID55: 55 – HVAC EXTERIOR AMBIENT AIR TEMPERATURE
PID56: 56 – HVAC SUN LOAD SENSOR
PID57: 57 – FAN SPEED INDICATED
PID58: 58 – A/C COMPRESSOR STATUS
PID59: 59 – FAN SPEED DEMANDED
PID60: 60 – EVAPORATOR TEMPERATURE
PID61: 61 – REAR CABIN INTERIOR AMBIENT TEMPERATURE
PID62: 62 – MISFIRE COUNTS
PID63: 63 – O2 SENSOR – BANK 1 -SENSOR 1
PID64: 64 – O2 SENSOR – BANK 1 -SENSOR 2
PID65: 65 – O2 SENSOR – BANK 2 -SENSOR 1
PID66: 66 – O2 SENSOR – BANK 2 -SENSOR 2
PID67: 67 – FAN SPEED INDICATED
PID68: 68 – AUDIO VOLUME
PID69: 69 – SPEAKER FADE SETTING
PID70: 70 – SPEAKER BALANCE SETTING
PID71: 71 – HORN INPUT
PID72: 72 – LEFT FRONT DOOR LOCK SWITCH STATUS
PID73: 73 – RIGHT FRONT DOOR LOCK SWITCH STATUS
PID74: 74 – LEFT REAR DOOR LOCK SWITCH STATUS
PID75: 75 – RIGHT REAR DOOR LOCK SWITCH STATUS
PID76: 76 – BATTERY VOLTAGE
PID77: 77 – BRAKE PAD WEAR SENSORS
91 92 93

FIG. 58B

COMPONENT TEST INDEX ← 95
CT1: 1A – FREQUENCY TEST
CT2: 1B – SIGNATURE TEST
CT3: 1C – OUT OF RANGE NO SIGNAL TEST
CT4: 1D – VOLTAGE TEST
CT5: 1E – CURRENT TEST
CT6: 1F – RESISTANCE TEST
CT7: 2A – CAPACITANCE TEST
CT8: 2B – TEMPERATURE TEST
CT9: 2C – PRESSURE TEST
CT10: 2D – TAIL PIPE EMISSION TEST
CT11: 2E – CONTINUITY TEST
CT12: 2F – FUEL PUMP VOLTAGE TEST
CT13: 3A – HVAC ACTUATOR VOLTAGE TEST
CT14: 3B – FUEL PUMP SIGNATURE TEST
CT15: 3C – HVAC ACTUATOR TEMPERATURE TEST
CT16: 3D – EXHAUST GAS CYLINDER BALANCE TEST
CT17: 3E – AIR CONDITIONING PRESSURE TEST
CT18: 3F – AC PRESS. TEST DUR. RECYCLE AND RECHARGE
96 97 98

FIG. 59

FUNCTIONAL TEST INDEX ← 101
FT1: 4A – FUEL PUMP ENGAGEMENT ← 99
FT2: 4B – CLOSE EVAPORATOR CANISTER VENT VALVE
FT3: 4C – ENGINE COOLING FAN HIGH
FT4: 4D – ENGINE COOLING FAN LOW
FT5: 4E – FUEL INJECTOR #1 ON
FT6: 4F – FUEL INJECTOR #2 ON
FT7: 5A – FUEL INJECTOR #3 ON
FT8: 5B – FUEL INJECTOR #4 ON
FT9: 5C – FUEL INJECTOR #5 ON
FT10: 5D – FUEL INJECTOR #6 ON
FT11: 5E – FUEL INJECTOR #7 ON
FT12: 5F – FUEL INJECTOR #8 ON
FT13: 9A – EGR VALVE OPEN
FT14: 9B – EGR VALVE CLOSED
FT15: 9C – LOCK DRIVER DOOR
FT16: 9D – SPARK PLUG COIL #3 OFF
FT17: 9E – A/C SWITCH ON
FT18: 9F – UNLOCK DRIVER DOOR 103 105 107

FIG. 60

RESET PROCEDURE INDEX ← 111
RP1: 80 – OIL CHANGE INTERVAL RESET
RP2: 81 – VEHICLE THEFT DETERRENT RESET
RP3: 82 – IGNITION KEY IDENTIFIER RESET
RP4: 83 – VIN LEARN RESET
RP5: 84 – CALIBRATE ENGINE CONTROL ECU
RP6: 85 – CALIBRATE ANTI-LOCK BRAKE ECU
RP7: 86 – CALIBRATE TRACTION CONTROL ECU
RP8: 87 – CALIBRATE AIRBAG SYSTEM ECU
RP9: 88 – CALIBRATE POWERTRAIN CONTROL ECU
RP10: 89 – CLEAR ENGINE CONTROL ECU DTC
RP11: 90 – CLEAR ANTI-LOCK BRAKE ECU DTC
RP12: 91 - CLEAR TRACTION CONTROL ECU DTC
RP13: 92 - CLEAR AIRBAG SYSTEM ECU DTC
RP14: 93 – CLEAR POWERTRAIN CONTROL ECU DTC
RP15: 94 – RESERVED
RP16: 95 – RESERVED 113 115 117

FIG. 61

TEST SET INDEX ← 648
TS1: 6A – FUEL PUMP TEST SET
TS2: 6B – HVAC ACTUATOR TEST SET – VOLTAGE TEST
TS3: 6C – EXHAUST GAS TEST SET
TS4: 6D – AIR CONDITIONING TEST SET
TS5: 6E – CYLINDER BALANCE TEST SET
TS6: 6F – FUEL PUMP / TARGET SIGNAL TEST SET: FUEL PUMP VOLTAGE
TS7: 7A – EGR TEST SET
TS8: 7B – MASS AIR FLOW TEST SET
TS9: 7C – DOOR LOCK TEST SET
TS10: 7D – HORN TEST SET
TS11: 7E – AUDIO SPEAKER TEST SET
TS12: 7F – AIR CONDITIONING TEST SET – PRESSURE TEST
TS13: 8A – COOLING FAN TEST SET
TS14: 8B – FUEL PUMP TEST SET – VOLTAGE SIGNATURE TEST
TS15: 8C – FUEL PUMP TEST SET – VOLTAGE TEST
TS16: 8D – HVAC ACTUATOR TEST SET – TEMPERATURE TEST
TS17: 8E – BATTERY VOLTAGE TEST SET 649 650 651

FIG. 62

| | PID | PID VALUES | DTCs |
|---|---|---|---|
| Vehicle 1 | – PID 6: | 37, 39, 40, 37, 40 | Inactive |
| Vehicle 2 | – PID 6: | 39, 40, 41, 39, 39, 40 | Inactive |
| Vehicle 3 | – PID 6: | 35, 35, 38, 39, 38 | Inactive |
| . . . . . . . | – PID 6: | . . . . . . . . . . . . . . . . . . | Inactive |
| Vehicle X | – PID 6: | 38, 39, 40, 37, 39, 40 | Inactive |
| 811 | 813 | 815 | 817 |

| | PID | PID VALUES | DTCs |
|---|---|---|---|
| Vehicle 1 | – PID 6: | 27, 29, 26, 25, 23 | DTCs: 5, 9 |
| Vehicle 2 | – PID 6: | 29, 26, 26, 24, 22, 24 | DTCs: 5, 9 |
| Vehicle 3 | – PID 6: | 28, 25, 24, 26, 26 | DTCs: 5, 9 |
| . . . . . . . | – PID 6: | . . . . . . . . . . . . . . . . . . | DTCs: 5, 9 |
| Vehicle Y | – PID 6: | 28, 27, 24, 24, 25, 26 | DTCs: 5, 9 |
| 819 | 813 | 821 | 823 |

FIG. 63

80

| FT | Target Signal | Target Signal Index | Target Signal Characteristics | Functional Test Command ECU ID / Command / Sub-command/ module address | PID | PID Index Value |
|---|---|---|---|---|---|---|
| 1 | Fuel pump relay to fuel pump circuit | 1 | Batt. Volt | $10 / $01 / $01 | Fuel pump status | 1 |
| 2 | Canister vent valve solenoid high | 2 | Batt. Volt | $10 / $02 / $01 | Evap. canister vent valve status | C1 |
| 3 | Left cooling fan (LCF) voltage feed<br>Right cooling fan (RCF) voltage feed | 3 | LCF - Batt. Volt<br>RCF - Batt. Volt | $10 / $03 / $01 | LCF status<br>RCF status | C2 |
| 4 | Left cooling fan (LCF) voltage feed<br>Right cooling fan (RCF) voltage feed | 4 | LCF - Batt. Volt<br>RCF - 0 volts | $10 / $03 / $02 | LCF status<br>RCF status | C3 |
| 5 | Fuel Injector #1 Low - Ckt. 108 | 5 | Off: Batt. Volt.-On TN#1 | $10 / $04 / $01 | Fuel Injector #1 duty cycle | C4 |
| 6 | Fuel Injector #2 Low - Ckt. 110 | 6 | Off: Batt. Volt.-On TN#1 | $10 / $05 / $01 | Fuel Injector #2 duty cycle | C5 |
| 7 | Fuel Injector #3 Low - Ckt. 112 | 7 | Off: Batt. Volt.-On TN#1 | $10 / $06 / $01 | Fuel Injector #3 duty cycle | C6 |
| 8 | Fuel Injector #4 Low - Ckt. 114 | 8 | Off: Batt. Volt.-On TN#1 | $10 / $07 / $01 | Fuel Injector #4 duty cycle | C7 |
| 9 | Fuel Injector #5 Low - Ckt. 116 | 9 | Off: Batt. Volt.-On TN#1 | $10 / $08 / $01 | Fuel Injector #5 duty cycle | C8 |
| 10 | Fuel Injector #6 Low - Ckt. 118 | 10 | Off: Batt. Volt.-On TN#1 | $10 / $09 / $01 | Fuel Injector #6 duty cycle | C9 |
| 11 | Fuel Injector #7 Low - Ckt. 120 | 11 | Off: Batt. Volt.-On TN#1 | $10 / $0A / $01 | Fuel Injector #7 duty cycle | CA |
| 12 | Fuel Injector #8 Low - Ckt. 122 | 12 | Off: Batt. Volt.-On TN#1 | $10 / $0B / $01 | Fuel Injector #8 duty cycle | CB |
| 13 | EGR position control | 13 | Square wave - duty cycle 0-100% | $10 / $0C / $01 to $FF | EGR commanded position | 13 |
| 14 | EGR Solenoid High | 14 | Batt. Volt | $10 / $0D / $01 | EGR commanded position | CC |
| 15 | Driver door lock actuator relay high | 15 | Batt. Volt pulse | $40 / $01 / null / $B4578A | Driver door lock status | CD |
| 16 | Ignition coil #3 control | 16 | Square wave - duty cycle 20-80% | $10 / $0E / $01 | Ignition coil #3 duty cycle | CE |
| 17 | PID 48: A/C switch | 17 | Off: 12 Volts DC<br>On: 0 Volts DC | $30 / $01 / null | A/C Comp. Clutch,<br>A/C Comp. Solenoid Valve | CF |
| 18 | Driver door unlock actuator relay high | 18 | Batt. Volt pulse | $40 / $02 / null / $B6D037 | Driver door lock status | D1 |

915 916 917 918 919 920 226

FIG. 65

| Target signal | Signal type | Signal type | Waveform | Period / Frequency | Duty cycle | Expected Characteristic Range (amplitude) |
|---|---|---|---|---|---|---|
| Circuit name | Analog | Voltage AC | Square wave | None | None | 0-5 v nominal - 5 volt ref. |
| Circuit number | Digital | Voltage DC | Rectangular wave | > than none | 0%> duty cycle ≥ 100% | 0-12 v nominal - 12 volt ref. |
| PID | --- | Current AC | Triangular wave | --- | --- | 0-42 v nominal - 42 volt ref. |
| --- | --- | Current DC | Sawtoothed wave | --- | --- | $Current_1$ to $Current_2$ |
| --- | --- | Resistance | Sine wave | --- | --- | $Resistance_1$ to $Resistorance_2$ |
| --- | --- | --- | --- | --- | --- | $Voltage_1$ to $Voltage_2$ |

600

FIG. 66

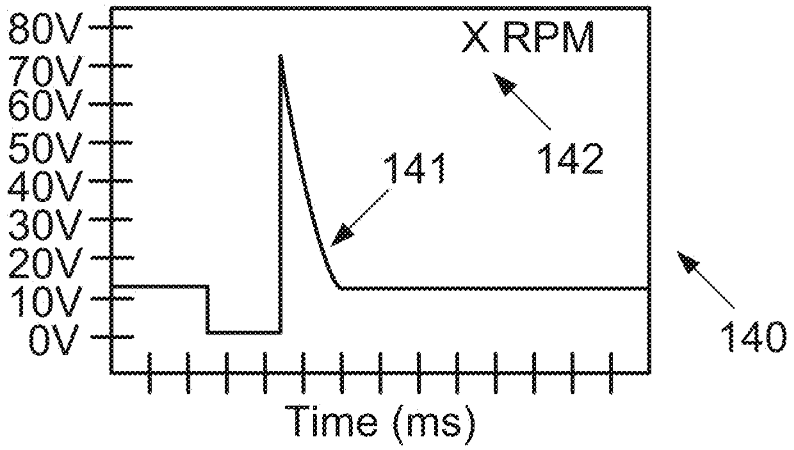

FIG. 67

850

| PID THRESHOLDS | | | | | |
|---|---|---|---|---|---|
| PID | CONDITION | RANGE TOP | RANGE BOTTOM | UNITS | EXPECTED VALUE |
| 6 | KEY ON - ENGINE OFF | 0 | 0 | PSI | NULL |
| 6 | KEY ON - ENGINE ON | 85 | 12 | PSI | NULL |
| 31 | KEY ON - ENGINE OFF | 15 | 3 | VOLTS DC | NULL |
| 31 | KEY ON - ENGINE ON | 15 | 3 | VOLTS DC | NULL |
| 32 | KEY ON - ENGINE OFF | NULL | NULL | NULL | OFF |
| 32 | KEY ON - ENGINE ON | NULL | NULL | NULL | ON |
| 33 | KEY ON - ENGINE OFF | NULL | NULL | NULL | NULL |
| 33 | KEY ON - ENGINE ON | NULL | NULL | NULL | NULL |
| 76 | KEY ON - ENGINE OFF | 14.5 | 11.8 | VOLTS DC | NULL |
| 76 | KEY ON - ENGINE ON | 14.8 | 12.0 | VOLTS DC | NULL |

851 852 853 854 855 856

FIG. 68

203

| PID Index | VDM protocol | PID request | PID Descriptor |
|---|---|---|---|
| 1 | 1 | $10 04 01 | Fuel pump status |
| 2 | 1 | $10 04 02 | Evaporator canister vent valve status |
| 3 | 1 | $10 04 03 | Left cooling fan status |
| 4 | 1 | $10 04 04 | Right cooling fan status |
| 5 | 1 | $10 04 05 | Fuel injector #1 duty cycle |
| 6 | 1 | $10 04 06 | Fuel injector #2 duty cycle |
| 7 | 1 | $10 04 07 | Fuel injector #3 duty cycle |
| 8 | 1 | $10 04 08 | Fuel injector #4 duty cycle |
| 9 | 1 | $10 04 09 | Fuel injector #5 duty cycle |
| 10 | 1 | $10 04 0A | Fuel injector #6 duty cycle |
| 11 | 1 | $10 04 0B | Fuel injector #7 duty cycle |
| 12 | 1 | $10 04 0C | Fuel injector #8 duty cycle |
| 13 | 1 | $10 04 0D | EGR commanded position |
| 14 | 1 | $10 04 0E | A/C compressor clutch |
| 15 | 1 | $10 04 0F | A/C compressor solenoid valve |
| 16 | 1 | $10 04 10 | Ignition coil #1 duty cycle |
| 17 | 1 | $10 04 11 | Ignition coil #2 duty cycle |
| 18 | 1 | $10 04 12 | Ignition coil #3 duty cycle |
| 19 | 1 | $10 04 13 | Ignition coil #4 duty cycle |
| 20 | 2 | $40 04 05 | Driver door lock status |
| 21 | 2 | $40 04 06 | Passenger door lock status |
| 22 | 1 | $10 04 2A | Engine oil temperature |
| 23 | 1 | $10 04 2B | Fuel pump voltage |
| 24 | 1 | $10 04 2C | Fuel pump relay |
| 25 | 1 | $10 04 2D | Fuel rail pressure |
| 26 | 1 | $10 04 2E | Fuel pressure |
| 27 | 2 | $30 04 01 | HVAC actuator direction |
| 28 | 2 | $30 04 02 | Fan motor switch |
| 29 | 2 | $30 04 03 | Fan speed |
| 30 | 2 | $30 04 04 | Ambient air temperature |
| 31 | 2 | $30 04 05 | A/C - high side pressure |
| 32 | 2 | $30 04 06 | A/C - low side pressure |
| 33 | 2 | $40 04 16 | Heated seat – driver side back only switch |
| 34 | 2 | $40 04 17 | Heated seat – driver side back and seat switch |
| 35 | 2 | $40 04 18 | Heated seat – passenger side back only switch |
| 36 | 2 | $40 04 19 | Heated seat – passenger side back and seat switch |
| 37 | 2 | $40 04 1A | Heated seat – driver side temperature |
| 38 | 2 | $40 04 1B | Heated seat – passenger side temperature |
| 39 | 2 | $30 04 A8 | HVAC actuator – supply voltage |
| 40 | 2 | $30 04 AD | A/C switch voltage |

213 214 215 FIG. 69 220

221

225

| 222 Functional Test 223 | Vehicle | Index value 224 | Memory address |
|---|---|---|---|
| Fuel pump engagement | YMME_1 | 4A | $AA31F4 |
| Close evaporator canister vent valve | YMME_1 | 4B | $4F8300 |
| Engine cooling fan high | YMME_1 | 4C | $58BB00 |
| Engine cooling fan low | YMME_1 | 4D | $3A905C |
| Fuel injector #1 on | YMME_1 | 4E | $4ABCD1 |
| Fuel injector #2 on | YMME_1 | 4F | $68DCA9 |
| Fuel injector #3 on | YMME_1 | 5A | $78EF00 |
| Fuel injector #4 on | YMME_1 | 5B | $47EADC |
| Fuel injector #5 on | YMME_1 | 5C | $ABFA31 |
| Fuel injector #6 on | YMME_1 | 5D | $C0A78F |
| Fuel injector #7 on | YMME_1 | 5E | $058CDE |
| Fuel injector #8 on | YMME_1 | 5F | $1A2B3C |
| EGR valve open | YMME_1 | 9A | $A43FCB |
| EGR valve closed | YMME_1 | 9B | $9061FD |
| Lock driver door | YMME_1 | 9C | $2F3E4D |
| Spark plug coil #3 off | YMME_1 | 9D | $AF071F |
| A/C switch on | YMME_1 | 9E | $A1B2C3 |
| Unlock driver door | YMME_1 | 9F | $F6E5D4 |
| Driver side heated seat on/off | YMME_1 | B1 | $C6C6C6 |
| Pasenger side heated seat on/off | YMME_1 | B2 | $8434DE |
| HVAC actuator on/off | YMME_1 | B3 | $ED6436 |
| Fuel pump on/off | YMME_2 | BA | $D90066 |
| Driver door lock/unlock | YMME_2 | BB | $C9D740 |
| Passenger door lock/unlock | YMME_2 | BC | $BA958E |
| Horn on/off | YMME_2 | BD | $BB0C85 |
| Driver side heated seat on/off | YMME_2 | BE | $D06CD0 |
| Pasenger side heated seat on/off | YMME_2 | BF | $BE0F1A |

FIG. 70

106

```
<testsets>
    <testset>
        <title>Fuel Pump</title> ←108
        <body>
            <section>
                <head>Testing Instructions</head>
                <text>
                Monitor the Fuel Pressure and Fuel Pump Voltage PIDs
                while the fuel pump is activated, using the provided
                functional test. When the fuel pump is activated, the vehicle
                fuel pressure should be approximately 46 PSI and system
                voltage should be applied to the fuel pump. Select "Guided
                Component Tests" to optionally measure voltage using the
                multi-meter.
                </text>                127
            </section>
            <section>
109             <head>Location</head>
                <text>
                The fuel pump is located in the fuel tank, and can be
                accessed for testing at the five-pin connector under the
                rear seat.
                </text>                128
            </section>
            <section>
                <head>Connector</head>
                <text>View: From Wiring Harness Side Of Fuel Pump
                Connector</text>
            </section>                    130
        </body>
        <pids>
            <pid>
                <name>Fuel Pump Voltage (V)</name> ←131
                <unit>voltage</unit> ←132
                <values>
                    <Value>
                        <testState>On</testState> ←135
133                     <minValue>12.0</minValue> ←136
                        <maxValue>14.0</maxValue> ←137
                    </Value>
110 112             <Value>
                        <testState>Off</testState> ←135
134                     <minValue>12.0</minValue> ←136
                        <maxValue>14.0</maxValue> ←137
                    </Value>
                </values>
            </pid>
```

FIG. 81A

106

```
110 {
114 {
<pid>
    <name>Fuel Pressure (PSI)</name>  ← 131
    <unit>psi</unit> ← 132
    <values>
138 {   <Value>
            <testState>On</testState> ← 135
            <minValue>41.0</minValue> ← 136
            <maxValue>47.0</maxValue> ← 137
        </Value>
    </values>
</pid>
116 {
<pid>
    <name>Fuel Pump Relay</name> ← 131
    <unit>on/off</unit> ← 132
    <values>
139 {   <Value>
            <testState>On</testState> ← 135
            <textValue>On</textValue> ← 143
        </Value>
    </values>
</pid>
144 {
<pid>
    <name>Short Term Fuel Trim-B1 (%)</name> ← 131
    <unit>%</unit> ← 132
</pid>
</pids>
118 {
<functionalTest>
    <Name>Fuel Pump Engagement</Name> ← 147
    <Description>
    This functional test activates and deactivates the vehicle's fuel
    pump ← 148
    </Description>
    <TestType>0</TestType> ← 149
    <Label>Functional Test</Label> ← 151
</functionalTest>
120 {
<componentTest>
    <name>Fuel Pump</name> ← 152
    <sequence>Engine|Fuel System|Fuel Pump</sequence> ← 153
    <CtmSystem>Engine</CtmSystem> ← 154
    <Tests>
155 {   <Test>
            <Name>Location</Name>
            <Sequence>Engine|Fuel System|Fuel Pump|Location</
            Sequence>
        </Test>
156 {   <Test>
            <Name>Connector</Name>
            <Sequence>Engine|Fuel System|Fuel Pump|Connector</
            Sequence>
        </Test>
    </Tests>
</componentTest>
```

FIG. 81B

106

```
122 {  <meterSettings>
            <numberOfChannels>2</numberOfChannels> ← 145
124 {       <channel1>
                <meterType>multimeter</meterType> ← 157
158 {           <horizontalAxis>
                    <timebase>10</timebase>
                    <unit>seconds</unit>
                </horizontalAxis>
159 {           <verticalAxis>
160 {               <unit>
                        <name>voltage</name>
                        <unitqualifier>dc</unitqualifier>
                    </unit>
                    <offset>5</offset> ← 161
                    <scale>20</scale> ← 162
                </verticalAxis>
163 {           <trigger>
                    <slopeType>rising</slopeType>
                    <scale>14</scale>
                </trigger>
            </channel1>
126 {       <channel2>
                <meterType>pid</meterType> ← 164
                <name>Fuel Pressure (PSI)</name> ← 146
            </channel2>
        </meterSettings>
    </testset>
</testsets>
```

FIG. 81C

825

```
<?xml version="1.0"? encoding="UTF-8"?>                                          } 165
<response xmlns:i="http://www.w3.org/2001/XMLSchema-instance">                   }
<?xml-stylesheet type="text/css" href="TS6.css"?>                                }
<testSet>                                                                          (166)
    <testSetName>Fuel Pump / Target Signal: Fuel Pump Voltage</testSetName>  ←167
    <container>                                                                    (168)
        <height>"5%"</height> ←172
        <width>"98%"</width> ←173
        <verticalPosition>"1% from top"</verticalPosition> ←174
        <horizontalPosition>"1% from left"</horizontalPosition> ←175
        <text>Fuel Pump / Target Signal: Fuel Pump Voltage</text> ←176
    </container>
    <container>                                                                    (169)
        <height>"85%"</height> ←172
        <width>"98%"</width> ←173
        <verticalPosition>"6% from top"</verticalPosition> ←174
        <horizontalPosition>"1% from left"</horizontalPosition> ←175
        <graph>                                                                    } 177
            <verticalAxisUnits>VDC</verticalAxisUnits>
            <verticlalAxisScale>"5"</verticlalAxisScale>
            <verticalAxisRange>"-5, 15"</verticalAxisRange>
            <horizontalAxisUnits>Seconds</horizontalAxisUnits>
            <horizontalAxisScale>"1"</horizontalAxisScale> </graph>
    </container>
    <container>                                                                    (170)
        <height>"8%"</height> ←172
        <width>"98%"</width> ←173
        <verticalPosition>"91% from top"</verticalPosition> ←174
        <horizontalPosition>"1% from left"</horizontalPosition> ←175
        <text>Vehicle ID: "vehicle ID"</text> ←176
        <usc>"standard GUI controls"</usc> ←178
    </container>
    <container>                                                                    (171)
        <usc>                                                                      (179)
            <uscType>"circular"</uscType> ←185
                <rule>                                                             (190)
                    <ifCondition="pid54", "on">
                    <thenUscIcon>"lightning bolt"</thenUscIcon>
                    <elseUscIcon>"lighting bolt stricken"</elseUscIcon>
                </rule>
```

FIG. 82A

825

```
181 <usc>
        <uscType>"circular"</uscType> ← 185
        <uscIcon>"connector"</uscIcon> ← 200
        <uscFunction>"instruction"</uscFunction> ← 201
            <instruction>"GET", "4 pin connector.bmp"</instruction>
            <instruction>"GET", "pins and wire colors.bmp"</instruction>
        <verticalPosition>"10% from top"</verticalPosition> ← 187
        <horizontalPosition>"81% from left"</horizontalPosition> ← 189
    </usc>
183 <usc>
        <uscType>"circular"</uscType> ← 185
        <uscIcon>"list"</uscIcon> ← 202
        <uscFunction>
204         <pid>
                <pidKey>"PID31", "parameterValue"</pidKey> ← 208
                <rangeTop>15</rangeTop> ← 211
                <rangeBottom>3</rangeBottom> ← 212
                <unit>Volts DC</unit> ← 210
            </pid>
205         <pid>
                <pidKey>"PID32", "parameterValue"</pidKey> ← 208
                <expectedValue>ON</expectedValue</expectedValue>
                <unit>Null</unit> ← 210
            </pid>
206         <pid>
                <pidKey>"PID33", "parameterValue"</pidKey> ← 208
                <unit>Percent</unit> ← 210
            </pid>
207         <pid>
                <pidKey>"PID6", "parameterValue"</pidKey> ← 208
                <rangeTop>85</rangeTop> ← 211
                <rangeBottom>12</rangeBottom> ← 212
                <unit>PSI</unit> ← 210
            </pid>
        </uscFunction>
        <verticalPosition>"10% from top"</verticalPosition> ← 187
        <horizontalPosition>"89% from left"</horizontalPosition> ← 189
    </usc>
  </container>
  <componentTest = "CT12"> ← 845
  <vehicleIdentifier = "Y/M/M/E"> ← 846
</testSet>
```

FIG. 82C

400

```
{ "test set": {
  "testSetName" : "Fuel Pump / Target Signal: Fuel Pump Voltage",
  "vehicleYear" : "2014",
  "vehicleMake" : "Acme",                440
  "vehicleModel" : "Mamba",
  "vehicleEngine" : "5.7 L"}  {
  "containers" : [
    {
      "heightPercent" : 5,
      "widthPercent" : 98,
441   "verticalPositionPercentFromTop" : 1,
      "horizontalPositionPercentFromLeft" : 1,
      "text" : "Fuel Pump / Target Signal: Fuel Pump Voltage"
    },
    {
      "heightPercent" : 85,
      "widthPercent" : 98,
      "verticalPositionPercentFromTop" : 6,
      "horizontalPositionPercentFromLeft" : 1,
      "text" : "Fuel Pump / Target Signal: Fuel Pump Voltage",
      "graph" : {
          "verticalAxisUnits" : "VDC",
442       "verticalAxisScale" : 5,
          "verticalAxisRangeLower" : -5,
          "verticalAxisRangeUpper" : 15,
          "horizontalAxisUnits" : "seconds",
          "horizontalAxisScale" : 1
                }
    }
    {
      "heightPercent" : 8,
      "widthPercent" : 98,
      "verticalPositionPercentFromTop" : 91,
443   "horizontalPositionPercentFromLeft" : 1,
      "text" : "2014 Acme Mamba 5.7L",
      "usc" : "standard GUI controls"
    }         ]            }
    {
      "usc": [
          {
          "uscTypeCircular": true,
          "uscIcon": ["PID 54", "on", "lightening bolt].
     444  "uscIcon": ["PID 54", "off", "lightening bolt stricken"]
          "uscFunction": ["function": "control", "functional test":
                "4A"].
          "verticalPositionPercentFromTop": 10
          "horizontalPositionPercentFromLeft": 65
          },
```

FIG. 83A

400

445
{
"uscTypeCircular": true,
"uscIcon": "map pin",
"uscFunction": ["function": "instruction", "text" : "Connect test leads," "text": "- Yellow = Fuel Pump Supply Voltage", "text" : "- Black = Known Good Ground"]
"componentTest": 2F,
"configure" : ["device" : "oscilloscope", "sample rate" : "1.5 MB/s", "vertical scale" : "5 volts/div", "vertical scale max" : 25 volts", "horizontal scale" : "250 ms/div", "trigger mode" : "rising edge", "trigger voltage" : "0 volts", "voltage offset" : "0 volts", "invert" "off"]
"verticalPositionPercentFromTop": 10
"horizontalPositionPercentFromLeft": 73
},
446
{
"uscTypeCircular": true,
"uscIcon": "connector",
"uscFunction": ["function": "instruction", "image": "4 pin connector.bmp", "image": "pins and wire colors.bmp"],
"verticalPositionPercentFromTop": 10
"horizontalPositionPercentFromLeft": 81
},
493
{
"uscTypeCircular": true,
"uscIcon": "list",
"uscFunction": [
{"pidKey": "Fuel Pump Voltage", "rangeTop": 15, "rangeBottom" 3, "unit": "Volts DC"
},
{"pidKey": "Fuel Pump Relay", "expected_value": "on", "unit": null"
}
{"pidKey": "Short Term Fuel Trim", "unit": "percent"
},
{"pidKey": "Fuel Pump Pressure", "rangeTop": 85, "rangeBottom" 12, "unit": "PSI"
} ]
"verticalPositionPercentFromTop": 10
"horizontalPositionPercentFromLeft": 89
}
]
}
}

FIG. 83B

METHOD AND SYSTEM FOR SERVICING A VEHICLE USING A TEST SET

REFERENCE TO RELATED APPLICATION

This application is a continuation of U.S. patent application Ser. No. 17/667,997, filed on Feb. 9, 2022, titled Method and System for Servicing a Vehicle Using a Test Set, which was published on Aug. 10, 2023, as U.S. Patent Application Publication No. 2023/0252824 A1. U.S. patent application Ser. No. 17/667,997 and U.S. Patent Application Publication No. 2023/0252824 A1 are hereby incorporated by reference in their entireties.

BACKGROUND

Most vehicles are serviced at least once during their useful life. In many instances, a vehicle is serviced at a facility with professional mechanics (e.g., technicians). The technicians can use any of a variety of non-computerized hand tools to service (e.g., diagnose, maintain, or repair) any of the wide variety of mechanical components on a vehicle. The technicians from time to time also use computerized tools to service a vehicle.

Early on, companies that provided computerized tools provided computerized tools with dedicated functionality, such as a computerized tool dedicated to electronic meter functionality, a computerized scan tool dedicated to transmitting and receiving messages according to a vehicle data message protocol, or a computerized tool dedicated to providing information to guide a technician to service a vehicle. Thereafter, at least some companies have provided computerized tools with functionality from the multiple legacy computerized tools, but the functionality from those legacy computerized tools operate in silos (e.g., without any inter-operability). For example, a computerized tool can include a menu from which electronic meter functionality and scan tool functionality can be accessed separately using separate menu selections without the ability to perform such functionality simultaneously.

Additionally, in some instances, a technician uses a computerized tool with scan tool functionality to perform a functional test on the vehicle and uses one or more of her senses to directly perceive a change in vehicle performance in response to performing the functional test. For instance, the technician may perform a functional test to control an audible warning horn on a vehicle and perceive sound waves emitted by the horn during performance of the functional test. In some instances, the horn may not emit any sound waves during performance of the functional test or may emit sound waves at one or more frequencies that indicate that the horn is malfunctioning. In those or in other instances, a technician may be able to service a vehicle more efficiently if the technician is provided with a computerized tool configured for presenting a representation of a target signal corresponding to performance of the functional test. This is especially true for situations in which it is difficult or impossible for a technician to discern the precise timing between initiating and/or performing a functional test with respect to different characteristics of a target signal related to the functional test.

Additionally, while servicing a vehicle, sometimes a technician needs information for servicing the vehicle, and for post-repair activities performed to a repaired vehicle. The technician may use a vehicle information system that obtains and displays parameter values corresponding to a parameter-identifier (PID). With hundreds of different parameter-identifiers (PIDs) being available for each of hundreds of different types of vehicles, the technician may not know which PIDs are applicable or helpful for diagnosing a particular symptom for a particular vehicle. This may lead to a technician guessing which PIDs should be requested to diagnose the symptom. If the technician guesses incorrectly, the technician may not see PID parameter values that would lead to a quicker and more accurate diagnosis of the symptom.

OVERVIEW

Several example implementations that relate to servicing a vehicle using a test set are described herein. In at least some implementations, a computing system for servicing a vehicle outputs, during performance of the test set, a representation of a performance of a component test, a representation of a target signal, and/or a diagnostic status of a vehicle determined by the computing system. Outputting such representation or diagnostic status is beneficial to diagnosing and repairing a vehicle, at least in part, because the representation can be displayed on a display even after component test has ended, a characteristic of the target signal has changed, and/or the diagnostic status has changed.

In a first implementation, a method is provided. The method includes determining, by a processor of a computing system, a test set that is to be performed on a vehicle corresponding to a particular vehicle identifier. The method also includes determining, by the processor based at least in part on the test set and the particular vehicle identifier, a component test and a functional test command, the component test and a first set of parameter identifiers, or the functional test command and a second set of parameter identifiers. The component test corresponds to a particular component of the vehicle. The functional test command is for requesting control of a controllable component of the vehicle. If the processor determines the component test and the functional test command, then the method further includes: (A) configuring, by the processor, a test device to be in a mode to perform the component test corresponding to the particular component of the vehicle, (B) outputting, by the processor on a display, a first graphical user interface including a first user-selectable control corresponding to the functional test command, (C) transmitting, by the processor in response to a selection of the first user-selectable control, a first vehicle data message including the functional test command, the first vehicle data message being directed to an electronic control unit of the vehicle, and (D) outputting, by the processor within the first graphical user interface, a representation of a performance of the component test during a time period while the controllable component is controlled in response to transmitting the first vehicle data message. Alternatively, if the processor determines the component test and the first set of parameter identifiers, then the method further includes: (E) configuring, by the processor, the test device to be in the mode to perform the component test corresponding to the particular component of the vehicle, (F) outputting, by the processor on the display, a second graphical user interface, (G) receiving, by the processor in response to transmitting a set of vehicle data messages to the vehicle during a performance of the component test, a first set of parameter values corresponding to the first set of parameter identifiers, and (H) outputting, by the processor within the second graphical user interface, the first set of parameter values corresponding to the first set of parameter identifiers, and a representation of a performance of the component test during a time period in which the processor receives the first set of parameter. Alternatively, if the processor determines the functional test command and the second set of parameter identifiers, then the method further includes: (I) outputting, by the processor on the display, a third graphical user interface including a second user-selectable control corresponding to the functional test command, (J) transmitting, by the processor in response to a selection of the second user-selectable control, a second vehicle data message including the functional test command, the second vehicle data message being directed to the electronic control unit of the vehicle, (K) receiving, by the processor in response to transmitting a set of vehicle data messages to the vehicle during a time period while the controllable component is controlled in response to transmitting the second vehicle data message, a first set of parameter values corresponding to the second set of parameter identifiers, and (L) outputting, by the processor within the third graphical user interface, the first set of parameter values corresponding to the second set of parameter identifiers received in response to transmitting the set of vehicle data messages to the vehicle during the time period while the controllable component is controlled in response to transmitting the second vehicle data message.

In a second implementation, a computing system is provided. The computing system includes a display, a processor, and a non-transitory computer-readable medium having stored thereon instructions executable by the processor to perform functions. The functions include determining, by the processor, a test set that is to be performed on a vehicle corresponding to a particular vehicle identifier. The functions also include determining, by the processor based at least in part on the test set and the particular vehicle identifier, a component test and a functional test command, the component test and a first set of parameter identifiers, or the functional test command and a second set of parameter identifiers. The component test corresponds to a particular component of the vehicle. The functional test command is for requesting control of a controllable component of the vehicle. Additionally, if the processor determines the component test and the functional test command, then the functions further include: (A) configuring, by the processor, a test device to be in a mode to perform the component test corresponding to the particular component of the vehicle, (B) outputting, by the processor on the display, a first graphical user interface including a first user-selectable control corresponding to the functional test command, (C) transmitting, by the processor in response to a selection of the first user-selectable control, a first vehicle data message including the functional test command, the first vehicle data message being directed to an electronic control unit of the vehicle, and (D) outputting, by the processor within the first graphical user interface, a representation of a performance of the component test during a time period while the controllable component is controlled in response to transmitting the first vehicle data message. Alternatively, if the processor determines the component test and the first set of parameter identifiers, then the functions further include: (E) configuring, by the processor, the test device to be in the mode to perform the component test corresponding to the particular component of the vehicle, (F) outputting, by the processor on the display, a second graphical user interface, (G) receiving, by the processor in response to transmitting a set of vehicle data messages to the vehicle during a performance of the component test, a first set of parameter values corresponding to the first set of parameter identifiers, and (H) outputting, by the processor within the second graphical user interface, the first set of parameter values corresponding to the first set of parameter identifiers, and a representation of a performance of the component test during a time period in which the processor receives the first set of parameter values. Alternatively, if the processor determines the functional test command and the second set of parameter identifiers, then the functions further include: (I) outputting, by the processor on the display, a third graphical user interface including a second user-selectable control corresponding to the functional test command, (J) transmitting, by the processor in response to a selection of the second user-selectable control, a second vehicle data message including the functional test command, the second vehicle data message being directed to the electronic control unit of the vehicle, (K) receiving, by the processor in response to transmitting a set of vehicle data messages to the vehicle during a time period while the controllable component is controlled in response to transmitting the second vehicle data message, a first set of parameter values corresponding to the second set of parameter identifiers, and (L) outputting, by the processor within the third graphical user interface, the first set of parameter values corresponding to the second set of parameter identifiers received in response to transmitting the set of vehicle data messages to the vehicle during the time period while the controllable component is controlled in response to transmitting the second vehicle data message.

In a third implementation, a non-transitory computer-readable medium is provided. The non-transitory computer-readable medium has stored thereon instructions executable by a processor to cause a computing system to perform functions. The functions include determining, by the processor, a test set that is to be performed on a vehicle corresponding to a particular vehicle identifier. The functions also include determining, by the processor based at least in part on the test set and the particular vehicle identifier, a component test and a functional test command, the component test and a first set of parameter identifiers, or the functional test command and a second set of parameter identifiers. The component test corresponds to a particular component of the vehicle. The functional test command is for requesting control of a controllable component of the vehicle. Additionally, if the processor determines the component test and the functional test command, then the functions further include: (A) configuring, by the processor, a test device to be in a mode to perform the component test corresponding to the particular component of the vehicle, (B) outputting, by the processor on the display, a first graphical user interface including a first user-selectable control corresponding to the functional test command, (C) transmitting, by the processor in response to a selection of the first user-selectable control, a first vehicle data message including the functional test command, the first vehicle data message being directed to an electronic control unit of the vehicle, and (D) outputting, by the processor within the first graphical user interface, a representation of a performance of the component test during a time period while the controllable component is controlled in response to transmitting the first vehicle data message. Alternatively, if the processor determines the component test and the first set of parameter identifiers, then the functions further include: (E) configuring, by the processor, the test device to be in the mode to perform the component test corresponding to the particular component of the vehicle, (F) outputting, by the processor on the display, a second graphical user interface, (G) receiving, by the processor in response to transmitting a set of vehicle data messages to the vehicle during a performance of the component test, a first set of parameter values corresponding to the first set of parameter identifiers, and (H)

outputting, by the processor within the second graphical user interface, the first set of parameter values corresponding to the first set of parameter identifiers, and a representation of a performance of the component test during a time period in which the processor receives the first set of parameter values. Alternatively, if the processor determines the functional test command and the second set of parameter identifiers, then the functions further include: (I) outputting, by the processor on the display, a third graphical user interface including a second user-selectable control corresponding to the functional test command, (J) transmitting, by the processor in response to a selection of the second user-selectable control, a second vehicle data message including the functional test command, the second vehicle data message being directed to the electronic control unit of the vehicle, (K) receiving, by the processor in response to transmitting a set of vehicle data messages to the vehicle during a time period while the controllable component is controlled in response to transmitting the second vehicle data message, a first set of parameter values corresponding to the second set of parameter identifiers, and (L) outputting, by the processor within the third graphical user interface, the first set of parameter values corresponding to the second set of parameter identifiers received in response to transmitting the set of vehicle data messages to the vehicle during the time period while the controllable component is controlled in response to transmitting the second vehicle data message.

In a fourth implementation, a method is provided. The method includes determining, by a processor of a computing system, a test set that is to be performed on a vehicle corresponding to a particular vehicle identifier. The method also includes determining, by the processor based at least in part on the test set and the particular vehicle identifier, a component test corresponding to a particular component of the vehicle and a functional test command for requesting control of a controllable component of the vehicle. Additionally, the method includes configuring, by the processor, a test device to be in a mode to perform the component test corresponding to the particular component of the vehicle. Furthermore, the method includes outputting, by the processor on a display, a graphical user interface (GUI) including a user-selectable control (USC) corresponding to the functional test command. Furthermore still, the method includes transmitting, by the processor in response to a selection of the USC, a vehicle data message (VDM) including the functional test command. The VDM is directed to an electronic control unit of the vehicle. Finally, the method includes outputting, by the processor within the GUI, a representation of a performance of the component test corresponding to the particular component of the vehicle during a time period while the controllable component is controlled in response to transmitting the VDM.

In a fifth implementation, a computing system is provided. The computing system includes a display, a processor, and a non-transitory computer-readable medium. The non-transitory computer-readable memory has instructions stored thereon. The instructions are executable by the processor to perform functions. The functions include determining, by the processor, a test set that is to be performed on a vehicle corresponding to a particular vehicle identifier. The functions include determining, by the processor based at least in part on the test set and the particular vehicle identifier, a component test corresponding to a particular component of the vehicle and a functional test command for requesting control of a controllable component of the vehicle. The functions also include configuring, by the processor, a test device to be in a mode to perform the component test corresponding to the particular component of the vehicle. Additionally, the functions include outputting, by the processor on a display, a GUI including a user-selectable control corresponding to the functional test command. Furthermore, the functions include transmitting, by the processor in response to a selection of the user-selectable control, a VDM including the functional test command. The VDM is directed to an electronic control unit of the vehicle. Finally, the functions include outputting, by the processor within the GUI, a representation of a performance of the component test corresponding to the particular component of the vehicle during a time period while the controllable component is controlled in response to transmitting the VDM.

In a sixth implementation, a non-transitory computer-readable medium is provided. The non-transitory computer-readable memory has instructions stored thereon. The instructions are executable by a processor to cause a computing system to perform functions. The functions include determining a test set that is to be performed on a vehicle corresponding to a particular vehicle identifier. The functions include determining, based at least in part on the test set and the particular vehicle identifier, a component test corresponding to a particular component of the vehicle and a functional test command for requesting control of a controllable component of the vehicle. The functions also include configuring a test device to be in a mode to perform the component test corresponding to the particular component of the vehicle. Additionally, the functions include outputting, on a display, a GUI including a user-selectable control corresponding to the functional test command. Furthermore, the functions include transmitting, in response to a selection of the user-selectable control, a VDM including the functional test command. The VDM is directed to an electronic control unit of the vehicle. Finally, the functions include outputting, within the GUI, a representation of a performance of the component test corresponding to the particular component of the vehicle during a time period while the controllable component is controlled in response to transmitting the VDM.

BRIEF DESCRIPTION OF THE DRAWINGS

Example implementations are described herein with reference to the drawings.

27.

FIG. 41 shows test device configurations parameters in accordance with the example implementations.

FIG. 51 is a diagram showing mapping data in accordance with the example implementations.

FIG. 53 is a diagram showing mapping data in accordance with the example implementations.

FIG. 54 is a diagram showing functional-test-to-PID mapping data in accordance with the example implementations.

FIG. 55 is a diagram showing reset-procedure-to-PID mapping data in accordance with the example implementations.

FIG. 56 is a diagram showing component-test-to-PID mapping data in accordance with the example implementations.

FIG. 57 is a diagram showing test-set-to-PID mapping data in accordance with the example implementations.

FIG. 58A and FIG. 58B show a PID index in accordance with the example implementations.

FIG. 59 shows a component test index in accordance with the example implementations.

FIG. 60 shows a functional test index in accordance with the example implementations.

FIG. 61 shows a reset procedure index in accordance with the example implementations.

FIG. 62 shows a test set index in accordance with the example implementations.

FIG. 63 is a diagram showing PIDs and PID parameter values communicated by vehicles in accordance with the example implementations.

FIG. 65 is a diagram showing mapping data in accordance with the example implementations.

FIG. 66 is a diagram showing baseline characteristics of a target signal in accordance with the example implementations.

FIG. 67 shows a thumbnail image of a target signal in accordance with the example implementations.

FIG. 68 shows PID thresholds in accordance with the example implementations.

FIG. 69 and FIG. 70 are diagrams showing mapping data in accordance with the example implementations.

FIG. 81A, FIG. 81B and FIG. 81C show content of a test set file in accordance with the example implementations.

FIG. 82A, FIG. 82B, and FIG. 82C show content of a test set file in accordance with the example implementations.

FIG. 83A and FIG. 83B show content of a test set file in accordance with the example implementations.

Figure 1:
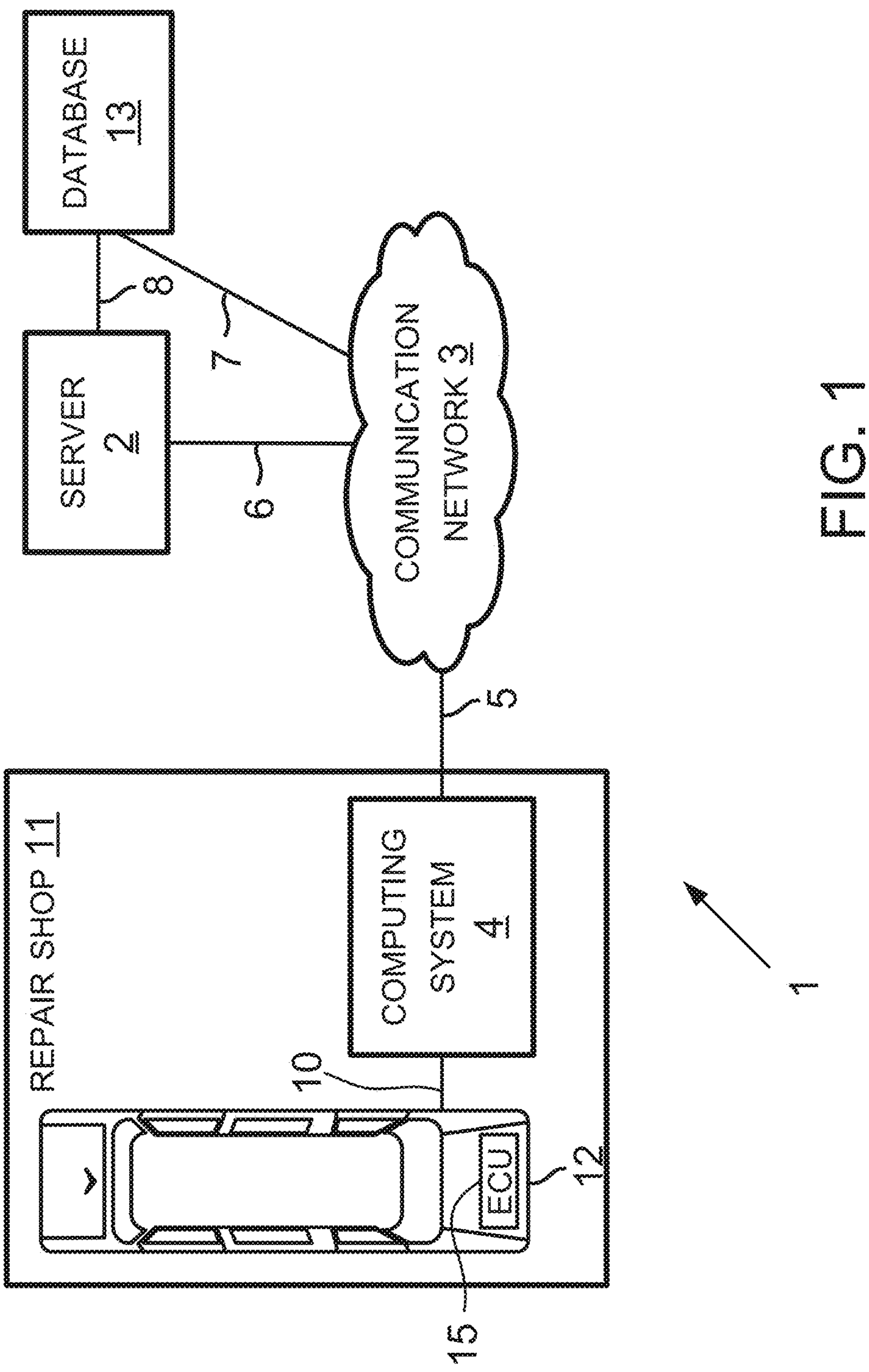
FIG. 1 is a diagram showing an operating environment in which the example implementations can operate.

All the figures are schematic and not necessarily to scale.

DETAILED DESCRIPTION

I. Introduction

This description describes several example implementations that pertain to performing a test set using a computing system. The methods and systems pertaining to use of a test set to service a vehicle (e.g., diagnose, maintain, and/or repair a vehicle) can lead to a quicker and more reliable service outcome than via the use of existing methods and systems.

In at least some of the implementations, performing a test set includes performing two or more tasks selected from among: a functional control test of a vehicle component, a signal measurement using a test device such as a meter or oscilloscope (i.e., a component test), reading a PID parameter value, or a manual user adjustment. Table A below shows the various combinations of those tasks that can be carried out during performance of a test set. Each row after the first row shows the type of tasks that can be included within a test set. In other words, the X in each row after the first row indicates that the task corresponding to that X is part of performing a test set. A benefit of including multiple tasks described below in a test set is that the multiple tasks are available via a GUI as compared to having to perform those tasks from separate GUIs.

TABLE A

| Functional Control Test | Signal Measurement | PID Parameter Value Reading | Manual User Adjustment |
|---|---|---|---|
| X | X | | |
| X | | X | |
| X | | | X |
| | X | X | |
| | X | | X |
| | | X | X |
| X | X | X | |
| X | X | | X |
| | X | X | X |
| X | X | X | X |

A functional control test (or more simply, a functional test) includes controlling a controllable component in a vehicle by transmitting a VDM to the vehicle including the controllable component. The VDM that causes control of the vehicle component can include a functional test command that identifies the functional control test. The VDM can be sent in response to a selection of a USC. The VDM can be directed to one or more vehicle components of the vehicle.

In at least some implementations, the VDM is directed to an ECU within the vehicle. In some implementations, the controllable component is the ECU. In at least some other implementations, the controllable component is connected to an ECU via a wired or wireless connection.

A signal measurement (i.e., measuring a signal) with respect to a vehicle component can be referred to as a component test. A component test within a test set file can include instructions executable by a processor and/or guidance for configuring a test device to be in a mode for measuring the signal. The signal measurement can include measuring a signal input to a vehicle component or output by the vehicle component. The measured signal can be referred to as a target signal.

The second row in Table A indicates that performing a test set can include performing a functional control test and a signal measurement. The signal measurement can be carried out before, while, and/or after a controllable component in the vehicle is controlled using the functional control test. The signal for the signal measurement can be input to or output by the controllable component or another component in the vehicle.

Reading a PID parameter value (or more simply, a PID PV or PID parameter) includes a processor receiving a VDM transmitted by the vehicle, the VDM including a PID and a parameter value corresponding to the PID. In at least some implementations, the processor requests the VDM from the vehicle by sending another VDM to the vehicle. The other VDM includes the PID. In at least some implementations, the processor reads the PID and the parameter value from a VDM transmitted by the vehicle without receiving a request for the VDM from the computing system. In at least some implementations, a processor receives a VDM directly from the vehicle, whereas in other implementation, a processor receives a VDM indirectly (such as from a dongle 43 shown in FIG. 79).

A manual user adjustment includes an adjustment to a component on the vehicle. As an example, performing a manual user adjustment can include turning a component on or off, opening or closing a component, setting a component to a particular position, placing a switch in a particular position, increasing or decreasing a speed of an engine, increasing or decreasing a speed of the vehicle, changing a direction of the vehicle, changing a load on the engine, adjusting a fluid level in a vehicle component (e.g., adding oil to an engine or removing air from a tire), or changing a fluid in the vehicle. Other examples of performing a manual user adjustment are also possible.

A test set can be defined by a test set file. A processor within the computing system can read a test set file. A processor within the computing system can write a test set file into a memory. A test set file can include settings for multiple devices in the computing system to carry out the test set. As an example, the multiple devices can include two or more from among: a meter, an oscilloscope, a vehicle communication transceiver, or a display (e.g., one display or two or more displays). A test set file can, for example, be arranged as an XML file or a JSON file.

The computing system can include a display. A processor can cause the display to display a GUI. In at least some implementations, the GUI is included within a displayable page, such as a web page, displayable on the display. In at least some implementations, the GUI includes the USC selectable to cause transmission of the VDM including the functional test command. The processor that outputs the GUI can determine that the USC was selected and responsively transmit the VDM. A test set file can include a GUI or data for populating a GUI on a display. A test set file can include or reference a template for generating the GUI. The test set file can include guidance corresponding to a test set defined by the test set file. The guidance can include diagnostic information corresponding to the test set.

A container is an element of a GUI and/or an element of a page displayable on a display. A container is associated with content that can be displayed within an area of a GUI and/or a page defined for the container. As an example, the content associated with a container can include one or more of a USC, a graph, an icon, text, an image, a video, a PID, or a parameter value corresponding to a PID. Other examples of content displayable within a container are also possible. The application drawings show at least some of those other examples.

A container can be associated with a default location within a GUI and/or a displayable page. In some implementations, the default location within a GUI and/or a page to display the container is fixed. In at least some implementations, a location to display the container can change, such as by moving the container from one location (e.g., a default location) within the GUI and/or page to another location within the GUI and/or page, and/or by increasing or decreasing a size of an area of the container. In at least some implementations, a GUI can include multiple portions (e.g., first and second portions) and the multiple portions can be output on multiple, distributed displays (e.g., the first portion is displayed on a first display and the second portion is displayed on a second display).

A container can be related to one or more other containers. As an example, two or more containers can be related as defined by a hierarchical relationship in which a first of the two containers is within a second of the two containers, and/or the second of the two containers includes the first container. In accordance with this example, the second container is considered to be a parent container, whereas the first container is considered to be a sub-container (and/or a child container). Although the example hierarchical relationship refers to the first container being within the second container, the hierarchical relationship does not require that displaying the first and second containers includes displaying the first container, wholly or even partly, within a boundary established for the second container. For example, in some implementations, displaying the first container could include displaying at least a portion of the first container beyond the boundary established for the second container.

A sub-container is a container that corresponds to a parent container. In at least some implementations, a container defined within a GUI and/or page as being within another container is a sub-container. The container that includes that sub-container is a parent container. A sub-container can be a parent container to one or more other sub-containers.

In at least some implementations, a container or sub-container is arranged as a display card. The containers within the user-interfaces of the example implementations can be displayed using various container properties. As an example, in at least some implementations, a container can have a boundary property. A boundary property can be non-visible, such that no visible boundary is displayed while the container having that boundary property is displayed. A different boundary property can be visible, such that a visible boundary is displayed while the container having that boundary property is displayed. As an example, a visible boundary could specify one or more of a line thickness, color, or a drop shadow. Other examples of a container property are also possible.

Furthermore, in at least some implementations, a diagnostic status of the vehicle is determined through use of a test set. Determining the diagnostic status of the vehicle can include determining a diagnostic status of a component and/or system of the vehicle. In at least some implementations, determining the status of the vehicle, system, and/or component can include the computing system requesting from the vehicle a parameter value for a parameter-identifier that corresponds to a target signal measured by performing a component test of the test set.

Additionally, or alternatively, determining the status of the vehicle, system, and/or component can include determining a characteristic of the target signal measured during performance of a component test. The computing system can determine the characteristic over a period of time, such as period of time that includes at least a portion of time that a controllable component is being controlled by performing a functional control test of the test set. Upon determining the status of the vehicle, system, and/or component, the computing system can output an indication of the status on the display.

Furthermore still, in at least some implementations, determining the status of the vehicle, system, and/or component can include requesting parameter value(s) corresponding to one or more PIDs from an ECU and/or determining a characteristic of a target signal output by the ECU or a different component within the vehicle, such as an ECU controlled output (ECO). A characteristic based on the parameter value(s) or the target signal can be determined and then compared to a baseline characteristic corresponding to the target signal and/or a functional control test corresponding to a functional test command sent to the vehicle. In at least some implementations, the characteristic of the target signal can be determined without requesting a specific change in the ongoing operation or configuration of the vehicle. In other implementations, however, a specific change in the ongoing operation or configuration of the vehicle may be requested by sending a VDM to the vehicle or manually in order to detect how the target signal reacts to the change in the ongoing operation or configuration of the vehicle. Determining changes in the target signal based on changes in the ongoing operation or configuration of the vehicle can be helpful in determining the status of the vehicle, system, and/or component. The computing system can compare the characteristics of the target signal to baseline characteristics that depend on the operation or configuration of the vehicle (e.g., baseline characteristics that depend on a speed of the vehicle or an operating temperature of the vehicle).

As an example, during diagnosis of a vehicle system that includes an electrical pump (e.g., an electrical fuel pump), commanding a change in the operation of the fuel pump by transmitting a VDM to the vehicle may reduce the burden of making a determination whether faulty operation of the system lies with the pump itself or, instead, within a wiring harness or other electrical components that serve the pump. In this example, observable quantities like parameter value (s) corresponding to a PID, measured pressures, or other detected quantities pertaining to a single operating state of the fuel pump may be insufficient to unambiguously diagnose whether the fuel pump itself has failed or, rather, that the connectors, wiring harness, pump controller, or other components have failed. Thus, to unambiguously diagnose a problem with the operation of the pump, it may be helpful to command the fuel pump to be turned off, to be turned on, to set the fuel pump to a specified level (e.g., speed, power), or to otherwise control the operation of the fuel pump. Baseline characteristics corresponding to the fuel pump, such as an output fuel pump pressure characteristic, a fuel pump voltage level characteristic, or some other characteristic pertaining to operation of the fuel pump can be detected before, while, and/or after controlling the operation of the fuel pump and used to diagnose the status and operation of the fuel pump and/or the system including the fuel pump.

In at least some implementations, performing a test set can include requesting performance of one or more from among: an information test, a toggle test, a variable control test, and/or a reset test. An information test is a test in which an ECU or other vehicle component reads data, such as data stored in a computer-readable memory or a data register, and provides the data to the computing system. As an example, the data can include a calibration value, a parameter value corresponding to a PID, and/or a parameter value a first ECU receives from a second ECU during a non-diagnostic vehicle communication. A toggle test is a particular type of functional control test used to switch a vehicle component, such as a solenoid, relay or switch between two operating states (e.g., on or off, or open or closed). A variable control is a type of functional control test used to command a certain value for a vehicle component or vehicle system, such as varying spark time in one-degree increments or varying an exhaust gas recirculation (EGR) valve duty cycle in ten percent increments. A reset test is a test to check an adaptive or learned value stored in a memory of an ECU after performing a reset procedure to store the adaptive or learned value in the ECU. Performing a reset test can include transmitting a VDM to request performance of a reset procedure, examples of which are shown in FIG. 61. A toggle test or a variable control test can include a temporal element in that the functional control test can specify to switch to a different operating state for a number of seconds or to switch to the certain value for a number of seconds.

In at least some implementations, the computing system can transmit to a vehicle a first VDM including a PID, and receive from the vehicle, in response to transmitting the VDM including the PID, a second VDM including the PID and parameter value corresponding to the PID. The computing system can convert the PID into a textual PID. The computing system can compare the parameter value to a threshold or expected value corresponding to the PID. The computing system can output an indicator indicative of whether the parameter value has breached the threshold or does not match the expected value. In at least some implementations, that indicator can be a flag icon, or more simply, a flag. For purposes of this description, the drawings show a white flag to indicate that none of the parameter values corresponding a particular PID has breached a threshold value for that PID or is not an unexpected parameter value. On the other hand, the drawings show a black flag to indicate that at least one parameter value corresponding to a particular PID has breached a threshold for that PID or is an unexpected parameter value. A parameter value is unexpected if the component and/or system is operating without a malfunction. The flag(s) can represent the determined diagnostic status of the vehicle, system, and/or component. Other examples of representing the diagnostic status are also possible.

In this description, numbers within parenthesis do not pertain to drawing reference numbers, although the numbers in the parenthesis may be shown in the drawings. For example, some numbers within parenthesis within this description are shown in a drawing showing example data that can be displayed on a computing system.

The following abbreviations or acronyms are used in this description at least once. An abbreviation or acronym that ends with a lowercase “s” represents a plural version of the abbreviation or acronym not including the lowercase “s.”

CRPI—computer-readable program instructions
CT—component test
DTC—diagnostic trouble code
DVD—digital video disk
ECO—ECU controlled output
ECU—electronic control unit
EEPROM—electronically erasable program read-only memory
EGR—exhaust gas recirculation
FIG.—figure
FT—functional test
GUI—graphical user interface
HVAC—heating ventilation air conditioning
IEEE—Institute of Electrical and Electronics Engineers
IP—internet protocol
JSON—JavaScript Object Notation
LCD—liquid crystal display
OBDC—on-board diagnostic connector
OLED—organic light-emitting diode
PID—parameter-identifier
PV—parameter value
RAM—random access memory
ROM—read-only memory
RP—reset procedure
RTOS—real-time operating system
SAE—Society of Automotive Engineers
TCP—transmission control protocol
TS—test set
USC—user-selectable control
VDM—vehicle data message
WAN—wide area network
XML—extensible markup language

II. Example Systems

A. Operating Environment

FIG. 1 is a diagram showing an operating environment 1 in which the example implementations can operate. The operating environment 1 includes a server 2, a communication network 3, a computing system 4, a communication link 5, 6, 7, 8, 10, a repair shop 11, a vehicle 12, a database 13, and an ECU. The communication link 10 operatively connects the computing system 4 and the vehicle 12 and/or the ECU 15. In at least some implementations, the communication link 10 includes one or more communication channels. In those or in other implementations, the communication link 10 can also include power circuits (e.g., a battery-connected circuit connected to a positive terminal of a battery and a circuit connected to a negative terminal of the battery), and one or more communication channels. A communication channel of the one or more communication channels of the communication link 10 can directly or indirectly connect the computing system 4 to the vehicle 12. The vehicle 12 includes a variety of vehicle systems and vehicle components. A vehicle system can include one or more electronic control units (ECUs). The ECU 15 represents one or more ECU in the vehicle 12. An ECU is one example of a vehicle component.

The communication network 3 can comprise the communication link 5, 6 as well as other communication links (at least some of which are not shown). For example, in at least some implementations, a communication link 7 can operatively connect the database 13 directly to the communication network 3. The communication network 3 and the communication link 5, 6, 7 can include various network components such as switches, modems, gateways, antennas, cables, transmitters, and/or receivers. The communication network 3 can comprise a wide area network (WAN). The WAN can carry data using packet-switched and/or circuit-switched technologies. The WAN can include an air interface or wire to carry the data. The communication network 3 can comprise a network or at least a portion of a network that carries out communications using a Transmission Control Protocol (TCP) and the Internet Protocol (IP), such as the communication network commonly referred to as the Internet.

The repair shop 11 can comprise a variety of shop tools, such as brake lathes, wheel alignment machines, wheel balancers, and/or diagnostic devices for diagnosing vehicles. A shop tool can include the computing system 4. As shown in FIG. 1, the computing system 4 is located within the repair shop 11. The computing system 4 can, however, operate inside and/or outside of the repair shop 11. For example, the computing system 4 can be used within the vehicle 12 as the vehicle 12 is driven on a road outside of the repair shop 11 for any of a variety of purposes. The server 2 can be scaled so as to be able to serve any number of computing systems, such as one computing system (as shown in FIG. 1), one hundred computing systems, one thousand computing systems, or some other number of computing systems.

B. Server

Figure 2:
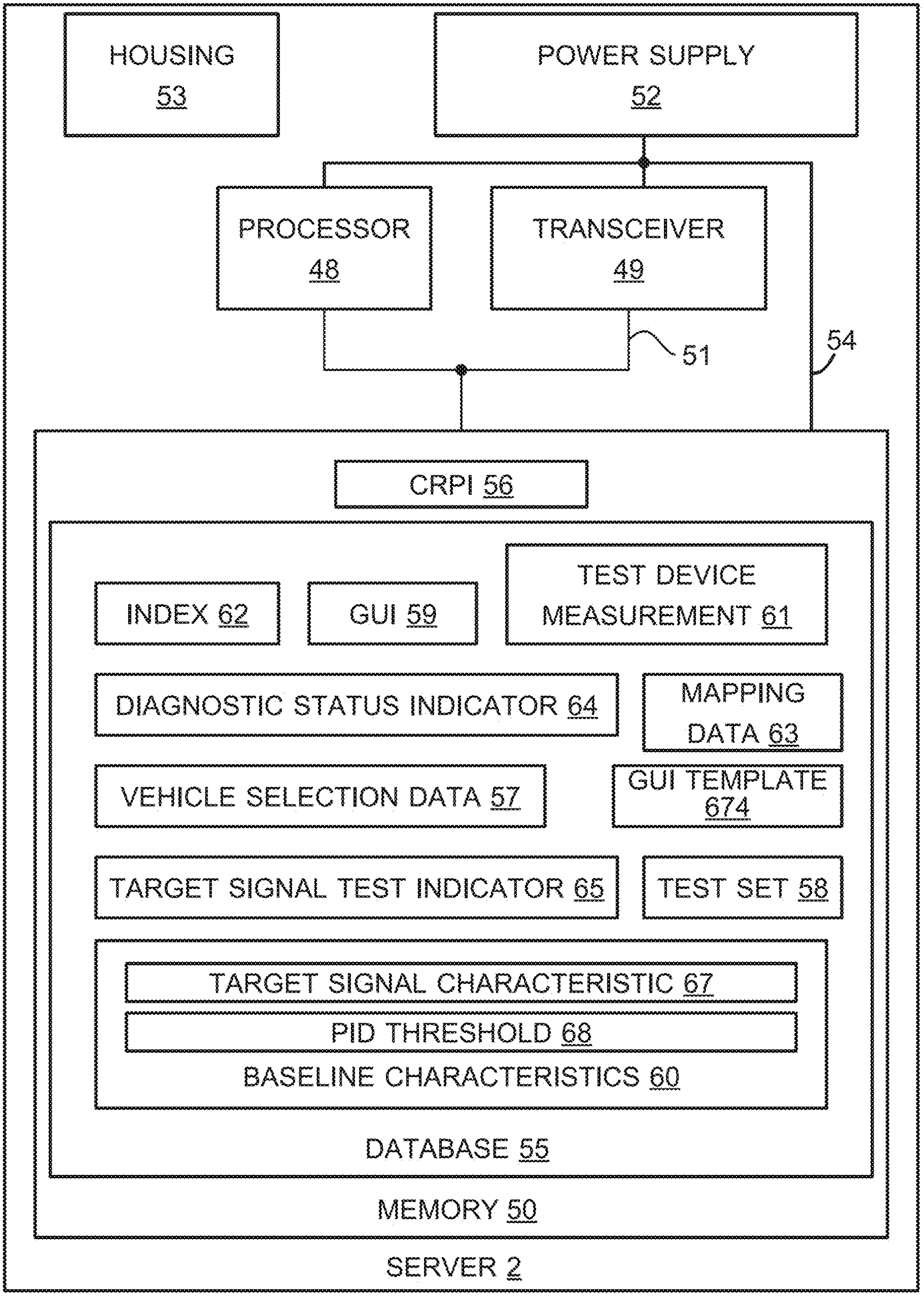
FIG. 2 is a block diagram of a server in accordance with the example implementations.

Next, FIG. 2 is a block diagram of the server 2. As shown in FIG. 2, the server 2 comprises a processor 48, a transceiver 49, and a memory 50. Two or more of those components can be operatively coupled or linked together via a data bus 51. Components operatively coupled to one another allow for one or more of the components to communicate with the other. In at least some implementations, the server 2 also includes a power supply 52 and/or a housing 53. The power supply 52 can supply electrical current to the processor 48, the transceiver 49, and/or the memory 50 using a power bus 54.

A description of a power supply below refers to “any other power supply discussed in this description. The power supply 52 is such a power supply and thus the aforementioned description of a power supply, in general, pertains to the power supply 52.

The housing 53 surrounds at least a portion of the following: the processor 48, the transceiver 49, the memory 50, the data bus 51, the power supply 52 and/or the power bus 54. The housing 53 can support a substrate. In at least some example implementations, at least a portion of the following: the processor 48, the transceiver 49, the memory 50, the data bus 51, the power supply 52 and/or the power bus 54 is/are mounted on and/or connected to a substrate of the housing 53. In at least some implementations, the housing 53 includes a rack and/or cabinet having one or more shelves.

1. Processor

Figure 3:
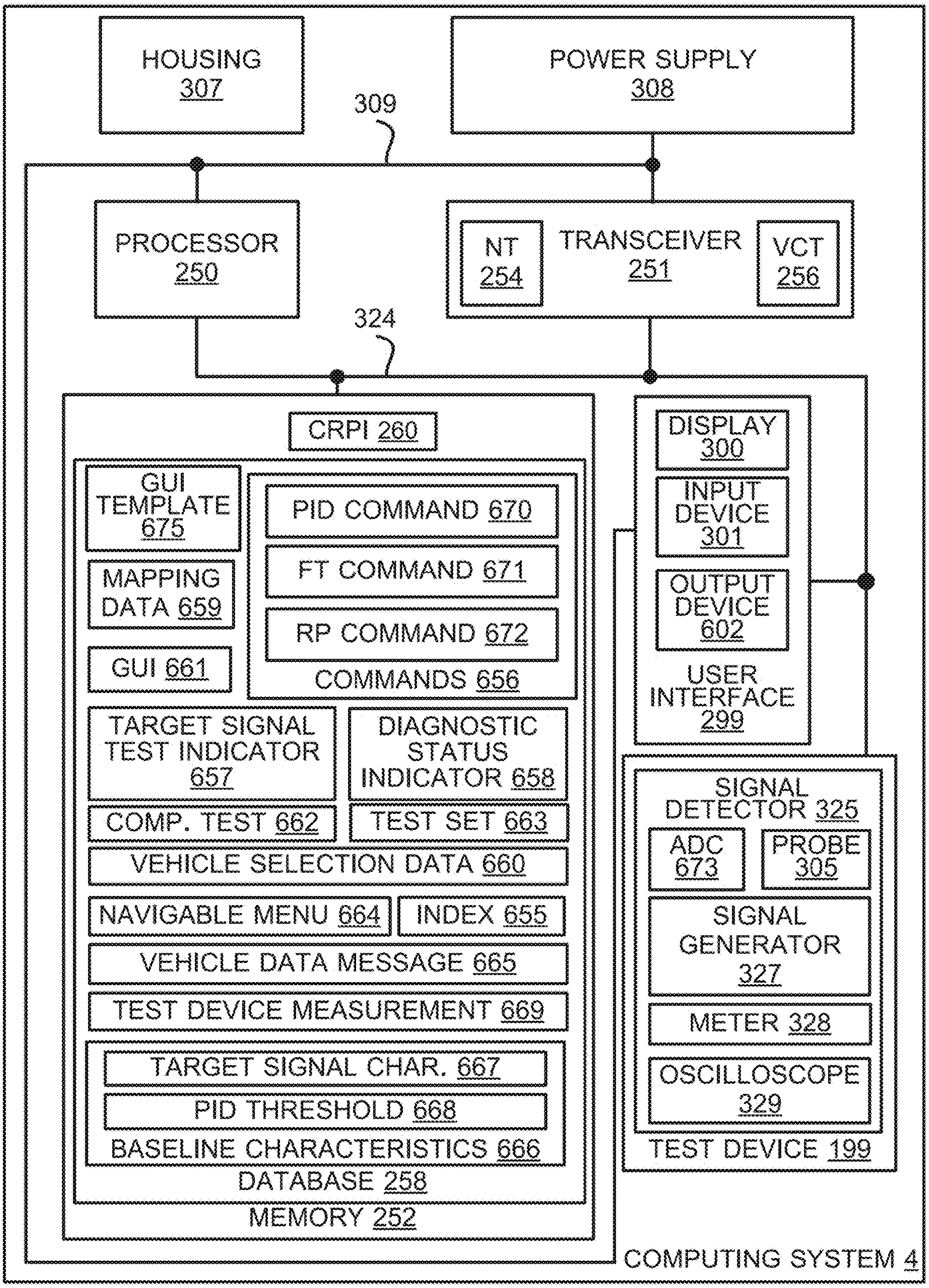
FIG. 3 is a block diagram of a computing system in accordance with the example implementations.
Figure 4:
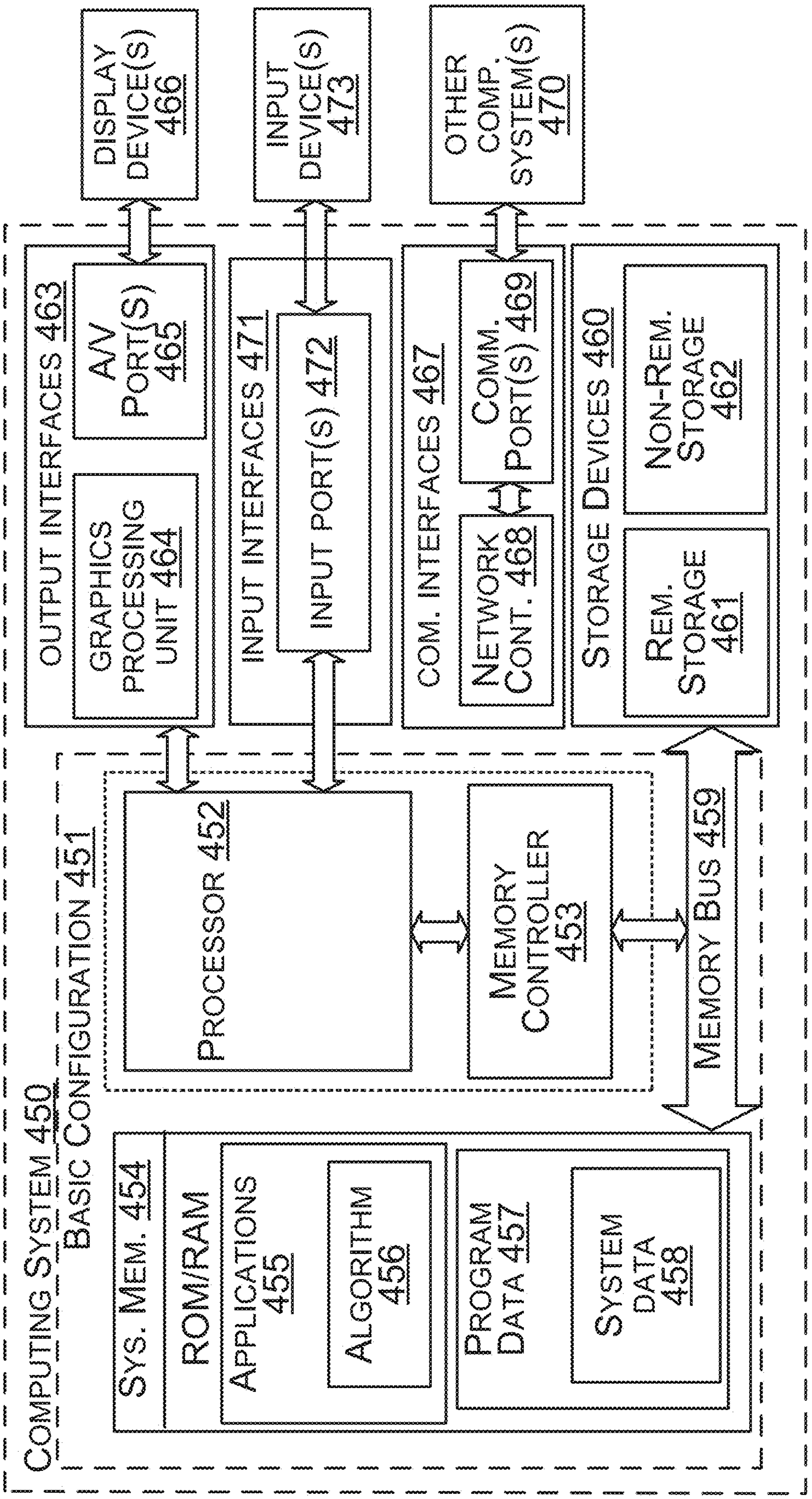
FIG. 4 is a functional block diagram illustrating a computing system that is arranged in accordance with the example implementations.

A processor, such as the processor 48, a processor 250 shown in FIG. 3, or a processor 452 shown in FIG. 4, or any other processor discussed in this description, can comprise one or more processors. Any processor discussed in this description can thus be referred to as “at least one processor” or “one or more processors.” Any processor discussed in this description can include a general purpose processor (e.g., an INTEL® single core microprocessor or an INTEL® multicore microprocessor), a special purpose processor (e.g., a digital signal processor, a graphics processor (e.g., a graphics processing unit (GPU)), an embedded processor, a field-programmable gate array (FPGA), or an application specific integrated circuit (ASIC) processor). Moreover, for an implementation in which the processor 48 is arranged like the INTEL® multicore microprocessor, the processor 48 can include one or more INTEL® XEON® processors having between four and fifty-six cores. Furthermore, any processor discussed in this description can include or be operatively coupled to a memory controller that controls a flow of data going to and from a memory, such as the memory 50.

Any processor discussed in this description can be configured to execute computer-readable program instructions (CRPI). Any CRPI discussed in this description can, for example, include assembler instructions, machine instructions, machine dependent instructions, microcode, firmware instructions, state-setting data, and/or either source code or object code written in one or any combination of two or more programming languages. As an example, a programming language can include an object-oriented programming language such as Java, Python, or C++, or a procedural programming language, such as the "C" programming language. Any processor discussed in this description can be configured to execute hard-coded functionality in addition to or as an alternative to software-coded functionality (e.g., via CRPI). For example, the processor 48 can execute CRPI 56 stored in the memory 50. In at least some implementations of the server 2, the processor 48 can be programmed to perform any or all function(s) described in this description as being performed by the server 2. Additionally, a processor described in this description can execute CRPI to read content of a test set file (such as a test set file configured as an XML or JSON file) and execute other CRPI based on at least a portion of the test set file content.

An embedded processor refers to a processor with a dedicated function or functions within a larger electronic, mechanical, pneumatic, and/or hydraulic device, and is contrasted with a general-purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can, but need not necessarily, include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands. A general-purpose processor, a special purpose processor, and/or an embedded processor can perform analog signal processing and/or digital signal processing.

The description of any or all function(s) that include the processor 48 and/or the server 2 transmitting data can include the processor 48 causing the transceiver 49 to transmit the data. Similarly, the description of any or all function(s) that include the processor 48 and/or the server 2 receiving data can include the processor 48 receiving the data from the transceiver 49. Additionally, the description of any or all function(s) that include the transceiver 49 transmitting data can include the processor 48 or the server 2 transmitting the data. Likewise, the description of any or all function(s) that include the transceiver 49 receiving data can include the processor 48 or the server 2 receiving the data. Examples of this data include a command, a response with a diagnostic list, a response to a request, a filter list, a signal, a destination identifier or address, a source identifier or address, a request for database information, a response to determining a vehicle repair has occurred with respect to a diagnostic session, vehicle identifying information, a symptom identifier, a component identifier, test device measurement data, vehicle selection data, a VDM, a diagnostic trouble code (DTC), a PID, a parameter value corresponding to a PID, a request for a parameter, a request for a test set, a test set, a GUI, and a GUI template. Other examples of this data are also possible.

2. Memory

A memory, such as the memory 50 or any other memory discussed in this description, can include one or more memories. A memory can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), an electrically erasable programmable read-only memory (EEPROM), or a compact disk read-only memory (CD-ROM). The RAM can include static RAM or dynamic RAM.

A transitory memory can include, for example, CRPI provided over a communication link, such as a communication link which is connected to or is part of the communication network 3. The communication link can include a digital or analog communication link. The communication link can include a wired communication link including one or more wires or conductors, or a wireless communication link including an air interface.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory.

3. Example Memory Content

The memory 50 stores computer-readable data. As shown in FIG. 2, the memory 50 includes a database 55. In at least some implementations, the database 55 is separate from the database 13. In some of those implementations, at least a portion of the data stored in the database 13, 55 is identical. Accordingly, the database 13 can include any or all of the data described below as being contained within the database 55. In other implementations, the database 55 includes the database 13 such that the processor 48 can access data from the database 13, 55 using the data bus 51 rather than the communication link 7, 8.

The memory 50 contains the CRPI 56. The database 55 can include one or more of the following computer-readable data: vehicle selection data 57, a test set 58, a GUI 59, baseline characteristics 60, a test device measurement 61, an index 62, mapping data 63, a diagnostic status indicator 64, a target signal test indicator 65, or a GUI template 674. The baseline characteristics 60 can include a target signal characteristic 67 and/or a PID threshold 68. A description of and examples of the vehicle selection data 57 are located in the description of FIG. 8.

The test set 58 includes data for displaying a GUI corresponding to a test set. In at least some implementations, the test set 58 includes a test set file. As an example, the test set file can include a markup language file such as an XML file, a YAML (YAML Ain't Markup Language) file, a comma separated variable (CSV) file, a flat file, or a JSON file. Examples of content of a test set file are shown in FIG. 81A to FIG. 81C, in FIG. 82A to FIG. 82C, and FIG. 83A to FIG. 83B.

Figure 86:
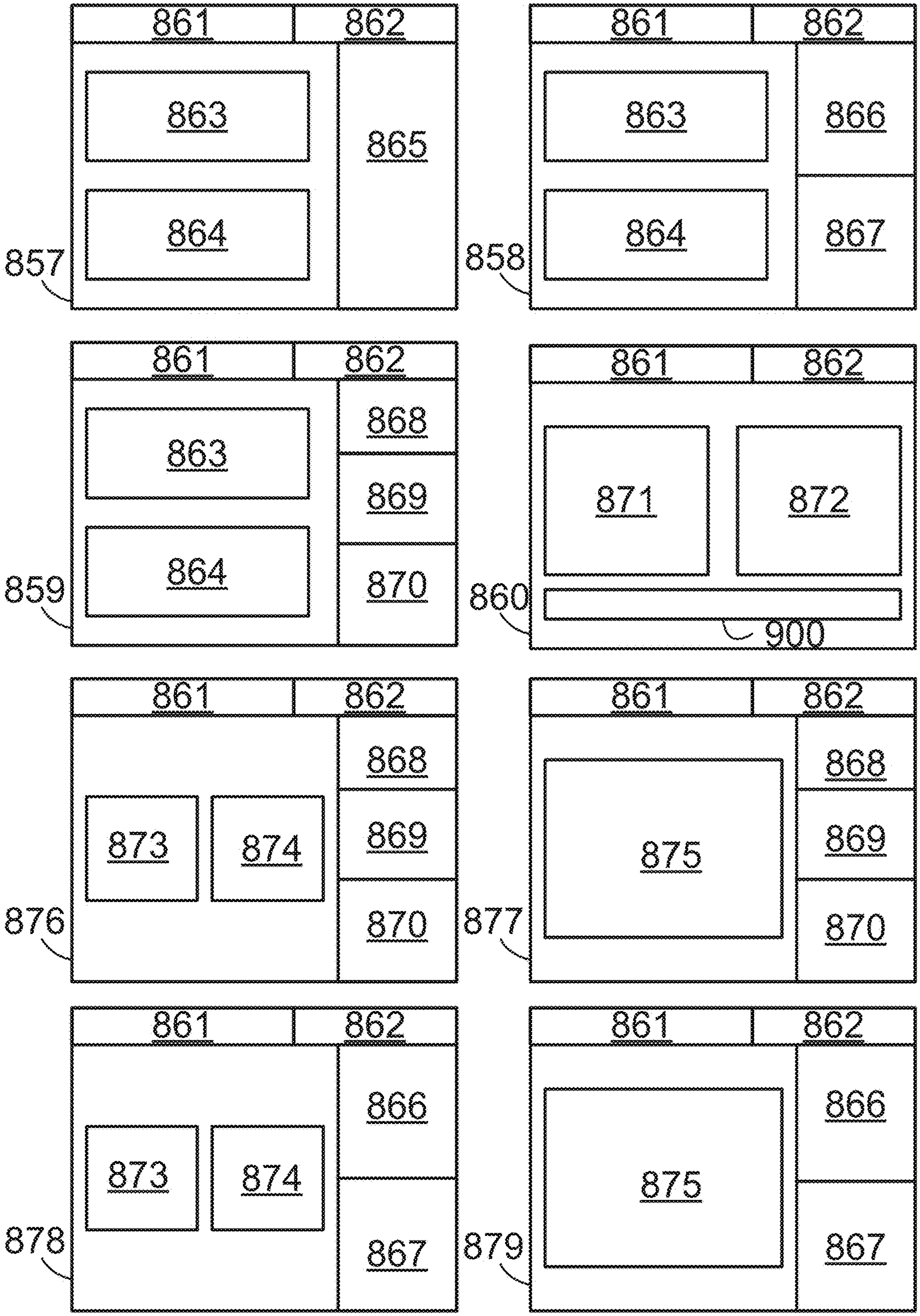
FIG. 86 shows a GUI template in accordance with the example implementations.

The GUI 59 can include one or more GUI or content to populate a GUI to be displayed on the display 300. As an example, the GUI 59 can include a GUI or aspects of a GUI shown in FIG. 8 to FIG. 40. As another example, the GUI 59 can include a test set based on one or more from among the vehicle selection data 57, the test set 58, the baseline characteristics 60, the test device measurement 61, the index 62, the mapping data 63, the diagnostic status indicator 64, or the target signal test indicator 65. The baseline characteristics 60 include a target signal characteristic 67 and a PID threshold 68. The GUI template 674 includes data defining how to display a GUI. The server 2 can provide a GUI template to the computing system 4 for instructing the computing system 4 how to display a GUI, such as a GUI including a test set. FIG. 86 shows example GUI templates.

The test device measurement 61 includes data indicative of a measurement made by a test device, such as the test device 199 (shown in FIG. 3). The test device measurement 61 can also include data indicative of one or more from among an identifier of the test device that made the measurement, a unit associated with the measurement, an identifier of what was measured (e.g., a voltage, a pressure, a temperature, or a resistance), or a measurement point (e.g., a connector pin or circuit of a particular component on the vehicle 12). In at least some implementations, the server 2 receives the data for storing as the test device measurement 61 directly from the test device 199. In at least some other implementations, the server 2 receives the data for storing as the test device measurement 61 indirectly. In those implementations, the test device 199 provides at least a portion of the data to be stored as the test device measurement 61 to computing system 4, which in turn transmits the data to be stored as the test device measurement 61 to the server 2. That data transmitted to the server 2 can include data regarding the measurement that the computing system 4 generates.

Figure 50:
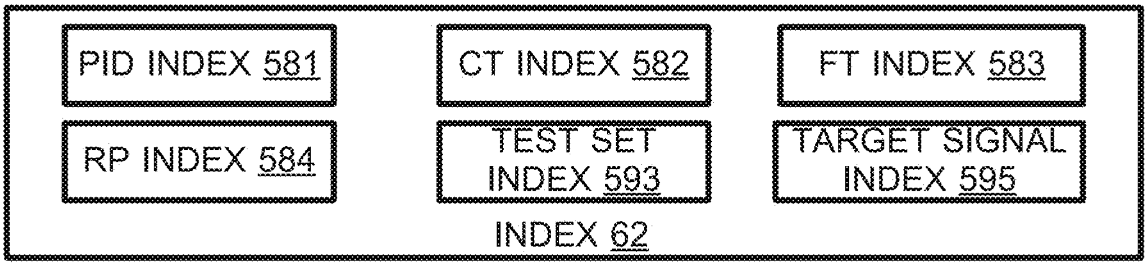
FIG. 50 is a diagram showing indices in accordance with the example implementations.

The index 62 can include one or more indices. Each index can include multiple index values and for each index value one or more reference values. FIG. 50 shows multiple indices. In particular, FIG. 50 shows a PID index 581, a component test index 582, a functional test index 583, a reset procedure index 584, and a test set index 585. The reference values in the PID index 581 include PIDs and PID descriptors. The reference values in the component test index 582 include component test identifiers and component test descriptors. The reference values in the functional test index 583 include functional test identifiers and functional test descriptors. The reference values in the reset procedure index 584 include reset procedure identifiers and reset procedure descriptors. The reference values in the test set index 585 include test set identifiers and test set descriptors. In at least some implementations, the reference values within one or more of the PID index 581, the component test index 582, the functional test index 583, the reset procedure index 584, or the test set index 585 can include references values that match a mapped value in the mapping data 63. Accordingly, after receiving a particular index value of a given index, the processor 48 can refer to the mapping data 63 to determine a mapped value that matches the reference value corresponding to the particular index value. For example, if the server 2 receives a particular index value “6” of the PID index 90 (shown in FIG. 58A), the server 2 can determine that the PID index 90 includes the reference value “PID6” with respect to the particular index value, and then determine from PID-to-test-set MD 261 (shown in FIG. 57) that the reference value PID6 corresponds to the test set TS6.

The mapping data 63 can include a variety of mapping data. Examples of the mapping data 63 are shown in FIG. 49 and FIG. 51 to FIG. 57. The processor 48 can traverse mapping data 63 backward or forward to determine data that is mapped to other data. As an example, by referring to the symptom-to-PID MD 70 shown in FIG. 49 and FIG. 51, the processor 48 can determine a PID based on a given symptom. In at least some implementations, the given symptom can be determined from the symptom identifier 27 (shown in FIG. 48). As another example, the processor 48 can also use the symptom to PID MD 70 to determine a symptom based on a PID, or a PID and PID parameter value. In at least some implementations, the PID and PID parameter value can be determined from the symptom identifier 27 (shown in FIG. 48). As yet another example, the processor 48 can use the symptom-to-test-set MD 83 (shown in FIG. 49 and FIG. 51) to determine a test set based on a symptom. As yet another example, the processor 48 can use the component-to-test-set MD 84 (shown in FIG. 49 and FIG. 53) to determine a test set based on a component. As still yet another example, the processor 48 can use the test-set-to-PID MD 82 (shown in FIG. 49 and FIG. 57) or the PID-to-test-set MD 261 (shown in FIG. 57) to determine a test set based on a PID.

The diagnostic status indicator 64 includes data regarding a diagnostic status of the vehicle. The server 2 can determine the diagnostic status indicator 64 based on one or more of the following: a comparison of a PID parameter value to a PID threshold value, a comparison of a target signal measurement to a target signal characteristic, a diagnostic trouble code, a functional test, a vehicle data message, a comparison of two images, or comparison of a waveform representation (or more simply, a waveform) and an image showing a signal signature (e.g., an image showing a known good signal or known bad signal). Other examples of data the server 2 can use to determine a diagnostic status of the vehicle 12 are also possible. The server 2 can output the diagnostic status indicator 64 for storage as the diagnostic status indicator 658 (shown in FIG. 3) and/or for displaying on the display 300 (shown in FIG. 3).

The target signal test indicator 65 includes an indicator that indicates a test that can be performed on or with respect to a target signal. Accordingly, the target signal test indicator 65 corresponds to target signal that can be output by the vehicle 12. As an example, the target signal test indicator 65 can include a component test indicator and/or a PID for testing the target signal. The processor 48 can provide target signal test indicator to the computing system 4 by providing the computing system 4 with a test set that includes a target signal test indicator. Examples of a target signal test indicator are discussed with respect to FIG. 13 and FIG. 44 to FIG. 47. As another example, the target signal test indicator 65 can include a component test identifier “CT9” or the index value “2C” corresponding to the component test named “Pressure Test” for a fuel rail on the vehicle 12 and a PID identifier "PID49" or the index value "49" corresponding to the PID named "Fuel Rail Pressure."

The target signal characteristic 67 includes one or more characteristics corresponding to a target signal that can be output by the vehicle 12 and/or a component of the vehicle 12. At least some of the characteristics can be measured using the test device 199 and/or the vehicle communication transceiver 256 shown in FIG. 3. The server 2 can determine a diagnostic status regarding the vehicle 12 based on the target signal characteristics and baseline characteristics. Examples of target signal characteristics are shown in and described with respect to FIG. 65 and FIG. 66 (i.e., target signal characteristics 600).

The PID threshold 68 includes one or more threshold values corresponding to a PID. In at least some implementations, the one or more threshold values corresponding to a PID include a minimum threshold value and a maximum threshold value. In at least some other implementations, the one or more threshold values corresponding to the particular PID includes different minimum and different maximum threshold values corresponding to a particular operating state of the vehicle 12, such as a particular engine load or engine RPM value. The particular operating of the vehicle 12 can be determined by requesting a parameter value for a PID different than the particular PID. In at least some implementations, the minimum and maximum threshold values can be associated with parameter values that are indicative of values that cause an ECU to set a DTC. In accordance with those implementations, the PID threshold can include an additional threshold (e.g., a threshold larger than the minimum threshold and/or a threshold smaller than the maximum threshold). The additional threshold can be indicative of a vehicle component experiencing degradation that is likely to lead to the vehicle 12 setting a DTC. The parameter values corresponding to a particular PID can be compared to the one or more threshold values corresponding to the particular PID to determine whether a fault has occurred or whether a degraded operating state is occurring.

The PID threshold 68 can comprise baseline ranges for PIDs from each set of vehicles identifiable by some particular vehicle identifying information. In this way, the server 2 can provide the computing system 4 with applicable baseline ranges with respect to a particular vehicle connected to the computing system 4.

In one respect, the PID threshold 68 can comprise baseline ranges defined by a vehicle manufacturer. For a particular PID associated with a DTC, the vehicle manufacturer may define the baseline maximum parameter value as the greatest parameter value for the particular PID an ECU would output while the associated DTC is set to inactive, and the vehicle manufacturer may define the baseline minimum parameter value as the lowest parameter value for the particular PID the ECU would output while the associated DTC is set to inactive.

In another respect, the PID threshold 68 can comprise baseline ranges determined by the server 2 from PID parameter(s) received within communications that include PID parameter value(s). The server 2 can store the received PID parameter value(s) within the PID threshold 68 and determine the maximum and minimum parameter values for each PID for each set of vehicles identifiable by particular vehicle identifying information. The server 2 can maintain a PID count that indicates how many PID parameter value(s) have been received and/or stored for a particular PID. The server 2 can compare the PID count to a first threshold PID count value stored in the PID threshold 68. If the server 2 determines that the PID count is less than the first threshold PID count value, the server 2 can produce a first baseline range for the particular PID.

As an example, the server 2 can determine the first baseline PID range for the PID to be a mean maximum PID parameter value plus (X) standard deviations of the mean maximum PID parameter value and a mean minimum PID parameter value minus (X) standard deviations of the mean minimum PID parameter value. As an example, (X) standard deviations can be one, two, three or some other number of standard deviations. The mean maximum PID parameter value is the mean of maximum PID parameter values for the particular PID across vehicles identifiable by the particular vehicle identifying information with all DTC from the ECU that provides the particular PID set to inactive. The mean minimum PID parameter value is the mean of minimum PID parameters for the particular PID across vehicles identifiable by the particular vehicle identifying information with all DTC from the ECU that provides the particular PID set to inactive.

As the server 2 continues to receive PID parameter values for the particular PID, the server 2 can determine the quantity of received PID parameter values for the particular PID exceeds the first threshold PID count value, but is less than a second threshold PID count value. In this situation, the server 2 can produce a second baseline PID range for the particular PID. As an example, the server 2 can determine the second baseline PID range for the PID to be a mean maximum PID parameter value plus (X−1) standard deviations of the mean maximum PID parameter value and a mean minimum PID parameter value minus (X−1) standard deviations of the mean minimum PID parameter value. The first baseline PID range can be referred to a loose baseline range with respect to the second baseline PID range. The second baseline PID range can be referred to as a tighter baseline range with respect to the first baseline PID range.

The server 2 can determine loose and tight baseline ranges in other manners. For example, before the server 2 has received a number of PID parameter values for the particular PID that exceeds the first threshold PID count value, the server 2 can add a first percentage of the mean maximum PID parameter value for the particular PID to that mean maximum PID parameter value or a first percentage of the maximum PID parameter value for the particular PID to that maximum PID parameter value. Furthermore, before the server 2 has received a number of PID parameter values for the particular PID that exceeds the first threshold PID count value, the server 2 can subtract a first percentage of the mean minimum PID parameter value for the particular PID from that mean minimum PID parameter value or a first percentage of the minimum PID parameter value for the particular PID from that minimum PID parameter value.

As the server 2 continues to receive PID parameter values for the particular PID, the server 2 can determine the quantity of received PID parameter values for the particular PID exceeds the first threshold PID count value, but is less than a second threshold PID count value. In this situation, the server 2 can add a second percentage of a mean maximum PID parameter value for the particular PID to that mean maximum PID parameter value or a second percentage of a maximum PID parameter value for the particular PID to that maximum PID parameter value, and the server 2 can subtract a second percentage of a mean minimum PID parameter value for the particular PID from that mean minimum PID parameter value or a second percentage of a minimum PID parameter value for the particular PID from that minimum PID parameter value. The second percentage can be smaller than the first percentage so that the baseline range determined using the second percentage is typically a tighter baseline range as compared to the baseline range determined using the first percentage.

The server 2 can provide the computing system 4 with a baseline PID range for the particular PID without any tolerance values so that the computing system 4 does not need to calculate a baseline PID range to be displayed on a display of the computing system 4. Alternatively, the server 2 can provide the computing system 4 with a baseline PID range for the particular PID with at least one tolerance value. The at least one tolerance value could, for example, be the first percentage or second percentage discussed above, or a value of the (X) standard deviations or the (X−1) standard deviations. Other examples of the at least one tolerance value are also possible.

The CRPI 56 can comprise a plurality of program instructions. The CRPI 56 and any other CRPI described in this description can include data structures, objects, programs, routines, or other program modules that can be accessed by a processor and executed by the processor to perform a particular function or group of functions and are examples of program codes for implementing steps or functions for methods described in this description.

In general, the CRPI 56 can include program instructions to cause the server 2 to perform any function described herein as being performed by the server 2 or to cause any component of the server 2 to perform any function herein as being performed by that component of the server 2.

As an example, the CRPI 56 can include program instructions executable by the processor 48 to receive from computing system 4 an identifier (such as a vehicle identifier, a component identifier, a symptom identifier, or a PID), to determine an index value corresponding to the received identifier (such as an index value corresponding to a functional test, a component test, a reset procedure, or a test set), and to provide the index value to the computing system 4. In accordance with the implementations in which the computing system 4 includes an index that includes the index value determined by the server 2, the computing system 4 can determine and then perform or request performance of a functional test, a component test, a reset procedure, or a test set corresponding to the index value without the server 2 having to output vehicle data messages required to request performance of a functional test or a reset procedure, instructions to select or configure a test device to perform a component test, or a test set file to the computing system 4.

Figure 45:
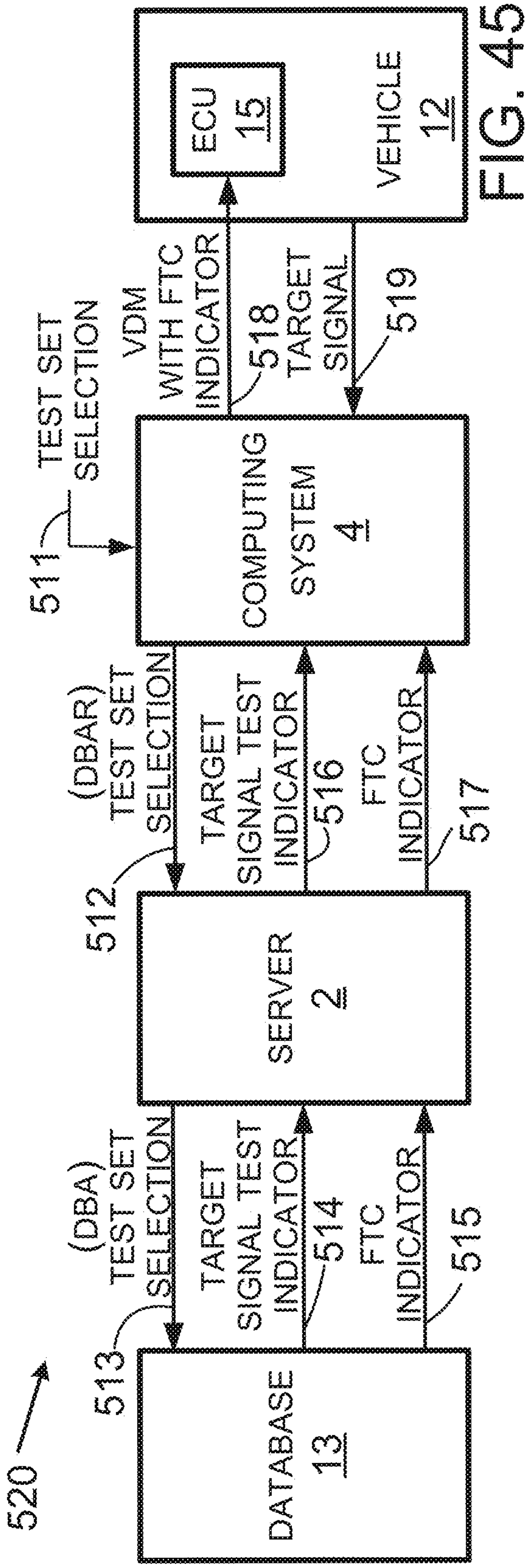
Figure 47:
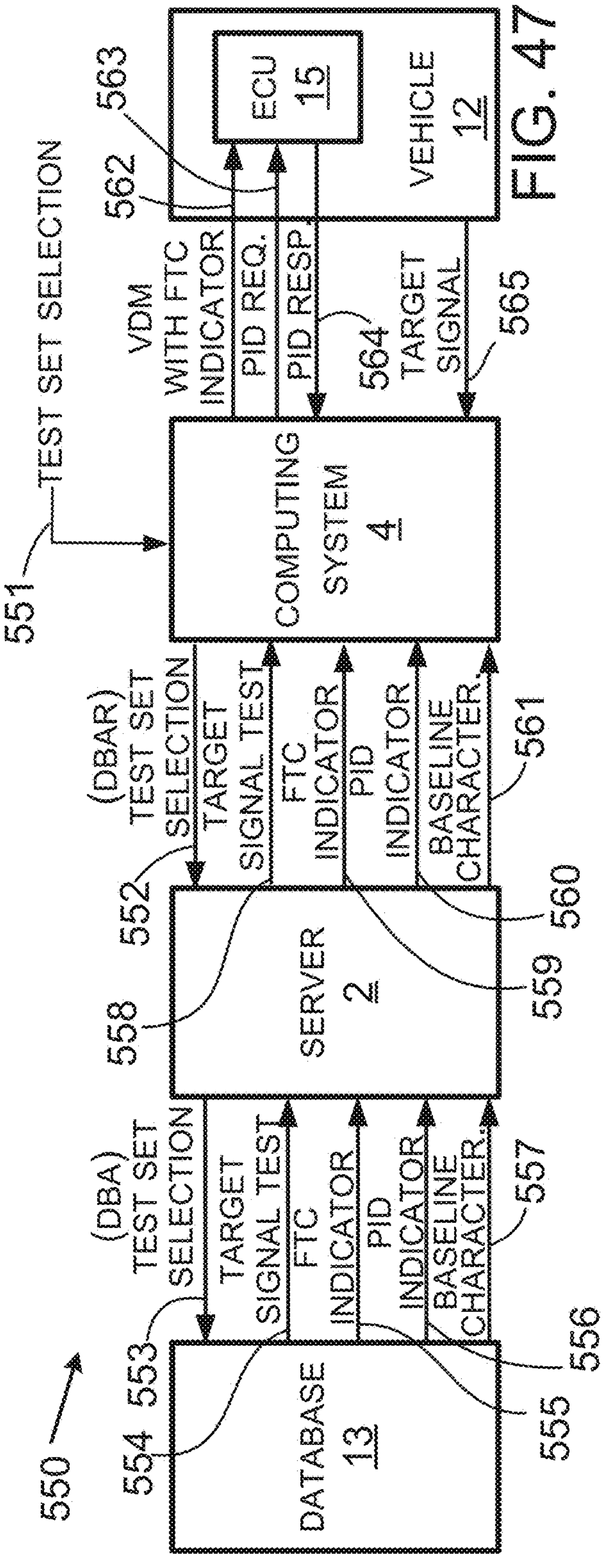

As another example, the server 2 can receive a database access request (e.g., a database access request 512 in FIG. 45 or a database access request 552 in FIG. 47). Based at least in part on the test set selection, the processor 48 can execute the CRPI 56 to determine a target signal test indicator and a functional test command indicator and provide the target signal test indicator and the functional test command indicator to the computing system 4. In at least some implementations, determining the target signal test indicator and the functional test command indicator includes determining a test set file that includes both the target signal test indicator and the functional test command indicator. In accordance with those implementations, providing the target signal test indicator and the functional test command indicator to the computing system 4 includes providing the test set file to the computing system 4.

As yet another example, the server 2 can receive a request for a test set. The request for the test set can include one or more from among: a component identifier, a symptom identifier, a PID, and/or a vehicle identifier. Based on the request for the test set, the processor 48 can execute the CRPI 56 to determine a test set within the test set 58 using the mapping data 63. In at least some implementations, upon determining the test set, the processor 48 can execute the CRPI 56 to generate a GUI and provide the GUI to the computing system 4. In at least some other implementations, upon determining the test set, the processor 48 can execute the CRPI 56 to obtain a GUI corresponding to the determined test set from the GUI 59 and the provide that GUI to the computing system 4. Determining the test set can include determining a test set file.

As yet another example, the CRPI 56 can include program instructions executable by the processor to determine a diagnostic status corresponding to the test device measurement 61. Execution of those program instructions can include comparing the test device measurement 61 to the target signal characteristic corresponding to the test device measurement 61. Examples of target signal characteristics for various target signals are shown in FIG. 65 and FIG. 66. Additionally, or alternatively, execution of the program instructions to determine the diagnostic status can include comparing PID parameter values to the PID threshold 68. In at least some implementations, the processor 48 can determine a fault exists by determining that test device measurement breaches a target signal characteristic and/or that a PID parameter value breaches the PID threshold 68. In contrast, the processor 48 can determine that no fault of a particular component has been detected by determining that all of the received test device measurements corresponding to the particular component have not breached the target signal characteristic and/or that the PID parameter value(s) have not breached the PID threshold 68. Upon determining the diagnostic status, the determined diagnostic status can be stored within the diagnostic status indicator 64. The diagnostic status indicator 64 can be included within a GUI or data to populate within the GUI so that the GUI can indicate the diagnostic status indicator on the display 300.

As still yet another example, the CRPI 56 can include program instructions executable by the processor 48 to receive from computing system 4 vehicle data messages provided to the computing system 4 from the vehicle 12. At least some of the vehicle data messages can include live vehicle data messages. Furthermore, the processor 48 can execute these program instructions to determine a PID and PID parameter value within the received vehicle data messages and compare the PID parameter value to a corresponding PID threshold or PID threshold range within the PID threshold 68 to determine whether the PID parameter value has breached a threshold. Furthermore still, in response to determining that a PID parameter value has breached a threshold, the processor 48 can execute the program instructions to determine a test set corresponding to the PID whose parameter value has breached the threshold. In some implementations, the processor 48 may determine more than one test set corresponds to the PID whose parameter value has breached the threshold. In at least some implementations, the processor 48 may determine that multiple PIDs within the received vehicle data messages have parameter values that breached a corresponding PID threshold. In accordance with these implementations, the processor 48 may determine one or more test sets that correspond to the multiple PIDs within the received vehicle data messages have parameter values that breached a corresponding PID threshold. To determine the test set(s), the processor 48 may traverse the test-set-to-PID MD 82 shown in FIG. 49 and FIG. 57 and/or the PID-to-test-set MD 261 shown in FIG. 57. And even furthermore still, in response to determining a test set, the processor 48 can execute the program instructions to transmit to the computing system 4 a test set file corresponding to the determined test set or an identifier of determined test set, such an index value corresponding to the test set, a name of the test set, or a test set identifier other an index value or the test set name.

4. Transceiver

A transceiver, such as the transceiver 49 or any other transceiver, discussed in this description can include one or more transceivers. Each transceiver can include one or more transmitters configured to transmit data onto a network, such as the communication network 3, or a data bus, such as the data bus 51. The data transmitted by the transceiver 49 can comprise any data described herein as being transmitted, output, and/or provided by the server 2. Moreover, each transceiver can include one or more receivers configured to receive data carried over a network, such as the communication network 3, or a data bus, such as the data bus 51. The data received by the transceiver 49 can comprise any data described herein as being received by the server, such as repair order data and any request described herein.

A transmitter can transmit radio signals carrying data and a receiver can receive radio signals carrying data. A transceiver with that transmitter and receiver can include one or more antennas and can be referred to as a "radio transceiver," an "RF transceiver," or a "wireless transceiver." The transmission of any data by a wireless transceiver can include the antenna transmitting that data. The reception of any data by a wireless transceiver can include the antenna receiving that data.

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, or 802.11n), (ii) an IEEE® 802.15 standard (e.g., 802.15.1, 802.15.3, 802.15.4 (ZIGBEE®), or 802.15.5) for wireless personal area networks (PANs), (iii) a BLUETOOTH® version 4.1 or 4.2 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, (xviii) the LoRaWAN communication standard, or (xix) a 5G new radio (5G NR) communication standard by the 3$^{rd}$ Generation Partnership Project (3GPP) standards organization, such as the 5G NR, first phase or 5G NR, second phase communication standard. Other examples of the wireless communication standards or protocols are possible.

Additionally, or alternatively, a transmitter, such as a transmitter within any transceiver described in this description, can be configured to transmit a signal (e.g., one or more signals or one or more electrical waves) carrying or representing data onto an electrical circuit (e.g., one or more electrical circuits). Similarly, a receiver, such as a receiver within any transceiver described in this description, can be configured to receive via an electrical circuit a signal carrying or representing data over the electrical circuit. The electrical circuit can be part of a non-vehicle network, a vehicle network, or a multi-purpose network. The signal carried over an electrical circuit can be arranged in accordance with a wired communication standard such as TCP/IP, an IEEE® 802.3 Ethernet communication standard for a LAN, a data over cable service interface specification (DOCSIS standard), such as DOCSIS 3.1, a universal serial bus (USB) specification, a VDM protocol, or some other wired communication standard or protocol. Examples of a VDM protocol are listed in Section X of this description. An electrical circuit can include a wire, a printed circuit on a circuit board, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". Transmission of data over the conductor can occur electrically and/or optically.

The data transmitted by a transceiver can include a destination identifier or address of a network device to which the data is to be transmitted. The data transmitted by a transceiver can include a source identifier or address of the system component including the transceiver. The source identifier or address can be used to send a response to the network device that includes the transceiver that sent the data.

A transceiver that is configured to carry out communications over the communication network 3, such as the transceiver 49, can include a modem, a network interface card, and/or a chip mountable on a circuit board. As an example, the chip can comprise a CC3100 WI-FI® network processor available from Texas Instruments, Dallas, Texas, a CC256MODx BLUETOOTH® Host Controller Interface (HCI) module available from Texas instruments, and/or a different chip for communicating via WI-FI®, BLUETOOTH® or another communication protocol.

C. Computing System

Next, FIG. 3 is a block diagram of the computing system 4. As shown in FIG. 3, the computing system 4 can include one or more of the following: a processor 250, a transceiver 251, a memory 252, a user interface 299, or a test device 199. Two or more of those components can be operatively coupled or linked together via a data bus 324. In at least some implementations, the computing system 4 includes a housing 307 and/or a power supply 308. In some at least some implementations, the computing system 4 includes and/or is arranged as a vehicle diagnostic tool or a vehicle scanner. Accordingly, the computing system 4 can be referred to as a "vehicle diagnostic tool," a "vehicle scanner," a "vehicle scan tool," and/or a "vehicle repair tool." In at least some of those implementations or in other implementations, the computing system 4 includes or is operatively connectable to one or more of the following: a tablet device, a cellular phone, a laptop or desktop computer, or a head-mountable device (HMD).

1. Processor

As described above, a processor, such as the processor 48, 250, 452 or any other processor discussed in this description, can include one or more processors. Examples of such processor(s) are listed above. The processor 250 can include or be operatively connected to a memory controller that controls a flow of data going to and from a memory, such as the memory 252.

As noted above, the processor 250 can be configured to execute CRPI. Examples corresponding to those CRPI are listed above and below. As an example, the processor 250 can execute CRPI 260 stored in the memory 252. In at least some implementations of the computing system 4, the processor 250 can be programmed to perform any or all function(s) described in this description as being performed by the computing system 4 and/or by a component of the computing system 4.

The description of any or all function(s) that include the processor 250 and/or the computing system 4 transmitting and/or outputting data can include the processor 250 causing the transceiver 251 to transmit and/or output the data. Similarly, the description of any or all function(s) that include the processor 250 and/or the computing system 4 receiving data can include the processor 250 receiving the data from the transceiver 251 or a component thereof, the memory 252, the user interface 299 or a component thereof, or the signal detector 325 or a component thereof. Additionally, the description of any or all function(s) that include the transceiver 251 transmitting data can include the processor 250 or the computing system 4 transmitting the data. Likewise, the description of any or all function(s) that include the transceiver 251 receiving data can include the processor 250 or the computing system 4 receiving the data. Examples of this data include a command, a response with a diagnostic list, a response to a request, a filter list, a signal, a destination identifier or address, a source identifier or address, a request for database information, repair order data, a repair order, a response to determining a vehicle repair has occurred with respect to a diagnostic session, vehicle identifying information, a symptom identifier, a component identifier, a VDM, a DTC, a parameter-identifier, a parameter value corresponding to a parameter-identifier, a request for a parameter value, a user selection, a selection of a USC, a GUI, and a GUI template. Other examples of this data are also possible.

2. Memory

The memory 252 can include one or more memories. The memory 252 can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

The CRPI 260 can comprise a plurality of program instructions. The CRPI 260 can include data structures, objects, programs, routines, or other program modules that can be accessed by the processor 250 and executed by the processor 250 to perform a particular function or group of functions and are examples of program codes for implementing steps or functions for methods described in this description as being performed by the computing system 4, the processor 250, and/or some other component of the computing system 4.

3. Transceiver

A transceiver, such as the transceiver 251 or any other transceiver discussed in this description, can include one or more transceivers. Each transceiver includes one or more transmitters configured to transmit data onto a network and/or a data bus within the device (e.g., the server 2, or the computing system 4) including the transceiver. Each transceiver includes one or more receivers configured to receive data or a communication carried over a network and/or a data bus within the device (e.g., the server 2, or the computing system 4) including the transceiver. Unless stated differently, any data described as being transmitted to a device or system is considered to be received by that device or system. Similarly, unless stated differently, any data described as being received from a device or system is considered to be transmitted by that device or system directly or indirectly to the receiving device or system. For some implementations, a transceiver can include a transmitter and a receiver in a single semiconductor chip. In at least some of those implementations, the semiconductor chip can include a processor.

For purposes of this description and with respect to the vehicle, a network can be configured as a vehicle network, a non-vehicle network, or a multi-purpose network. The vehicle network is at least partly on-board the vehicle 12 and has an on-board diagnostic connector (OBDC) and one or more electronic controls units interconnected to the OBDC and/or to each other. In at least some implementations, the computing system 4 includes a harness that operatively connects to the OBDC in the vehicle 12 and allows the computing system 4 to be disposed outside of the vehicle 12. In those or in other implementations, the computing system 4 is configured to communicate with the OBDC and can be disposed within or outside of the vehicle 12. The non-vehicle network is off-board of the vehicle 12 and includes one or more network nodes outside of the vehicle 12. The multi-purpose network is contained at least partly within the vehicle 12 and at least partly off-board the vehicle 12. The multi-purpose network can include a vehicle network and a non-vehicle network.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, or 802.11n), (ii) an IEEE® 802.15 standard (e.g., 802.15.1, 802.15.3, 802.15.4 (ZIGBEE®), or 802.15.5) for wireless personal area networks (PANs), (iii) a BLUETOOTH® version 4.1 or 4.2 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, (xviii) the LoRaWAN communication standard, or (xix) a 5G new radio (5G NR) communication standard by the 3rd Generation Partnership Project (3GPP) standards organization, such as the 5G NR, first phase or 5G NR, second phase communication standard. Other examples of the wireless communication standards or protocols are possible.

In at least some of the implementations, a transmitter, such as a transmitter within any transceiver described in this description, can be configured to transmit a signal (e.g., one or more signals or one or more electrical waves) carrying or representing data onto an electrical circuit (e.g., one or more electrical circuits). Similarly, a receiver, such as a receiver within any transceiver described in this description, can be configured to receive via an electrical circuit a signal carrying or representing data over the electrical circuit. The electrical circuit can be part of a non-vehicle network, a vehicle network, or a multi-purpose network. The signal carried over an electrical circuit can be arranged in accordance with a wired communication standard such as TCP/IP, an IEEE® 802.3 Ethernet communication standard for a LAN, a data over cable service interface specification (DOCSIS standard), such as DOCSIS 3.1, a universal serial bus (USB) specification, a VDM protocol, or some other wired communication standard or protocol. Examples of a VDM protocol are listed in Section X of this description. An electrical circuit can include a wire, a printed circuit on a circuit board, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". Transmission of data over the conductor can occur electrically and/or optically.

In accordance with at least some implementations, the transceiver 251 includes a network transceiver 254 and a vehicle communications transceiver 256. The network transceiver 254 is configured to communicate over a non-vehicle network and/or a multi-purpose network. The vehicle communications transceiver 256 is configured to communicate over a vehicle network and/or a multi-purpose network. The transceiver 251 can be configured as a gateway to communicate over a multi-purpose network. The transceiver 251 is also configured to communicate over the data bus 324.

In at least some implementations, the network transceiver 254 includes a modem, a network interface card, a local area network (LAN) on motherboard (LOM), and/or a chip mountable on a circuit board. As an example, the chip can include a CC3100 WI-FI® network processor available from Texas Instruments, Dallas, Texas, a CC256MODx Bluetooth® Host Controller Interface (HCI) module available from Texas instruments, or a different chip for communicating via WI-FI®, BLUETOOTH® or another communication protocol.

In at least some implementations, the vehicle communications transceiver 256 includes a chip mountable on a circuit board. As an example, for the SAE J1939 VDM protocol, the chip could include a CAN transceiver, part number SN65HVD251-Q1 sold by Texas Instruments, Dallas, Texas, the high-speed CAN transceiver, part number TJA1043 sold by NXP Semiconductors N.V., Eindhoven, Netherlands, or some other chip configured for the SAE J1939 VDM protocol. As another example, for the SAE J1708 VDM protocol, the chip can include a J1708 transceiver, part number MAX344E sold by Maxim Integrated Products, Inc., San Jose, California, or some other chip configured for the SAE J1708 VDM protocol. Other examples of chips configured for communicating using a particular VDM protocol are also possible.

A network node that is within and/or coupled to a non-vehicle network and/or that communicates via a non-vehicle network or a multi-purpose network using a packet-switched technology can be locally configured for a next 'hop' in the network (e.g., a device or address where to send data to, and where to expect data from). As an example, a device (e.g., a transceiver) configured for communicating using an IEEE® 802.11 standard can be configured with a network name, a network security type, and a password. Some devices auto-negotiate this information through a discovery mechanism (e.g., a cellular phone technology).

The network transceiver 254 can be arranged to transmit a request and/or receive a response using a transfer protocol, such a hypertext transfer protocol (i.e., HTTP), an HTTP over a secure socket link (SSL) or transport layer security (TLS) (i.e., HTTPS), a file transfer protocol (i.e., FTP), or a simple mail transfer protocol (SMTP). The network transceiver 254 can be arranged to transmit an SMS message using a short message peer-to-peer protocol or using some other protocol.

The data transmitted by the transceiver 251, the network transceiver 254, and/or the vehicle communications transceiver 256 can include a destination identifier or address of a computing device (e.g., an ECU within the vehicle 12, the server 2, or the database 13) to which the data is to be transmitted. The data or communications transmitted by the transceiver 251, the network transceiver 254, and/or the vehicle communications transceiver 256 can include a source identifier or address of the computing system 4. The source identifier or address data for generating a vehicle history session or other data instead or as well.

The transceiver 251 can be referred to a communications interface. Accordingly, the transceiver 251 can include and/or be configured like a communication interface 467 shown in FIG. 4. The data transmitted by the transceiver 251 can comprise any data described herein as being transmitted, output, and/or provided by the computing system 4. The data received by the transceiver 251 can comprise any data described herein as being received by the computing system 4, such as one or more of the following: vehicle identifying information, a DTC, a database entry, a target signal test indicator, a command indicator, a VDM, a PID, a PID parameter value, a GUI, a GUI template, or a test set file. Other examples of that data are also possible.

4. User Interface

The user interface 299 includes a display 300. The display 300 can include one or more displays. As an example, each display of the one or more displays includes a capacitive touch screen display, a resistive touch screen display, a plasma display, a light emitting diode (LED) display, a cathode ray tube display, an organic light-emitting diode (OLED) display (such as an active-matrix OLED or a passive-matrix OLED), a liquid crystal display (LCD) (such as include a backlit, color LCD), a touch screen display with the LCD, a capacitive touch screen display, or a resistive touch screen display. The display 300 can include a different type of display as well or instead.

In at least some implementations, a display of the display 300 is affixed (e.g., removably affixed) to a substrate of the housing 307 and/or to the housing 307. In those or in other implementations, a display of the display 300 is on and/or within a wearable device, such as a pair of glasses or goggles, a head-mountable display, or a wrist display, such as a wristwatch (e.g., a smartwatch). In at least some implementations, the housing 307 includes a laptop housing.

The display 300 is configured to display a GUI, such as a GUI 661 stored in the memory 252 and/or a GUI shown in any one of FIG. 8 to FIG. 40. The display 300 can also be configured to display a menu, a still image (such as a visible light image, a thermal image, and/or a blended image based on a visible light image and a thermal image), a video, a text file (such as a text file with a PDF file extension or an XML file extension), a hypertext markup language file, and/or a web page. In at least some implementations, the display 300 is configured to display a horizontal scroll bar and/or a vertical scroll bar. The horizontal scroll bar and the vertical scroll bar can be used to cause the display 300 to display content of a currently displayed page but not currently displayed on the display 300. A web page displayable on the display 300 can include any content shown in or described with respect to any one or more of FIG. 8 to FIG. 40. Other examples of content displayable on the display 300 are also possible.

The user interface 299 includes an input device 301. The input device 301 is configured to generate signals representative of user inputs from a user of the computing system 4. In at least some implementations, the input device 301 includes a keyboard or keypad including one or more keys configured to be pressed or otherwise manipulated by the user. In those or in other implementations, the input device 301 includes a touchpad or trackpad of a laptop computer housing. In those or in still other implementations, the input device 301 can include a computer mouse. In those or in still other implementations, the input device 301 includes a microphone configured for receiving sound waves, such as sound waves produced by the user speaking words in a vocabulary of the computing system 4. The display 300 configured as a touch screen display can also receive user inputs from a user of the computing system 4. Accordingly, the input device 301 can include the display 300 when configured as a touch screen display. The processor 250 determines the user inputs based on the signals generated by the input device 301. At least some of the user inputs are representative of a user-selectable control (USC) being selected from a GUI displayed on the display 300.

The user interface 299 includes an output device 602. The output device 602 is configured to present content to a user of the computing system 4. As an example, the output device 602 can present content visually, audibly, and/or haptically. To present content visually, the output device 602 can include and/or operatively communicate with the display 300 to visually present content, such as the navigable menu 664 or a GUI. To present content audibly, the output device 602 can include an audio speaker and electrical circuitry to convert digital data representative of the content into an audio signal for driving the audio speaker. To present content haptically, the output device 602 can include an eccentric rotating mass vibration motor and/or a linear resonant actuator to output the content haptically. As an example, the content presented haptically can include content that indicates a PID threshold has been breached.

In at least some implementations, the housing 307 includes a single housing and the user interface 299 and other components of the computing system 4 are contained at and/or within the single housing. In at least some other implementations, the housing 307 includes multiple housing such that different portions of the user interface 299 and other portions of the computing system 4 are distributed to be at and/or within the multiple different housings.

5. Additional Components

A power supply, such as the power supply 308 or any other power supply discussed in this description, can be arranged in any of a variety of configurations. As an example, the power supply can be configured to include circuitry to receive alternating current (AC) current from an AC electrical supply (e.g., electrical circuits operatively connected to an electrical wall outlet) and convert the AC current to a DC current for supplying to one or more of the components connected to the power supply 308. As another example, the power supply can be configured to include a battery or be battery operated. As yet another example, the power supply can be configured to include a solar cell or be solar operated. Moreover, a power supply can be configured to include electrical circuit(s) to distribute electrical current throughout the device or system including that power supply. As an example, those electrical circuit(s) include the power supply circuit 309 that connects to the processor 250, the transceiver 251, the memory 252, the user interface 299, and/or the test device 199. Other examples of a power supply are also possible.

In at least some implementations, the computing system 4 includes the housing 307. The housing 307 surrounds at least a portion of the following: the processor 250, the transceiver 251, the memory 252, the user interface 299, the test device 199, the data bus 324, the power supply 308, and/or the power supply circuit 309. The housing 307 can support a substrate. In at least some example implementations, at least a portion of the following: the processor 250, the transceiver 251, the memory 252, the user interface 299, the signal generator 327, the data bus 324, the power supply 308, and/or the power supply circuit 309 is/are mounted on and/or connected to a substrate of the housing 307. The housing 307 can be made from various materials. For example, the housing 307 can be made from a plastic material (e.g., acrylonitrile butadiene styrene (ABS)) and a thermoplastic elastomer used to form a grip on the housing 307.

6. Test Device

The test device 199 is configured to perform at least a part of a component test, such as the component test 662. In at least some implementations, performing the component test can include the processor 250 executing program instructions of the CRPI 260. Execution of at least some of those program instructions can include executing program instructions to configure the test device 199 for performing the component test 662.

As an example, the test device 199 can include a signal detector 325. The signal detector 325 can include one or more of the following: a probe 305, a signal generator 327, a meter 328, an oscilloscope 329, or an analog-to-digital converter 673 (i.e., an ADC). The signal detector 325 can detect a signal, such as a target signal, and responsively output on the display 300 a representation of the detected signal.

The probe 305 can include one or more probes. In some implementations, the probe 305 includes one or more oscilloscope probes for the oscilloscope 329. In those or in alternative implementations, the probe 305 includes one or more meter test leads. Each probe of the probe 305 can include a first end configured for connection to an input jack of the meter 328 or of the oscilloscope 329. Each probe also includes a second end configured for connection to or contacting a vehicle component, such as a connector pin within the vehicle 12 or an electrical conductor within the vehicle 12.

The meter 328 can include a single purpose meter, such as a voltmeter. Alternatively, the meter 328 can include a multi-meter, such as a digital volt-ohm meter. The oscilloscope 329 can include a single channel or multi-channel oscilloscope. In at least some implementations, outputs of the meter 328 and the oscilloscope are displayed on the display 300.

The signal generator 327 can output a signal onto a probe connected to the signal detector 325 for use in measuring a signal. For instance, the signal generator 327 can output a voltage differential onto the probe 305 (e.g., a red test lead and a black test lead) and onto a circuit for use in measuring a resistance of the circuit. The analog-to-digital converter 673 can be configured to convert an analog signal on the probe into a digital signal. A digital signal representing a signal detected by the signal detector 325 can be output onto the data bus 324 for transmission to the processor 250.

As another example, the test device 199 can include a pressure gauge and/or a pressure transducer to measure a pressure of a fluid. In at least some implementations, the test device 199 is included within the housing 307 along with the processor 250, the transceiver 251, the memory 252, and the user interface 299.

7. Memory Content

The memory 252 stores computer-readable data. As an example, the computer-readable data stored in the memory 252 can include the CRPI 260 and a database 258. As another example, the database 258 can include an index 655, commands 656, a target signal test indicator 657, a diagnostic status indicator 658, mapping data 659, vehicle selection data 660, a GUI 661, a component test 662, a test set 663, a navigable menu 664, a vehicle data message 665, baseline characteristics 666, a test device measurement 669, and/or a GUI template 675. The database 258 can include one or more of each of those computer-readable datum or data. The CRPI 260 can include some or all of the index 655, the commands 656, the target signal test indicator 657, the diagnostic status indicator 658, the mapping data 659, the vehicle selection data 660, the GUI 661, the component test 662, the test set 663, the navigable menu 664, the vehicle data message 665, and/or the baseline characteristics 666. A description of and examples of the vehicle selection data 660 are located in the description of FIG. 8.

The index 655 can include one or more indices. Each index can include multiple index values and for each index value one or more reference values. The index 655 can include the same indices as the index 62, which is described above with respect to FIG. 2. Additionally or alternatively, the index 655 can include one or more from among: the PID index 90 shown in FIG. 58A and FIG. 58B, the component test index 95 shown in FIG. 59, the functional test index 101 shown in FIG. 60, the reset procedure index 111 shown in FIG. 61, or the test set index 648 shown in FIG. 62.

The commands 656 can include a PID command 670 (i.e., one or more PID commands), a functional test command 671 (i.e., one or more functional test commands), and a reset procedure command 672 (i.e., one or more reset procedure commands). A PID command can include a PID. A functional test command can include an identifier of a functional test. A reset procedure command can include an identifier of a reset procedure. An identifier of a PID, functional test command, reset procedure, similar to an identifier of a component test or a test set, can be included within mapping data or an index described in this description.

The PID command 670 includes data that indicates how a VDM should be arranged to request a PID parameter value from the vehicle 12 for a particular PID. As an example, the PID command 670 can indicate a particular VDM protocol that is to be used to generate the VDM. As another example, the PID command 670 can include an ECU identifier of the ECU from which the PID parameter value is to be requested. As yet another example, the PID command 670 can include the PID. The processor 250 can determine the PID command 670 based on an index value corresponding to a PID and/or a PID key referenced in a test set file, such as the test set file 825 shown in FIG. 82A to FIG. 82C.

As shown in FIG. 82C, an element 208 includes the PID identifier PID31, which is an identifier of a fuel pump voltage PID corresponding to the index value (31) in the PID index 90. Since the test set file 825 includes an element 846 indicative of a vehicle, the processor 250 can refer to a PID index for the identified vehicle and generate a VDM using a VDM protocol used by the identified vehicle. As an example, the VDM can be arranged as $07 $DF $02 $01 $31 $00 $00 $00 $00 $00. In that example VDM, the fifth byte is the PID and corresponds to the PIDkey for PID31. By listing a PIDkey in a test set file, the test set file does not need to include data identifying the entire VDM. In at least some implementations, the PID command 670 includes formulas for converting a PID parameter value to a value represented by the PID parameter value.

The functional test command 671 includes data that indicates how a VDM should be arranged for requesting the vehicle 12 to perform a particular functional test. As an example, the functional test command 671 can indicate a particular VDM protocol that is to be used to generate the VDM. As another example, the functional test command 671 can include an ECU identifier of the ECU that is configured to perform the functional test. As yet another example, the functional test command 671 can include the functional test identifier. The processor 250 can determine the functional test command 671 based on an index value corresponding to a function test identifier.

Additionally, or alternatively, the processor 250 can determine the functional test command 671 based on a menu selection and program code or data that corresponds to the menu selection. As an example, the program code or data corresponding to a menu selection 950 shown in FIG. 71A can include the program code or data 974 shown in FIG. 71A. Likewise, the program code or data corresponding to a menu selection 886 shown in FIG. 71B can include the program code or data 975 shown in FIG. 71B. The processor 250 can use the data indicating a VDM protocol to determine which vehicle communication transceiver 256 is to be used to transmit a functional test command and the format for generating a VDM including the functional test command.

The reset procedure command 672 includes data that indicates how a VDM should be arranged for requesting the vehicle 12 to perform a particular reset procedure. As an example, the reset procedure command 672 can indicate a particular VDM protocol that is to be used to generate the VDM. As another example, the reset procedure command 672 can include an ECU identifier of the ECU that is configured to perform the reset procedure. As yet another example, the reset procedure command 672 can include the reset procedure identifier. The processor 250 can determine the reset procedure command 672 based on an index value corresponding to a reset procedure identifier.

The target signal test indicator 657 includes an indicator that indicates a component test that can be performed on or with respect to a target signal. The description of the target signal test indicator 65 is applicable to the target signal test indicator 657. Accordingly, the computing system 4 can receive a target signal test indicator from the server 2 by receiving a test set including the target signal test indicator and/or by receiving the target signal test indicator without being embedded in a test set file with a functional test command. The computing system 4 can receive one or more target signal test indicators for component test(s) to be performed and/or for PID(s) to be requested during performance of a functional test.

The diagnostic status indicator 658 can include one or more indicators regarding the diagnostic status of the vehicle 12. As an example, the diagnostic status indicator 658 can include an indicator regarding each component test or functional test that has been performed and the result of the performing the test (e.g., pass or fail). As another example, the diagnostic status indicator 658 can include an indicator regarding a PID parameter value breaching a threshold and a time that the PID parameter value was received. As yet another example, the diagnostic status indicator 658 can include an indicator regarding diagnostic trouble codes set active in the vehicle 12. In at least some implementations, the processor 250 uses the diagnostic status indicator 658 to determine whether a flag within a container showing a PID and PID parameter value should be shown to indicate whether a breach of a threshold has occurred.

The mapping data 659 includes reference data the processor 250 can use to guide a user in using the computing system 4 when servicing a vehicle. As an example, the computing system 4 can be configured to operate in a network-connected state and a network-unconnected state. When the computing system 4 is operating in the network-connected state, the processor 250 can request mapping data from the server 2. For example, upon determining a symptom such as a DTC, the processor 250 can request and received from the server 2 a PID, a component test identifier, a functional test identifier, a reset procedure identifier, and/or a test set identifier that is mapped to the determined symptom. Based on those received identifier(s), the processor 250 can output a GUI from which performance of a component test, functional test, reset procedure, or test corresponding to the received identifier(s) can be carried out or requested or from which parameter values corresponding to the PID can be displayed. When the computing system 4 is operating in the network-unconnected state, the processor 250 can refer to the locally-stored mapping data to determine a PID, a component test identifier, a functional test identifier, a reset procedure identifier, and/or a test set identifier that is mapped to the determined symptom. One possible benefit of requesting the mapping data from the server 2 is that the server 2 has a later version of mapping data that is stored locally within the memory 252.

As another example, the mapping data 659 can be stored in the memory 252 so that the server 2 does not have to transmit as much data to the computing system 4 when the computing system 4 is being used to service a vehicle. As an example, the processor 250 can transmit to the server 2 identifiers of a vehicle, a symptom, and/or a component on the vehicle. The server 2 can determine a functional test, a component test, a reset procedure or a test set that should be performed and/or request to be performed by the computing system 4. In at least some implementations, the server 2 can operate more efficiently by sending one or more index values to the computing system 4. The computing system 4 can determine the functional test, the component test, the reset procedure or the test set that should be performed and/or request to be performed based on the index value(s) received from the server 2. Moreover, the processor 250 can refer to the mapping data 659 to determine one or more PIDs that correspond to the functional test, the component test, the reset procedure or the test set corresponding to the index value(s). In this way, the server 2 would not have to send the one or more PIDs to the computing system 4.

Figure 49:
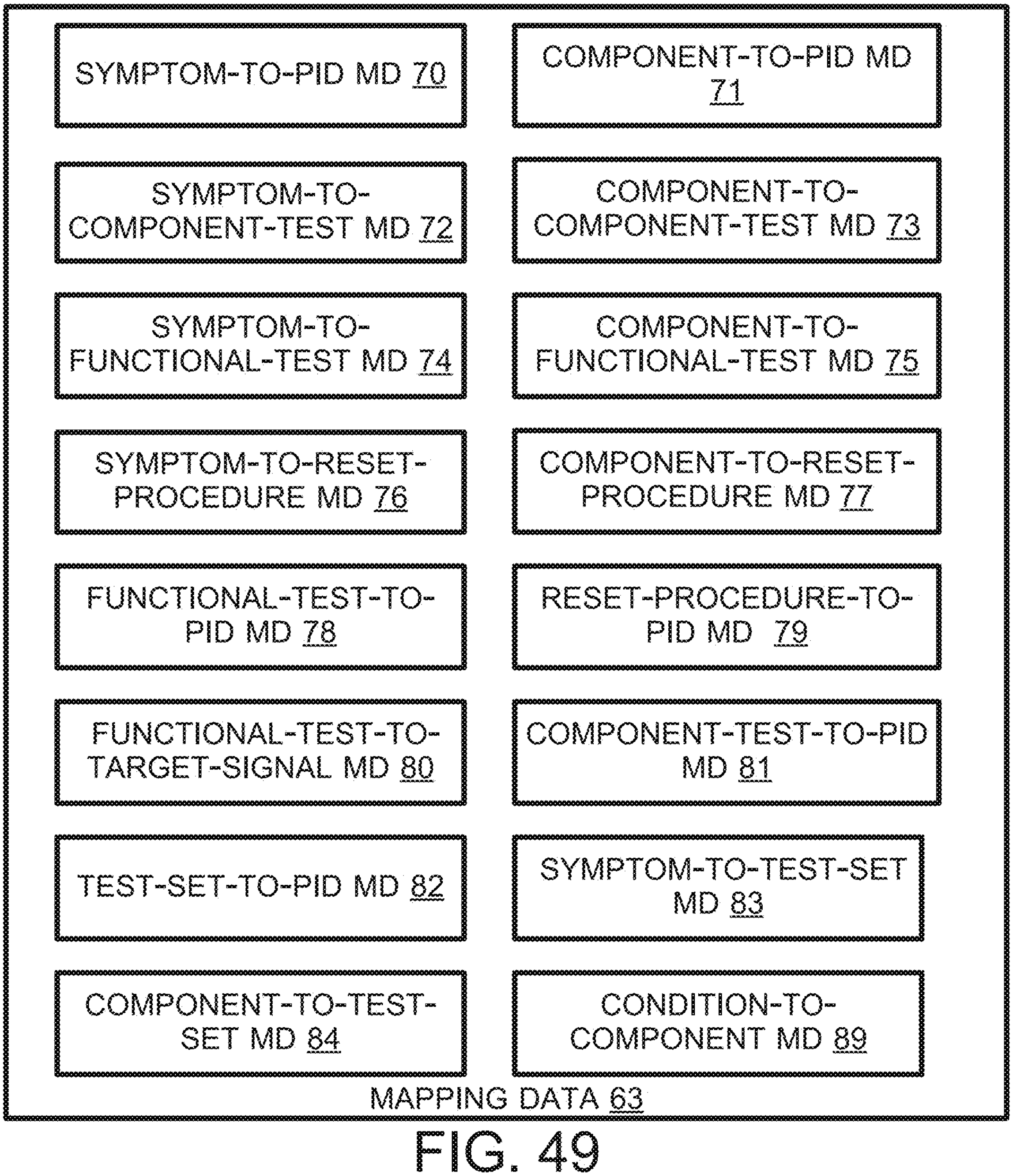
FIG. 49 is a diagram showing mapping data in accordance with the example implementations.

The mapping data 659 can include any and/or all of the mapping data 63 shown in FIG. 49 and/or any other mapping data discussed in this description and/or shown in the drawings.

The GUI 661 includes one or more GUI. The processor 250 can determine the GUI that is to be output to the display 300. The processor 250 can output the determined GUI to the display 300. The display 300 can display the GUI output by the processor 250. In at least some implementations, the processor 250 receives a GUI 661 from the server 2, causes the received GUI to be stored in the GUI 661, and causes the received GUI to be displayed on the display 300. In at least some implementations, the GUI 661 includes the GUI before the processor 250 determines that the GUI is to be displayed. The processor 250 can populate the GUI based on the content of a VDM received from the vehicle 12. Examples of a GUI contained in the GUI 661 are shown in FIG. 8 to FIG. 40. The GUI template 675 includes data defining how to display a GUI. The data defining how to display a GUI can include data defining page structure. The data defining page structure can include a style sheet arranged according to a style sheet language, such as the Cascading Style Sheets (CSS) style sheet language. The processor 250 can use a GUI template from the GUI template 675 to determine how to display a GUI, such as a GUI including content of a test set file. The processor 250 can determine a GUI template by determining a GUI template ID or a page structure ID from a test set file provided to the computing system 4 from the server 2. FIG. 86 shows example GUI templates and Table C below shows examples of a GUI template ID.

The component test 662 can include one or more component tests. Each component test can include computer-readable program instructions (i.e., a component test module) executable to perform the component test. Execution of a component test module can include configuring a test device for performing the component test for the component and/or vehicle to be tested.

A list of example component tests is shown in FIG. 56. Furthermore, similar to component tests CT12, CT13, CT14, CT15, CT16, CT17, CT18, additional component tests for particular components based on component tests CT1, CT2, CT3, CT4, CT5, CT6, CT7, CT8, CT9, CT10, and CT11 can be included in the component test index 95 (shown in FIG. 59) and/or identified in a test set file.

The test set 663 includes data for displaying a GUI corresponding to a test set. In at least some implementations, the data for displaying the GUI corresponding to the test set can include a GUI of the GUI 661. In at least some implementations, test set 663 includes a test set file. The test set file can define the type of data to be included within the GUI corresponding to the test set. In accordance with the aforementioned implementations, the test set file can include or refer to one or more style sheets that indicate how elements of the GUI corresponding to the test set should be displayed.

Figure 71A:
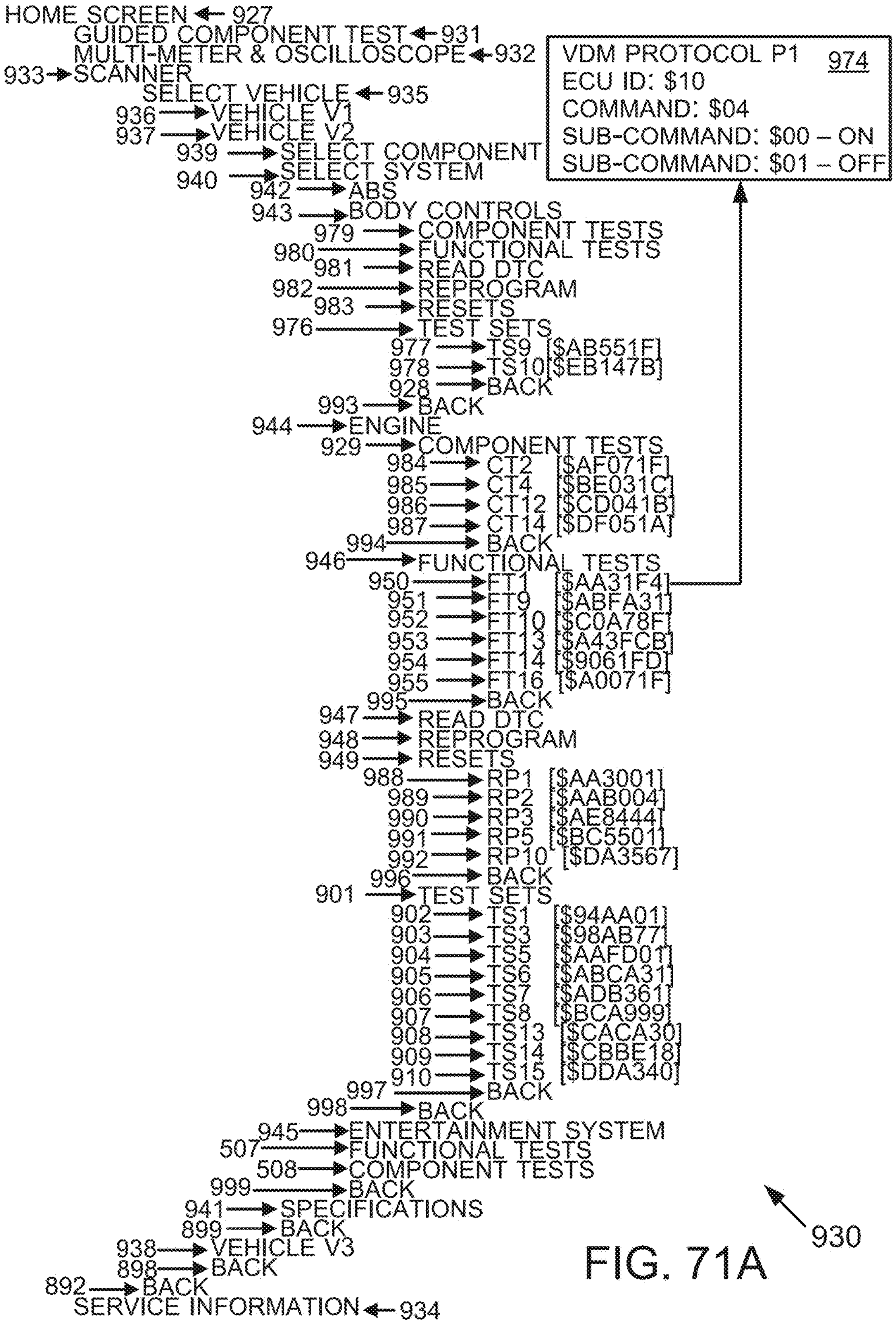
FIG. 71A and FIG. 71B show a navigable menu in accordance with the example implementations.

In at least some implementations, the test set 663 includes the data for displaying a GUI corresponding to a test set before the processor 250 receives a request to display the GUI corresponding to a test set. In accordance with at least some of these implementations, the navigable menu 664 can include menu selections for requesting the GUI corresponding to the test set to be displayed. The navigable menu 930 shown in FIG. 71A shows such menu selections (e.g., the menu selection 977, 978, 902 among others).

In at least some other implementations, performing the test set 663 includes downloading the data for displaying a GUI corresponding to a test set after the processor 250 receives a request to display the GUI corresponding to a test set. In accordance with at least some of these implementations, the navigable menu 664 does not include any menu selections for requesting the GUI corresponding to the test set to be displayed. In accordance with these implementations, the processor 250 may receive from the server 2 a GUI, such as the GUI 150 shown in FIG. 13, including one or more USC to select a test set to be performed on the computing system 4. In response to receiving a selection of a USC to select a test set, the processor 250 can request a test set file from the server 2, receive the test set file from the server 2, store the received test set file within the test set 663, and perform a test set based on the test set file.

Figure 71B:
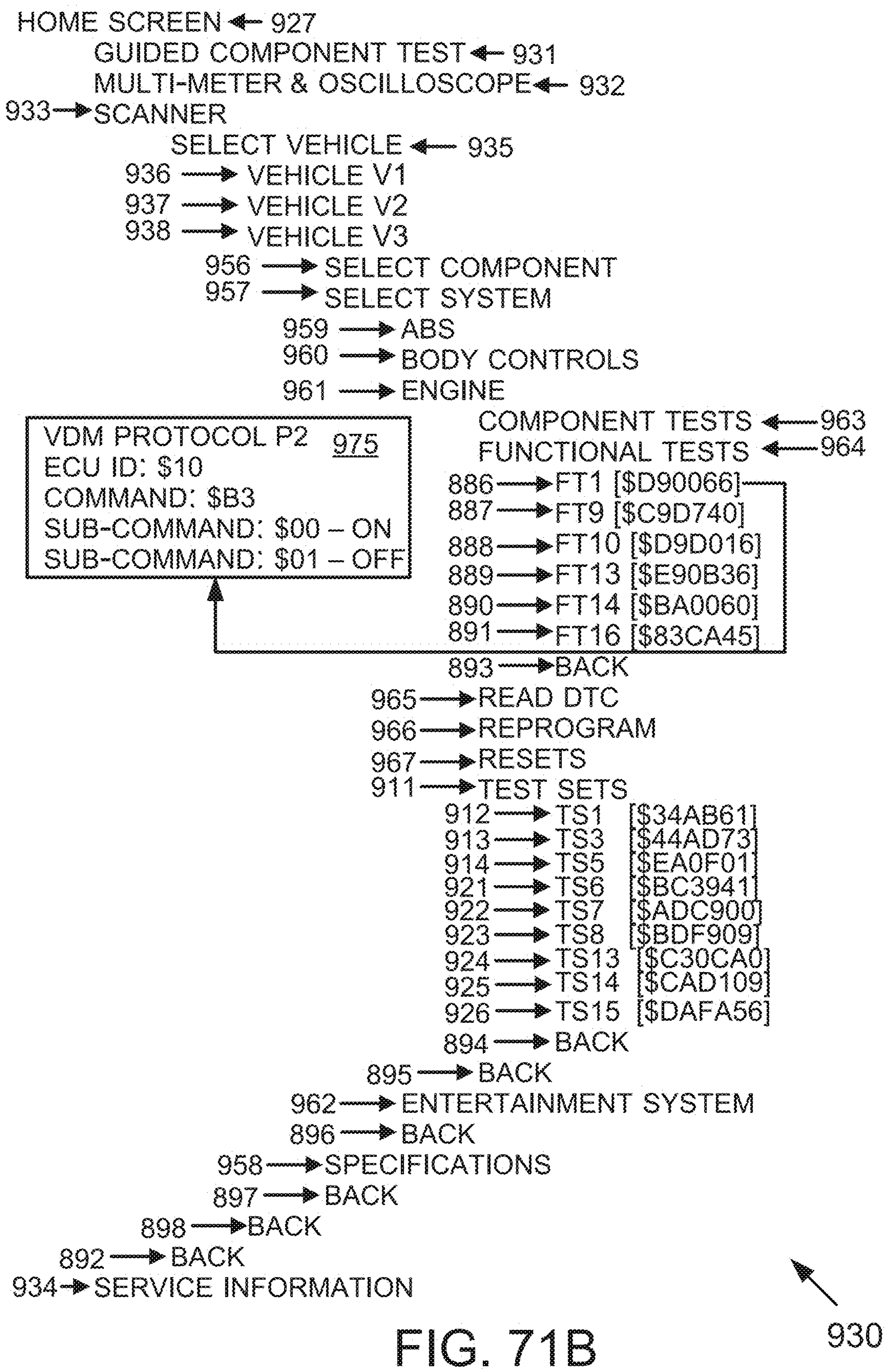

The navigable menu 664 includes a menu that can be output on the display 300. The input device 301 can be used to make selections on the navigable menu 664 to allow a user to navigate the navigable menu 664. The navigable menu 664 can include multiple levels. A lower level of the navigable menu can be displayed in response to selecting a menu selection (other than a back menu selection) shown on the display 300. A prior level of the navigable menu 664 can be viewed in response to selecting a back menu selection. FIG. 71A and FIG. 71B show an example of a navigable menu 930 in accordance with the example implementations. The navigable menu 664 can include at least a portion of the navigable menu 930 and/or can be arranged like at least a portion of the navigable menu 930.

The vehicle data message 665 can include one or more vehicle data messages received from the vehicle 12. In at least some implementations, the one or more vehicle data messages include entire messages received from the vehicle 12. In at least some implementations, the one or more vehicle data messages stored as the vehicle data message 665 includes a portion of the vehicle data messages received from the vehicle 12. As an example, that portion of the vehicle data messages includes a PID and corresponding parameter value(s) from each of the received vehicle data messages. In at least some implementations, the vehicle data message 665 stores the received vehicle data messages using a first-in-first-out (FIFO) arrangement. The vehicle data messages stored most recently in the vehicle data message 665 can include the live vehicle data messages discussed elsewhere in this description.

The baseline characteristics 666 include a target signal characteristic 667 and a PID threshold 668. In at least some implementations, the baseline characteristics 666 includes one or more images for comparison to images captured by a test device 199. As an example, an image in the baseline characteristics 666 can include an image of a vehicle component that is operating without malfunction and/or an image of a vehicle component that is malfunctioning.

The target signal characteristic 667 can include baseline characteristic(s) of a target signal. The target signal characteristic 667 includes characteristic(s) that can be compared against the measured and/or detected characteristics (e.g., characteristics stored in the test device measurement 669) to determine a status of a vehicle component, system, or the vehicle 12. Examples of the target signal characteristic 667 are shown in and described with respect to FIG. 65 and FIG. 66.

The PID threshold 668 includes one or more threshold values corresponding to a PID. The description of the PID threshold 68 shown in FIG. 2 is applicable to the PID threshold 668.

The test device measurement 669 includes data indicative of a measurement made by a test device, such as the test device 199. The test device measurement 669 can also include data indicative of one or more from among an identifier of the test device that made the measurement, a unit associated with the measurement, an identifier of what was measured (e.g., a voltage, a pressure, an exhaust gas content, a temperature, or a resistance), or a measurement point (e.g., a connector pin or circuit of a particular component on the vehicle 12).

In general, the CRPI 260 includes program instructions that are executable to cause the computing system 4 to perform any function described herein as being performed by the computing system 4 or to cause any component of the computing system 4 to perform any function described herein as being performed by that component of the computing system 4. As an example, the CRPI 260 can include program instructions executable to perform any or all functions of the flowchart 380 shown in FIG. 6A.

As another example, the CRPI 260 can include program instruction to traverse multiple sets of mapped data for implementations in which the mapped data is not mapped together. For example, the mapping data 63 includes the symptom-to-functional-test mapping data 74 and the functional-test-to-target-signal mapping data 80. FIG. 51 shows an example of the symptom-to-functional-test mapping data 74 in which the symptom S1 (DTC P0171 and DTC P0101) is mapped to functional tests FT5, FT6, FT7, FT8. FIG. 65 shows target signals mapped to functional tests FT5, FT6, FT7, FT8. Based on those examples, the processor 250 can traverse the symptom-to-functional-test mapping data 74 and the functional-test-to-target-signal mapping data 80 to determine that the target signals mapped to functional tests FT5, FT6, FT7, FT8 in FIG. 65 correspond to the symptom S1.

As yet another example, the CRPI 260 can include program instructions executable by the processor 250 and in accordance with the Society of Automotive Engineers (SAE) J1978-2002 or International Organization for Standardization (ISO)/draft international standard (DIS) 15031-4 for an on-board diagnostic (OBD) scan tool. The processor 250 can accordingly exercise a diagnostic service within an ECU within a conveyance that conforms to the SAE J1979_201202 and/or ISO 15031-5 standards for E/E diagnostic test modes.

As another example, the CRPI 260 can include program instructions executable by the processor, such as the processor 250, to expand a size of a container when the container is displayed on the display 300 in a contracted/diminished size. In accordance with the example implementations, the processor 250 can expand a size of a container in response to determining a container resizing USC is selected while the container including the container resizing USC is displayed on the display 300 in the contracted/diminished size.

As another example, the CRPI 260 can include program instructions executable by the processor 250 to contract/diminish a size of a container when the container is displayed on the display 300 in an expanded size. In accordance with the example implementations, the processor 250 can contract/diminish a size of a container in response to determining a container resizing USC is selected while the container including the container resizing USC is displayed on the display 300 in the expanded size.

As yet another example, the CRPI 260 can include program instructions executable by the processor 250 and in accordance with the Society of Automotive Engineers (SAE) J1978-2002 or International Organization for Standardization (ISO)/draft international standard (DIS) 15031-4 for an on-board diagnostic (OBD) scan tool. The processor 250 can accordingly exercise a diagnostic service within an ECU within a vehicle that conforms to the SAE J1979_201202 and/or ISO 15031-5 standards for E/E diagnostic test modes. Exercising the diagnostic service can occur in response to the processor 250 transmitting a VDM to the vehicle 12 arranged according to one of the aforementioned standards or another standard used by the vehicle 12.

In addition to identifiers of the target signal and functional test command, the database 13, 258 can include additional data that can be retrieved. For example, the database 13, 258 can include an identifiers of additional target signals, characteristics of the first or additional target signals (e.g., a sample rate, a PID parameter value associated with the signal, a timing to begin and/or end detection of the signal(s)), identifiers of additional functional test commands, information about a functional test command (e.g., relative timing information between multiple commands and/or the detection of target signal(s), prerequisite conditions necessary to confirm prior to sending a functional test command, error conditions indicating the necessity to terminate the functional test, or other information), baseline target signal ranges, thresholds, or other information necessary to determine diagnostic information, information relevant to determining whether to provide the functional test as part of a set of suggested functional tests, or other information related to the functional test. In at least some implementations, the database 13, 258 includes circuit diagrams, connector diagrams, schematics, or other information that can be output on a display in order to guide a technician with respect to performing the selected functional test and/or using the computing system 4 to detect a target signal. For example, the database 13, 258 can include information showing how test leads are to be connected for detecting the target signal.

Figure 27:
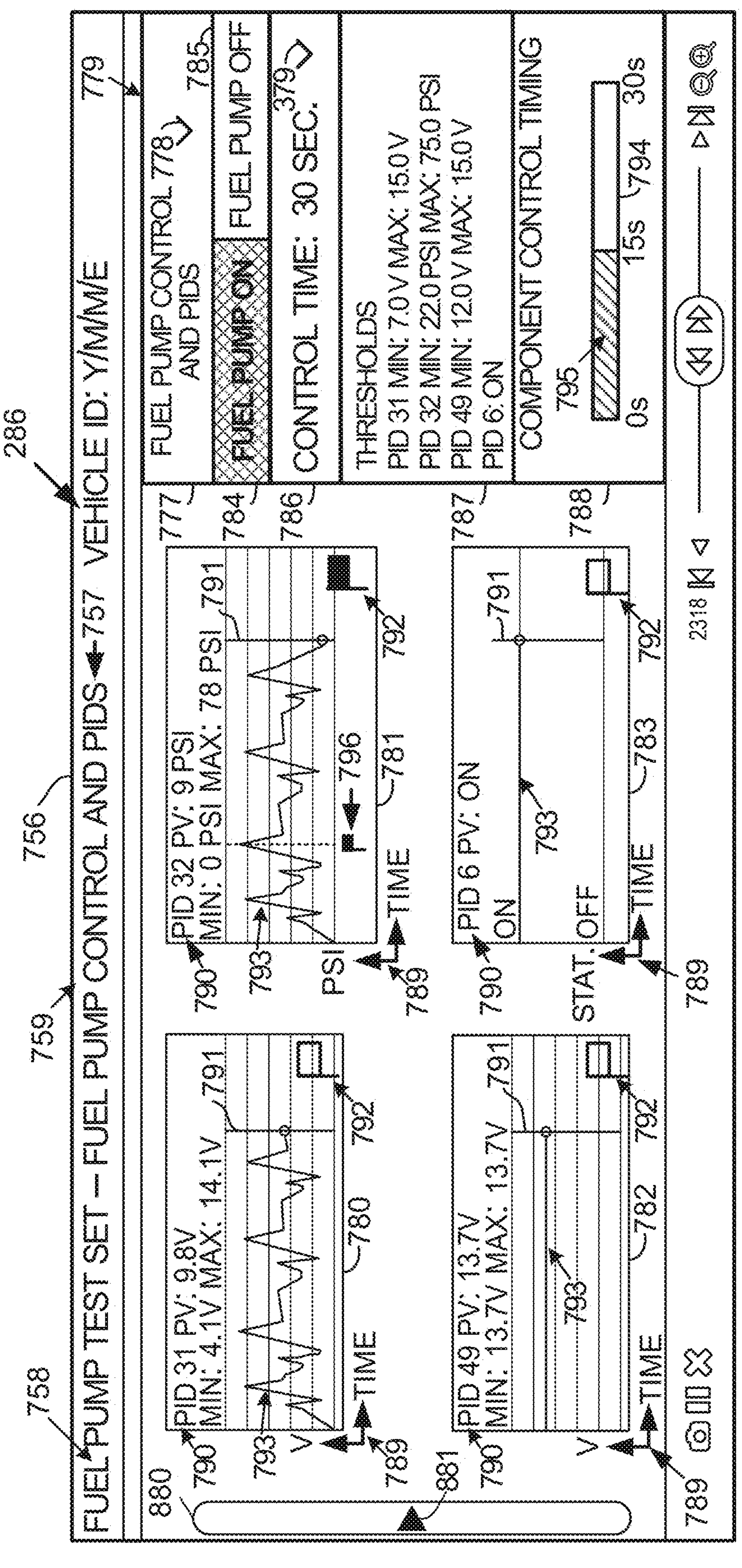
Figure 29:
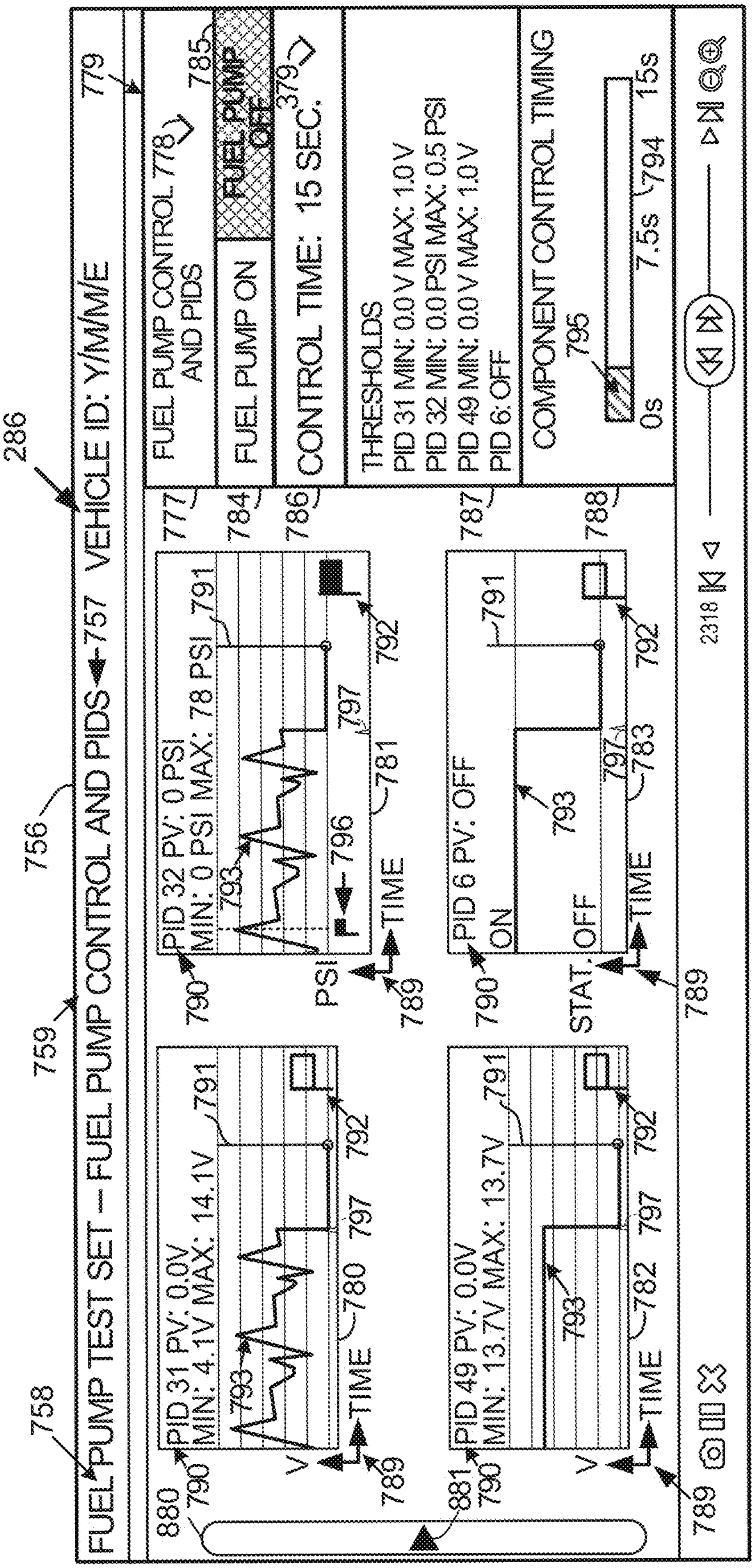

As still yet another example, the CRPI 260 can include program instructions executable by the processor 250 to operate a timer. In at least some implementations, the timer tracks an amount of time of an event. In at least some implementations, the processor outputs a representation of the time on the display 300 (e.g., within a GUI output on the display 300). In at least some implementations, the processor 250 starts or stops a timer automatically in response to selection of a USC displayed within a GUI and/or within the input device 301. In at least some other implementations, the processor 250 starts or stops a time automatically in response to receiving a particular VDM from the vehicle 12. In at least some implementations, the processor 250 initiates a timer in response to determining a USC for selecting control of a component has occurred and outputs a status of timer on the display 300. FIG. 27 and FIG. 29 show a GUI 756 that includes a container 788 that includes a time indicator 794 that represents a status of a timer. Initiating a timer can include starting a timer that starts counting up and/or starting a timer that starts counting down. In at least some implementations, a timer operated by executing the CRPI 260 has a fixed amount of time. In at least some other implementations, a timer operated by executing the CRPI 260 has a user-selectable amount of time. As an example, a user-selectable amount of time can be entered via a USC, such as the USC 786 shown in FIG. 27 and FIG. 29.

As still yet another example, the CRPI 260 can include program instructions executable by the processor 250 to automatically transmit a first particular VDM to the vehicle 12 after both transmitting a second particular VDM to the vehicle 12 in response to a selection of a USC corresponding to the second particular VDM and upon expiration of a timer. As an example, the first particular VDM includes a request for a vehicle component to change to a first state (e.g., on, up, or closed) and the second particular VDM includes a request for the vehicle component to change to a second state, contrary to the first state (e.g., off, down, or open). With respect to FIG. 27, after the timer indicated by the time indicator 794 expires with the fuel pump on, the processor 250 can transmit a VDM with a request for the fuel pump to be turned off.

As yet another example, the CRPI 260 can include program instructions executable by the processor 250 to output guidance on the user interface 299 (e.g., on the display 300). In at least some implementations, the guidance corresponds to a functional control test of a vehicle component. As an example, a container 828, 830 shown in FIG. 32 includes guidance regarding a functional control test of an electric fuel pump. In at least some implementations, the processor 250 obtains the guidance from a test set file stored on the computing system 4 or from a test set file stored on the server 2. In at least some of those implementations, the test set file stored on the computing system 4 includes a test set file that the server 2 provides to the computing system 4.

Figure 30:
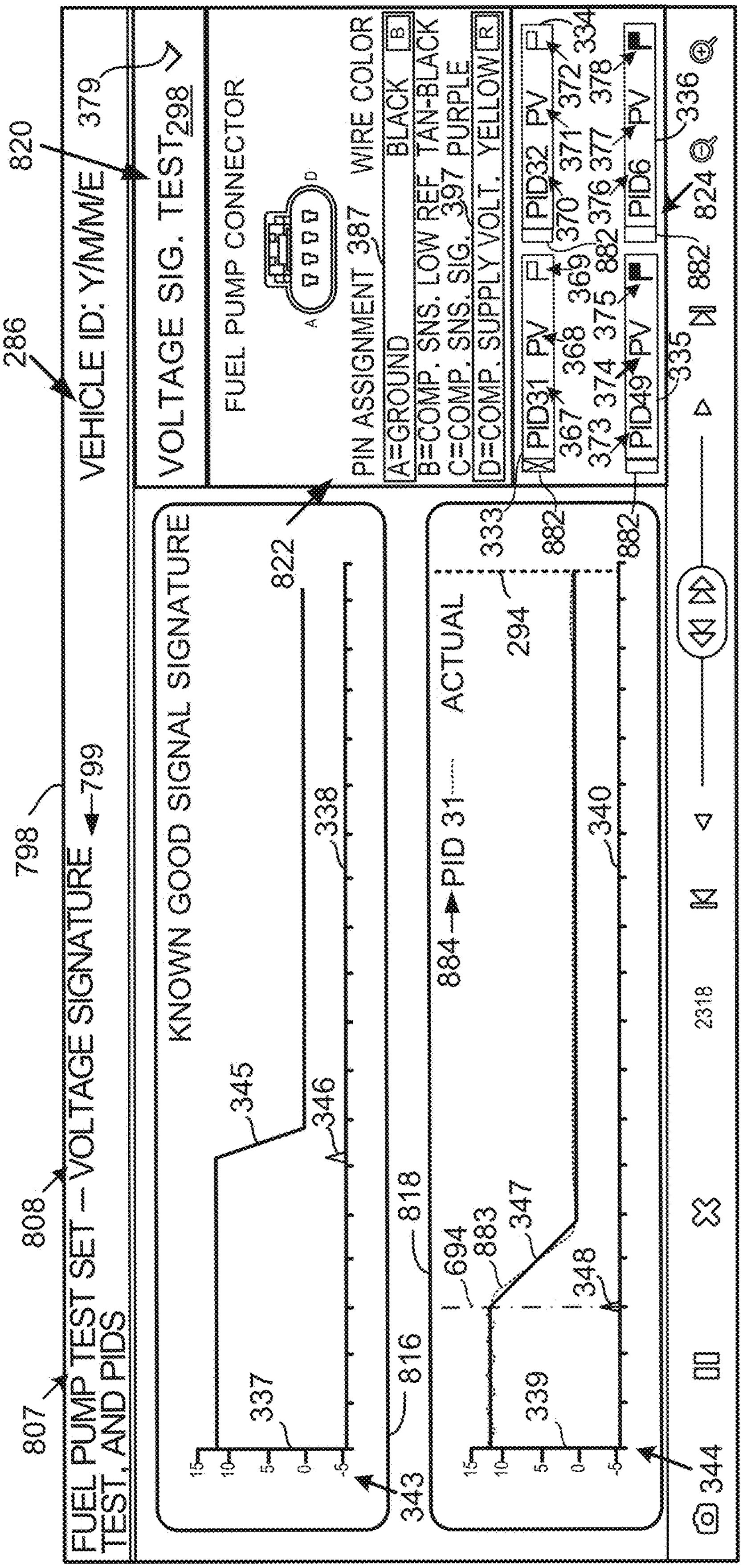

As still yet another example, the CRPI 260 can include program instructions executable by the processor 250 to output a GUI on a display, the GUI including a graph of both a signal measured using the test device 199 (e.g., the meter 328 or the oscilloscope 329) and parameter values corresponding to a particular PID. In at least some implementations, the parameter values correspond directly to the signal shown in the graph. A benefit of graphing those aspects is that the graphed aspects can be compared with one another so that an ECU that outputs both the signal and the parameter values to diagnose whether the ECU is malfunctioning. In at least some implementations, the parameter values correspond indirectly or not at all to the signal shown in the graph. In at least some of the aforementioned implementations, the measured signal includes multiple signals measured simultaneously using different channels of the meter 328 or the oscilloscope 329, and/or the PID represented by the graphed parameter values includes multiple different PIDs. FIG. 30 shows a container 828 including both a graph of a voltage measured by the test device 199 and parameter values of a PID that corresponds directly to the measured voltage.

As yet another example, the CRPI 260 can include program instructions executable by the processor 250 to determine a USC corresponding to a PID has been selected and responsively graph parameter values corresponding to the PID within a graph of a signal measured by the test device 199. Likewise, the processor 250 can execute the CRPI 260 to determine a USC corresponding to the PID has been selected (while parameter values corresponding to the PID are shown in a graph) and responsively remove from the parameter values corresponding to the PID from the graph showing the signal measured by the test device 199. FIG. 30 shows an example of the USC discussed above.

As still yet another example, the CRPI 260 can include program instructions executable by the processor 250 to determine a test set file for a test set to be performed via the computing system 4. Upon or after determining the test set file, the processor 250 can read the test set file and responsively output a GUI including content in the test set file or based on content of the test set file. Outputting that GUI can include modifying a GUI currently displayed on the display 300. Reading the test set file can include parsing objects or arrays defined by the test set file, with or without reference to a schema identified in the test set file or otherwise. Reading the test set file can include stringifying an object within the test set file to a string. Outputting the GUI can include modifying a GUI template based on content of a test set file. Examples of that content are shown in FIG. 81A to FIG. 83B.

As yet another example, the CRPI 260 can include program instructions executable by the processor 250 to determine the vehicle 12 is operating in a particular state before sending a VDM to request functional control of a vehicle component. The processor 250 can determine an operating state of the vehicle by requesting and receiving parameter values for a PID indicative of an operating state of the vehicle and comparing those parameter values to data that indicates what the parameter values represent. As an example, if the desired functional control is turning an electric fuel pump off, the processor 250 may confirm that an operating state of the vehicle is that the vehicle has a vehicle speed of 0.0 miles per hour. If the vehicle is operating under the particular operating state, the processor 250 can send a VDM to request control of the fuel pump. If the vehicle is not operating under the particular operating state, the processor 250 does not send the VDM to request control of the vehicle. Moreover, the processor 250 output on the display 300 a notification that indicates the functional control of the fuel pump will not occur and an explanation why the functional control of the fuel pump will not occur. Other examples of the particular operating state and a functional control are possible.

D. Computing System and Computer Program Product

Next, FIG. 4 is a block diagram illustrating a computing system 450. The server 2 comprises a computing system. The server 2 and/or the computing system 4 can comprise any or all of the components of the computing system 450.

In a basic configuration 451, the computing system 450 can include a processor 452 and a system memory 454. A memory bus 459 can be used for communicating between the processor 452 and the system memory 454. Depending on the desired configuration, the processor 452 can be of any type including but not limited to a microprocessor (μP), a microcontroller (μC), a digital signal processor (DSP), or any combination thereof. A memory controller 453 can also be used with the processor 452, or in some implementations, the memory controller 453 can be an internal part of the processor 452.

Depending on the desired configuration, the system memory 454 can be of any type including but not limited to volatile memory (such as RAM), non-volatile memory (such as ROM, flash memory, etc.) or any combination thereof. The system memory 454 can include one or more applications 455, and program data 457. The program data 457 can include system data 458 that can be directed to any number of types of data. In at least some example implementations, the applications 455 can be arranged to operate with the program data 457 on an operating system executable by the processor 452.

For a computing system configured as the server 2, the application 455 can include an algorithm 456 that is arranged to perform one or more or all of the functions described as being performed by the server 2. Moreover, the system data 458 for the server 2 can include one or more of the following types of data: the vehicle selection data 57, the test set 58, the GUI 59, the baseline characteristics 60, the test device measurement 61, the index 62, the mapping data 63, the diagnostic status indicator 64, the target signal test indicator 65, and/or the GUI template 674. The processor 48 can be configured like the processor 452. The memory 50 can be configured as part of or all of the system memory 454 or the data storage devices 460. The transceiver 49 can be configured as part of or all of the communication interface 467.

For a computing system configured as the computing system 4, the application 455 can include an algorithm 456 that is arranged to perform one or more or all of the functions described as being performed by the computing system 4. Moreover, the system data 458 for the computing system 4 can include one or more of the following types of data: the index 655, the command 656, the target signal test indicator 657, the diagnostic status indicator 658, the mapping data 659, the vehicle selection data 660, the GUI 661, the component test 662, the test set 663, the navigable menu 664, the vehicle data message 665, the baseline characteristic 666, the test device measurement 669, or the GUI template 675. The processor 250 can be configured like the processor 452. The memory 252 can be configured as part of or all of the system memory 454 or the data storage devices 460. The transceiver 251 can be configured as part of or all of the communication interface 467.

The computing system 450 can have additional features or functionality, and additional interfaces to facilitate communications between the basic configuration 451 and any devices and interfaces. For example, data storage devices 460 can be provided including removable storage devices 461, non-removable storage devices 462, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable program instructions, data structures, program modules, or other data such as the data stored in a computer-readable memory, such at the memory 50, 252.

The system memory 454 and the data storage devices 460 are examples of computer-readable memory, such as the memory 50, 252. The system memory 454 and the data storage devices 460 can include, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by the computing system 450.

For the computing system 4, the computing system 450 can include or be implemented as a portion of a small-form factor portable (i.e., mobile) electronic device such as a smartphone (e.g., an IPHONE® smartphone from Apple Inc. of Cupertino, California, or a GALAXY S® smartphone from Samsung Electronics Co., Ltd. of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The application 455, or the program data 457 can include an application downloaded to the communication interface 467 from the APP STORE® online retail store, from the GOOGLE PLAY® online retail store, or another source of the applications or the CRPI described herein for use on the computing system.

Additionally, or alternatively, the computing system 450 can include or be implemented as part of a personal computing system (including both laptop computer and non-laptop computer configurations), or a server. In some implementations, the disclosed methods can be implemented as CRPI encoded on a non-transitory computer-readable storage media in a machine-readable format, or on other non-transitory media or articles of manufacture.

The computing system 450 can also include output interfaces 463 that can include a graphics processing unit 464, which can be configured to communicate to various external devices such as display devices 466 or speakers via one or more audio-visual (A/V) ports 465 or a communication interface 467. The communication interface 467 can include a network controller 468, which can be arranged to facilitate communications with one or more other computing systems 470 over a network communication via one or more communication ports 469. The computing system 450 can include an input interface 471 that includes one or more input ports 472. The input ports 472 can be configured to communicate to various input devices 473 such as a keyboard, a computer mouse, a microphone, or a display device, such as the display devices 466. The communication connection is one example of a communication media. Communication media can be embodied by computer-readable program instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, communication media can include wired media such as a wired network or direct-wired connection, and wireless media such as acoustic, radio frequency (RF), infrared (IR) and other wireless media.

Figure 5:
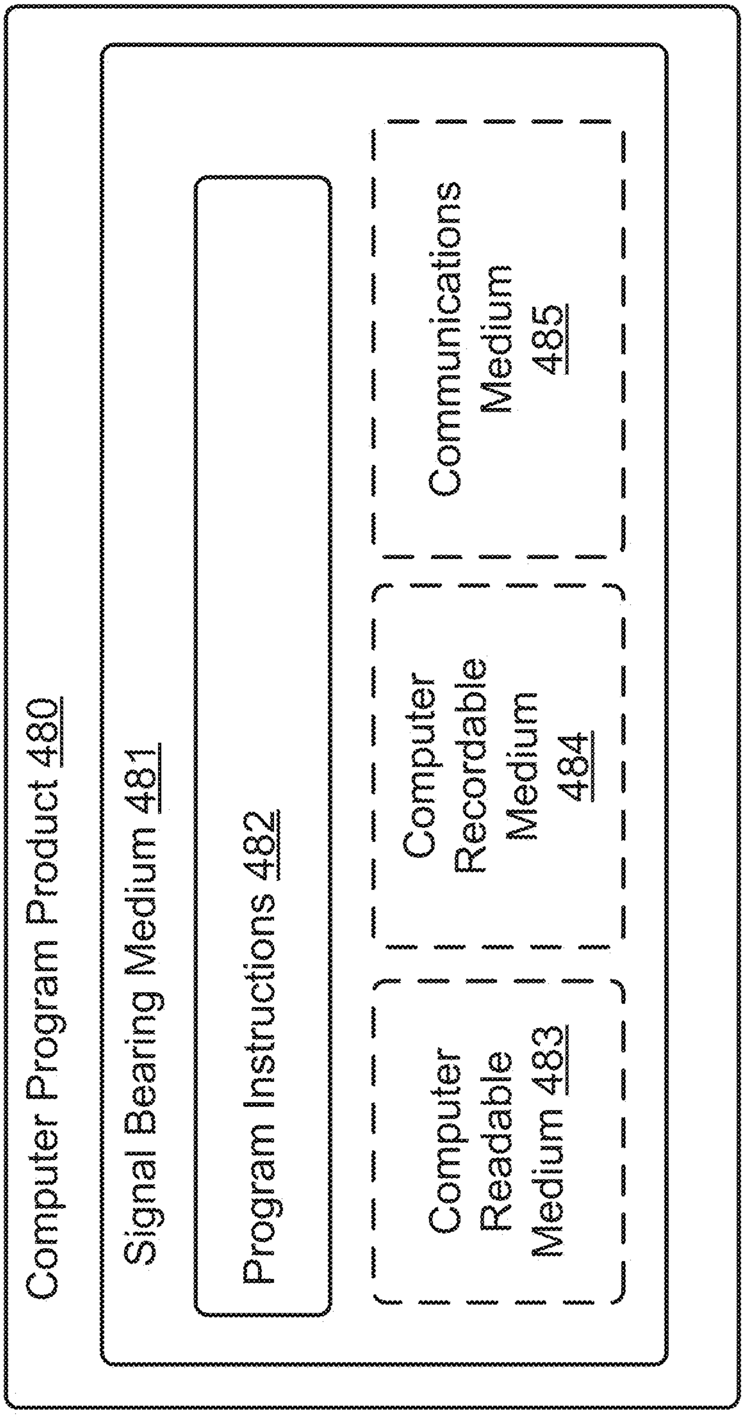
FIG. 5 is a schematic illustrating a conceptual partial view of a computer program product for executing a computer process on a computing system in accordance with the example implementations.

Next, FIG. 5 is a schematic illustrating a conceptual partial view of an example computer program product 480 that includes a computer program for executing a computer process on a computing system, arranged according to at least some implementations presented herein. In at least some implementations, the example computer program product 480 is provided using a signal bearing medium 481. The signal bearing medium 481 can include one or more programming instructions 482 that, when executed by one or more processors can provide functionality or portions of the functionality described in this description with respect to any other figure. In some implementations, the signal bearing medium 481 encompasses a computer-readable memory 483, such as, but not limited to, a hard disk drive, a Compact Disc (CD), a Digital Video Disk (DVD), a digital tape, or any other memory described herein. In those or in other implementations, the signal bearing medium 481 encompasses a computer recordable medium 484, such as, but not limited to, memory, read/write (R/W) CDs, R/W DVDs, etc. In those or in still other implementations, the signal bearing medium 481 encompasses a communications medium 485, such as, but not limited to, a digital and/or an analog communication medium (e.g., a fiber optic cable, a waveguide, a wired communications link, a wireless communication link, etc.). Thus, for at least some implementations, the signal bearing medium 481 can be conveyed by a wireless form of the communications medium 485 (e.g., a wireless communications medium conforming to the IEEE 802.11 standard or another transmission protocol).

The one or more programming instructions 482 can be, for example, computer executable and/or logic implemented instructions. In some examples, a computing system such as the computing system 450 of FIG. 4 can be configured to provide various operations, functions, or actions in response to the programming instructions 482 conveyed to the computing system 450 by one or more of the computer-readable memory 483, the computer recordable medium 484, and/or the communications medium 485.

The server 2, the computing system 4, and the computing system 450 can comprise a power source. In accordance with the example implementations, a power source can include a connection to an external power source and circuitry to allow current to flow to other elements connected to the power source. As an example, the external power source can include a wall outlet at which a connection to an alternating current can be made. As another example, the external power source can include an energy storage device (e.g., a battery) or an electric generator.

Additionally, or alternatively, a power source can include a connection to an internal power source and power transfer circuitry to allow current to flow to other elements connected to the power source. As an example, the internal power source can include an energy storage device, such as a battery. Furthermore, any power source described herein can include various circuit protectors and signal conditioners. The power sources described herein can provide a way to transfer electrical currents to other elements that operate electrically.

III. Example Operation

A. FIG. 6A

Figure 6A:
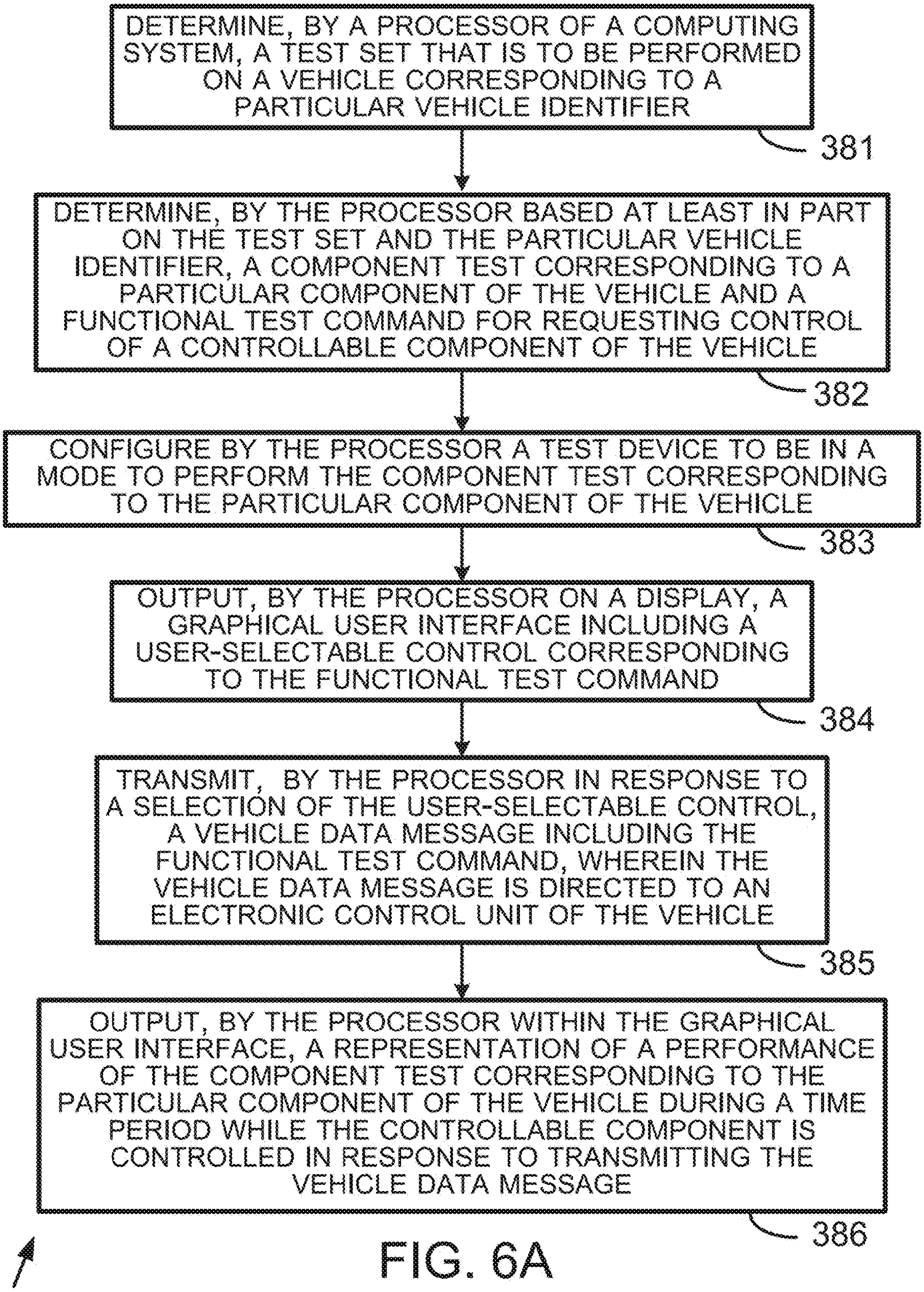
FIG. 6A, FIG. 6B, and FIG. 6C are flowcharts depicting sets of functions that can be carried out in accordance with the example implementations.

Next, FIG. 6A shows a flowchart 380 depicting a set of functions that can be carried out in accordance with the example implementations. The flowchart 380 includes the functions shown in block 381 through block 386. A variety of methods can be performed using all of the functions shown in the flowchart 380 or any proper subset of the functions shown in the flowchart 380. Any of those methods can be performed with other functions such as one or more of the other functions described in this description. For example, the methods can include one or more functions contained in an enumerated example embodiment (EEE) shown below, such as EEE 1 or any EEE dependent directly or indirectly upon EEE 1.

One or more or all of the functions shown in the flowchart 380 and/or one or more of the other functions described in this description can be performed by one or more processors of a computing system. In at least some implementations, a computing system that performs at least one of the functions includes one or more from among: the server 2, the computing system 4, or the computing system 450.

Block 381 includes determining, by a processor (e.g., the processor 48, 250, 452) of a computing system, a test set that is to be performed on a vehicle corresponding to a particular vehicle identifier.

As an example, determining the test set can include determining a test set corresponding to a PID within live vehicle data (e.g., data from VDMs most-recently received from the vehicle 12 and displayed on the computing system 4) that has breached a PID threshold. As another example, determining the test set can include determining the test set from mapping data that maps a symptom, a component or a PID to the test set. As yet another example, determining the test set can include determining the test set from a test set selection indicative of the test set.

Figure 12:
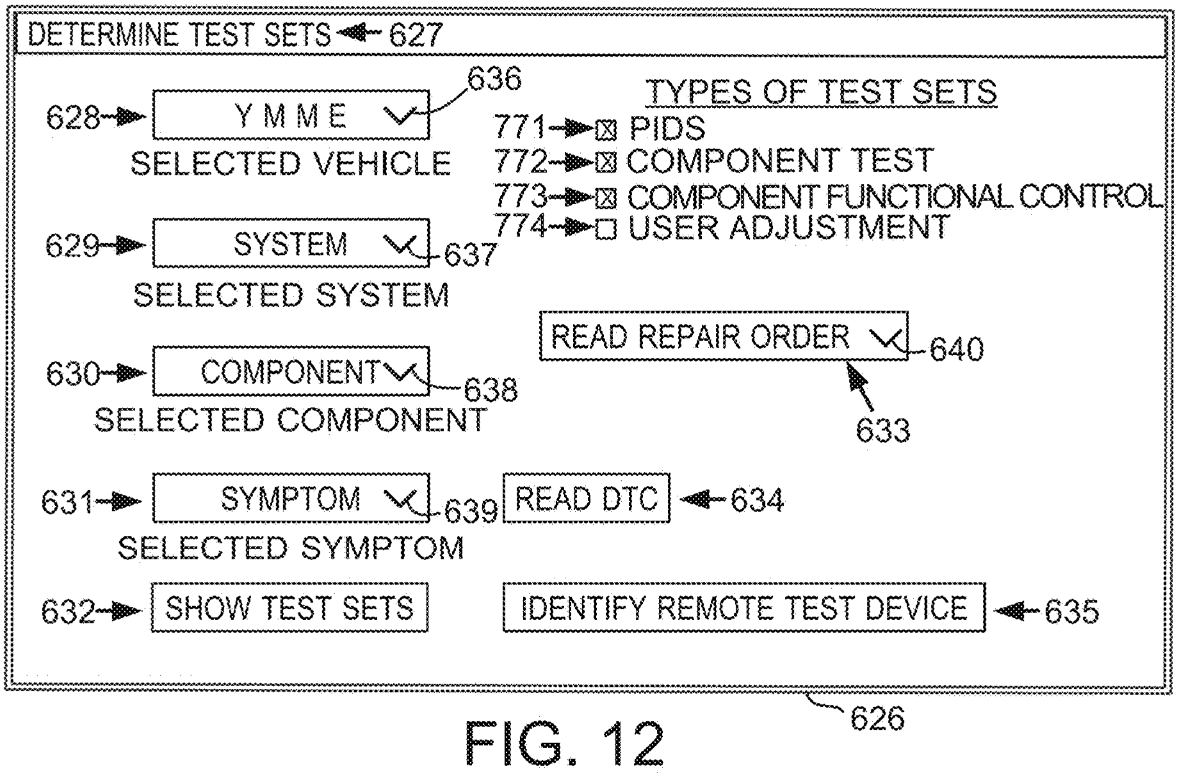

In at least some implementations, determining the test set selection includes the processor determining a selection of the test set based on search criteria entered using a GUI, such as the GUI 626 shown in FIG. 12. Entering a relatively small amount of search criteria, such as just a vehicle identifier using the USC 628 can lead to determining a relatively large quantity of test sets from which a test set can be selected, as compared to entering a relatively larger amount of search criteria, such as the vehicle identifier, a system identifier, a component identifier, and a symptom identifier using the USC 628, 629, 630, 631, respectively, that can lead to smaller quantity of test sets from which a test set can be selected. In at least some implementations, using the GUI 626 to determine a test set selection can result in determining a single test set available for selection. In such an implementation, the single test set can be selected automatically by the processor(s).

Figure 13:
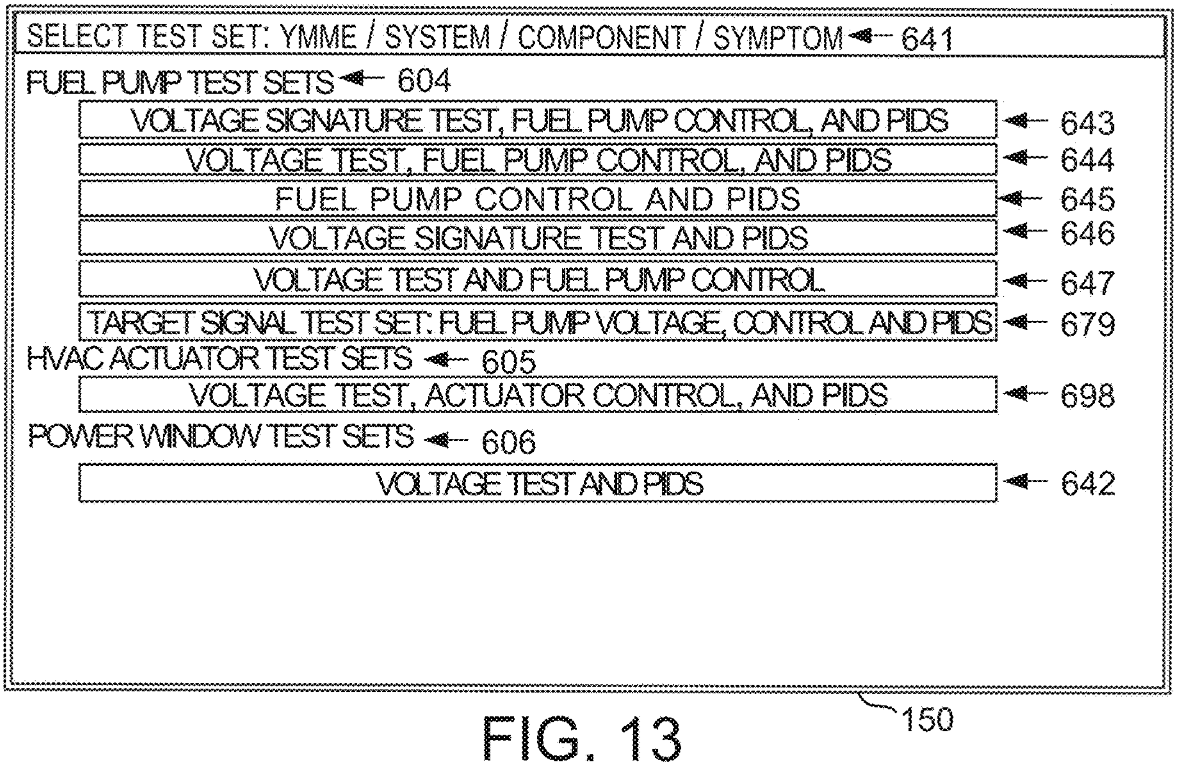

In at least some implementations, determining the test set selection includes the processor(s) determining a selection of the test set from a GUI, such as the GUI 150 shown in FIG. 13. As an example, the processor(s) can determine the test set selection in response to the input device 301 being used to select one of the USC 642 to the USC 647 shown in FIG. 13. The GUI 150 can be displayed in response to entering search criteria using the GUI 626 and then selecting the USC 632 in the GUI 626.

In at least some implementations, determining the test set selection includes the processor 250, receiving from the server 2, a communication including the test set selection from the server 2. As an example, the communication including the test set selection can include an identifier of a test set stored in the test set 663. As another example, the communication including the test set selection can include a test set file, such as a test set file 825 shown in FIG. 82A to FIG. 82C. In accordance with the prior example, the processor can determine the test set from the test set file.

The test set can be arranged in any of a variety of configurations. As an example, the test set can be arranged like any test set described in this description or include aspect(s) contained in any test set described in this description. As another example, the test set can include and/or be displayed like any GUI including a test set shown in the drawings. As yet another example, the test set can include a test set having an identifier of a component test contained on the computing system 4, an identifier of a functional test command for requesting control of a component within the vehicle, and/or a container for displaying a representation of performing the component test during a time period when the component within the vehicle 12 is controlled using the functional test command. As yet another example, the test set can include the aspects mentioned in the previous example and a PID for requesting a parameter value corresponding to the PID from the vehicle 12. As yet another example, the test set can include the aspects mentioned in the previous example and a baseline parameter for determining a status of the vehicle by comparing the parameter value corresponding to the PID to the baseline parameter. Moreover, the test set can be arranged as a computer-readable test set file, such as a markup language file such as an XML file, a YAML file, a CSV file, a flat file, or a JSON file, or as computer-readable program instructions within the CRPI 56, 260.

Next, block 382 includes determining, by the processor based at least in part on the test set and the particular vehicle identifier, a component test corresponding to a particular component of the vehicle and a functional test command for requesting control of a controllable component of the vehicle. In general, the processor can determine the component test and/or the functional test command by receiving a communication that includes an identifier of the component test and/or an identifier of the functional test command and/or by accessing the component test and/or the functional test command from a database, such as the database 13, 258.

Figure 82B:
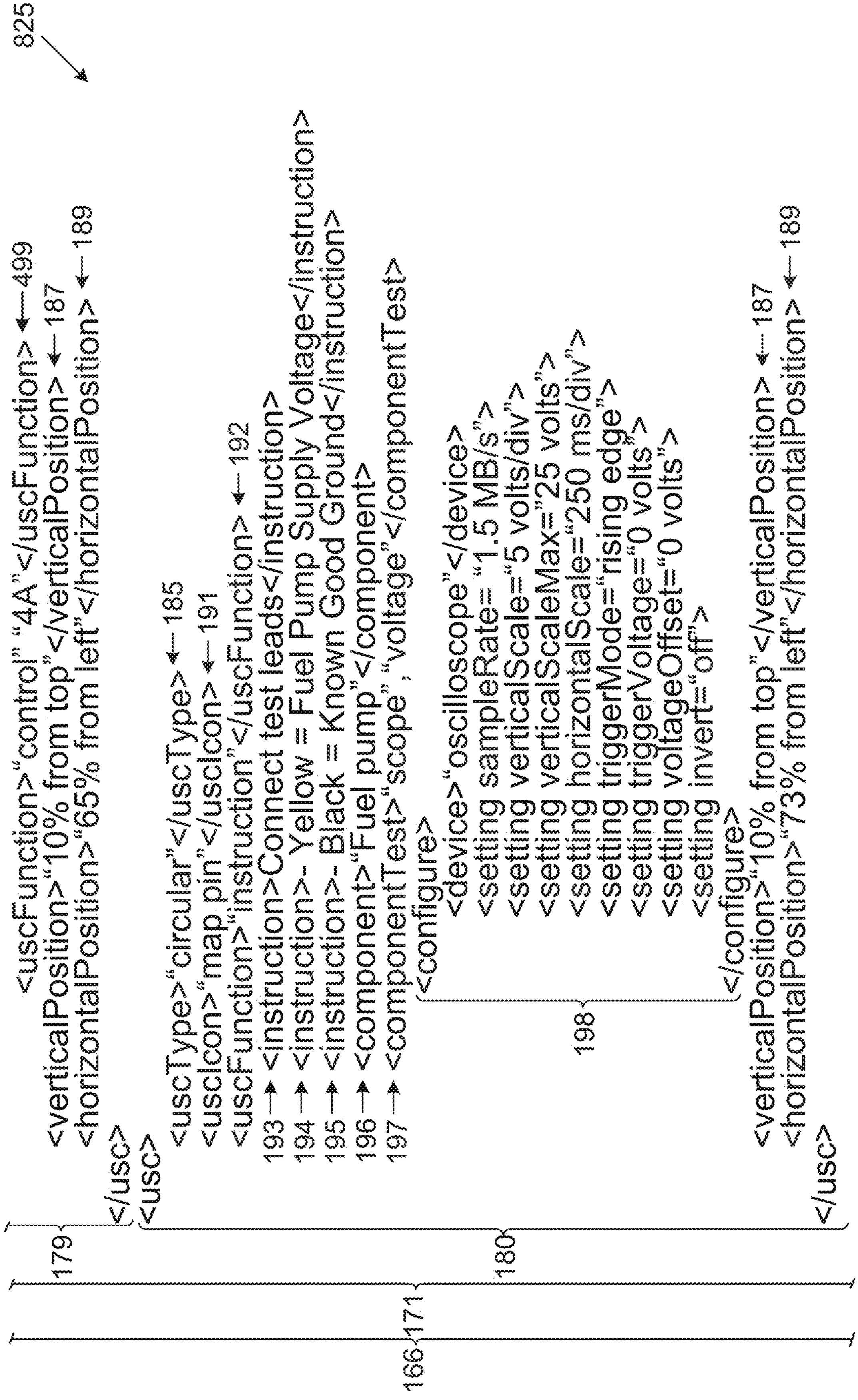

In at least some implementations, determining the component test includes determining the component test from the test set (e.g., via a test set file). As an example, the test set can include an identifier of the component test, such as the identifier "Fuel Pump Voltage Test" that corresponds to the component test CT12 shown in FIG. 59. A test set file 825 shown in FIG. 82C shows an element 845 indicative of the component test CT12. As another example, a test set can include an index value, such as the CTI 95. The processor 250 can parse an element (e.g., an object or an array) of a test set file to determine a component test indicated by and/or referenced within the element, such as an element 120 shown in FIG. 81B, an element 180 shown in FIG. 82B, or an object 445 shown in FIG. 83B. As an example, by parsing the object 445, the processor 250 can determine the component test identifier $2F, and determine the component test is the "Fuel Pump Voltage Test" based on that identifier being within a component test index 95 shown in FIG. 59.

In at least some implementations, determining the functional test command includes determining the functional test command from the test set (e.g., via a test set file). As an example, the test set can include a name of the functional test command, such as the name "Fuel Pump Engagement" that corresponds to the fuel pump engagement functional test 99 shown in FIG. 60. The element 147 in a test set file 106 shown in FIG. 81B shows such a test set name. As another example, the test set can include an index value into a functional test index (FTI) 101 shown in FIG. 60, such as the index value (4A) in an element 499 in the test set file 825 shown in FIG. 82B or in the test point indicator 447 in the test set file 400 shown in FIG. 83A. The processor 250 can parse an element (e.g., an object or an array) of a test set file to determine a name of a functional test command or an index value into the FTI 101.

In at least some implementations, determining the component test and/or the functional test command can include the processor 250 transmitting to the server 2 a request including the vehicle identifier and an indication of the first test or of a test set selection. In response to that request, the processor 250 can receive a response that includes an identifier of the component test and/or an identifier of the functional test command. One or more of those identifiers can include an index value within the CTI 95 to the component test or an index value within the FTI 101 to the functional test command. In at least some implementations, the response includes a test set file that includes the identifier of the component test and/or the functional test command.

Next, block 383 includes configuring, by the processor, a test device to be in a mode to perform the component test corresponding to the particular component of the vehicle. In at least some implementations, the processor and the test device are located within the computing system 4. In accordance with these implementations, the processor 250 can execute the CRPI 260 and provide an instruction to the test device 199 over the data bus 324. As an example, the test device 199 in these implementations can include the meter 328 or the oscilloscope 329. Examples of configuring the meter 328 or the oscilloscope 329 are described throughout this description are applicable to the configuring function of the block 383. In accordance with those or other implementations, the processor 250 can refer to configuration parameters for the test device 199, such as the configuration parameters 360, 361 shown in FIG. 41, and/or the configuration parameters in a test set file, such as the configuration parameters 808 shown in FIG. 84. Additionally, or alternatively, configuring the test device at block 383 can include the processor 250 executing program instructions corresponding to a component test selectable from a navigable menu, such as the navigable menu 930 shown in FIG. 71A and FIG. 71B. That selectable component test is the component test corresponding to the particular component of the vehicle.

Next, block 384 includes outputting, by the processor on a display, a GUI including a USC corresponding to the functional test command. As an example, the GUI can include a GUI shown in one of FIG. 14 to FIG. 17, FIG. 19, FIG. 22 to FIG. 29, FIG. 31, FIG. 32, FIG. 36, or FIG. 38 to FIG. 40. In at least some implementations, the USC corresponding to the functional test command is configured as a toggle switch selectable to cause a functional test corresponding to the functional test command to turn on (e.g., start) and to turn off (e.g., end). In at least some implementations, the USC corresponding to the functional test command includes a first USC selectable to cause the functional test corresponding to the functional test command to turn on and a second USC selectable to cause the functional test corresponding to the functional test command to turn off.

Next, block 385 includes transmitting, by the processor in response to a selection of the USC, a VDM including the functional test command. The VDM is directed to an ECU of the vehicle. Transmitting the VDM can include the processor 250 and/or the transceiver 251 (e.g., the vehicle communication transceiver 256) transmitting the VDM on the communication link 10 (shown in FIG. 1) and/or the vehicle network 36 (shown in FIG. 78).

In at least some implementations, the processor 250 may execute or refer to program code or data, such as the program code or data 974 (shown in FIG. 71A) to generate the VDM and then transmit the VDM to the transceiver 251 over the data bus 324. For implementations in which the computing system 4 is configured to communicate using multiple VDM protocols and/or includes multiple vehicle communication transceivers for the multiple VDM protocols, the processor 250 can determine which VDM protocol and/or which vehicle communication transceiver is to be used to transmit the VDM by referring to the program code or data 974 for data that identifies the VDM protocol for the functional test and/or the vehicle data message 665.

In at least some implementations, the selected functional test pertains to emission controls of a motor vehicle. For these implementations, the selected functional test can meet on-board diagnostic requirements of a given geo-political region, such as the SAE J1979 standard for the United States or the ISO 15031-5 standard for the European Union. In implementations for a vehicle that implements one or more of those standards, a functional test command for a selected functional test can include a service identifier to indicate a type of functional test requested. As an example, the service identifiers can include: service ($01) for a functional test to request current powertrain diagnostic data, service ($02) for a functional test to request powertrain freeze frame data, service ($03) for a functional test to request emission-related DTC, service ($04) for a functional test to clear/reset emission-related diagnostic information, service ($05) for a functional test to request oxygen sensor monitoring test results, service ($06) for a functional test to request on-board monitoring test results for specific monitored systems, service ($07) for a functional test to request emission-related DTC detected during a current or last completed driving cycle, service ($08) for a functional test to request control of an on-board system, test or component, and/or service ($09) for a functional test to request vehicle information. As an example, the functional test command to perform an evaporative system leak test using the service identifier ($08) can include a functional test that corresponds to a test identifier ($01) that identifies the evaporative system leak test.

A functional test command, such as the functional test command, can include a command that represents a variety of commanded actuations, forces, currents, voltages, flows, rotations, translations, pressures, configuration changes, or other actions that can be executed an/or set by the ECU or a vehicle component controlled by the ECU. In accordance with at least some example implementations, the functional test command can be a command to activate or deactivate a vehicle component. For example, the functional test command can include a functional test command to activate a pump, a relay, a fan, a valve, a light, a horn, a switch, an electromagnet, a fuel injector, a motor, a solenoid, or some other vehicle component.

Additionally or alternatively, the functional test command can include a command to set or change a level of activity of a vehicle component or system (e.g., to set an RPM, a voltage, a current, or some other actuated parameter to a specified level or to increase or reduce such an actuated parameter by a specified absolute or relative amount). In some examples, the functional test command can include command to change a set point or other configuration of the vehicle 12 or a vehicle component or system of the vehicle 12. This can include setting an engine RPM, a fuel rail pressure, or some other controllable operating condition of the vehicle 12. A functional test command to alter such a set point or other configuration parameter can indirectly result in operation of a vehicle component or systems of the vehicle 12 (e.g., by indirectly causing the ECU to control the throttle, fuel pump, turbocharger, fuel injectors, or other actuators of the vehicle in order to effectuate a command to change the RPM of an engine).

Next, block 386 includes outputting, by the processor within the graphical user interface, a representation of a performance of the component test corresponding to the particular component of the vehicle during a time period while the controllable component is controlled in response to transmitting the VDM.

In at least some implementations of a method including one or more or all of the functions shown in the flowchart 380, the GUI includes a first container and a second container. The representation of the performance of the component test output within the GUI is output within the first container. The method also includes determining, by the processor based at least in part on the test set and the particular vehicle identifier, a first PID corresponding to the ECU. The method further includes transmitting, by the processor to the ECU, a second VDM including a request for a parameter value corresponding to the first PID. Moreover, the method also includes outputting, by the processor within the second container, a representation of the first PID and a parameter value corresponding to the first PID received in response to the request.

In at least some of the implementations described in the preceding paragraph, the method also includes determining, by the processor based at least in part on the test set and the particular vehicle identifier, a threshold value corresponding to the first PID. The method further includes determining, by the processor, whether the parameter value corresponding to the first PID received in response to the request breaches the threshold value. Furthermore, the method includes outputting, by the processor within the second container, a threshold indicator that indicates whether the parameter value corresponding to the first PID received in response to the request breaches the threshold value.

In at least some of the implementations described in the preceding paragraph, the threshold value includes a threshold range. Moreover, the threshold range includes a maximum threshold range value and a minimum threshold range value. Additionally, the parameter breaches the threshold value if the parameter is less than the minimum threshold value or greater than the maximum threshold value. In at least some implementations, the test set includes the threshold value. In at least some implementations, the processor 250 determines the threshold value from the PID threshold 668. In at least some implementations, the processor 250 determines the threshold value from a database response 536 (shown in FIG. 46) or a communication 561 (shown in FIG. 47). In at least some implementations, the processor 250 determines the threshold value by parsing an element of a test set file that includes the threshold value or data representing the threshold value.

In at least some implementations described two paragraphs above, the threshold value corresponding to the first PID includes: (i) a first threshold value corresponding to the first PID and a first threshold range of parameter values corresponding to a second PID, and (ii) a second threshold value corresponding to the first PID and a second threshold range of the parameter values corresponding to the second PID. Furthermore, the first threshold range of parameter values corresponding to the second PID is different than the second threshold range of the parameter values corresponding to the second PID. Furthermore still, determining whether the parameter value that corresponds to the first PID breaches the threshold value corresponding to the first PID includes the processor comparing: (i) the parameter value that corresponds to the first PID to the first threshold range if a parameter value that corresponds to the second PID is within the first threshold range of parameter values corresponding to the second PID, or (ii) the parameter value that corresponds to the first PID to the second threshold range if the parameter value that corresponds to the second PID is within the second threshold range of parameter values corresponding to the second PID. In at least some implementations, the test set includes the threshold value. In at least some implementations, the processor 250 determines the threshold value from the PID threshold 668. In at least some implementations, the processor 250 determines the threshold value from a database response 536 (shown in FIG. 46) or a communication 561 (shown in FIG. 47).

In at least some implementations of a method including one or more or all of the functions shown in the flowchart 380, the test device includes an oscilloscope (e.g., the oscilloscope 329) having one or more test leads. Moreover, configuring the test device includes configuring the oscilloscope to operate with one or more from among: a particular sample rate from among multiple sample rates, a particular vertical scale setting from among multiple vertical scale settings, a particular horizontal scale setting from among multiple horizontal scale settings, a particular trigger mode from among multiple trigger modes, and/or a particular trigger source from among multiple trigger sources. In at least some implementations, the settings to configure the oscilloscope are stored within the computing system 4 (e.g., within the CRPI 260 and/or the component test 662) such that the computing system 4 does not have to receive the settings from the server 2. In those implementations, the settings are native to the computing system 4. In other implementations, the computing system 4 receives the oscilloscope settings from another device, such as the server 2, and then stores the settings within the memory 252 (e.g., within the component test 662). In at least some implementations, the processor 250 determines the settings to configure the oscilloscope by parsing element(s) of a test set file that includes the settings.

In at least some of the implementations described in the preceding paragraph, the method further includes generating, by the processor, a scaled signal by scaling a signal received on the one or more test leads during the time period. The representation of the performance includes a representation of the scaled signal. Additionally, scaling the signal includes scaling the signal received on the one or more test leads to conform to one or more from among the particular vertical scale setting or the particular horizontal scale setting. In at least some implementations, the signal is scaled to a level that matches a scale of a signal represented in an image of a known good signal or a known bad signal.

In at least some implementations of a method including one or more or all of the functions shown in the flowchart 380, the test device includes a meter (e.g., the meter 328) having multiple test leads. Moreover, configuring the test device includes configuring the meter to operate with a particular measurement mode from among multiple measurement modes. As an example, the multiple measurement modes can include two or more measurement modes from among: an amperage measurement mode, a capacitance measurement mode, a continuity measurement mode, a duty cycle measurement mode, a frequency measurement mode, a pulse width measurement mode, a resistance measurement mode, a temperature measurement mode, or a voltage measurement mode. As an example, an amperage measurement mode can be an alternating current measurement mode or a direct current measurement mode. Similarly, a voltage measurement mode can be an alternating current (AC) voltage measurement mode or a direct current (DC) voltage measurement mode. In at least some implementations, the settings to configure the meter are stored within the computing system 4 (e.g., within the CRPI 260 and/or the component test 662) such that the computing system 4 does not have to receive the settings from the server 2. In those implementations, the settings are native to the computing system 4. In other implementations, the computing system 4 receives the meter settings from another device, such as the server 2, and then stores the settings within the memory 252 (e.g., within the component test 662).

In at least some of the implementations described in the preceding paragraph, configuring the test device further includes configuring the meter to operate with a particular measurement range from among multiple measurement ranges. Additionally, or alternatively, the representation of the performance of the component test includes a representation of a signal received on the test leads during the time period. As an example, the representation of the signal includes can include a digital numeric representation of the signal, and/or a graphical representation of the signal.

In at least some implementations of a method including one or more or all of the functions shown in the flowchart 380, the representation of the performance of the component test includes a representation of a target signal measured by the test device. The method also includes determining, by the processor, one or more characteristics of the target signal. The method further includes determining, by the processor, a diagnostic status corresponding to the vehicle by comparing the one or more characteristics of the target signal to one or more baseline characteristics corresponding to the target signal. Additionally, the method includes outputting, by the processor on the display, the diagnostic status while the representation of the performance of the component test is output within the first container. In at least some of these implementations, the processor 250 determines the one or more characteristics from the test set, a test set file corresponding to the test set, and/or the baseline characteristics 666.

In at least some of the implementations described in the preceding paragraph, the method also includes transmitting, by the processor, a second VDM to the ECU. The second VDM includes a request for a parameter value corresponding to a first PID. Furthermore, the method includes receiving, by the processor from the ECU in response to transmitting the second VDM, a third VDM. The third VDM includes the parameter value corresponding to a first PID. Comparing one or more characteristics of the target signal to the threshold value includes comparing the parameter value corresponding to a first PID to the threshold value.

In at least some of the implementations described in the preceding two paragraphs above, the method also includes transmitting, by the processor to the ECU, a first set of VDMs. Each VDM of the first set of VDMs includes a request for a parameter value corresponding to a PID. The PID corresponds directly to the target signal. Additionally, the method includes receiving, by the processor in response to transmitting the first set of VDMs, one or more parameter values corresponding to the PID. The one or more parameter values are contained with one or more VDMs received in response to transmitting the first set of VDMs. Furthermore, the method includes determining, by the processor, the one or more characteristics of the target signal based on the one or more parameter values corresponding to a PID.

In at least some of the implementations described in the preceding three paragraphs above, the method also includes receiving, by the processor from a signal detector, one or more samples of the target signal during the time period. The one or more characteristics of the target signal are based on the one or more samples of the target signal. Additionally, as an example, the signal detector includes one or more from among: an analog-to-digital converter, a probe, a meter, or an oscilloscope. The one or more samples of the target signal can be stored within the test device measurement 669.

In at least some of the implementations described in the preceding four paragraphs above, the representation of the target signal measured by the first device is contained within a graph on the display. Additionally, the graph includes an axis corresponding to time. Furthermore, the method can include outputting, by the processor on the display, an icon along the axis. The icon is indicative of a time of transmitting the first VDM.

In at least some of the implementations described in the preceding five paragraphs above, determining the one or more characteristics of the target signal includes determining one or more characteristics for a first portion of the target signal and one or more characteristics for a second portion of the target signal. Additionally, the first portion of the target signal occurs before the second portion of the target signal. Furthermore, the first portion of the target signal occurs before transmission of the VDM. Furthermore, the second portion of the target signal occurs after transmission of the VDM.

In at least some of the implementations described in the preceding six paragraphs above, the target signal includes a signal output by the ECU or by a vehicle component operatively connected to the ECU. The method also includes determining, by the processor based at least in part on the test set and the particular vehicle identifier, a PID corresponding to the target signal. Additionally, the method includes transmitting, by the processor to the ECU, one or more additional VDMs. Each additional VDM includes a request for a parameter value corresponding to the PID. Furthermore, the method includes receiving, by the processor from the ECU in response to transmitting the one or more additional VDMs, one or more received parameter values corresponding to the PID. The one or more characteristics of the target signal include the one or more received parameter values. Moreover, the one or more baseline characteristics corresponding to the target signal further correspond to the PID.

In at least some implementations of a method including one or more or all of the functions shown in the flowchart 380, configuring the test device to be in the mode to perform the component test includes configuring the test device to generate a representation of a target signal corresponding to the particular component of the vehicle. Additionally, the method includes determining, by the processor based at least in part on the test set and the particular vehicle identifier, a known-good representation of the target signal. Furthermore, the method includes outputting, the representation of the performance of the component test includes displaying, on the display, the representation of the target signal corresponding to the particular component of the vehicle and the known-good representation of the target signal in proximity to one another. In at least some of these implementations, the processor 250 determines the known-good representation of the target signal from the test set, a test set file corresponding to the test set, and/or the baseline characteristics 666.

In at least some implementations of a method including one or more or all of the functions shown in the flowchart 380, the method also includes receiving, by the processor prior to transmitting the VDM, one or more other VDMs including parameter values corresponding to one or more PIDs. Furthermore, the method includes determining, by the processor based at least in part on the parameter values corresponding to one or more PIDs and the particular vehicle identifier, a group of test sets that includes the test set. Furthermore, the method includes outputting, by the processor on the display, a second GUI including a respective USC corresponding to each test set of the group of tests. Determining the test set selection can include receiving, by the processor, an indication that a USC corresponding to the test set was selected from the second GUI.

In at least some implementations of a method including one or more or all of the functions shown in the flowchart 380, the test set corresponds to a test set file. Moreover, determining the component test and the functional test command includes the processor determining the component test and the functional test command from the test set file. Furthermore, the processor is also configured to determine, for an occurrence of performing the component test without performing the test set, the component test based on a selection of the component test from a navigable menu output on the display. Furthermore still, the processor is also configured to determine for an occurrence of transmitting the VDM including the functional test command without performing the test set, the functional test command based on a selection of the functional test command from the navigable menu output on the display.

In at least some implementations of a method including one or more or all of the functions shown in the flowchart 380, the method also includes transmitting, by the processor to a server in response to determining the test set, a request for a test set file corresponding to the test set. The method also includes the processor receiving the test set file in response to the request. Examples of the test set file are described throughout this description.

In at least some implementations of a method including one or more or all of the functions shown in the flowchart 380, the method also includes receiving, by the processor, a VDM transmitted by the vehicle. The VDM transmitted by the vehicle includes a first PID and a parameter value corresponding to the first PID. This method also includes determining, by the processor, that the parameter value corresponding to the first PID breaches a threshold corresponding to the first PID. Moreover, determining the test set occurs in response to determining that the parameter value corresponding to the first PID breaches the threshold. Additionally, determining the test set that is to be performed on the vehicle includes determining that the test set corresponds to the first PID.

In at least some implementations of a method including one or more or all of the functions shown in the flowchart 380, the GUI includes a first GUI and the USC includes a first USC. Additionally, the method includes outputting, by the processor onto the display, a second GUI including a second USC. The second USC corresponds to the test set. Moreover, determining the test set that is to be performed on the vehicle includes the processor receiving a signal that indicates a selection of the second USC on the second GUI has occurred. As an example, the signal can be provided to a processor from a touch screen display, a keypad, a mouse, or audibly via a microphone.

In at least some implementations of a method including one or more or all of the functions shown in the flowchart 380, the method also includes outputting, by the processor onto the display before outputting the GUI onto the display, one or more other GUIs. The GUI and the one or more other GUIs are part of a navigable menu at the computing system. At least one GUI of the one or more other GUIs is configured to enter one or more from among: a year identifier, a make identifier, a model identifier, or an engine identifier (e.g., a GUI like the GUI 725 shown in FIG. 8). At least one other GUI of the one or more GUIs is configured to enter one or more from among: a system identifier, a component identifier, or a symptom identifier (e.g., a GUI like the GUI 725 shown in FIG. 8). The vehicle and the test set both correspond to whichever of the year identifier, the make identifier, the model identifier, the engine identifier, the system identifier, the component identifier, and the symptom identifier is entered using the one or more other GUIs interfaces correspond to the vehicle. The navigable menu further includes a second USC and a third USC. The second USC is configured to enter a menu selection that causes the processor to output onto the display a second GUI from which the test device can be configured to be in a mode to perform the component test corresponding to the particular component of the vehicle. The third USC is configured to enter a menu selection that causes the processor to output onto the display a third GUI including another USC corresponding to the functional test command.

In at least some implementations of a method including one or more or all of the functions shown in the flowchart 380, the method also includes receiving, by the processor from a server, a communication including data indicative of the test set. Determining the test set includes the processor determining the test set from the data indicative of the test set. In at least some of these implementations, the data indicative of the test set includes a test set file corresponding to the test set, an identifier of a test set file stored with a non-transitory memory accessible to the computing system, or an index value indicative of the test set file stored with the non-transitory memory accessible to the computing system.

In accordance with any of the aforementioned implementations in which the processor determines one or more characterizations of the target signal, the processor can determine the characterization(s) in response to the selection of the USC and during a particular period of time corresponding to the time period when the controllable component is being controlled in response to transmitting the VDM. The particular period of time can include an amount of time before controlling the controllable component, an amount of time after controlling the controllable component, and/or an amount of time while controlling the controllable component. Typically, the amount of time before controlling the controllable component is an amount of time occurring immediately before transmitting the VDM. Likewise, typically, the amount of time after controlling the controllable component is an amount of time occurring immediately after controllable component is no longer controlled in response to transmitting the VDM. A benefit of the particular period of time including some amount of time before and/or after controlling the controllable component is that the computing system 4 can have and/or generate a point of reference with respect to changes in the target signal caused by controlling the controllable component and/or to provide some other form of normalization or relative valuation or analysis of the target signal.

In accordance with any of the aforementioned implementations in which the processor determines one or more characterizations of the target signal, determining the one or more characteristics of the target signal can include the analog-to-digital converter 673 receiving the target signal from the probe 305 or the meter 328 and converting the received target signal to a digital value representative of the target signal. The digital value can be provided to the processor 250 for comparison to baseline characteristics, such as the target signal characteristic 667.

In accordance with any of the aforementioned implementations in which the processor determines one or more characterizations of the target signal, determining the one or more characteristics of the target signal can include receiving the target signal. In at least some of these implementations, receiving the target signal can include the signal detector 325 receiving the target signal. As an example, receiving the target signal can include the probe 305, the meter 328 and/or the oscilloscope 329 receiving the target signal. In at least some implementations, receiving the target signal can include the probe 305, the meter 328, and/or the oscilloscope 329 receiving a current output by the signal generator 327 to measure a resistance of an electrical circuit, such as an electrical circuit leading to or away from a vehicle sensor or ECU. In at least some other implementations, receiving the target signal can include the vehicle communication transceiver 256 receiving the target signal. Furthermore, receiving the target signal can also include the processor 250 receiving the target signal from the vehicle communication transceiver 256 or from the signal detector 325. In accordance with at least some of these implementations, receiving the target signal includes receiving one or more parameter values corresponding to a PID that corresponds to the target signal.

In accordance with any of the aforementioned implementations in which the processor determines the diagnostic status corresponding to the vehicle 12, determining the status can include determining a diagnostic status of a system of the vehicle 12. Moreover, since the system of the vehicle 12 can include a vehicle component, determining the diagnostic status of the system can include determining the diagnostic status of vehicle component. A diagnostic status of vehicle 12, the system, or the vehicle component can include an indication whether the vehicle 12, the system, or the vehicle component, respectively is malfunctioning or operating without a malfunction. As an example, determining the diagnostic status of the system or the vehicle component can include determining that the target signal is within an expected signal range (e.g., threshold) for the target signal or that the target signal is outside of an expected signal range for the target signal.

In accordance with any of the aforementioned implementations in which the processor determines the diagnostic status corresponding to the vehicle 12, the one or more baseline characteristics can include one or more characteristics based on a particular operating state of the vehicle 12 (e.g., a particular engine RPM level or a particular engine coolant temperature value). Additionally, or alternatively, the one or more baseline characteristics can include temporal characteristics with respect to transmitting the VDM including the functional test command. The temporal characteristics can include expected characteristics of the target signal before the controllable component is controlled in response to transmitting the VDM, expected characteristics of the target signal while the controllable component is controlled in response to transmitting the VDM, and/or expected characteristics of the target signal after the controllable component is no longer controlled in response to transmitting the VDM.

In accordance with any of the aforementioned implementations in which the processor determines the diagnostic status corresponding to the vehicle 12, comparing the one or more characteristics of the target signal to one or more baseline characteristics can include comparing one or more characteristics of the target signal to a baseline waveform (or baseline waveform representation or baseline signal signature) corresponding to the target signal. The baseline waveform can be included within an image file, such as at thumbnail image file or otherwise. The processor 250 can cause an indication of the diagnostic status to be stored in the diagnostic status indicator 658.

Examples characteristics of a target signal or the baseline characteristics corresponding to a target signal are shown in FIG. 66 and FIG. 67. Those baseline characteristics can, for example, include at least a signal type, a waveform type, a period or frequency of a target signal, a duty cycle of the target signal, and an expected signal range. The baseline characteristics can, for example, indicate an average value, maximum value, minimum value, or another value or values for use in comparison against the target signal.

In accordance with any of the aforementioned implementations in which the processor outputs the diagnostic status, outputting the diagnostic status can include outputting on the display an indicator representing whether the component test passed or failed. As an example, the indicator can include a color-coded indicator. For instance, a numerical representation of the target signal can be provided against a background whose color is indicative of the determined diagnostic status, e.g., green for a status indicating no malfunction has been detected and the target signal is not in proximity to a baseline characteristic (e.g., within one percent of the baseline characteristic), yellow for situations in which the target signal is in proximity to a baseline characteristic without breaching the baseline characteristic, and red for a status indicating a malfunction has been detected. The processor 250 can determine and/or obtain the diagnostic status indicator from the diagnostic status indicator 658.

In at least some implementations of a method including one or more or all of the functions shown in the flowchart 380, determining one or more characteristics of the target signal can include transmitting, to the ECU, a first set of VDMs. Each VDM of the first set of VDMs includes a request for a parameter value corresponding to a particular PID. In response to transmitting the first set of VDMs, the processor receives a second set of VDMs transmitted from the ECU. Each VDM of the second set of VDMs includes a parameter value corresponding to the particular PID. The particular PID can further correspond directly to the target signal. For example, if the target signal is a battery voltage input to the ECU, the particular PID can further correspond to the same battery voltage input, such that the parameter value corresponding to the particular PID is indicative of the battery voltage detected by the ECU on the battery voltage input.

As an example, a value of the target signal detected by the computing system 4 can be compared to a threshold voltage that represents whether a fuel pressure, which is related to the target signal, has reached an acceptable minimum fuel pressure. If the value of the target signal does not exceed the threshold value, then the processor 250 can determine that the fuel pump is in need of replacement, repair, adjustment, or some other intervention. The threshold value for this example can be a pre-specified value (e.g., a voltage representing a necessary minimum fuel pressure) or can be determined. For example, a pre-command value of the target signal can be detected by the processor 250 and used to determine a threshold relative to the pre-command value (e.g., an increase of an absolute or relative amount from the pre-command value).

In at least some implementations of a method including one or more or all of the functions shown in the flowchart 380, the method further includes receiving, by the processor from the ECU prior to transmitting the VDM, one or more other VDMs including a parameter value corresponding to one or more other PIDs, determining, based at least in part on the parameter value corresponding to one or more other PIDs and the particular vehicle identifier, one or more test sets including the test set and outputting, on the display, a respective USC. Each respective USC is configured to signal the processor that the test set corresponding to the USC has been selected. In accordance with these implementations, determining the test selection indicative of the test set includes the processor receiving a signal that the test set has been selected using a USC.

In at least some implementations of a method including one or more or all of the functions shown in the flowchart 380, the particular component of the vehicle is the controllable component.

In at least some implementations of a method including one or more or all of the functions shown in the flowchart 380, the particular component of the vehicle is separate from, but operatively connected to the controllable component. In at least some of these implementations, an operative connection between the particular component and the controllable component is a direct connection. Alternatively, in at least some of these implementations, an operative connection between the particular component and the controllable component is an indirect connection.

In at least some implementations of a method including one or more or all of the functions shown in the flowchart 380, transmitting the VDM includes transmitting the VDM over an air interface directly to the ECU or a vehicle component operatively connected to the ECU, or indirectly to a dongle operatively connected to an on-board diagnostic port in the vehicle.

B. FIG. 6B

Figure 6B:
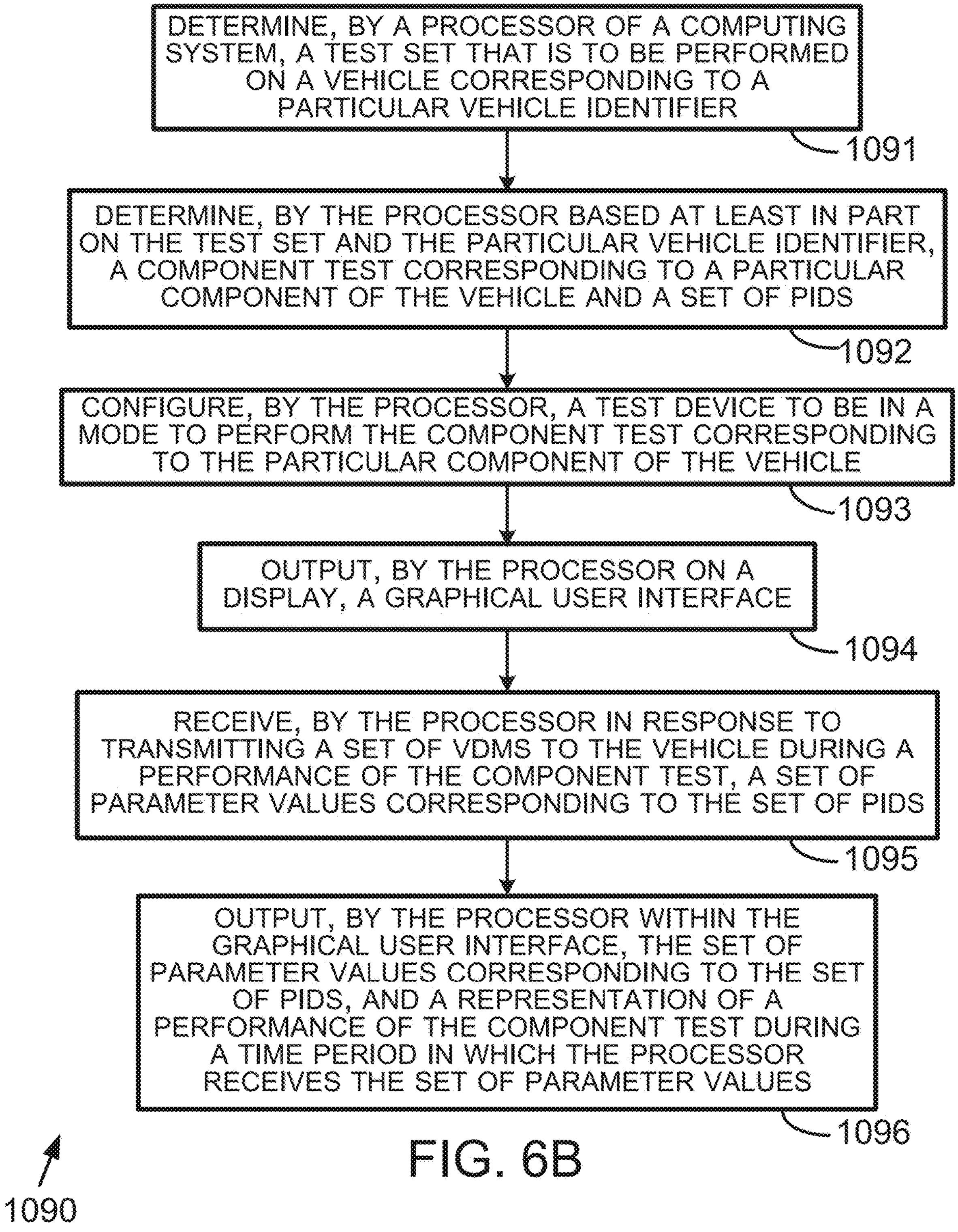

Next, FIG. 6B shows a flow chart 1090 depicting a set of functions that can be carried out in accordance with the example implementations. The flowchart 1090 includes the functions shown in block 1091 through block 1096. A variety of methods can be performed using all of the functions shown in the flowchart 1090 or any proper subset of the functions shown in the flowchart 1090. Any of those methods can be performed with other functions such as one or more of the other functions described in this description.

One or more or all of the functions shown in the flowchart 1090 and/or one or more of the other functions described in this description can be performed by one or more processors of a computing system. In at least some implementations, a computing system that performs at least one of the functions includes one or more from among: the server 2, the computing system 4, or the computing system 450.

Block 1091 includes determining, by a processor (e.g., the processor 48, 250, 452) of a computing system, a test set that is to be performed on a vehicle corresponding to a particular vehicle identifier. In at least some implementations, the determining function at block 1091 includes and/or is the same as the determining function at block 381 shown in FIG. 6A. The description and examples described with respect to block 381 are applicable to block 1091. Accordingly, the determining function at block 1091 can include determining a test set selection and/or a test set file.

Next, block 1092 includes determining, by the processor based at least in part on the test set and the particular vehicle identifier, a component test corresponding to a particular component of the vehicle and a set of PIDs. In general, the processor can determine the component test and/or the set of PIDs by receiving a communication that includes an identifier of the component test and/or an identifier of the set of PIDs and/or by accessing the component test and/or the set of PIDs from a database, such as the database 13, 258.

In at least some implementations, determining the component test includes determining the component test from a test set file (e.g., via a test set file corresponding to the particular vehicle identifier). As an example, the test set file can include an identifier of the component test, such as the identifier “Fuel Pump Voltage Test” that corresponds to the component test CT12 shown in FIG. 59. A test set file 825 shown in FIG. 82C shows an element 845 indicative of the component test CT12. As another example, a test set can include an index value, such as the CTI 95. The processor 250 can parse an element (e.g., an object or an array) of a test set file to determine a component test indicated by and/or referenced within the element, such as an element 120 shown in FIG. 81B, an element 180 shown in FIG. 82B, or an object 445 shown in FIG. 83B. As an example, by parsing the object 445, the processor 250 can determine the component test identifier $2F, and determine the component test is the “Fuel Pump Voltage Test” based on that identifier being within a component test index 95 shown in FIG. 59.

Figure 84:
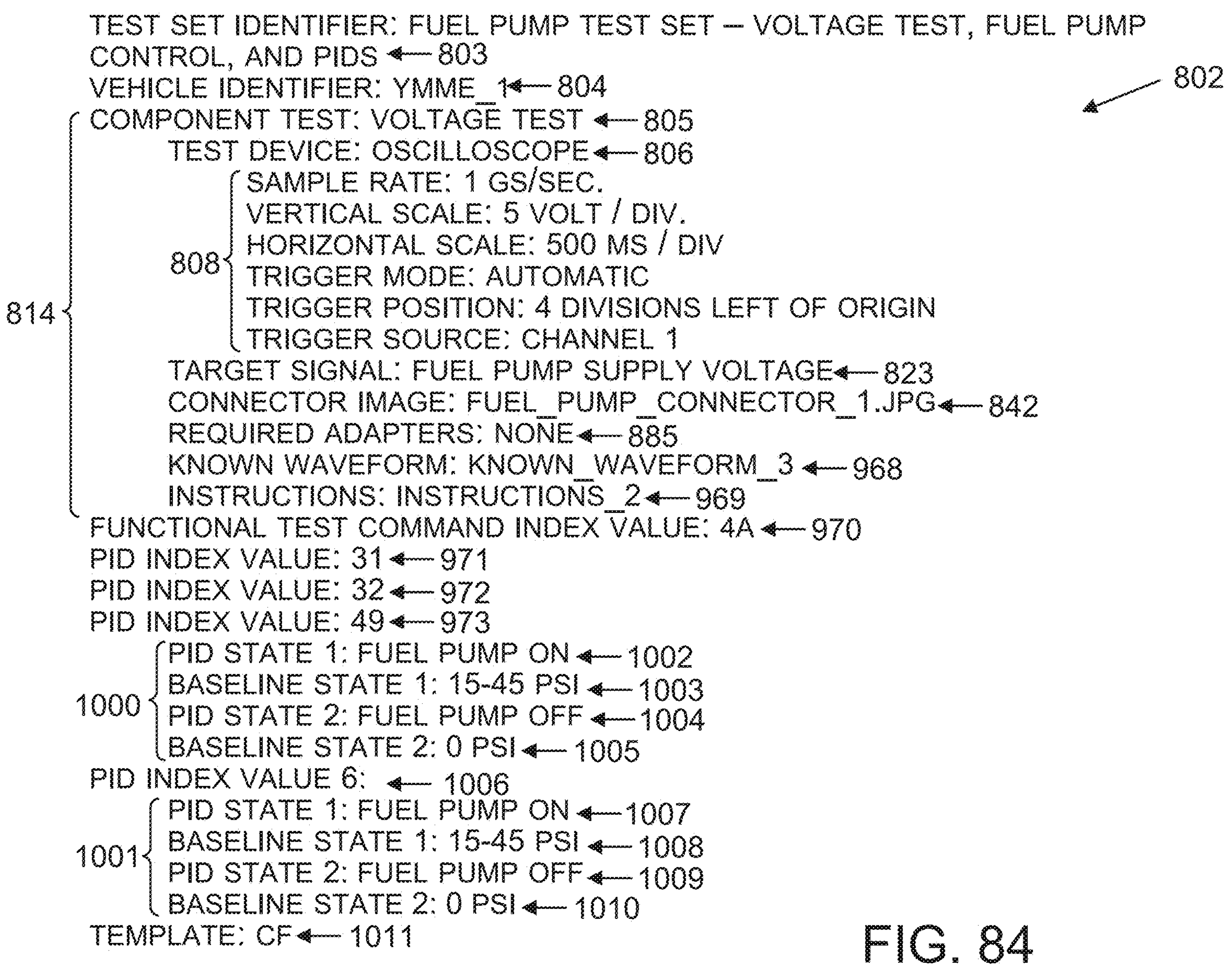
FIG. 84 and FIG. 85 show a test set file in accordance with the example implementations.
Figure 85:
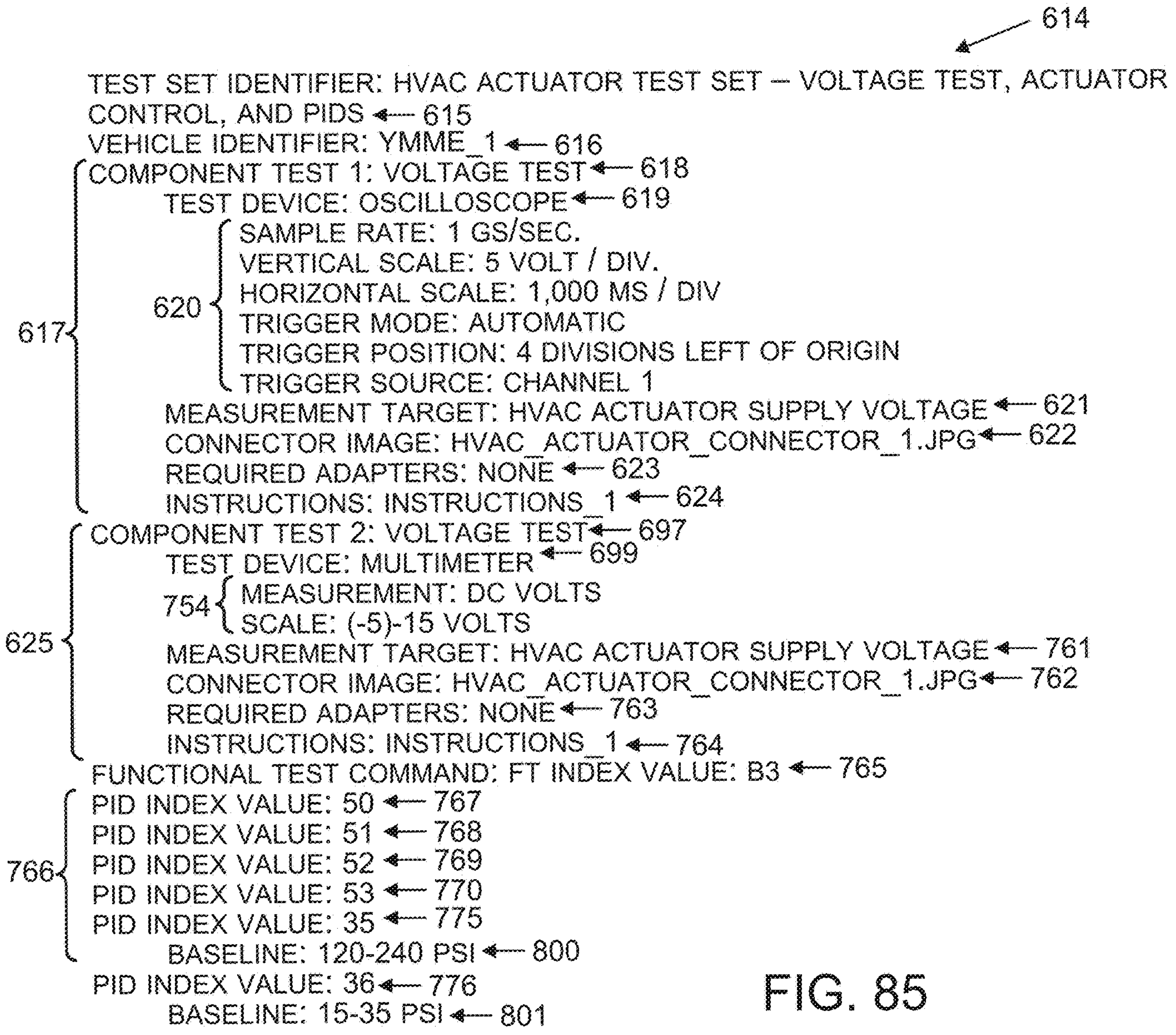

In at least some implementations, determining the set of PIDs includes determining the set of PIDs from a test set file (e.g., via a test set file corresponding to the particular vehicle identifier). As an example, the test set file can include elements that include data that identifies PID(s) of the set of PIDs. For instance, the element 110 within the test set file 106 shown in FIG. 81A and FIG. 81B include identifiers of PIDs. The processor can read the element 110 to determine the set of PIDs. Similarly, the test set file 825 shown in FIG. 82C includes the element 204, 205, 206, 207, which can be read by the processor to determine the set of PIDs. FIG. 83B shows an object 493 that includes PIDkey elements that the processor can use to determine the set of PIDs. FIG. 84 and FIG. 85 show test sets that include PID index values that the processor can use to determine the set of PIDs, perhaps by referring to the PID index 581 shown in FIG. 50.

In at least some implementations, determining the component test and/or the set of PIDs can include the processor 250 transmitting to the server 2 a request including the vehicle identifier and an indication of the component test or of a test set selection. In response to that request, the processor 250 can receive a response that includes an identifier of the component test and/or data indicative of the set of PIDs. One or more of those identifiers can include an index value within the CTI 95 to the component test or an index value within the PID index 90. In at least some implementations, the response includes a test set file that includes the identifier of the component test and/or the set of PIDs.

Next, block 1093 includes configuring, by the processor, a test device to be in a mode to perform the component test corresponding to the particular component of the vehicle. In at least some implementations, the configuring function at block 1093 includes and/or is the same as the configuring function at block 383 shown in FIG. 6A. The description and examples described with respect to block 383 are applicable to block 1093.

As an example, configuring the test device can include the processor 250 reading configuration parameters stored in the memory 252 and/or within a test set file. For an implementation in which the test device includes an oscilloscope, the configuration parameters can include configuration parameters like the configuration parameters 360, 361 shown in FIG. 41 or the test device configuration parameters 620 shown in FIG. 85. For an implementation in which the test device includes a meter, such as the meter 328, the configuration parameters can include configuration parameters like the test device configuration parameters 754 shown in FIG. 85 or the meter settings shown within the element 122 shown in FIG. 81C.

As an example, configuring the test device can include configuring the test device 199 to output a measurement of one or more channels of the test device 199. In at least some of those implementations, the measurement can be provided to the ADC 673 and outputs of the ADC 673 are provided to the processor 250 for writing to the test device measurement 669. In at least some other implementation the measurement is provided to the processor 250 for converting to a digital value to store in the test device measurement. Each measurement can be a sample of the signal appearing on the probe 305. The processor 250 can write a time stamp corresponding to each measurement. The processor 250 can correlate a measurement of the test device with a parameter value corresponding to PID based on respective time stamps corresponding to the measurement value and the parameter value. As an example, those times stamps can be two identical time stamps or two different time stamps closest in time to one another.

Next, block 1094 includes outputting, by the processor on a display, a GUI. The GUI output at block 1094 is configured to display a representation of a performance of the component test and parameter values corresponding to the set of PIDs. In at least some implementations, the GUI output at block 1094 includes one or more containers. In at least some of those implementations, a container within the GUI output at block 1094 includes one or more sub-containers, such as sub-container 333 shown in FIG. 19 to display a PID and a PID parameter value among other data. In at least some implementations, the GUI output at the block 1094 includes a GUI based on a template, such as a template 857 shown in FIG. 86 and/or from within the GUI template 675. The processor 250 can determine the GUI template from a template identifier within a test set file corresponding to the test set, such as the template identifier 1011 in the test set file 802 shown in FIG. 84.

In at least some implementations, the representation of the performance of the component test includes a waveform based on samples of an electrical signal present on the probe 305. As an example, the meter 328 or the oscilloscope 329 can perform the sampling of the electrical signal. The processor 250 can write digital values of the samples into the test device measurement 669 in such a way that the waveform represents the samples in an order in which the samples were obtained. For example, the samples can be saved in a buffer sequentially. As another example, the samples can be saved with a respective time stamp or sequence number.

Next, block 1095 includes receiving, by the processor in response to transmitting a set of VDMs to the vehicle during a performance of the component test, a set of parameter values corresponding to the set of PIDs. In at least some implementations, the processor 250 provides the VCT 256 with the set of VDMs to transmit to the vehicle 12 and/or data the VCT 256 can use to generate the set of VDMS. Afterwards, the VCT 256 transmits the set of VDMs to the vehicle 12. Similarly, in at least some implementations, the processor 250 receives the set of parameter values from the VCT 256. In at least some of those implementations, the processor 250 receives the parameter values by receiving VDMs including the parameter values from the VCT 256. The description about FIG. 82C includes an example of generating a VDM to request a PID parameter value based on a PID index within a test set file. The other example test files shown in the drawings show other ways of representing data the processor 250 can use to generate a VDM to request a PID parameter value.

The processor 250 can store the parameter values within the vehicle data message 665 or elsewhere within the memory 252. Additionally, the processor 250 can store the parameter values in the memory 252 so that the parameter values can be displayed sequentially in an order in which the parameter values were received. Additionally, or alternatively, the processor 250 can store a time stamp that corresponds to a respective parameter value, such as a time indicative of when the VDM including that parameter value was received at the computing system 4. Table B below shows an example of data that can be stored within the memory 252 for use in displaying PID parameter values and test device measurements made during performance of the component test. In at least some implementations, the numerical data values in each column in Table B can be stored in a separate data storage buffer. In at least some other implementations, the numerical data values in the two right-most columns of Table B are stored in separate buffers and one or both of those buffers can be associated with a PID index value, such as the PID index value shown in the center column of Table B. Additionally, a separate buffer including the sequence reference or the time stamp can be stored to represent a position in a sequence or a time when a PID parameter value was received or a test device measurement was made. In at least some implementations, in addition to or as an alternative to storing time stamps, the memory 252 can include data indicating an amount of time (e.g., 0.001 seconds) that occurs between sequential requests for the PID parameter value and/or between sequential samples taken by the test device 199.

TABLE B

| Sequence Ref. | Time stamp | PID Index Value | PID parameter value | Test device measurement |
|---|---|---|---|---|
| 1 | 1:00.00.000 | 31 | 0.00 VDC | 0.01 VDC |
| 2 | 1:00.00.001 | 31 | 0.00 VDC | 0.01 VDC |
| 3 | 1:00.00.002 | 31 | 0.00 VDC | 0.01 VDC |
| 4 | 1:00.00.003 | 31 | 4.74 VDC | 4.80 VDC |
| 5 | 1:00.00.004 | 31 | 12.10 VDC | 12.15 VDC |
| 6 | 1:00.00.005 | 31 | 12.10 VDC | 12.15 VDC |
| 7 | 1:00.00.006 | 31 | 12.10 VDC | 12.15 VDC |
| 8 | 1:00.00.007 | 31 | 12.10 VDC | 12.15 VDC |
| 9 | 1:00.00.008 | 31 | 12.10 VDC | 12.16 VDC |
| 10 | 1:00.00.009 | 31 | 12.10 VDC | 12.17 VDC |
| 11 | 1:00.00.010 | 31 | 12.10 VDC | 12.15 VDC |
| 12 | 1:00.00.011 | 31 | 12.10 VDC | 12.15 VDC |
| 13 | 1:00.00.012 | 31 | 12.10 VDC | 12.14 VDC |
| 14 | 1:00.00.013 | 31 | 12.10 VDC | 12.15 VDC |

Next, block 1096 includes outputting, by the processor within the GUI, the set of parameter values corresponding to the set of PIDs, and a representation of a performance of the component test during a time period in which the processor receives the set of parameter values. In at least some implementations, the one or more containers of the GUI output at block 1094 include one or more containers for displaying a representation of a waveform (or more simply, a waveform) and a container for displaying a PID and parameter values corresponding to the PID. In at least some implementations, the container for displaying the PID and parameter values includes multiple sub-containers, each sub-container for displaying a respective PID and parameter values corresponding to that PID. As an example, the set of parameter values can be displayed in a GUI like the GUI 798 shown in FIG. 30, in which the parameter value 368, 371, 374, 377 is displayed within the sub-container 333, 334, 335, 336, respectively.

As shown in FIG. 30, the parameter value 368, 371, 374, 377 is shown as a respective, single parameter value. The processor 250 can change the parameter value 368, 371, 374, 377 shown in the sub-container 333, 334, 335, 336 each time a VDM including a parameter value corresponding to the PID 367, 370, 373, 376 is received. Additionally, or alternatively, outputting the set of parameter values at block 1096 can include displaying a graphed waveform representing the set of parameter values. In at least some of those implementations, the graphed waveform representing the set of parameter values is displayed in a container along with a waveform representing measurements made by the test device 199. The container 818 in FIG. 30 shows an example of displaying such waveforms.

C. FIG. 6C

Figure 6C:
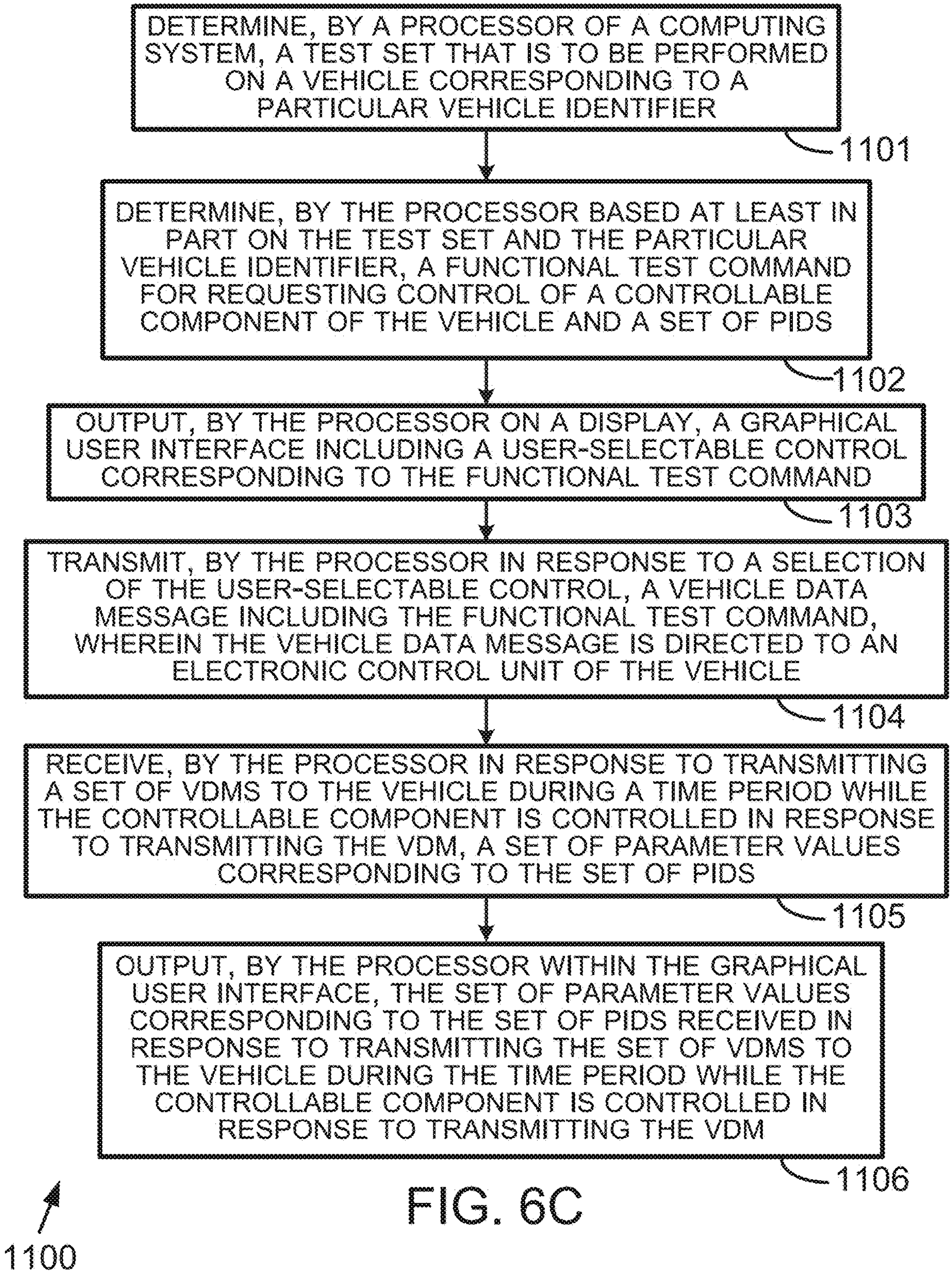

Next, FIG. 6C shows a flowchart 1100 depicting a set of functions that can be carried out in accordance with the example implementations. The flowchart 1100 includes the functions shown in block 1101 through block 1106. A variety of methods can be performed using all of the functions shown in the flowchart 1100 or any proper subset of the functions shown in the flowchart 1100. Any of those methods can be performed with other functions such as one or more of the other functions described in this description.

One or more or all of the functions shown in the flowchart 1100 and/or one or more of the other functions described in this description can be performed by one or more processors of a computing system. In at least some implementations, a computing system that performs at least one of the functions includes one or more from among: the server 2, the computing system 4, or the computing system 450.

Block 1101 includes determining, by a processor (e.g., the processor 48, 250, 452) of a computing system, a test set that is to be performed on a vehicle corresponding to a particular vehicle identifier. In at least some implementations, the determining function at block 1101 includes and/or is the same as the determining function at block 381 shown in FIG. 6A. The description and examples described with respect to block 381 are applicable to block 1101. Accordingly, the determining function at block 1101 can include determining a test set selection and/or a test set file.

Next, block 1102 includes determining, by the processor based at least in part on the test set and the particular vehicle identifier, a functional test command for requesting control of a controllable component of the vehicle and a set of PIDs. In general, the processor can determine the functional test command and/or the set of PIDs by receiving a communication that includes an identifier of the functional test command and/or the set of PIDs, and/or by accessing the functional test command and/or the set of PIDs from a database, such as the database 13, 258.

In at least some implementations, determining the functional test command includes determining the functional test command from the test set (e.g., via a test set file). As an example, the test set can include a name of the functional test command, such as the name "Fuel Pump Engagement" that corresponds to the fuel pump engagement functional test 99 shown in FIG. 60. The element 147 in a test set file 106 shown in FIG. 81B shows such a test set name. As another example, the test set can include an index value into a functional test index (FTI) 101 shown in FIG. 60, such as the index value (4A) in an element 499 in the test set file 825 shown in FIG. 82B or in the test point indicator 447 in the test set file 400 shown in FIG. 83A. The processor 250 can parse an element (e.g., an object or an array) of a test set file to determine a name of a functional test command or an index value into the FTI 101.

In at least some implementations, determining the set of PIDs includes determining the set of PIDs from a test set file (e.g., via a test set file corresponding to the particular vehicle identifier). As an example, the test set file can include elements that include data that identifies PID(s) of the set of PIDs. For instance, the element 110 within the test set file 106 shown in FIG. 81A and FIG. 81B include identifiers of PIDs. The processor can read the element 110 to determine the set of PIDs. Similarly, the test set file 825 shown in FIG. 82C includes the element 204, 205, 206, 207, which can be read by the processor to determine the set of PIDs. FIG. 83B shows an object 493 that includes PIDkey elements that the processor can use to determine the set of PIDs. FIG. 84 and FIG. 85 show test sets that include PID index values that the processor can use to determine the set of PIDs, perhaps by referring to the PID index 581 shown in FIG. 50.

In at least some implementations, determining the functional test command and/or the set of PIDs can include the processor 250 transmitting to the server 2 a request including the vehicle identifier and an indication of the first test or of a test set selection. In response to that request, the processor 250 can receive a response that includes an identifier of the functional test command and/or data indicative of the set of PIDs. One or more of those identifiers or the data can include an index value within the FTI 101 to the functional test command or an index value within the PID index 90. In at least some implementations, the response includes a test set file that includes the identifier of the functional test command and/or the set of PIDs.

Next, block 1103 includes outputting, by the processor on a display, a GUI including a USC corresponding to the functional test command. In at least some implementations, the outputting function at block 1103 includes and/or is the same as the outputting function at block 384 shown in FIG. 6A. The description and examples described with respect to block 384 are applicable to block 1103.

Next, block 1104 includes transmitting, by the processor in response to a selection of the USC, a VDM including the functional test command. The VDM is directed to an ECU of the vehicle. In at least some implementations, the transmitting function at block 1104 includes and/or is the same as the transmitting function at block 385 shown in FIG. 6A. The description and examples described with respect to block 385 are applicable to block 1104.

Next, block 1105 includes receiving, by the processor in response to transmitting a set of VDMs to the vehicle during a time period while the controllable component is controlled in response to transmitting the VDM, a set of parameter values corresponding to the set of PIDs. In at least some implementations, the processor 250 provides the VCT 256 with the set of VDMs to transmit to the vehicle 12 and/or data the VCT 256 can use to generate the set of VDMS. Afterwards, the VCT 256 transmits the set of VDMs to the vehicle 12. Similarly, in at least some implementations, the processor 250 receives the set of parameter values from the VCT 256. In at least some of those implementations, the processor 250 receives the parameter values by receiving VDMs including the parameter values from the VCT 256. The description about FIG. 82C includes an example of generating a VDM to request a PID parameter value based on a PID index within a test set file. The other example test files shown in the drawings show other ways of representing data the processor 250 can use to generate a VDM to request a PID parameter value.

The processor 250 can store the parameter values within the vehicle data message 665 or elsewhere within the memory 252. Additionally, the processor 250 can store the parameter values in the memory 252 so that the parameter values can be displayed sequentially in an order in which the parameter values were received. Additionally, or alternatively, the processor 250 can store a time stamp that corresponds to a respective parameter value, such as a time indicative of when the VDM including that parameter value was received at the computing system 4. The four left-most columns in Table B above show an example of data that can be stored within the memory 252 for use in displaying PID parameter values.

Next, block 1106 includes outputting, by the processor within the GUI, the set of parameter values corresponding to the set of PIDs received in response to transmitting the set of VDMs to the vehicle during the time period while the controllable component is controlled in response to transmitting the VDM. In at least some implementations, the GUI includes one or more containers for displaying a PID and parameter values corresponding to the PID. As an example, the set of parameter values can be displayed in a GUI like the GUI 756 shown in FIG. 29, in which a present value of a parameter value is displayed within the container 780, 781, 782, 783 along with the graphical representation 793 of multiple parameter values within those containers. As noted below, the container 780, 781, 782, 783 includes an icon 797 to indicate a transmission time corresponding to transmission of a functional test command.

Figure 7A:
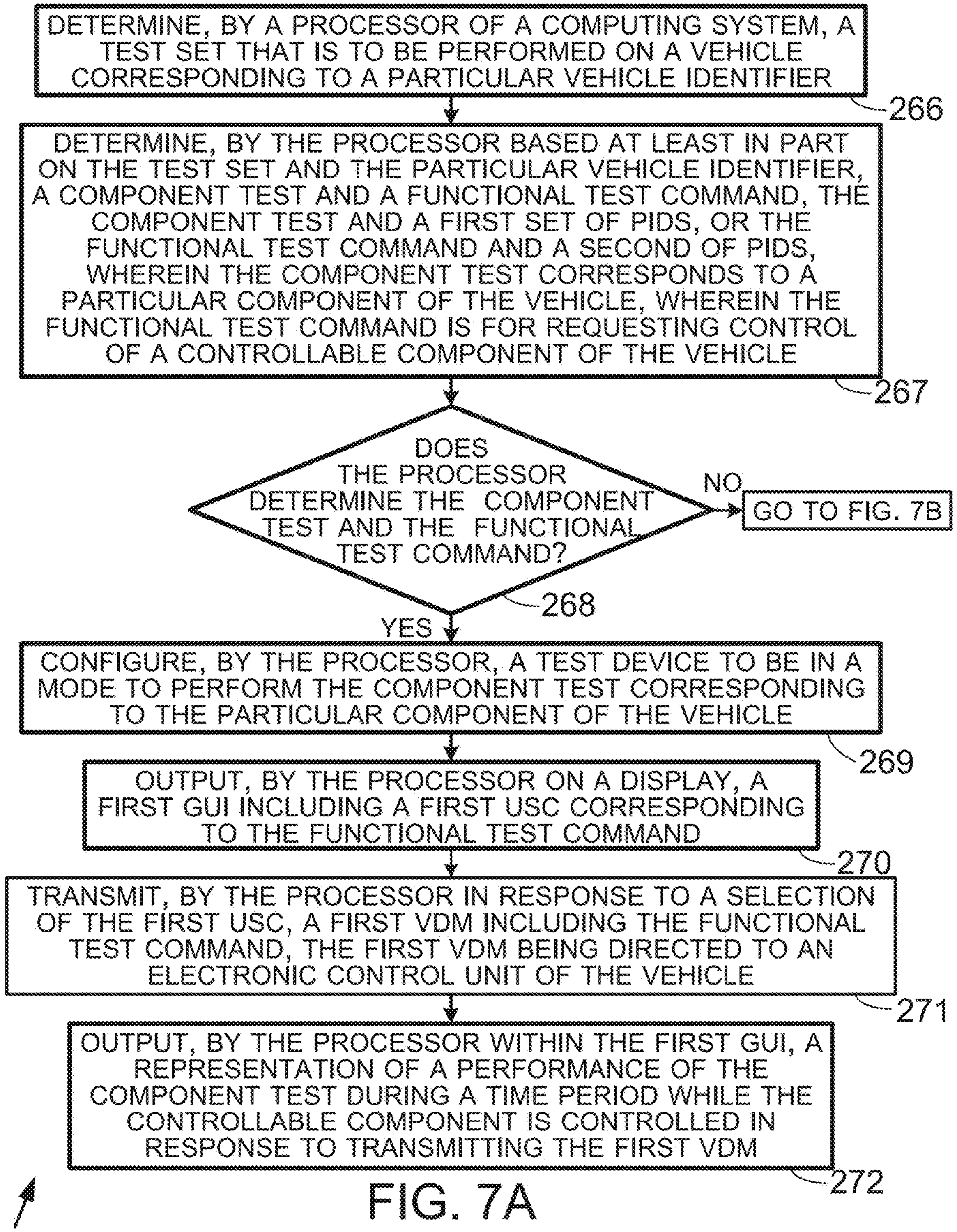
FIG. 7A and FIG. 7B show a flowchart depicting a set of functions that can be carried out in accordance with the example implementations.
Figure 7B:
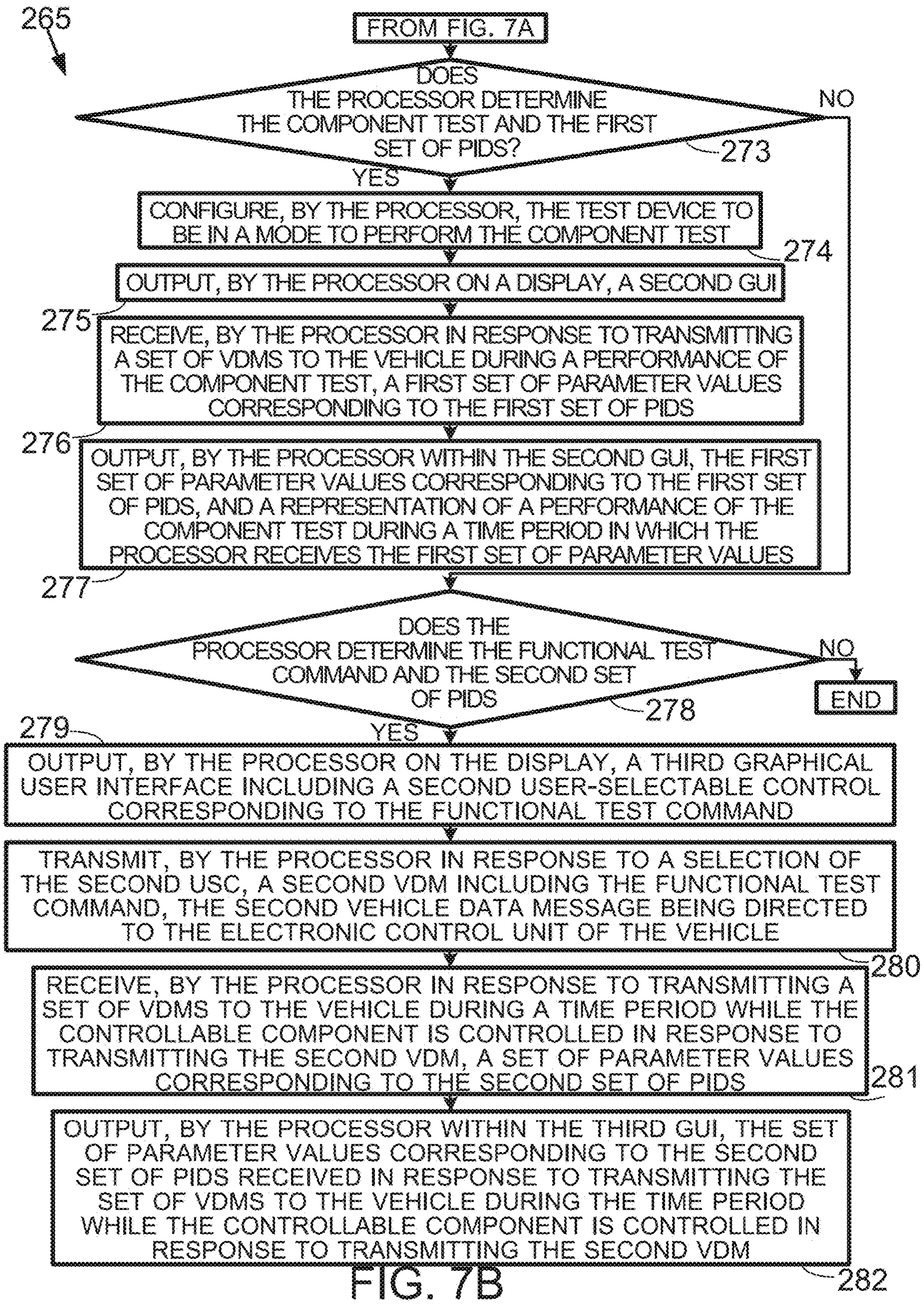

D. FIG. 7A and FIG. 7B

Next, FIG. 7A and FIG. 7B show a flowchart 265 depicting a set of functions that can be carried out in accordance with the example implementations. The flowchart 265 includes the functions shown in block 266 through block 282. A variety of methods can be performed using all of the functions shown in the flowchart 265 or any proper subset of the functions shown in the flowchart 265. Any of those methods can be performed with other functions such as one or more of the other functions described in this description. For example, the methods can include one or more functions contained in an enumerated example embodiment (EEE) shown below, such as EEE 27 or any EEE dependent directly or indirectly upon EEE 27.

One or more or all of the functions shown in the flowchart 265 can be performed by one or more processors of a computing system. In at least some implementations, a computing system that performs at least one of the functions includes one or more from among: the server 2, the computing system 4 or the computing system 450.

Block 266 includes determining, by a processor (e.g., the processor 48, 250, 452) of a computing system, a test set that is to be performed on a vehicle corresponding to a particular vehicle identifier. In at least some implementations, the determining function at block 266 includes and/or is the same as the determining function at block 381 shown in FIG. 6A. The description and examples described with respect to block 381 are applicable to block 266. Accordingly, the determining function at block 266 can include determining a test set selection and/or a test set file.

Next, block 267 includes determining, by the processor based at least in part on the test set and the particular vehicle identifier, (i) a component test and a functional test command, (ii) the component test and a first set of PIDs, or (iii) the functional test command and a second set of PIDs. The component test corresponds to a particular component of the vehicle. The functional test command is for requesting control of a controllable component of the vehicle. Making the determination at block 267 can include a processor (e.g., the processor 48, 250, 452) executing program instructions to read a test file to determine whether the content of a test set file corresponding to the test set includes identifiers of the component test, the functional test command, the first set of PIDs or the second set of PIDs. In at least some implementations, the processor can read meta data associated with a test set file to determine from the meta data whether the test set file includes identifiers of the component test, the functional test command, the first set of PIDs or the second set of PIDs.

In at least some implementations, if the processor determines the component test and the functional test command at block 267, the processor can make that determination as described with respect to block 382 shown in FIG. 6A. Alternatively, if the processor determines the component test and the first set of PIDs at block 267, the processor can make that determination as described with respect to block 1092 shown in FIG. 6B. And yet, if the processor determines the functional test command and the second set of PIDs at block 267, the processor can make that determination as described with respect to block 1102 shown in FIG. 6C.

Next, block 268 is a determination block as to whether the processor determines the component test and the functional test command. If the processor does not determine the component test and the functional test command, then the method can continue in FIG. 7B, block 273, which is discussed below. If the processor determines the component test and the functional test command, then the method continues at block 269. In an alternative arrangement, a determination at block 273 or a determination at block 278 is performed before, concurrently, or after the determination at block 268. In another alternative arrangement, the determination at block 273 or the determination at block 278 is performed in lieu of the determination at block 268.

In at least some implementations, performing the determining at block 268 includes a processor reading a test set file to determine whether the test set file includes the component test and the functional test command.

Block 269 includes configuring, by the processor, a test device to be in a mode to perform the component test corresponding to the particular component of the vehicle. In at least some implementations, the test device is the meter 328 or the oscilloscope 329. Examples of configuring such a test device are discussed elsewhere in this description. In at least some implementations, the configuring function at block 269 includes and/or is the same as the configuring function at block 383 shown in FIG. 6A. The description and examples described with respect to block 383 are applicable to block 269.

Next, block 270 includes outputting, by the processor on a display, a first GUI including a first user-selectable control corresponding to the functional test command. In at least some implementations, the outputting function at block 270 includes and/or is the same as the outputting function at block 384 shown in FIG. 6A. The description and examples described with respect to block 384 are applicable to block 270.

Next, block 271 includes transmitting, by the processor in response to a selection of the first user-selectable control, a first VDM including the functional test command. The first VDM is directed to an electronic control unit of the vehicle. In at least some implementations, the transmitting function at block 271 includes and/or is the same as the transmitting function at block 385 shown in FIG. 6A. The description and examples described with respect to block 385 are applicable to block 271.

Next, block 272 includes outputting, by the processor within the first GUI, a representation of a performance of the component test during a time period while the controllable component is controlled in response to transmitting the first VDM. In at least some implementations, the outputting function at block 272 includes and/or is the same as the outputting function at block 386 shown in FIG. 6A. The description and examples described with respect to block 386 are applicable to block 272. As an example, the first GUI can be arranged like and/or include aspects of the GUI 809 shown in FIG. 31.

Turning to FIG. 7B, block 273 is a determination block as to whether processor determines the component test and the first set of PIDs. If the processor does not determine the component test and the first set of PIDs, then the method continues at block 278, which is discussed below. If the processor determines the component test and the first set of PIDs, then the method continues at block 274. In at least some implementations, performing the determining at block 273 includes a processor reading a test set file to determine whether the test set file includes the component test and the first set of PIDs. In at least some implementations, a set of multiple PIDs can be identified using an identifier of the set of PIDs. The identifier of the set of PIDs can be used to determine the set of PIDs from a PID index, for example.

Block 274 includes configuring, by the processor, the test device to be in the mode to perform the component test. In at least some implementations, the test device is the meter 328 or the oscilloscope 329. Examples of configuring such a test device are discussed elsewhere in this description. In at least some implementations, the configuring function at block 274 includes and/or is the same as the configuring function at block 383 shown in FIG. 6A. The description and examples described with respect to block 383 are applicable to block 274.

Next, block 275 includes outputting, by the processor on the display, a second GUI. In at least some implementations, the outputting function at block 275 includes and/or is the same as the outputting function at block 1094 shown in FIG. 6B. The description and examples described with respect to block 1094 are applicable to block 275.

Next, block 276 includes receiving, by the processor in response to transmitting a set of VDMs to the vehicle during a performance of the component test, a first set of parameter values corresponding to the first set of PIDs. In at least some implementations, the receiving function at block 276 includes and/or is the same as the receiving function at block 1095 shown in FIG. 6B. The description and examples described with respect to block 1095 are applicable to block 276.

Next, block 277 includes outputting, by the processor within the second GUI, the first set of parameter values corresponding to the first set of PIDs, and a representation of a performance of the component test during a time period in which the processor receives the first set of parameter values. In at least some implementations, the outputting function at block 277 includes and/or is the same as the outputting function at block 1096 shown in FIG. 6B. The description and examples described with respect to block 1096 are applicable to block 277. As an example, the second GUI can be arranged like and/or include aspects of the GUI 798 shown in FIG. 30.

Next, block 278 is a determination block as to whether processor determines the functional test command and the second set of PIDs. If the processor does not determine the component test and the second set of PIDs, then the method ends. If the processor determines the functional test command and the second set of PIDs, then the method continues at block 279. In at least some implementations, performing the determining at block 278 includes a processor reading a test set file to determine whether the test set file includes the functional test command and the second set of PIDs.

Next, block 279 includes outputting, by the processor on the display, a third GUI including a second user-selectable control corresponding to the functional test command. In at least some implementations, the outputting function at block 279 includes and/or is the same as the outputting function at block 1103 shown in FIG. 6C. The description and examples described with respect to block 1103 are applicable to block 279.

Next, block 280 includes transmitting, by the processor in response to a selection of the second user-selectable control, a second VDM including the functional test command, the second VDM being directed to the electronic control unit of the vehicle. In at least some implementations, the transmitting function at block 280 includes and/or is the same as the transmitting function at block 1104 shown in FIG. 6C. The description and examples described with respect to block 1104 are applicable to block 280.

Next, block 281 includes receiving, by the processor in response to transmitting a set of VDMs to the vehicle during a time period while the controllable component is controlled in response to transmitting the second VDM, a first set of parameter values corresponding to the second set of PIDs. In at least some implementations, the receiving function at block 281 includes and/or is the same as the receiving function at block 1105 shown in FIG. 6C. The description and examples described with respect to block 1105 are applicable to block 281.

Next, block 282 includes outputting, by the processor within the third GUI, the first set of parameter values corresponding to the second set of PIDs received in response to transmitting the set of VDMs to the vehicle during the time period while the controllable component is controlled in response to transmitting the second VDM. In at least some implementations, the outputting function at block 282 includes and/or is the same as the outputting function at block 1106 shown in FIG. 6C. The description and examples described with respect to block 1106 are applicable to block 282. As an example, the third GUI can be arranged like and/or include aspects of the GUI 756 shown in FIG. 27 to FIG. 29.

IV. Example Graphical User Interfaces

Next, each of FIG. 8 to FIG. 40 shows an example GUI. The processor 250 is configured to output a GUI, such as any GUI shown in FIG. 8 to FIG. 40 on a display, such as the display 300. In at least some implementations, one or more of the GUI shown in FIG. 8 to FIG. 40 and/or any content contained within one or more of those GUIs can be stored in the GUI 59, 661. In those or in other implementations, one or more of the GUI shown and/or any content contained within one or more of those GUIs in FIG. 8 to FIG. 40 can be stored in the GUI 59 and provided to the computing system 4 from the server 2 via the communication network 3. At least some of the example GUI are described as including one or more containers. Moreover, at least some of the example GUI are described as including one or more user-selectable controls (USCs).

In at least some of the implementations including a USC, a USC includes a drop-down arrow useable to select an alternative aspect pertaining to the USC. The use of the drop-down arrow is merely an example as those USC can be configured for selecting the alternative aspect other than by using a drop-down arrow. Moreover, at least some of the example GUI are described as having a USC that can be used to make a selection. In accordance with those examples, the processor 250 is configured to detect a selection of the GUI and execute program instructions in response to detecting the GUI has been selected.

At least some of the GUIs shown in the drawings, include a vehicle identifier 286. In at least some implementations, the vehicle identifier 286 includes a Y/M/M/E to identify a vehicle on which the identified test set is to be performed. In other implementations, the vehicle identifier 286 can be arranged in a different format, such as one of the other formats of a vehicle identifier described in this description.

Figure 8:
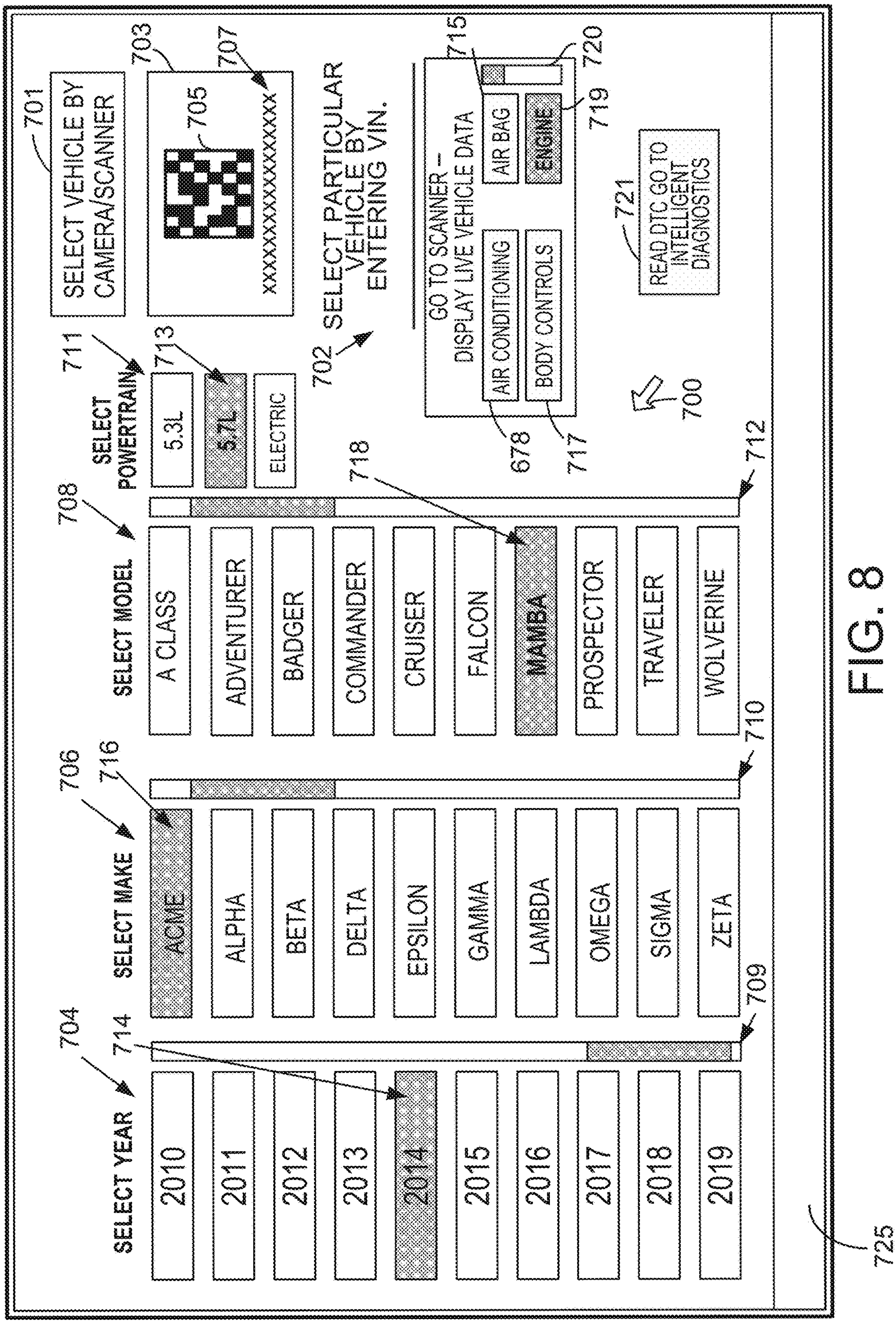
FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG.

In particular, FIG. 8 shows a GUI 725 that includes a vehicle selection menu. The vehicle selection data 57, 660 can also include data that represents relationships between vehicle model years and the types of vehicles that were built for and/or during each model year. For instance, for a given model year, the vehicle selection data 57, 660 can include data that indicates all vehicle makes that include at least one type of vehicle for the given model year, and for each of those vehicle makes, the vehicle selection data 57, 660 can include data that indicates all vehicle models that correspond to one of the vehicle makes that built at least one type of vehicle for the given model year. In at least some implementations, the vehicle selection data 57, 660 can include data that indicates all engines that are used in each vehicle model. The vehicle selection data 57, 660 can include data that indicates other criteria that can be used to distinguish different groups of common (i.e., like) vehicles. The processor 250 can generate a vehicle selection menu based on the other data within the vehicle selection data 57, 660.

The GUI 725 can include a cursor 700 movable to point to a USC or another item of the GUI 725. The processor 250 can detect the USC or the other item of the GUI 725 is selected when the cursor 700 is disposed on the USC or the other item of the GUI 725. The other GUIs shown in the figures can also include a cursor, similar to the cursor 700, for use in selecting an item of that GUI. For implementations in which the display 300 includes a touch screen display, the GUIs shown in FIG. 8 to FIG. 40 may or may not include a cursor.

As shown in FIG. 8, the GUI 725 includes a year selection menu 704 in which a year selector 714 representing the year 2014 has been selected. The GUI 725 includes a make selection menu 706 in which a make selector 716 representing a make Acme has been selected. The GUI 725 includes a model selection menu 708 in which a model selector 718 representing the model Mamba has been selected. The example makes and models shown in FIG. 8 are fictitious. The GUI 725 includes a powertrain selection menu 711 in which an engine selector USC 713 representing the 5.7 liter engine has been selected. The year selection menu 704 includes a scroll bar 709 to cause the year selection menu 704 to display year(s) not currently shown in the year selection menu 704. Similarly, the make selection menu 706 includes a scroll bar 710 to cause the make selection menu 706 to display make(s) not currently shown in the make selection menu 706. Likewise, the model selection menu 708 includes a scroll bar 712 to cause the model selection menu 708 to display model(s) not currently shown in the model selection menu 708. Other examples of a selected year, make, model, and engine are also possible.

In at least some implementations, the make selection menu 706 is populated with vehicle makes after a year is selected from the year selection menu 704. Similarly, in at least some implementations, the model selection menu 708 is populated with vehicle models after a year is selected from the year selection menu 704 and after a make is selected from the make selection menu 706. Similarly, in at least some implementations, the powertrain selection menu 711 is populated with powertrain identifiers after a model is selected from the model selection menu 708 is populated with vehicle models after a year is selected from the year selection menu 704 and after a make is selected from the make selection menu 706. In alternative implementations, each of the year selection menu 704, the make selection menu 706, the model selection menu 708, or the powertrain selection menu 711 is in a separate GUI without the other of the year selection menu 704, the make selection menu 706, the model selection menu 708, and the powertrain selection menu 711.

In at least some implementations, the GUI 725 also includes a VIN USC 702 for entering an identifier of a particular vehicle. As an example, the VIN USC 702 can be used to type or key-in a vehicle identification number (VIN) associated with the particular vehicle. As another example, the VIN USC 702 can be used to cause the vehicle communications transceiver 256 to request a VIN from an ECU in the vehicle 12. The processor 250 can receive the requested VIN and determine at least a year, make, model, and a serial number of the particular vehicle from the VIN.

The GUI 725 includes a vehicle selector USC 701 for capturing a visual indication of a particular vehicle. As an example, in response to selection of the vehicle selector USC 701, the processor 250 can cause a camera of the input device 301 to capture an image, such as an image of a code 705 representing a VIN, and to cause a GUI, such as the GUI 725 or a different GUI, to display a window 703 showing the image of code 705 and to display a representation of the alpha-numeric representation of the VIN 707 as determined by the processor 250 decoding the code 705. As yet another example, in response to selection of the vehicle selector USC 701, the processor 250 can cause a scanner of the input device 301 to generate an image, such as an image of the code 705, and to cause a GUI, such as the GUI 725 or a different GUI, to display the window 703 showing the image of the code 705 and to display a representation of the alpha-numeric representation of the VIN 707 as determined by the processor 250 decoding the code 705.

In at least some implementations, the GUI 725 includes user-selectable controls to select a particular system or component of interest for displaying live vehicle data. Live vehicle data is vehicle data that a computing system, such as the computing system 4, received most-recently from the vehicle. The amount of live vehicle data can vary so long as the amount of live vehicle data includes the vehicle data most-recently received, such as the most recent PID parameter value for a PID currently displayed on the display 300. As an example, the GUI 725 includes a system selector USC 678, 715, 717, 719 configured to indicate a selection of an air conditioning system, an air bag system, a body control system, or an engine system, respectively. The GUI 725 can include a scroll bar 720 to cause a different system selector USC (for selecting a different component or system) to be displayed within the GUI 725.

In at least some implementations, the GUI 725 includes an intelligent diagnostics USC 721. In response to determining the intelligent diagnostics USC 721 has been selected, the processor 250 can transmit one or more vehicle data messages to request DTC from an ECU within the vehicle 12 and to display a GUI for an intelligent diagnostics operating mode of the computing system 4.

Figure 9:
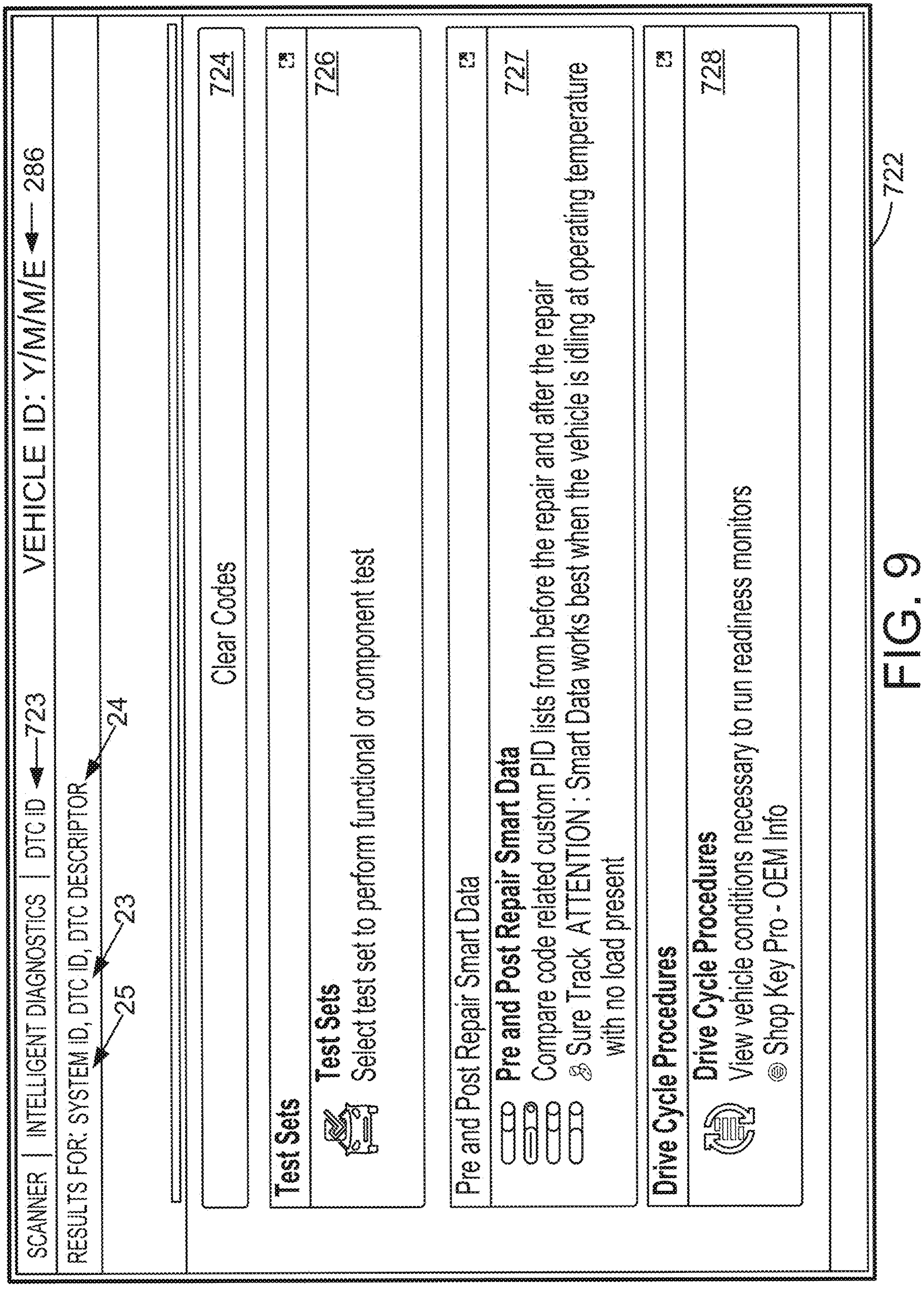

Next, FIG. 9 shows a GUI 722 having a GUI identifier 723 that indicates the GUI 722 pertains to the intelligent diagnostic operating mode with respect to a DTC corresponding to a DTC identifier 23. In at least some implementations, the DTC can be determined in response to a selection of the intelligent diagnostics USC 721 shown in FIG. 8. The GUI 722 also includes a system identifier 25, and a DTC descriptor 24 corresponding to a DTC that corresponds to the DTC identifier 23. As an example, the system identifier 25 is "Engine," the DTC identifier 23 is "P0171," and the DTC descriptor is "P0171, System too lean (bank 1)." As another example, the system identifier 25 is "Body Control," the DTC identifier 23 is "B1413," and the DTC descriptor is "B1413—Driver Power Window Circuit Short to Ground." Other examples of the DTC identifier 23, the DTC descriptor 24, and the system identifier 25 are also possible.

The GUI 722 includes a clear codes USC 724, a test sets USC 726, a pre-and-post repair smart data USC 727, and a drive cycle procedure USC 728. In response to a selection of the clear codes USC 724, the processor 250 can transmit one or more VDM to request one or more ECU in the vehicle 12 clear DTC set active by those ECU(s).

In response to a selection of the pre-and-post repair smart data USC 727, the processor 250 can cause the display 300 to display a GUI that shows a list of PIDs and parameters that were obtained by the processor 250 prior to a repair being made to the vehicle and a list of PIDs and parameters that were obtained by the processor 250 after the vehicle was repaired. In response to a selection of the drive cycle procedure USC 728, the processor 250 can cause the display 300 to display a GUI showing drive cycle procedures and PIDs and parameter values captured during performance of a drive cycle procedure.

In response to selection of the test sets USC 726, the processor 250 can cause the display 300 to display a GUI from which a test set can be selected and/or from which a test set can be performed. If the processor 250 determines that more than one test set is available for the selected vehicle, the selected system (e.g., engine or body control), and the identified DTC (e.g., P0171 or B1413), the GUI displayed in response to a selection of the test sets USC 726 can be configured like or at least in part like the GUI 150 shown in FIG. 13. Alternatively, if the processor 250 determines that only one test set is available for the selected vehicle, the selected system (e.g., engine), and the identified DTC (e.g., P0171), the GUI displayed in response to a selection of the test sets USC 726 can be arranged a GUI from which a test set can be initiated, such as a GUI shown in FIG. 14 to FIG. 17. Likewise, if the one test set for the selected vehicle corresponds to the system identifier Body Control and the DTC B1413, the GUI displayed in response to a selection of the test sets USC 726 can be arranged like a GUI 16 shown in FIG. 34 and FIG. 35.

Figure 10:
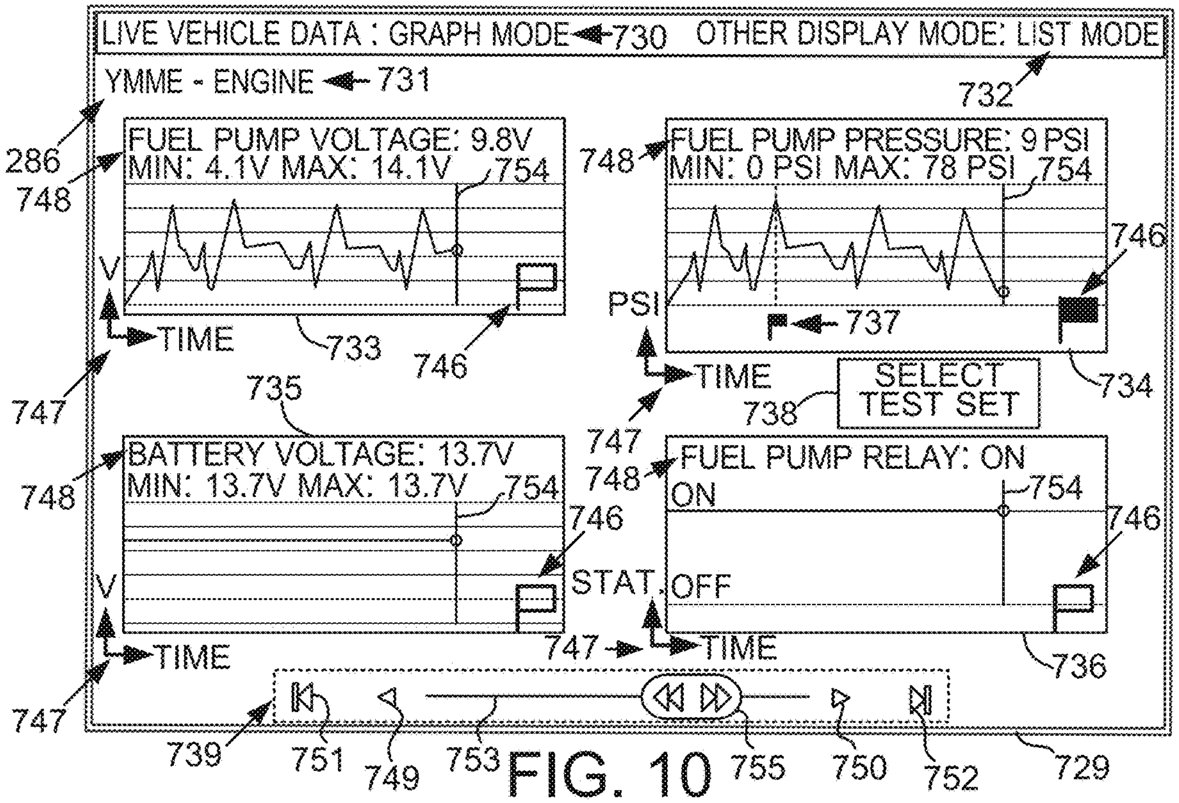

Next, FIG. 10 shows a GUI 729 having a GUI identifier 730 that indicates the GUI 729 pertains to displaying live vehicle data in a graph mode. The GUI 729 includes a system/component identifier 731 to indicate which system or component in the vehicle 12 pertains to the live vehicle data displayed in the GUI 729. The GUI 729 includes a display mode selector USC 732 that is selectable to cause the processor 250 to display the live vehicle data in a different mode, such as a list mode shown in FIG. 11. The GUI 729 includes an axis description 747 for each vertical and horizontal axis of a displayed graph. The axis description 747 include a "V" for voltage, "PSI" for pounds per square inch, and "STAT" for status.

The GUI 729 includes a container 733, 734, 735, 736 to display live vehicle data representing parameter values for a particular PID. As shown in FIG. 10, the PIDs for those containers can be a PID representing a fuel pump voltage, a PID representing a fuel pump pressure, a PDF representing a battery voltage, and a PID representing a fuel pump relay status, respectively. The container 733, 734, 735, 736 includes a textual PID identifier 748.

In at least some implementations, a PID can be associated with one or more threshold values that the processor 250 can compare to received parameters. Moreover, the processor 250 can output an indicator of whether a received parameter has breached the threshold value(s). As an example, FIG. 10 shows those indicators as a flag 746 within each container 733, 734, 735, 736. A flag 746 that is white represents that the parameter values corresponding to the PID have not breached the threshold value(s). A flag 746 that is black represents that one or more parameters for the corresponding PID has breached the threshold value(s).

Moreover, the container 734 includes a flag 737 along the horizontal axis to indicate a time where a threshold value was breached by a PID parameter value. The GUI 729 includes a USC 738. In at least some implementations, the USC 738 appears within the GUI 729 in response to the threshold value being breached by the PID parameter value in the container 734. In at least some other implementations, the USC 738 is displayed in the GUI 729 at all times the GUI 729 is being displayed. The USC 738 corresponds to the container 734. In response to the USC 738 being selected, the processor 250 can cause a GUI including a test set to be displayed. The test set to be displayed corresponds to the PID represented by the textual PID identifier 748 in the container 734. In at least some implementations, the GUI 729 includes an identifier of the test set corresponding to the USC 738. In at least some other implementations, the processor 250 can refer to the PID index 90 (shown in FIG. 58A and FIG. 58B) to determine an index value corresponding to a PID within the container 734 and to the test-set-to-PID MD 82 (shown in FIG. 49 and FIG. 57) to determine one or more test sets corresponding to the PID within the container 734. As an example, as shown in FIG. 58A, the index value corresponding to the PID within the container 734 (i.e., fuel pump pressure) is (6). As another example, as shown in FIG. 57, the test sets corresponding to the index value (6) for a PID include the test set TS1, TS6, TS14, TS15.

Moreover, FIG. 10 shows that a GUI can include a time-based user-selectable control 749, 750, 751, 752, 755. In some implementations, the time-based user-selectable control 749, 750, 751, 752, 755 is contained within a container 739. The time-based user-selectable control 755 is configured to slide along a timeline 753 to cause different portions of the graphs shown in the container 733, 734, 735, 736.

Figure 11:
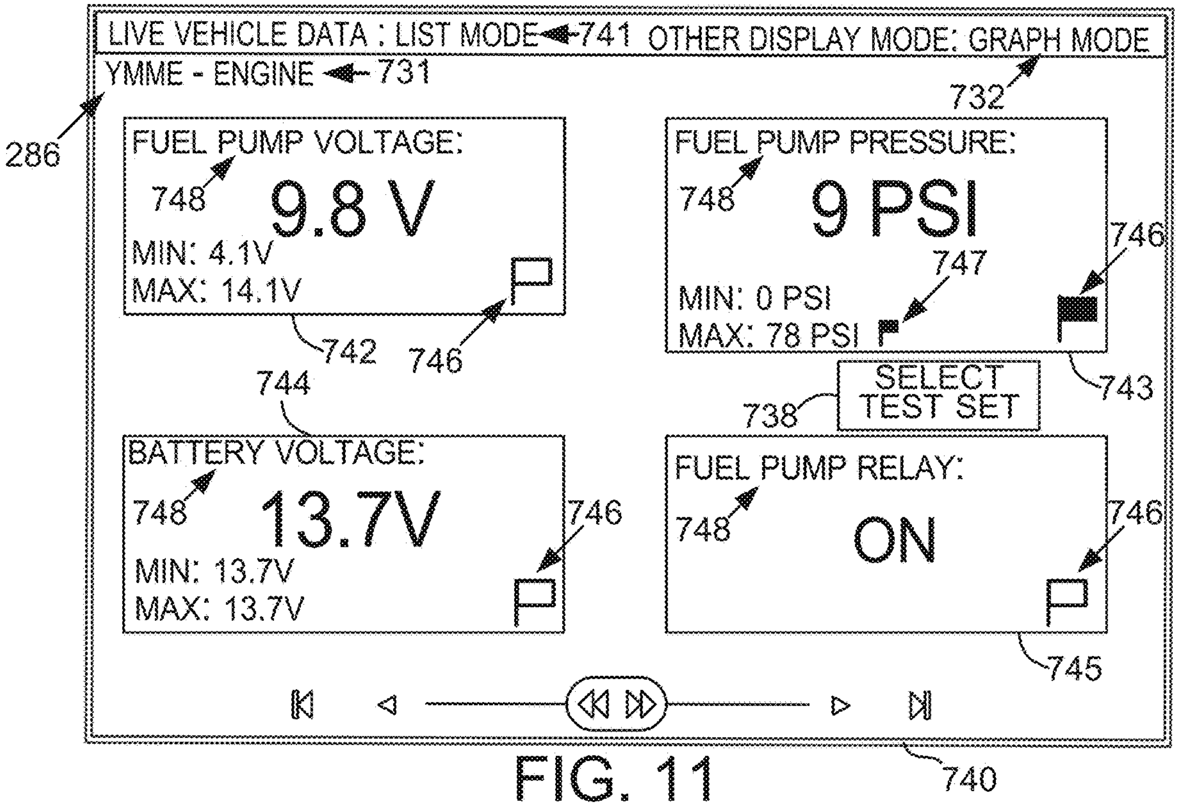

Next, FIG. 11 shows a GUI 740 having a GUI identifier 741 that indicates the GUI 740 pertains to displaying live vehicle data in a list mode. The GUI 740 includes a system/component identifier 731 to indicate which system or component in the vehicle 12 pertains to the live vehicle data displayed in the GUI 740. The GUI 740 includes the display mode selector USC 732 that is selectable to cause the processor 250 to display the live vehicle data in a different mode, such as a graph mode shown in FIG. 10.

The GUI 740 includes a container 742, 743, 744, 745 to display live vehicle data representing parameter values for a particular PID. As shown in FIG. 11, the PIDs for those containers can be a PID representing a fuel pump voltage, a PID representing a fuel pump pressure, a PDF representing a battery voltage, and a PID representing a fuel pump relay status, respectively. The container 742, 743, 744, 745 includes a textual PID identifier 748. Similar to the container 733, 734, 735, 736, the container 742, 743, 744, 745 includes the flag 746 to indicate whether a received parameter has breached the threshold value(s). The container 743 includes a flag 760 to indicate a maximum threshold value was breached by a parameter value corresponding to the PID indicated by the textual PID identifier 748 in that container.

Next, FIG. 12 shows a GUI 626 having a GUI identifier 627 that indicates the GUI 626 pertains to determining test sets. In at least some implementations, the GUI 626 is displayed after selecting a vehicle from the GUI 725 shown in FIG. 8 and the YMME information entered via the GUI 725 is populated into a USC 628. In at least some other implementations, a GUI like the GUI 626 is displayed in lieu of displaying a GUI like the GUI 725. The GUI 626 includes a USC 628, 629, 630, 631, 632, 633, 634, 635.

The USC 628 can be used to select a vehicle and identify a selected vehicle. The USC 628 includes a drop-down arrow 636 selectable to cause the processor 250 to display within the USC 628 a list of one or more vehicles identifiers that can be selected and displayed as being the selected vehicle identifier. As an example, each of the one or more other vehicle identifiers can indicate a respective Y/M/M or Y/M/M/E.

The USC 629 can be used to select a system of the vehicle 12 and identify a selected system. The USC 629 includes a drop-down arrow 637 selectable to cause the processor 250 to display within the USC 629 a list of one or more other system identifiers that can be selected and displayed as being the selected system identifier. As an example, each of the one or more system identifiers can indicate a respective system within a selected vehicle, such as a fuel system, an HVAC system, a powertrain system, an antilock brake system, or some other vehicle system.

The USC 630 can be used to select a component of the vehicle 12 and identify a selected component. The USC 630 includes a drop-down arrow 638 selectable to cause the processor 250 to display within the USC 630 a list of one or more other component identifiers that can be selected and displayed as being the selected component identifier. As an example, each of the one or more component identifiers can indicate a respective component within a selected vehicle, such as a fuel pump, an air conditioning compressor, an oxygen sensor, an antilock brake system controller, or some other component.

The USC 631 can be used to select a symptom and identify a selected symptom. The USC 631 includes a drop-down arrow 639 selectable to cause the processor 250 to display within the USC 631 a list of one or more other symptom identifiers that can be selected and displayed as being the selected symptom identifier.

The processor 250 can populate one or more of the USC 628, 629, 630, 631 automatically based on a prior selection or in response to referring information corresponding to the USC 628, 629, 630, 631. As an example, in response to a selection of the USC 633 and/or a repair order from a list of repair orders displayed in response to selecting a drop-down arrow 640, the processor 250 can populate one or more of the USC 629, 630, 631 with a system identifier, a component identifier, or a symptom identifier, respectively, that is read from a repair order identified using the USC 633.

As another example, in response to a selection of the USC 634, the USC 631 and or a list of symptom identifiers displayable in response to a selection of the drop-down arrow 639 can be populated with diagnostic trouble codes (DTCs) determined in response the selection of the USC 634. The processor 250 can determine the DTCs by transmitting to one or more ECUs in the vehicle a respective VDM including a request for DTCs currently or historically set by the ECU.

The USC 632 can be used to cause the processor 250 to determine a group of test sets corresponding to one or more of the selected vehicle indicated by the USC 628, the selected system indicated by the USC 629, the selected component indicated by the USC 630, or the selected symptom indicated by the USC 631. In at least some implementations, the processor 250 can filter the determined group of test sets in response to a selection of the USC 635. That filtering, for example, can remove a test set from the group of test sets or not add that test set to the group of test sets if a test device needed for performing the test set is not currently available.

The GUI 626 also includes a USC 771, 772, 773, 774 corresponding to a type of test set content. The USC 771 is selectable to indicate a test set that includes aspects for requesting PID parameter values. The USC 772 is selectable to indicate a test set that includes aspects for requesting performance of a component test. The USC 773 is selectable to indicate a test set that includes aspects for requesting performance of a component functional test. The USC 774 is selectable to indicate a test set that indicates an aspect corresponding to a user adjustment of a vehicle. The "X" within the USC 771, 772, 773 represents that the USC 771, 772, 773 has been selected. In at least some implementations, a processor will determine test set(s) based, at least in part, on which USC 771, 773, 773, 774 is selected, if any. In at least some of those implementations, the processor can search for and determine a test set that includes test set content corresponding to one or more of types of test set content selected using the USC 771, 772, 773, 774.

Next, FIG. 13 shows a GUI 150 having a GUI identifier 641 that indicates the GUI 150 pertains to selecting a test set for a particular vehicle, system, component and/or symptom. In at least some implementations, the GUI 150 is displayed after making selections using one or more of the USC 628, 629, 630, 631, 633, 634, 635, 771, 772, 773, 774 and then selecting the USC 632 from the GUI 626 shown in FIG. 12. The GUI 150 includes a USC 642, 643, 644, 645, 646, 647, 679, 698, and a header 604, 605, 606. The USC indented immediately under the header 604, 605, 606 correspond to test set(s) that relate to the subject matter indicated by the header immediately above the USC.

Figure 19:
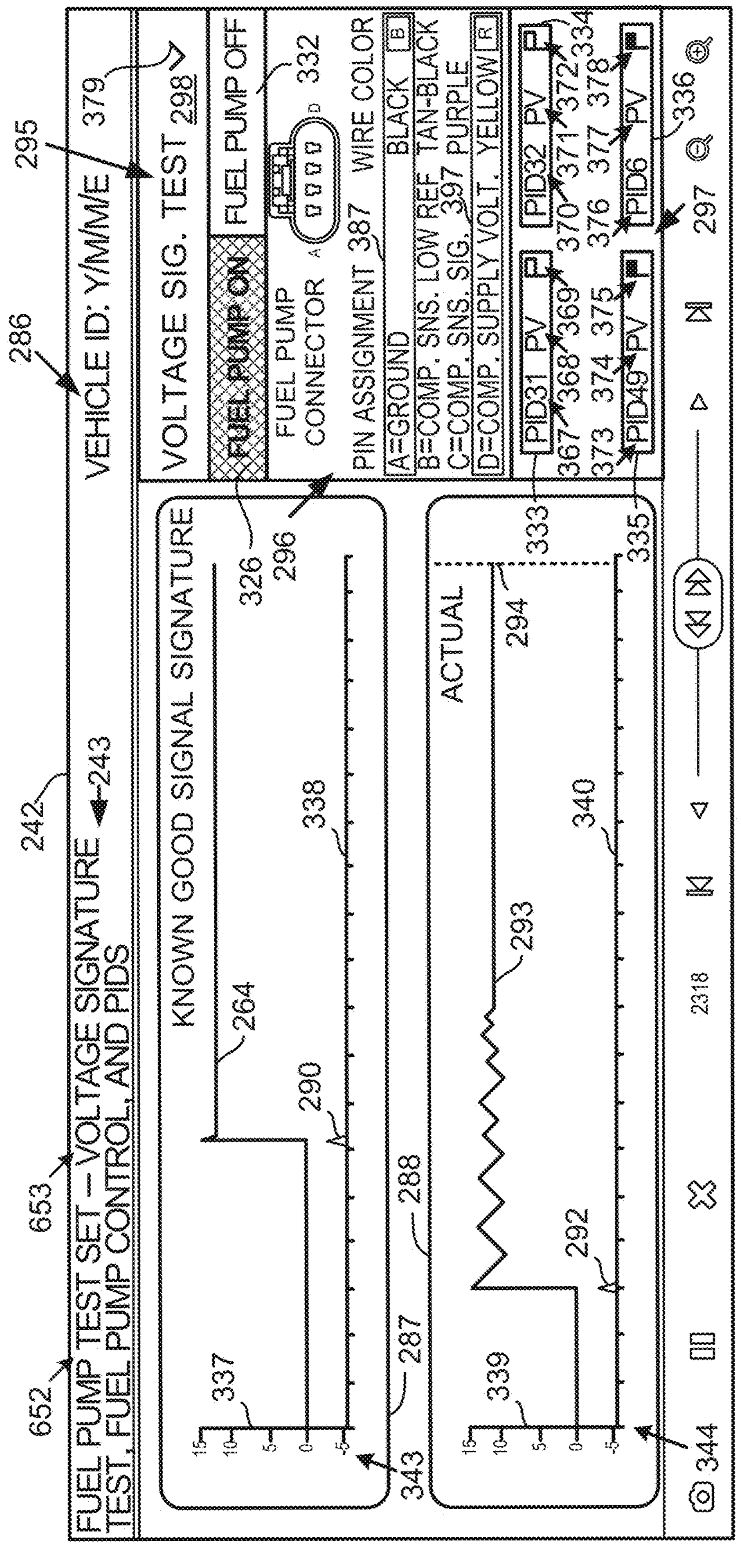
Figure 22:
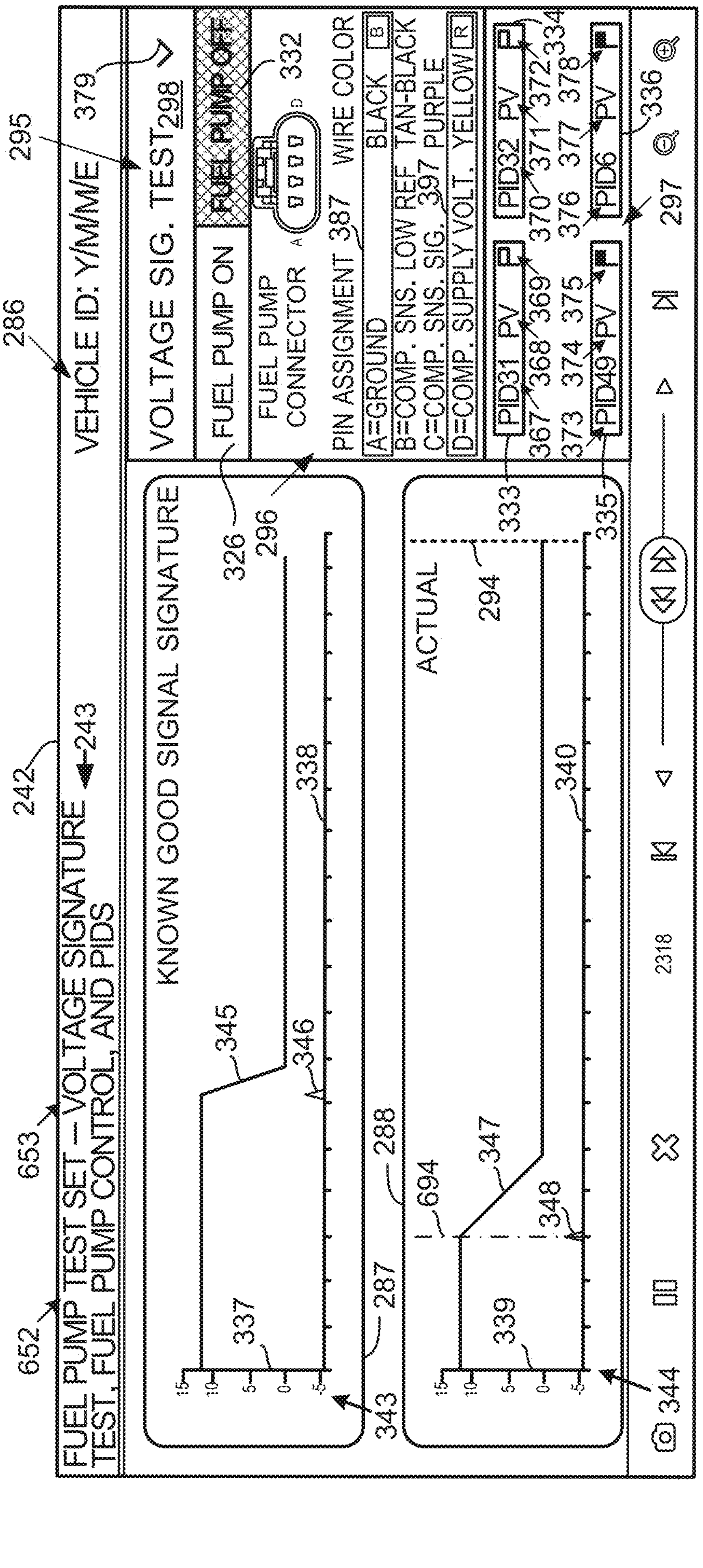

The USC 643 can be used to select a fuel pump test set that is described with respect to FIG. 19 and FIG. 22. The USC 644 can be used to select a fuel pump test set that is described with respect to FIG. 24. The USC 645 can be used to select a fuel pump test set that is described with respect to FIG. 27 to FIG. 29. The USC 646 can be used to select a fuel pump test set that is described with respect to FIG. 30. The USC 647 can be used to select a fuel pump test set that is described with respect to FIG. 31. The USC 679 can be used to select a fuel pump test set that is described with respect to FIG. 14 to FIG. 17. The USC 698 can be used to select a heating, ventilation, air conditioning (HVAC) actuator test set that is described with respect to FIG. 25 and FIG. 26. The USC 642 can be used to select a power window test set that is described with respect to FIG. 34 and FIG. 35.

Figure 14:
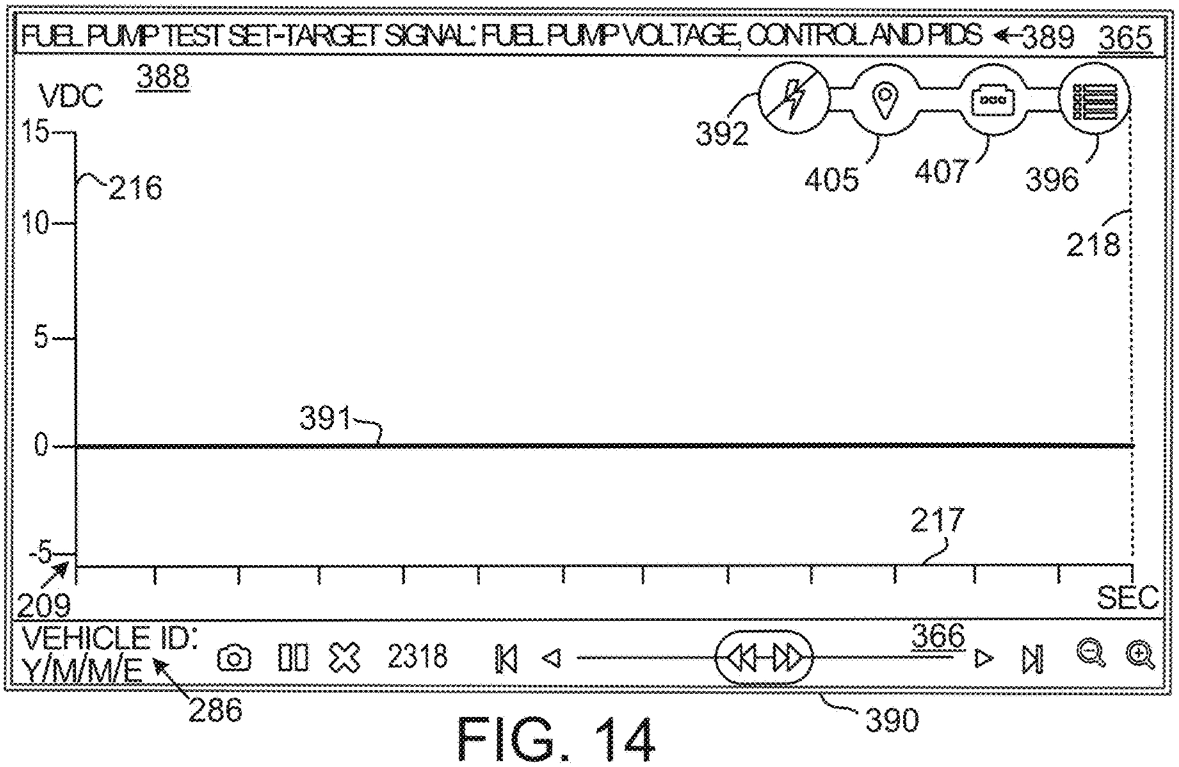

Next, FIG. 14 shows a GUI 390. The GUI 390 can be displayed in response to a selection of the USC 679 shown in FIG. 13. The GUI 390 includes a container 365 including a GUI identifier 389 that identifies a test set corresponding to the GUI 390 (i.e., Fuel Pump Test Set-Target Signal: Fuel Pump Voltage, Control, and PIDs). The test set for the GUI 390 includes a functional test for engagement of an electric fuel pump within the vehicle 12 and a component test to measure the target signal. The GUI 390 also includes a container 388, 366, and a USC 392, 396, 405, 407. A test set file that can be used to generate the GUI 390 can include a target signal test indicator indicative of a component test for measuring a voltage with respect to the electric fuel pump (e.g., CT12) and a target signal test indicator indicative of a PID that is indicative of the fuel pump voltage (e.g., PID31).

Figure 16:
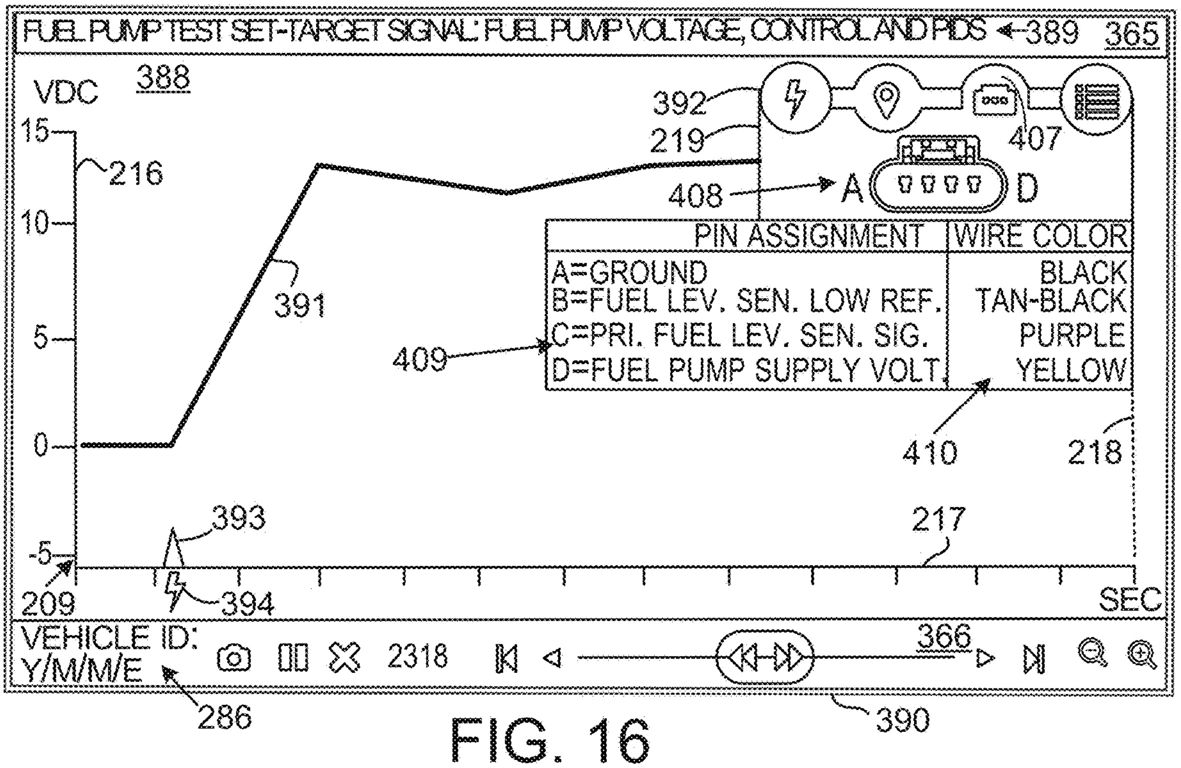
Figure 17:
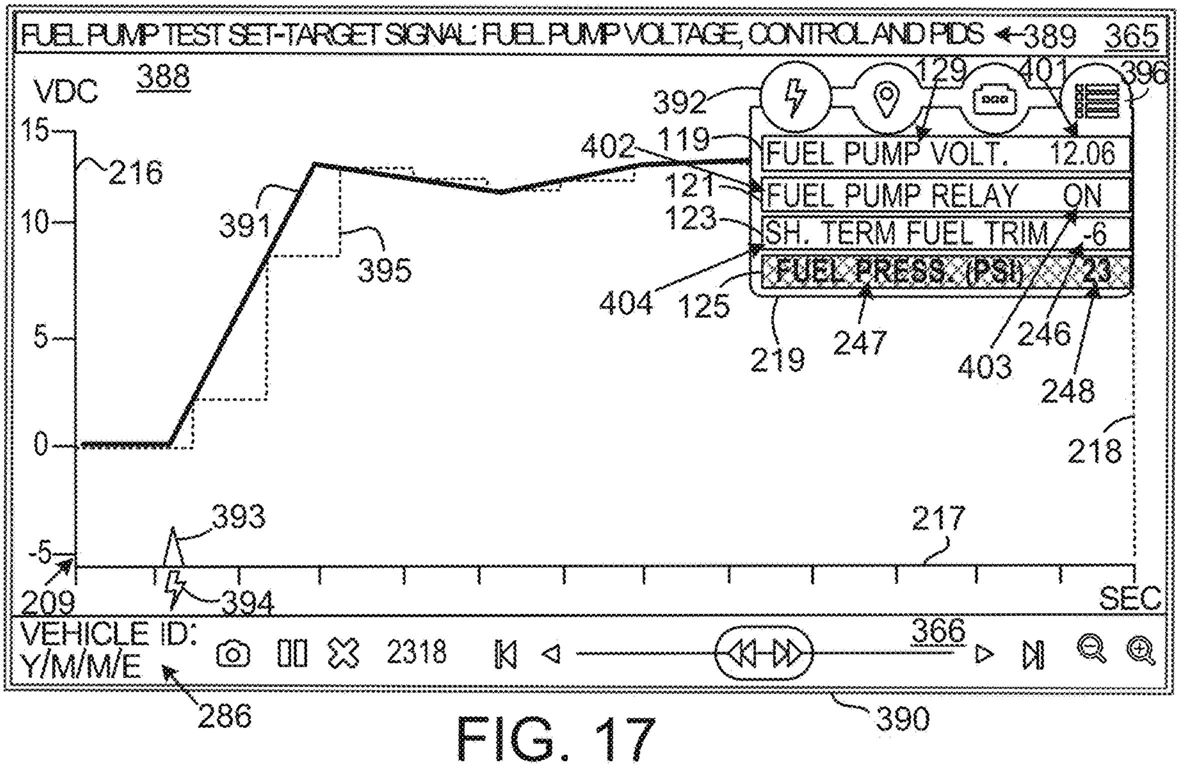

The container 388 includes a graph 209 including a vertical axis 216 representing an amplitude (e.g., a voltage amplitude) and a horizontal axis 217 representing time, a waveform representation 391 of the target signal, and a vertical cursor 218 indicative of a current time on the horizontal axis 217. The container 366 can the vehicle identifier 286 and standard controls such as a control to capture a screen shot of the display, a pause control to pause the waveform representation 391, a stop control to stop capturing of vehicle data, a fast reverse control, a reverse control, a time-bar slider, a forward control, a fast forward control, a zoom-in control, or a zoom-out control. Since the test set indicated by the GUI identifier 389 provides for measuring the fuel pump voltage using a component test (e.g., a component test performed using the meter 328 or the oscilloscope 329) and determining the fuel pump voltage from PID parameter values, the waveform representation can be based on the measurement made via the component test or the PID parameter values. FIG. 17 shows the GUI 390 with the waveform representation 391 and a waveform representation 395. For FIG. 17, the waveform representation 391 is based on the component test measurement and the waveform representation 395 is based on the PID parameter values. The waveform representation 395 can be displayed in FIG. 14 to FIG. 16 as well.

Additionally, or alternatively, the representation of a target signal within a GUI can include a digital representation, such as alpha-numeric characters representing a voltage level and units (e.g., volts DC). A GUI configured to display a representation of a target signal can display representations of multiple target signals, such as multiple target signals that correspond to a selected functional test.

Figure 15:
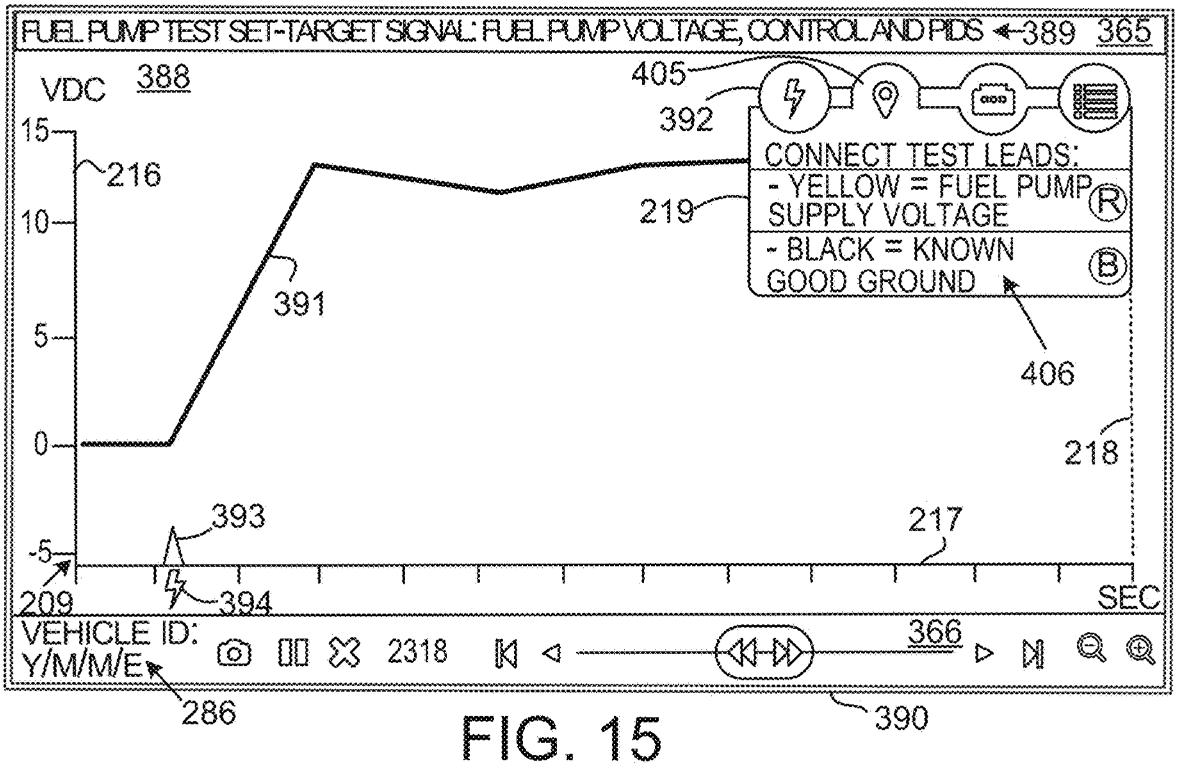

The USC 392 can be used to initiate a functional test and/or toggle a functional test on or off. The USC 392 can include an indicator indicative of a status of the functional test. The indicator of the USC 392 can indicate the status using color, shape, animation, or some other means. For example, in FIG. 14, the USC 392 uses a lightning bolt icon stricken through to represent that the functional test is off, has not been initiated, has not been requested to be performed, and/or has completed. In FIG. 15 to FIG. 17, the USC 392 uses a lightning bolt icon without strike-through to represent that the functional test is on, has been initiated, and/or that been requested to be performed. In an alternative implementation, the USC 392 can include an icon with the word "OFF" instead of the stricken-though lightning bolt and an icon with the word "ON" instead of the lightning bolt icon without strike-through. As shown in FIG. 14, with the functional test off, the waveform representation 391 represents that the target signal has a value of zero volts DC. For other functional tests, the representation of a target signal shown in a GUI can have a value other than zero volts or a representation of a target signal other than a representation of a voltage.

Next, FIG. 15 shows another view of the GUI 390. This view of the GUI 390 represents a state after the USC 405 has been selected and the fuel pump of the vehicle 12 is operating in an on state. In response to a selection of the USC 405, the container 219 displays additional information 406 corresponding to the component test of the test set identified by the GUI identifier 389. The additional information 406 includes instructions for connecting test leads of the meter 328 or the oscilloscope 329 to the vehicle 12. The container 219 can include the additional information 406 after a selection of the USC 405 with the fuel pump in the off state also.

The view of the GUI 390 shown in FIG. 15, as well as in FIG. 16 and FIG. 17, can be shown on the display 300 after a selection of the USC 392. In response to the selection of the USC 392, the processor 250 transmits a VDM to the vehicle 12 to request functional control of the fuel pump within the vehicle 12. To request activation of the fuel pump when the fuel pump is in the off state, the VDM sent in response to selection of the USC 392 includes a functional test command to turn the fuel pump on. Conversely, to request deactivation of the fuel pump when the fuel pump is operating in the on state, the VDM sent in response to selection of the USC 392 includes a functional test command to turn the fuel pump off.

In at least some implementations, the processor 250 can determine which VDM to send, at least in part, from a test set, such as the test set file 825 shown in FIG. 82A to FIG. 82C. For example, the processor 250 can determine from the element 499 shown in FIG. 82C that the VDM should include the functional test 4A, and from the functional test index 101. In at least some of those implementations, the element 499 or another element in the test set file 825 can include the content of VDM.

A transmission time corresponding to transmission of the functional test command and/or a VDM including the functional test command, relative to the waveform representation 391, is indicated by an icon 393. In at least some implementations, a trigger icon 394 is displayed in proximity to the icon 393. The trigger icon 394 indicates that the functional test has been initiated and/or that the functional test was toggled on or off.

The GUI 390 also includes a USC 405. In response to a selection of the USC 405, the processor 250 outputs a container 219 including additional information 406. The additional information 406 corresponds to a component test of the test set identified by the GUI identifier 389. The additional information 406 includes information regarding how to measure the target signal (in this case, by connecting a black test lead to an electrical circuit or node referred to as a "known good ground" and by connecting a red test lead to an electrical circuit that provides the fuel pump with a supply voltage.

Next, FIG. 16 shows yet another view of the GUI 390. This view of the GUI 390 represents a state after the USC 407 has been selected and the fuel pump of the vehicle 12 is operating in an on state. In response to a selection of the USC 407, the container 219 displays additional information 408, 409, 410 corresponding to the component test of the test set identified by the GUI identifier 389.

The additional information 408 includes an image of a fuel pump connector and connector pin layout for connector pins A to D. The additional information 409 includes circuit identifiers for electrical circuits connected to connector pins A to D. The additional information 410 includes color identifiers of the electrical circuits connected to connector pins A to D. The additional information can provide guidance to a user connecting test leads of the meter 328 or the oscilloscope 329 to the vehicle 12. Other examples of additional information included within the container 219 in response to a selection of the USC 407 are also possible.

Next, FIG. 17 shows still yet another view of the GUI 390. This view of the GUI 390 represents a state after the USC 396 has been selected and the fuel pump of the vehicle 12 is operating in an on state. In response to a selection of the USC 396, the container 219 includes a sub-container 119, 121, 123, 125 to display PIDs and parameter values corresponding to the functional test of the test set identified by the GUI identifier 389 and/or the target signal corresponding to the component test of the test set identified by the GUI identifier 389.

The sub-container 119 includes a textual PID 129 and a parameter value 401 corresponding to the textual PID 129. The textual PID 129 represents a PID corresponding to a fuel pump voltage, and the parameter value 401 is a digital numeric value representing a number of DC volts. In at least some implementations, the processor 250 transmits a VDM to the vehicle 12 to request the parameter value 401 corresponding to the PID31 shown in FIG. 58A.

The sub-container 121 includes a textual PID 402 and a parameter value 403 corresponding to the textual PID 402. The textual PID 402 represents a PID corresponding a status of a fuel pump relay in the vehicle 12, and the parameter value 403 is a non-numeric status value "ON," but can be "OFF" when the fuel pump is off. In at least some implementations, the processor 250 transmits a VDM to the vehicle 12 to request the parameter value corresponding to the PID32 shown in FIG. 58A.

The sub-container 123 includes a textual PID 404 and a parameter value 246 corresponding to the textual PID 404. The textual PID 419 represents a PID corresponding to a short-term fuel trim value calculated by an ECU within the vehicle 12, and the parameter value 246 is a digital numeric value representing the calculated short term fuel trim value. In at least some implementations, the processor 250 transmits a VDM to the vehicle 12 to request the parameter value 246 corresponding to the PID33 shown in FIG. 58A.

The sub-container 125 includes a textual PID 247 and a parameter value 248 corresponding to the textual PID 247. The textual PID 247 represents a PID corresponding to a fuel pressure value in PSI, and the parameter value 248 is a digital numeric value representing the fuel pressure. Any value described and/or shown in terms of PSI can be described and/or shown in terms of other units, such as kPa. In at least some implementations, the processor 250 transmits a VDM to the vehicle 12 to request the parameter value 248 corresponding to the PID6 shown in FIG. 58A.

When the sub-container 119, 121, 123, 125 is displayed in the container 219, the processor 250 can repeatedly send VDMs to request the parameter value 401, 403, 246, 248 for the textual PID 129, 402, 404, 247, respectively. Furthermore, in at least some implementations the parameter value 401, 403, 246, 248 can by changed dynamically to show a prior parameter value corresponding to the textual PID 129, 402, 404, 247, by repositioning the vertical cursor 218 along the horizontal axis 217 or via use of the fast reverse control, the reverse control, the time-bar slider, the forward control, or the fast forward control within the container 366.

The processor 250 can determine a diagnostic status of a component, system, and/or the vehicle 12 by comparing a parameter value corresponding to a PID to a baseline characteristic (e.g., a baseline parameter). The processor 250 can output on the display 300 an indication of the determined status.

As an example, the indication of the determined status can include displaying the PID, the parameter value, and/or the sub-container containing the PID and the parameter value using a first color, shading, and/or font when the determined status is a first status or using a second color, shading, and/or font when the determined status is a second status. As an example, the first determined status can be a malfunction is detected, and the second determined status can be no malfunction is detected. FIG. 17 shows an example of using highlighting and bold-faced text within the sub-container 125 to represent a determined status that indicates a malfunction corresponding to the fuel pressure has been detected.

As another example, the indication of the determined status can include displaying an icon, such as a flag icon, using a first color for occurrences when the determined status corresponding to the PID is the first determined status, or a second color for occurrences when the determined status corresponding to the PID is the second determined status. FIG. 19 shows an example of using a flag icon to represent a determined status.

Figure 18:
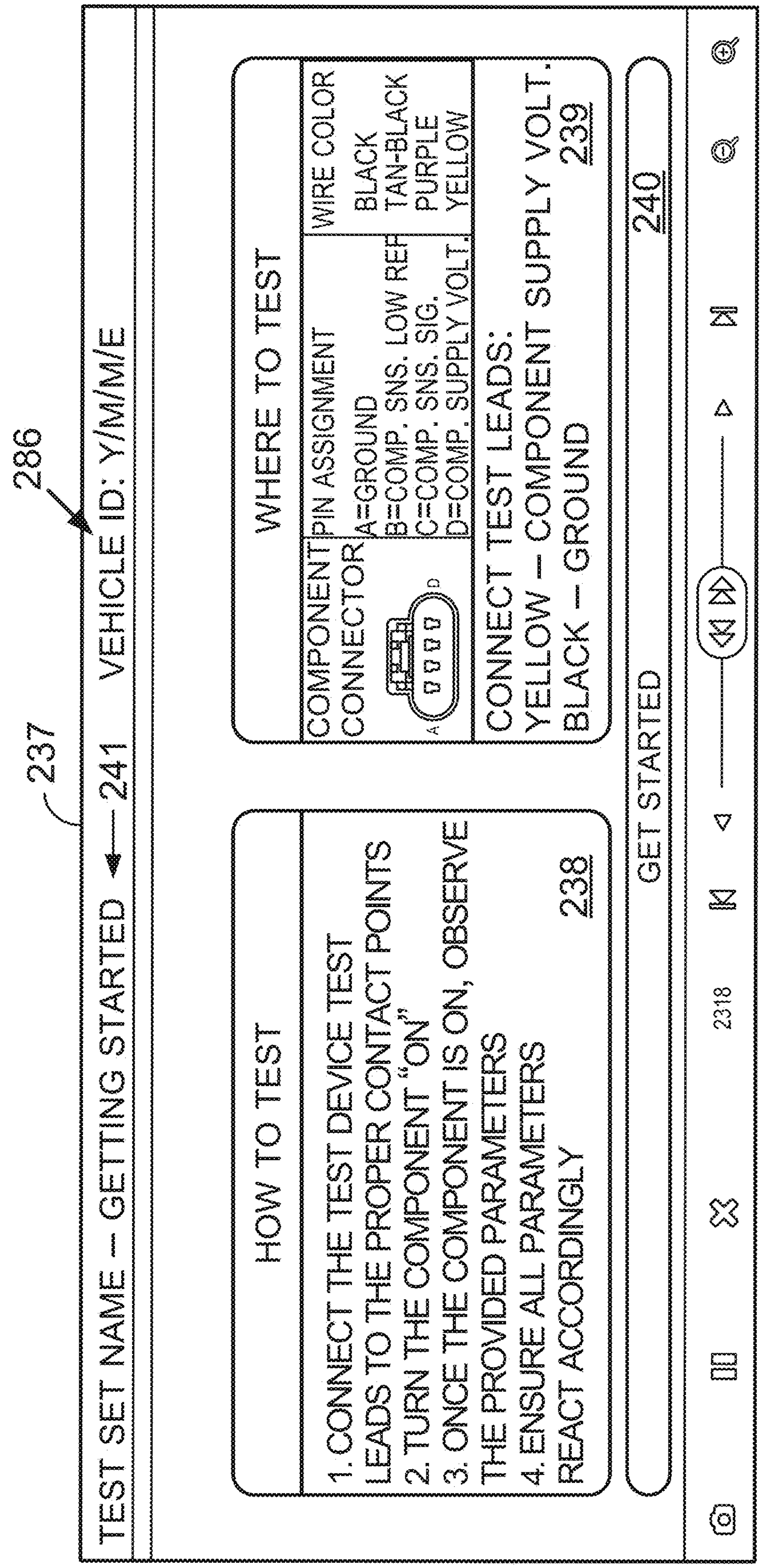

Next, FIG. 18 shows a GUI 237 having a GUI identifier 241 that includes a name of a test set and indicates that the GUI 237 pertains to starting the test set. In at least some implementations, the GUI 237 is displayed in response to selecting a test from a list of tests. As an example, the list of tests can include a list of symptom-based component tests, a list of component tests based on selection of a component, a list of functional tests, a list of component and functional tests, among other possible lists of tests.

The GUI 237 includes a container 238, 239. In at least some implementations, the container 238, 239 include information regarding the test set, such as information regarding a component or functional test that is to be performed during a performance of the test set. As an example, the information within the container 238, 239 can include information indicating how to perform a test, and where to perform the test, respectively. Providing such information within the container 238, 239 is beneficial because the information can guide a user of the computing system 4 in performing the test(s) of the test set.

As an example, for an implementation in which the test includes performing an electrical measurement using the meter 328 or the oscilloscope 329, the information in the container 239 includes information showing pin assignment information to guide the user in connecting a measurement lead of the meter 328 or the oscilloscope 329 to a pin that is to be measured.

The GUI 237 also includes a USC 240. In response to selection of the USC 240, the processor 250 can initiate one or more tests of test set. Moreover, the processor 250 can output a GUI showing real-time results of performing the test set and/or additional control(s) corresponding to the test set. Examples of a GUI output in response to selection of the USC 240 are shown in FIG. 19 to FIG. 35.

Figure 20:
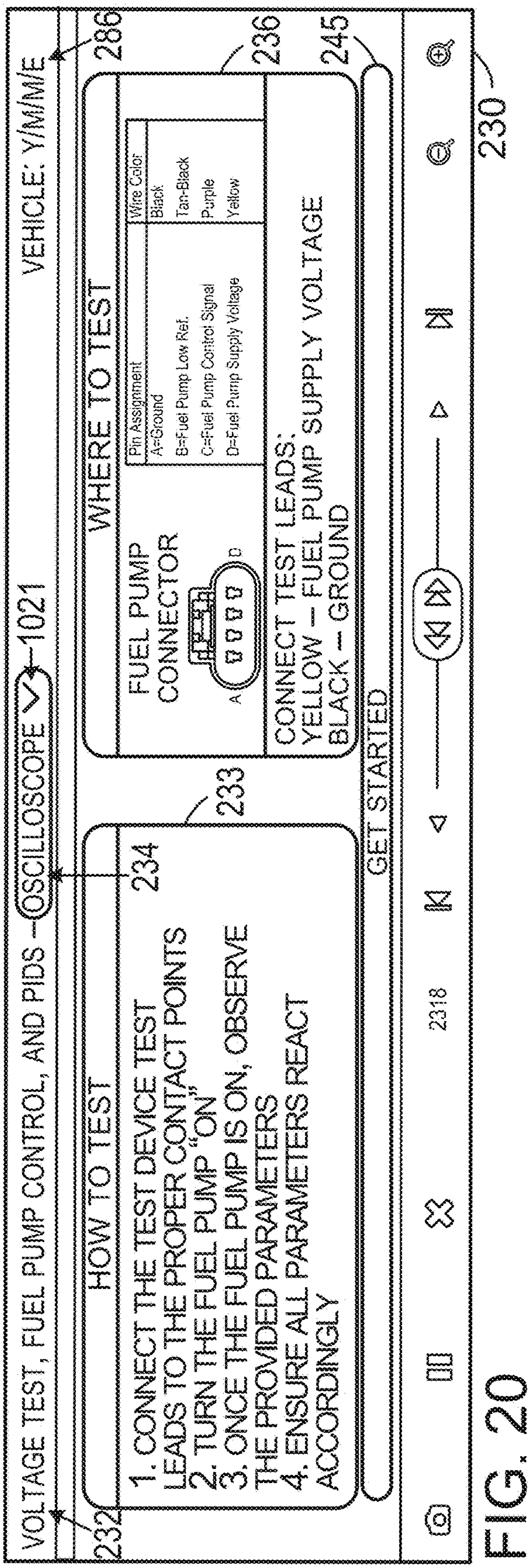

Next, FIG. 20 shows a GUI 230. The computing system 4 can output the GUI 230 onto the display 300 in response to selection of the USC 644 (shown in FIG. 13). Similar to other GUI described in this description, the GUI 230 includes a test set identifier 232, a vehicle identifier 286, and a test device identifier 234. For the implementation in which the GUI 230 is displayed in response to selection of the USC 644, the test set identifier 232 corresponds to the test set identifier 803 and the component test identifier 805 (both shown in FIG. 84); the vehicle identifier 286 corresponds to the vehicle identifier 804; and the test device identifier 234 corresponds to the test device identifier 806. The test device identifier 234 can indicate the test device is the oscilloscope 329. In at least some implementations, a test device identifier can be selectable using a USC, such as the USC 1021. In at least some of those implementations, the USC 1021 is configured for selecting the meter 328 or the oscilloscope 329. Selecting the meter 328 using the USC 1021 can cause the processor 250 to output a GUI in which the voltage test for the fuel pump test set is performed by the meter 328.

The GUI 230 includes a container 233, 236 and a USC 245 selectable to continue performance of a test set. The container 233, 236 can include text and/or an image. In at least some implementations, the container 233 includes information indicative of how to test a component corresponding to the test set file, and the container 236 includes information indicative of where to test the component corresponding to the test set identifier 232 in the GUI 230. The container 236 includes an image of a connector of the component corresponding to the test set file 802 (shown in FIG. 84). The processor 250 can generate the GUI 230 based on the GUI template CD shown in Table C (e.g., the GUI template 860 shown in FIG. 86) and content in and/or referenced by a test set file, such as the test set file 802.

Figure 21:
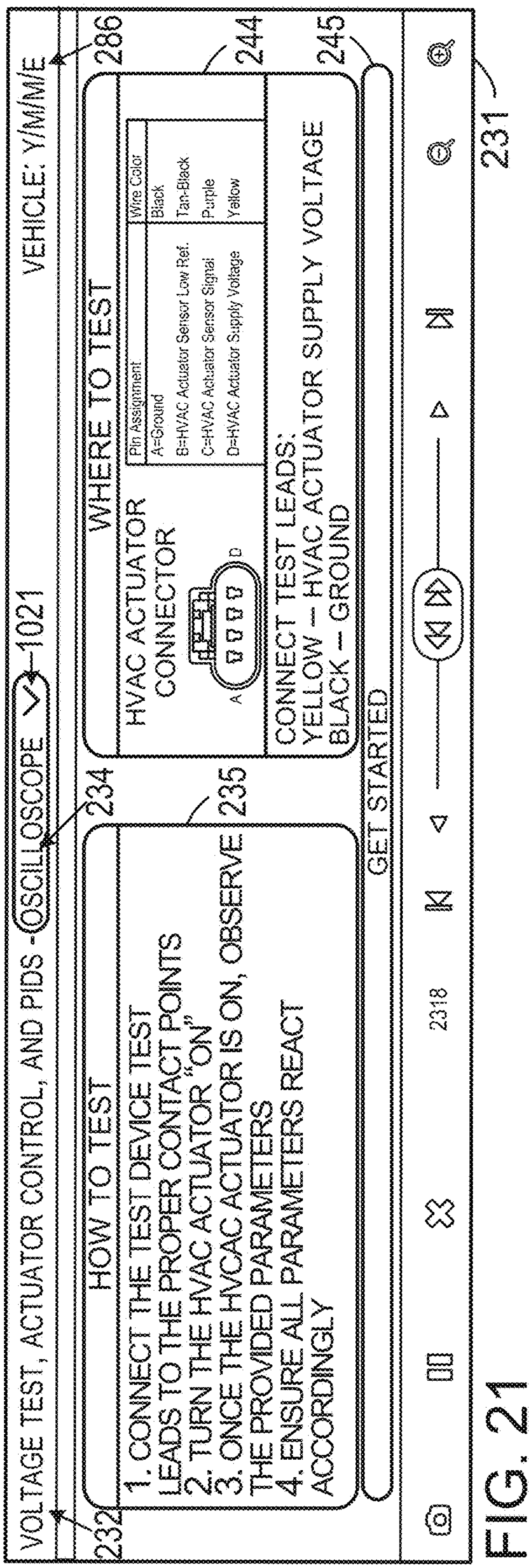
Figure 40:
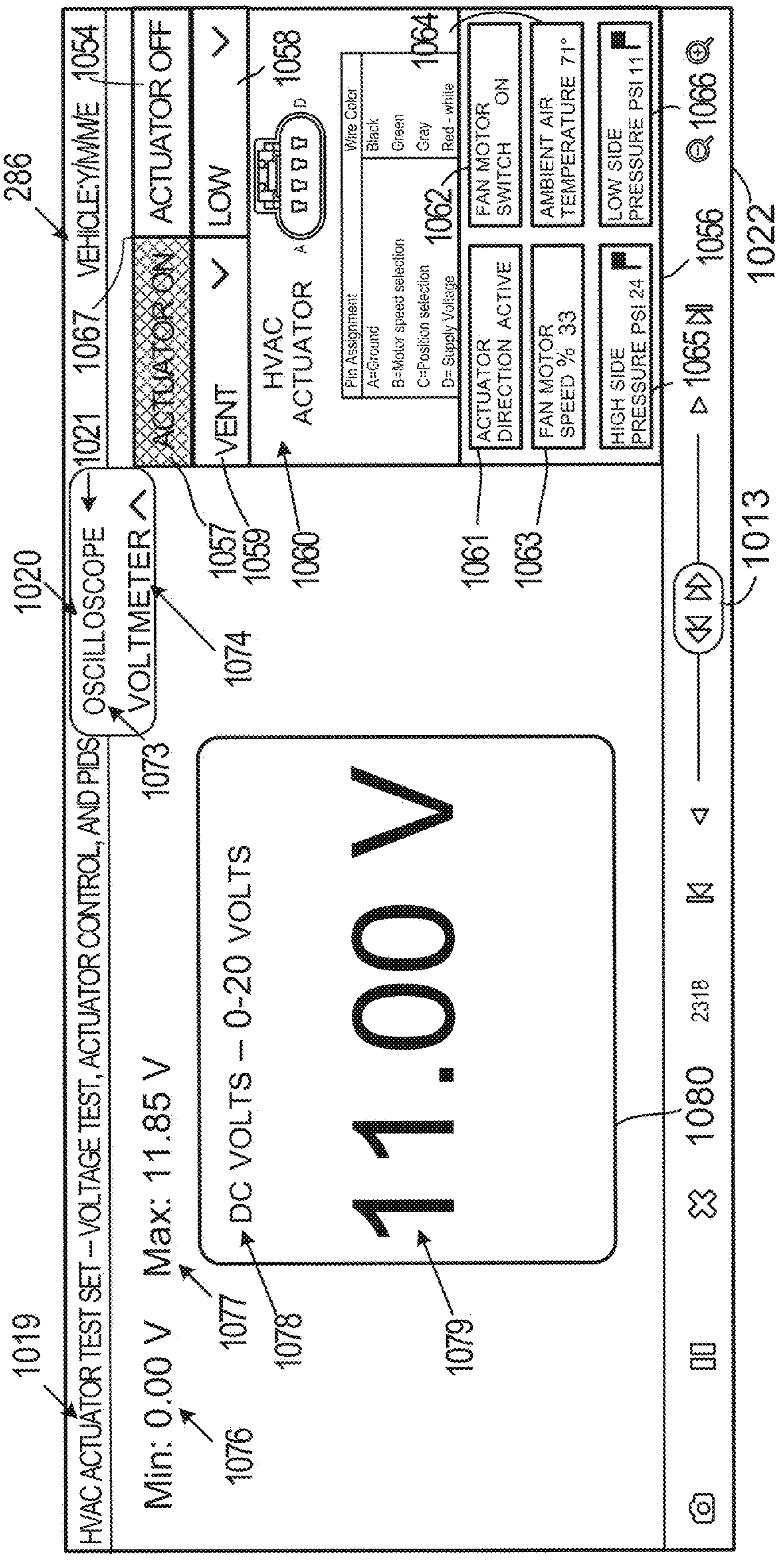

Next, FIG. 21 shows a GUI 231. The computing system 4 can output the GUI 231 onto the display 300 in response to selection of the USC 698 (shown in FIG. 13). The GUI 231 includes the test set identifier 232, the vehicle identifier 286, and the test device identifier 234. For the implementation in which the GUI 231 is displayed in response to selection of the USC 698, the test set identifier 232 corresponds to the test set file 614 (shown in FIG. 85), and the vehicle identifier 286 corresponds to a vehicle identifier for vehicle B. The test set file 614 includes the component test 617, 625 such that the USC 1021 is selectable to allow multiple selectable test devices to be shown within the test device identifier 234. For FIG. 21, the oscilloscope is selected such that performance of the test set file 614 would include performing the component test 617. One of the meter 328 or the oscilloscope 329 can be a default test device initially shown in the GUI 231. FIG. 40 shows a view of a GUI 1022 representing that the USC 1021 is being used to select a voltmeter as a test device.

The GUI 231 includes a container 235, 244 and the USC 245 selectable to continue performance of a test set. The container 235, 244 can include text and/or an image. In at least some implementations, the container 235 includes information indicative of how to test a component corresponding to a test set associated with the USC 698, and the container 244 includes information indicative of where to test the component corresponding to the test set identifier 232 in the GUI 231. The container 244 includes an image of a connector of the component corresponding to the test set file 614 (shown in FIG. 85). The processor 250 can generate the GUI 231 based on the GUI template CD shown in Table C (e.g., the GUI template 860 shown in FIG. 86) and content in and/or referenced by a test set file, such as the test set file 614.

Next, FIG. 19 shows a GUI 242 having a GUI identifier 243 that includes a test set name 652 (i.e., "Fuel Pump Test Set") and a test set descriptor 653 that indicates a component test (i.e., "Voltage Signature Test") and a functional component control (i.e., fuel pump control), and that PIDs are requestable using the test set. In at least some implementations, the GUI 242 is displayed in response to selecting: the USC 240 shown in FIG. 18, the USC 643 shown in FIG. 13, or a component test referred to as "voltage signature test" using the USC 298 and a drop-down arrow 379 when the USC 298 does not indicate "voltage signature test" (see, for example, FIG. 24). The GUI 242 includes a container 287, 288, 295, 296, 297. The container 297 includes a sub-container 333, 334, 335, 336.

The container 295 includes a USC 298, 326, 332. The USC 298 is configured to allow a user to select a component test to be performed via the computing system 4. In at least some implementations, the USC 298 includes a drop-down arrow 379 selectable to cause the processor 250 to display within the USC 298 a list of one or more component tests that can be performed for the vehicle identified by the vehicle identifier 286. In at least some implementations, the USC 298 includes the name of a currently-selected component test and allows for a user to select a different component test from the list of one or more component tests.

The USC 326, 332 is configured to allow a user to select a functional test and to cause the processor 250 to transmit a VDM to the vehicle 12 to request functional control of a component within the vehicle 12. As an example, a component corresponding to the functional test for the USC 326, 332 can include an electronic fuel pump within the vehicle 12, the VDM sent in response to selection of the USC 326 includes a functional test request to turn the fuel pump on, and the VDM sent in response to selection of the USC 332 includes a functional test request to turn the fuel pump off. The processor 250 can highlight or otherwise indicate which USC of the USC 326 and the USC 332 was most recently selected and/or a selected operational state of the component (s) corresponding to the USC 326 and the USC 332. FIG. 19 includes shading within the USC 326 to indicate that the USC 326 was selected more recently than the USC 332 and/or the status of the electric fuel pump.

The container 296 includes guidance for a user to carry out a component test (selected using the USC 298) using the computing system 4. In at least some implementations, the container 296 includes an image of a connector and connector pin layout for connector pins within the connector, such as connector pins A to D of an electrical circuit connector. As an example, the connector shown in the container 296 can include a connector configured to connect to the electric fuel pump. Moreover, the guidance within the container 296 can include circuit identifiers for electrical circuits connected to connector pins A to D. As an example, the circuit identifiers can include a circuit name and/or a color identifier of an electrical circuit connected to a connector pin A to D.

The container 296 includes a test point indicator 387, 397. The test point indicator 387 corresponds to a test point at which a first probe of the probe 305 is to be connected for a component test. The test point indicator 397 corresponds to a test point at which a second probe of the probe 305 is to be connected for a component test. As an example, the first probe can be a black test lead (indicated by a "B" within a rectangle within the test point indicator 387), and the second probe can be a red test lead (indicated by an "R" within a rectangle within the test point indicator 397). In other implementations, a test probe indicator can indicate a particular channel of the oscilloscope 329, such as channel (1), or a particular oscilloscope ground connector, such as channel (1) ground connector.

The sub-container 333 includes a textual PID 367, a flag 369, and a parameter value 368 corresponding to the textual PID 367. As an example, the textual PID 367 can be "Fuel Pump Voltage" (i.e., PID31 in the PID index 90), and the parameter value 368 can be a voltage value in volts DC, such as "12.06."

The sub-container 334 includes a textual PID 370, a flag 372, and a parameter value 371 corresponding to the textual PID 370. As an example, the textual PID 370 can be "Fuel Pump Relay" (i.e., PID32 in the PID index 90), and the parameter value 371 can be a status value, such as "On."

The sub-container 335 includes a textual PID 373, a flag 375, and a parameter value 374 corresponding to the textual PID 373. As an example, the textual PID 373 can be "Fuel Rail Pressure (PSI)" (i.e., PID49 in the PID index 90), and the parameter value 374 can be a pressure value in pounds per square inch, such as "0," or in different units, such as Kilopascals (kPa).

The sub-container 336 includes a textual PID 376, a flag 378, and a parameter value 377 corresponding to the textual PID 376. As an example, the textual PID 376 can be “Fuel Pressure (PSI)” (i.e., PID6 in the PID index 90), and the parameter value 377 can be a pressure value in pounds per square inch, such as “0,” or in different units, such as kPa.

The flag 369, 372 is a white flag. In contrast, the flag 375, 378 is a black flag. Descriptions of white and black flags are listed earlier in this description.

The container 287 includes the graph 343 including a vertical axis 337 representing an amplitude (e.g., a voltage amplitude) and a horizontal axis 338 representing time, and a waveform representation 264 for a known good signal corresponding to the vehicle indicated by the vehicle identifier 286, component and functional tests selected using a USC within the container 295, and a vehicle component corresponding to the selected component and functional tests. The graph 343 also includes an icon 290 on the horizontal axis 338. The icon 290 is indicative of a time corresponding to when the functional test corresponding to the USC 326 was selected. In at least some implementations, a container including a graph of a known good signal or a known bad signal can include multiple icons corresponding to respective times when a functional test corresponding to the signal was selected to be performed. In at least some implementations, the icon 290 or another icon along the horizontal waveform of a graph discussed in this description represents a time when the computing system 4 transmits a message to the vehicle 12 to request the vehicle to perform a functional test corresponding to a USC, such as the USC 326, 332.

The container 288 includes a graph 344 including a vertical axis 339 representing an amplitude (e.g., a voltage amplitude) and a horizontal axis 340 representing time, and a waveform representation 293 of a signal measured on a vehicle component within a vehicle corresponding to the vehicle identifier 286 during performance of component and functional tests selected using a USC within the container 295. For FIG. 19, those tests include a voltage signature test for a fuel pump, and a functional test to turn a fuel pump on. The graph 344 also includes an icon 292 on the horizontal axis 340, and a vertical cursor 294 indicative of a current time on the horizontal axis 340. The icon 292 is indicative of a time corresponding to a time when the functional test corresponding to the USC 326 was selected and/or a time corresponding to when the computing system 4 transmits a message to the vehicle 12 to request the vehicle to perform a functional test corresponding to the USC 326. A portion of the waveform representation 293 can represent a measurement of the signal before or after performance of a functional test selected using a USC within the container 295. That portion of the waveform representation 293 is for time to the left of the icon 292. Alternatively, the portion of the waveform representation 293 for the time to the left of the icon 292 could represent a voltage measurement of fuel pump supply voltage after a selection of the USC 332 to turn the fuel pump off.

In at least some implementations, the computing system 4 outputs the GUI 242 to allow a user of the computing system 4 to compare the graph 343, 344 so as to determine whether the waveform representation 293 indicates an expected operation or malfunction of the vehicle component of the vehicle 12.

Additionally, the processor 250 can compare the waveform representation 264 and the waveform representation 293. For example, the processor 250 can output a single container including both the waveform representation 264 and the waveform representation 293. Furthermore, the processor 250 can align the waveform representation 264 and the waveform representation 293 to each other by sliding one or both of the waveform representation 264 and the waveform representation 293 until the icon 290 and the icon 292 are represented at a same time along a horizontal axis corresponding to the waveform representation 264 and the waveform representation 293. Furthermore still, the processor 250 can compare the waveform representation 264 and the waveform representation 293 after being aligned to determine whether differences between the waveform representation 264 and the waveform representation 293 are indicative of a vehicle component in the vehicle 12 malfunctioning. As an example, the processor 250 can determine a component malfunction if a difference between the waveform representation 264 and the waveform representation 293 exceeds a first threshold or exceeds a second threshold for more than a particular amount of time.

Next, FIG. 22 shows an alternative view of the GUI 242 (shown in FIG. 19). In FIG. 22, the USC 332 has been selected instead of the USC 326, as shown in FIG. 19. Selection of the USC 332 causes the processor 250 to transmit a VDM including a request to turn an electric fuel pump in the vehicle 12 off. FIG. 22 includes shading within the USC 332 to indicate that the USC 332 was selected more recently than the USC 326 and/or to show a status of the electric fuel pump.

The container 287 includes the graph 343, although in FIG. 22, the graph 343 includes a waveform representation 345 for a known good signal corresponding to the vehicle indicated by the vehicle identifier 286, component and functional tests selected using a USC within the container 295, and a vehicle component corresponding to the selected component and functional tests. For FIG. 22, those tests include a voltage signature test for the electric fuel pump, and a functional test to turn the electric fuel pump off.

The graph 343 also includes an icon 346 on the horizontal axis 338. The icon 346 is indicative of a time corresponding to when the functional test corresponding to the USC 332 was selected. In at least some implementations, the icon 346 represents a time when the computing system 4 transmits a message to the vehicle 12 to request the vehicle to perform a functional test corresponding to the USC 332. In at least some implementations, the icons corresponding to times when a functional test command is sent and/or acted upon, may be different to distinguish between different functional test commands.

The container 288 includes the graph 344, although in FIG. 22, the graph 344 includes a waveform representation 347 of a signal measured on a vehicle component within a vehicle corresponding to the vehicle identifier 286 during performance of component and functional tests selected using a USC within the container 295. For FIG. 22, those tests include a voltage signature test for the electric fuel pump, and a functional test to turn the electric fuel pump off. The graph 344 also includes an icon 348, on the horizontal axis 340, and a cursor 694 extending from the horizontal axis 340. The icon 348 and the cursor 694 are indicative of a time corresponding to when the functional test corresponding to a time when the USC 332 was selected and/or a time corresponding to when the computing system 4 transmits a message to the vehicle 12 to request the vehicle to perform a functional test corresponding to the USC 332. A cursor, such as the cursor 694, can be an additional or alternative indicator to represent one or more times that are described herein as being represented by or corresponding to an icon along a graph axis. A portion of the waveform representation

347 can represent a measurement of the signal before or after performance of a functional test selected using a USC within the container 295. That portion of the waveform representation 347 is for time to the left of the icon 348.

In at least some implementations, the parameter value 368, 371, 374, 377 in FIG. 22 corresponds to a most recently received parameter value that corresponds to the PID corresponding to the parameter value, and/or a parameter value for that PID received most close in time to a time represented by the vertical cursor 294.

Figure 23:
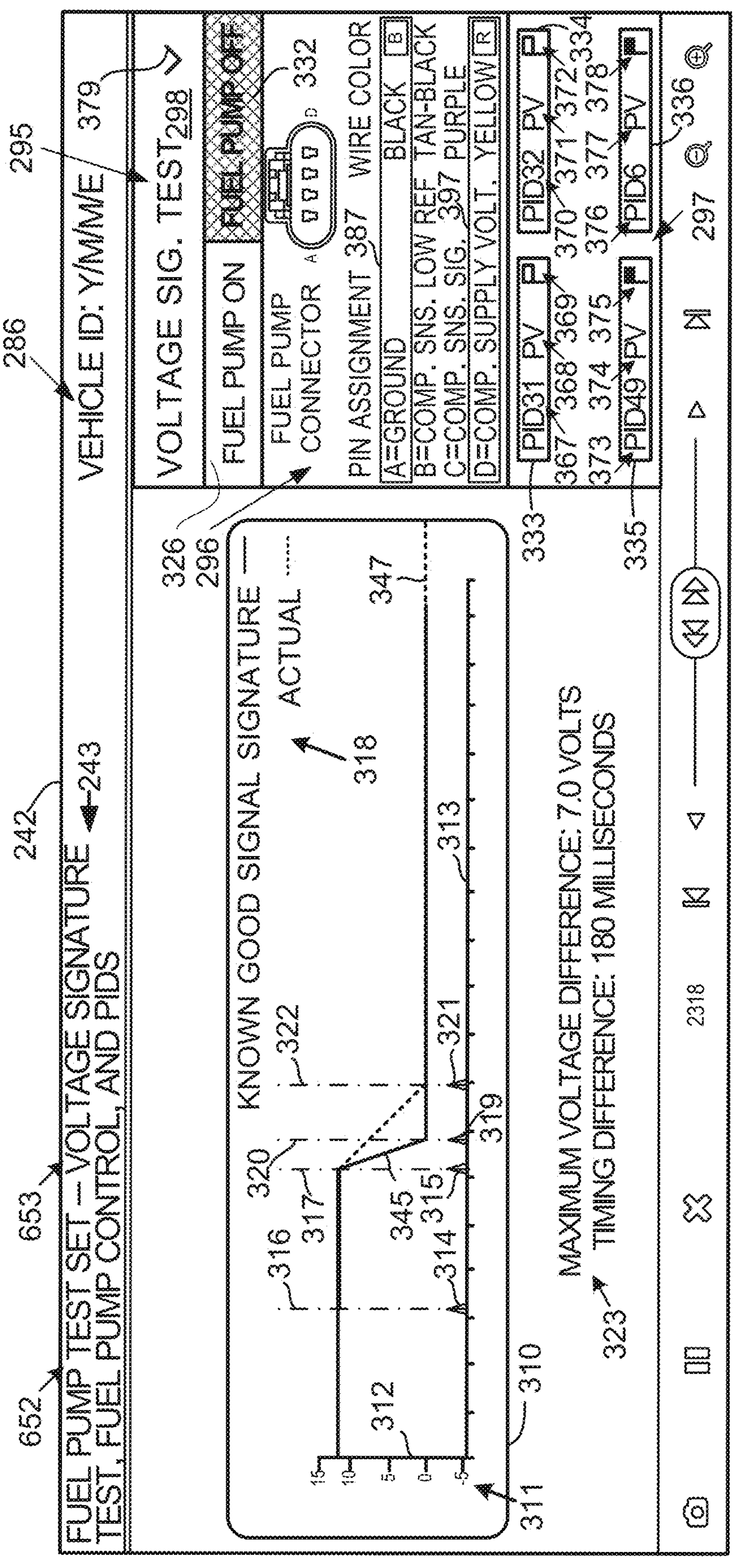

Next, FIG. 23 shows an alternative view of the GUI 242 (shown in FIG. 22). In FIG. 23, the GUI 242 includes a container 310 including a graph 311. The graph 311 includes a vertical axis 312 and a horizontal axis 313. The graph 311 includes the waveform representation 345 and the waveform representation 347, although the waveform representation 347 has been adjusted (e.g., slid rightward) so a portion of the waveform representation 345 corresponding to the icon 346 and a portion of the waveform representation 347 corresponding to the icon 348 overlap. In FIG. 23 those portions correspond to a time on the horizontal axis 313 at an icon 315 and a cursor 317. In other words, the icon 315 and the cursor 317 are indicative of a time corresponding to when the functional test corresponding to a time when the USC 332 was selected and/or a time corresponding to when the computing system 4 transmits a message to the vehicle 12 to request the vehicle to perform a functional test corresponding to the USC 332.

Additionally, the graph 311 includes an icon 314 and a cursor 316 indicative of a time when the meter 328 or the oscilloscope 329 started measuring a voltage of the signal represented by the waveform representation 347. The graph 311 also includes a legend 318 to provide an indication as to what the waveform representation 345, 347 represents.

The processor 250 can compare the waveform representation 345 and the waveform representation 347 to each other and to one or more thresholds. The result(s) of those comparison(s) can indicate whether a vehicle component is malfunctioning or functioning as expected. As an example, the graph 311 includes an icon 319 and a cursor 320 indicative of a time along the horizontal axis at which a maximum difference in the waveform representation 345 and the waveform representation 347 occurs. As another example, the graph 311 includes an icon 321 and a cursor 322. The icon 321 and the cursor 322 in conjunction with another icon and cursor, such as the icon 315 and the cursor 317 can indicate a time range in which a difference between the waveform representation 345 and the waveform representation 347 exceeded a threshold. The GUI 242 in FIG. 23 includes a notification 323 regarding determinations made by comparing the waveform representation 345 and the waveform representation 347 to each other and/or one or more thresholds.

Figure 24:
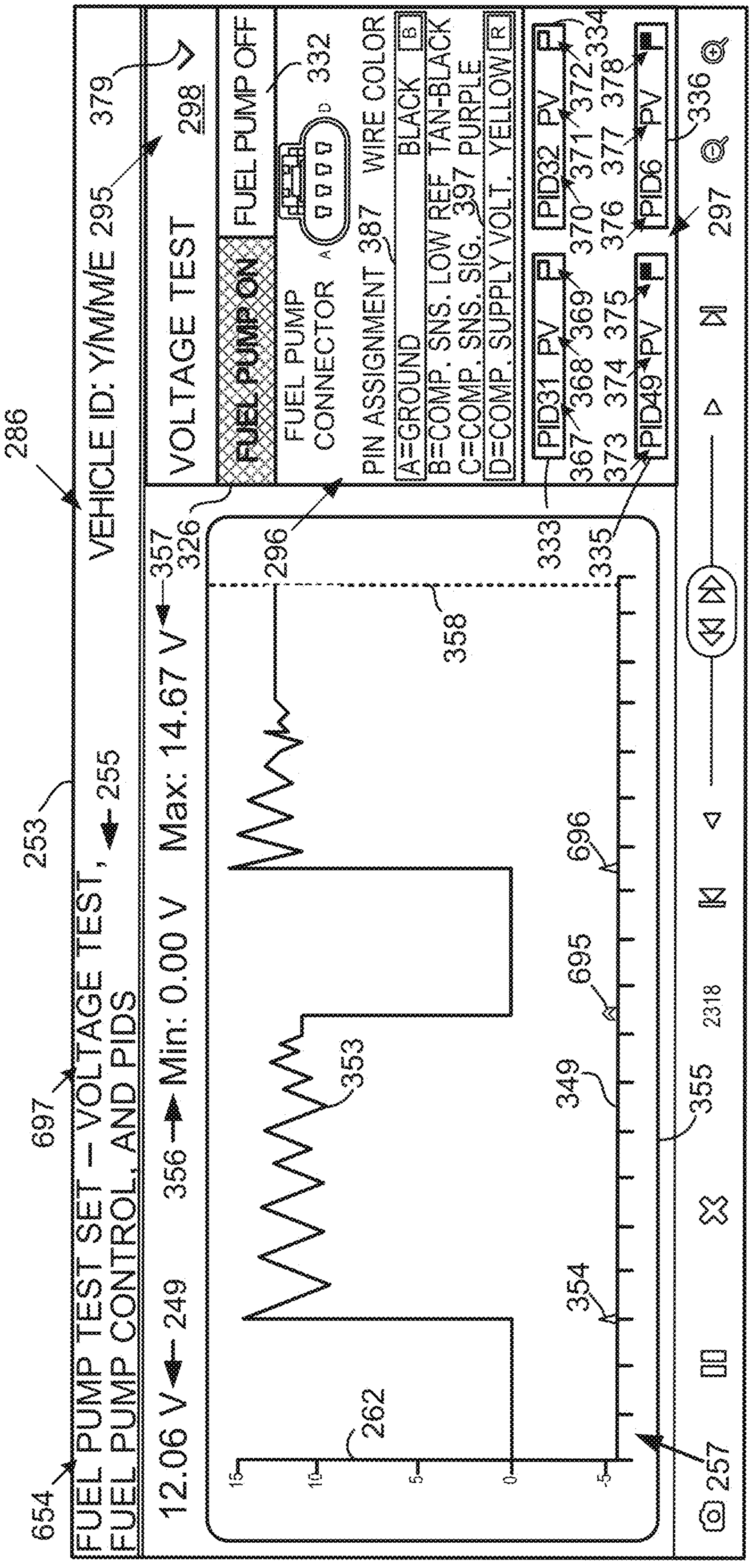

Next, FIG. 24 shows a GUI 253 having a GUI identifier 255 that includes a test set name 654 (i.e., "Fuel Pump Test Set") and a test set descriptor 697 that indicates a component test (i.e., "Voltage Test") and a functional component control (i.e., fuel pump control), and that PIDs are requestable using the test set. In at least some implementations, the GUI 253 is displayed in response to selecting: the USC 240 shown in FIG. 18, the USC 644 shown in FIG. 13, or a component test referred to as "voltage test" using the USC 298 and the drop-down arrow 379 when the USC 298 does not indicate "voltage test" (see, for example, FIG. 19 and FIG. 22). The GUI 253 includes a container 295, 296, 297, 355. The container 297 includes the sub-container 333, 334, 335, 336. The container 295, 296, 297 are described above with respect to FIG. 19. A difference between the container 295 shown in FIG. 19 and the container 295 shown in FIG. 24 is that a selected component test identified in the USC 298 is "Voltage Signature Test" in FIG. 19 and a selected component test identified in the USC 298 is "Voltage Test" in FIG. 24.

The container 355 includes a graph 257 including a vertical axis 262 representing an amplitude (e.g., a voltage amplitude) and a horizontal axis 349 representing time, and a waveform representation 353 of a signal measured on a vehicle component within a vehicle corresponding to the vehicle identifier 286 during performance of component and functional tests selected using a USC within the container 295. For FIG. 24, those tests include a voltage test for an electric fuel pump, and a functional test to turn the electric fuel pump on. The graph 257 also includes an icon 354, 695, 696 in proximity to (e.g., on and/or adjacent to) the horizontal axis 349, and a vertical cursor 358 indicative of a current time on the horizontal axis 349.

The icon 354 is indicative of a time corresponding to a time when the functional test corresponding to the USC 326 was selected a first time during the time represented by the horizontal axis 349 and/or a time corresponding to when the computing system 4 transmits a message to the vehicle 12 to request the vehicle to perform a functional test corresponding to the USC 326. A portion of the waveform representation 353 can represent a measurement of the signal before or after performance of a functional test selected using the USC 326 a first time within the container 355. That portion of the waveform representation 353 is for time to the left of the icon 354 and for time to the right of the icon 695.

The icon 695 is indicative of a time corresponding to a time when the functional test corresponding to the USC 332 was selected, and/or a time corresponding to when the computing system 4 transmits a message to the vehicle 12 to request the vehicle to perform a functional test corresponding to the USC 332. That message can include a request for an ECU within the vehicle to turn an electric fuel pump off.

The icon 696 is indicative of a time corresponding to a time when the functional test corresponding to the USC 326 was selected a second time during the time represented by the horizontal axis 349 and/or a time corresponding to when the computing system 4 transmits a message to the vehicle 12 to request the vehicle to perform a functional test corresponding to the USC 326.

The container 355 includes a textual measurement 249, 356, 357. As an example, the textual measurement 249 represents, textually, a measurement made by the meter 328 at a time represented by the vertical cursor 358. In at least some implementations, the vertical cursor 358 can be moved horizontally. As the vertical cursor 358 moves horizontally, the textual measurement 249 shows the measurement made at the time represented by the vertical cursor 358 or at a time a most-recent measurement was made before the time represented by the vertical cursor 358.

In at least some implementations, the textual measurement 356 represents, textually, a minimum measurement value made by the meter 328 since a time corresponding to the icon 354. In other implementations, the textual measurement 356 represents, textually, a minimum measurement value made by the meter 328 or the oscilloscope 329 and currently shown within the GUI 253 or a minimum measurement value made by the meter 328 or the oscilloscope 329 since starting its measurements for the component test selected using the USC 298.

In at least some implementations, the textual measurement 357 represents, textually, a maximum measurement value made by the meter 328 since a time corresponding to the icon 354. In other implementations, the textual measurement 357 represents, textually, a maximum measurement value made by the meter 328 or the oscilloscope 329 and currently shown within the GUI 253 or a maximum measurement value made by the meter 328 or the oscilloscope 329 since starting its measurements for the component test selected using the USC 298.

Figure 25:
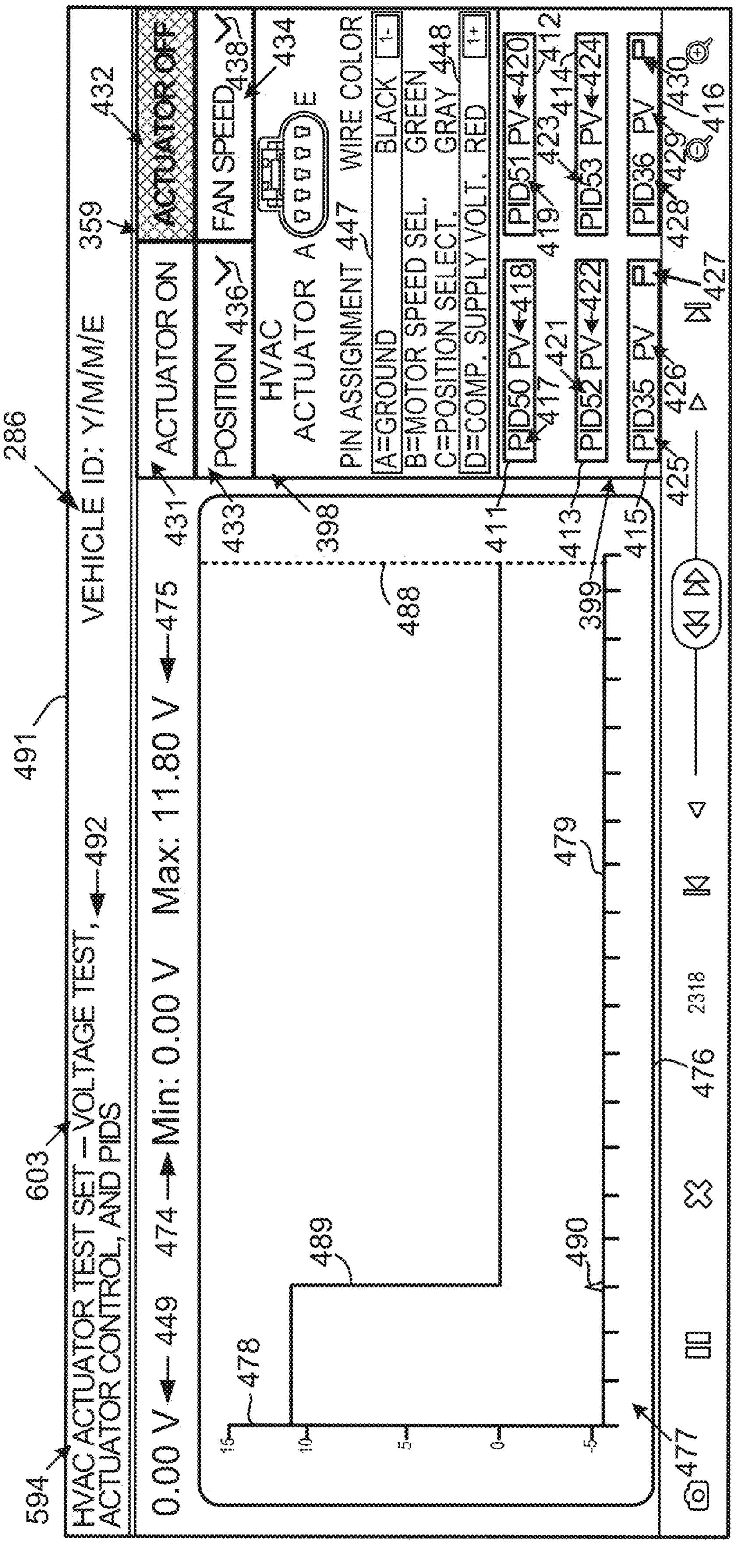

Next, FIG. 25 shows a GUI 491 having a GUI identifier 492 that includes a test set name 594 (i.e., "HVAC Actuator Test Set") and a test set descriptor 603 that indicates a component test (i.e., "Voltage Test") and a functional component control (i.e., an HVAC actuator control), and that PIDs are requestable using the test set. In at least some implementations, the GUI 491 is displayed in response to selecting: a USC from a GUI including information for starting a test set, similar to the USC 240 in the GUI 237 shown in FIG. 18, or the USC 698 shown in FIG. 13. The GUI 491 includes a container 359, 398, 399, 476. The container 399 includes a sub-container 411, 412, 413, 414, 415, 416.

The container 359 includes a USC 431, 432, 433, 434. The USC 431, 432 is configured to allow a user to select a functional test and to cause the processor 250 to transmit a VDM to the vehicle 12 to request functional control of a component within the vehicle 12. As an example, a component corresponding to the functional test for the USC 431, 432 can include an HVAC actuator within the vehicle 12, the VDM sent in response to selection of the USC 431 includes a functional test request to turn the HVAC actuator on, and the VDM sent in response to selection of the USC 432 includes a functional test request to turn the HVAC actuator off. The processor 250 can highlight or otherwise indicate which USC of the USC 431 and the USC 432 was most recently selected and/or a selected operational state of the component corresponding to the USC 431, 432. FIG. 25 includes shading within the USC 432 to indicate that the USC 432 was selected more recently than the USC 431.

The USC 433 is configured to allow a user to select a setting of the component corresponding to the functional test for the USC 431, 432. As an example, in at least some implementations, the USC 433 includes a drop-down arrow 436 selectable to cause the processor 250 to display within the USC 433 a list of one or more positions of the HVAC actuator that can be selected for the vehicle identified by the vehicle identifier 286. In at least some implementations, in response to making a selection using the USC 433, the processor 250 transmits a VDM to the vehicle 12 to request the component corresponding to the functional test for the USC 431, 432 to be set at a position selected using the USC 433. In at least some implementations, the processor 250 transmits that VDM if the HVAC actuator is in the "On" state, but does not transmit that VDM if the HVAC actuator is in the "Off" state.

The USC 434 is configured to allow a user to select a setting of the component corresponding to the functional test for the USC 431, 432. As an example, in at least some implementations, the USC 434 includes a drop-down arrow 438 selectable to cause the processor 250 to display within the USC 434 a list of one or more fan speeds of the HVAC actuator that can be selected for the vehicle identified by the vehicle identifier 286. In at least some implementations, in response to making a selection using the USC 434, the processor 250 transmits a VDM to the vehicle 12 to request the component corresponding to the functional test for the USC 431, 432 to be set at a fan speed selected using the USC 434. In at least some implementations, the processor 250 transmits that VDM if the HVAC actuator is in the "On" state, but does not transmit that VDM if the HVAC actuator is in the "Off" state.

The container 398 includes guidance for a user to carry out a component test identified by the GUI identifier 492. In at least some implementations, the container 398 includes an image of a connector and connector pin layout for connector pins within the connector, such as connector pins A to D of an electrical circuit connector. As an example, the connector shown in the container 398 can include a connector configured to connect to an HVAC actuator. Moreover, the guidance within the container 398 can include circuit identifiers for electrical circuits connected to connector pins A to D. As an example, the circuit identifiers can include a circuit name and/or a color identifier of an electrical circuit connected to a connector pin A to D.

The container 398 includes a test point indicator 447, 448. The test point indicator 447 corresponds to a test point at which a first probe of the probe 305 is to be connected for a component test. The test point indicator 448 corresponds to a test point at which a second probe of the probe 305 is to be connected for a component test. As an example, the first probe can be a ground clip of an oscilloscope test lead (indicated by a "1−" within a rectangle within the test point indicator 447), and the second probe can be a probe tip of an oscilloscope test lead (indicated by a "1+" within a rectangle within the test point indicator 448). The numeral "1" in the test point indicator 447, 448 can correspond to a channel number of the oscilloscope 329.

The sub-container 411 includes a textual PID 417 and a parameter value 418 corresponding to the textual PID 417. As an example, the textual PID 417 can be "HVAC Actuator Direction" (i.e., PID50 in the PID index 90), and the parameter value 418 can be a non-numeric status value, such as "Stop."

The sub-container 412 includes a textual PID 419 and a parameter value 420 corresponding to the textual PID 419. As an example, the textual PID 419 can be "HVAC Fan Motor Switch" (i.e., PID51 in the PID index 90), and the parameter value 420 can be a non-numeric status value, such as "Off."

The sub-container 413 includes a textual PID 421 and a parameter value 422 corresponding to the textual PID 421. As an example, the textual PID 421 can be "HVAC Motor Speed (%)" (i.e., PID52 in the PID index 90), and the parameter value 422 can be a numerical percentage value between 0 and 100 percent, such as "0."

The sub-container 414 includes a textual PID 423 and a parameter value 424 corresponding to the textual PID 423. As an example, the textual PID 423 can be "HVAC Interior Ambient Air Temperature (degrees)" (i.e., PID53 in the PID index 90), and the parameter value 424 can be a temperature in degrees Fahrenheit, such as "71°," or a different temperature scale such as the Celsius temperature scale.

The sub-container 415 includes a textual PID 425, a flag 427, and a parameter value 426 corresponding to the textual PID 425. As an example, the textual PID 425 can be "Air Conditioning High Side Pressure (PSI)," and the parameter value 426 can be a pressure value in pounds per square inch, such as "0," or in different units such as, kPa.

The sub-container 416 includes a textual PID 428, a flag 430, and a parameter value 429 corresponding to the textual PID 428. As an example, the textual PID 428 can be "Air Conditioning Low Side Pressure (PSI)," and the parameter value 429 can be a pressure value in pounds per square inch, such as "0," or in different units such as, kPa.

The flag 427, 430 in FIG. 25 is a white flag. A description of a white flag is described above.

The container 476 includes a graph 477 including a vertical axis 478 representing an amplitude (e.g., a voltage amplitude) and a horizontal axis 479 representing time, and a waveform representation 489 of a signal measured with respect to a vehicle component within a vehicle corresponding to the vehicle identifier 286 during performance of a functional test and setting selection selected using a USC within the container 359, and a component test identified by the GUI identifier 492. For FIG. 25, those tests include a voltage test for an HVAC actuator, and a functional test to turn the HVAC actuator off. The graph 477 also includes an icon 490 on the horizontal axis 479, and a vertical cursor 488 indicative of a current time on the horizontal axis 479. The icon 490 is indicative of a time corresponding to a time when the functional test corresponding to the USC 432 was selected and/or a time corresponding to when the computing system 4 transmits a message to the vehicle 12 to request the vehicle to perform a functional test corresponding to the USC 432. A portion of the waveform representation 489 can represent a measurement of the signal before or after performance of a functional test selected using the USC 432. That portion of the waveform representation 489 is for time to the left of the icon 490.

The container 476 includes a textual measurement 449, 474, 475. As an example, the textual measurement 449 represents, textually, a measurement made by the meter 328 or the oscilloscope 329 at a time represented by the vertical cursor 488. In at least some implementations, the vertical cursor 488 can be moved horizontally. As the vertical cursor 488 moves horizontally, the textual measurement 449 shows the measurement made at the time represented by the vertical cursor 488 or at a time a most-recent measurement was made before the time represented by the vertical cursor 488.

In at least some implementations, the textual measurement 474 represents, textually, a minimum measurement value made by the meter 328 or the oscilloscope 329 since a time corresponding to the icon 490. In other implementations, the textual measurement 474 represents, textually, a minimum measurement value made by the meter 328 or the oscilloscope 329 and currently shown within the GUI 491 or a minimum measurement value made by the meter 328 or the oscilloscope 329 since starting its measurements for the component test selected using the USC 432.

In at least some implementations, the textual measurement 475 represents, textually, a maximum measurement value made by the meter 328 or the oscilloscope 329 since a time corresponding to the icon 490. In other implementations, the textual measurement 475 represents, textually, a maximum measurement value made by the meter 328 or the oscilloscope 329 and currently shown within the GUI 491 or a maximum measurement value made by the meter 328 or the oscilloscope 329 since starting its measurements for the component test selected using the USC 432.

Figure 26:
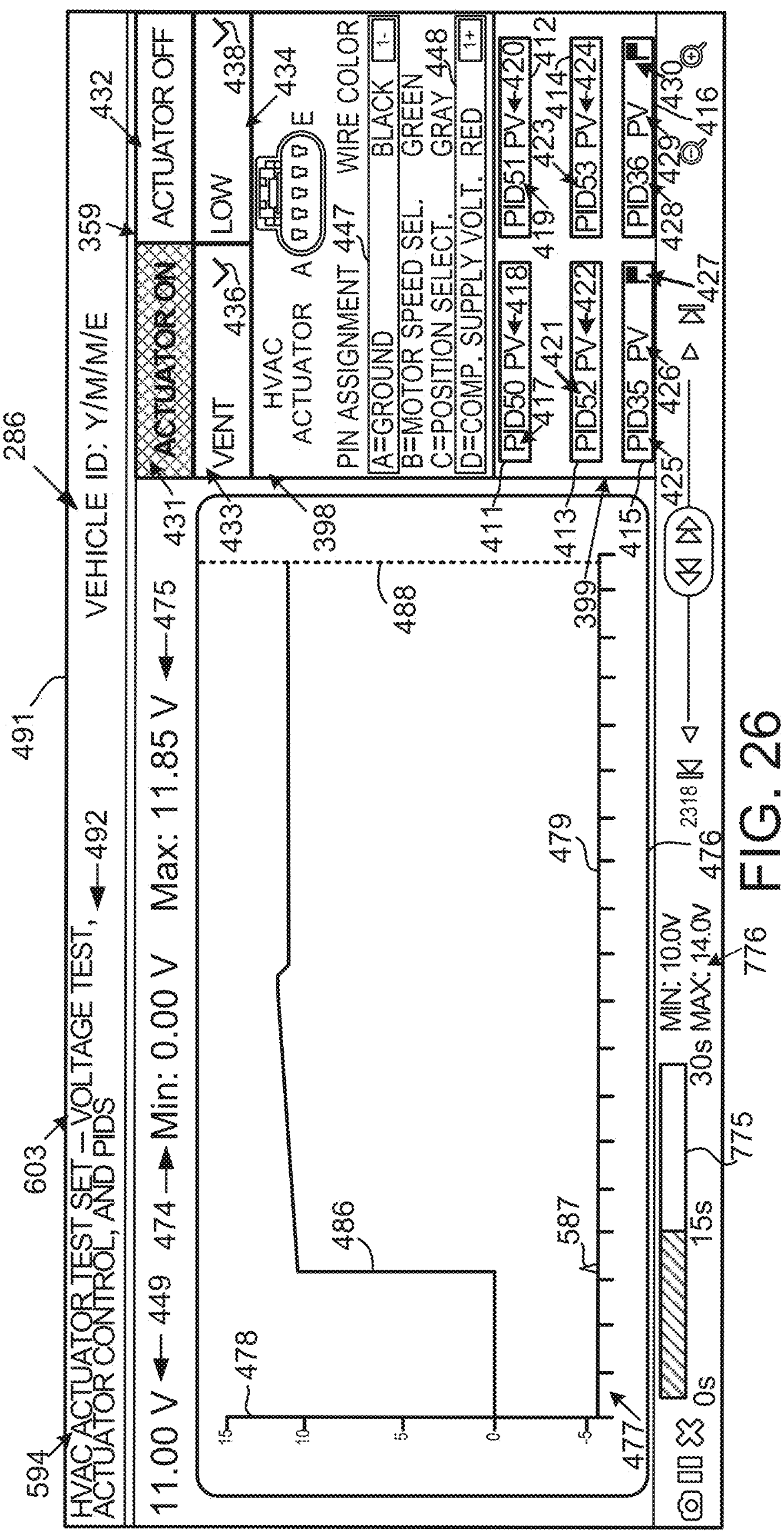

Next, FIG. 26 shows an alternative view of the GUI 491 (shown in FIG. 25). In FIG. 26, the USC 431 has been selected instead of the USC 432, as shown in FIG. 25. Selection of the USC 431 causes the processor 250 to transmit a VDM including a request to turn an HVAC actuator in the vehicle 12 on. FIG. 26 includes shading within the USC 431 to indicate that the USC 431 was selected more recently than the USC 432 and/or a state of the HVAC actuator.

In FIG. 26, the USC 433 shows that a “Vent” position has been selected using the USC 433 and a “Low” fan speed has been selected using the 434.

The container 476 includes the graph 477, although in FIG. 26, the graph 477 includes a waveform representation 486 of a signal measured on a vehicle component within a vehicle corresponding to the vehicle identifier 286 during performance of a functional test and based on selections made using a USC within the container 359, and the component test identified by the GUI identifier 492. For FIG. 26, those tests include a voltage test for an HVAC actuator, and a functional test to turn an HVAC actuator on. The graph 477 also includes an icon 587 on the horizontal axis 479. The icon 587 is indicative of a time corresponding to when the functional test corresponding to a time when the USC 431 was selected and/or a time corresponding to when the computing system 4 transmits a message to the vehicle 12 to request the vehicle to perform a functional test corresponding to the USC 431. A portion of the waveform representation 486 can represent a measurement of the signal before or after performance of a functional test selected using a USC within the container 295. A portion of the waveform representation 486 corresponding to time to the left of the icon 587 represents a measurement before the HVAC actuator is turned on using the USC 431.

In at least some implementations, the parameter value 418, 420, 422, 424, 426, 429 in FIG. 26 corresponds to a most recently received parameter value that corresponds to the PID corresponding to the parameter value, and/or a parameter value for that PID received most close in time to a time represented by the vertical cursor 488.

After the USC 431 is selected to request control of the HVAC actuator to the on state, as an example, the parameter value 418 can be a non-numeric status value, such as “Active,” the parameter value 420 can be a non-numeric status value, such as “On,” the parameter value 422 can be a percentage value, such as “33%,” the parameter value 424 can be a temperature value, such as “10° C.,” the parameter value 426 can be a temperature value, such as “90° C.,” and the parameter value 429 can be a temperature value, such as “12° C.”

The flag 427, 430 in FIG. 26 is a black flag. A description a black flag is described above. The processor 250 can display the flag 427 as black because a prior and/or current value of the parameter value 426 exceeds and/or breaches a threshold corresponding to the textual PID 425. The processor 250 can display the flag 430 as black because a prior and/or current value of the parameter value 429 exceeds and/or breaches a threshold corresponding to the textual PID 428.

Next, FIG. 27 shows a GUI 756 having a GUI identifier 757 that includes a test set name 758 (i.e., “Fuel Pump Test Set”) and a test set descriptor 759 indicating the test set provides for functional control of a component (e.g., an electric fuel pump) and requesting PIDs. In at least some implementations, the GUI 756 is displayed in response to selecting the USC 645 shown in FIG. 13 or in response to selecting a test referred to as “Fuel Pump Control and PIDs” using a drop-down arrow 778 within the USC 777 when the USC 777 does not indicate that test.

The GUI 756 includes a container 779, 780, 781, 782, 783, 787, 788, 880. The container 787 includes a set of thresholds corresponding to PIDs represented in the container 780, 781, 782, 783. In at least some implementations, the set of thresholds corresponding to PIDs can be dependent upon a state of the vehicle 12 or a component within the vehicle 12. As an example, the set of thresholds corresponding to PIDs can depend upon a state of a component being tested via a test set. For the GUI 756, the set of thresholds corresponding to the PIDs represented in the container 780, 781, 782, 783 depends upon an on/off state of the fuel pump within the vehicle 12. This can be seen by comparing the set of thresholds in the container 787 shown in FIG. 27 (when the fuel pump has been commanded to an on state) versus the set of thresholds in the container 787 shown in FIG. 29 (when the fuel pump has been commanded to an off state).

The container 779 includes a USC 777, 784, 785, 786. The USC 777 includes the drop-down arrow 778 selectable to display one or more other tests that can be selected using the USC 777. The USC 784 is selectable to select an on state for an electric fuel pump within a vehicle operatively connected to the computing system 4 and the USC 785 is selectable to select an off state for the fuel pump within the vehicle. In response to determining the USC 784 is selected, the processor 250 transmits a VDM including a request to turn the fuel pump on. Similarly, in response to determining the USC 785 is selected, the processor 250 transmits a VDM including a request to turn the fuel pump off.

The USC 786 is selectable to select an amount of time to control a component in the vehicle 12. As an example, the USC 786 can include a drop-down arrow selectable to cause a set of selectable control times. As an example, the set of selectable control times can include the following time settings: 1 second, 5 seconds, 15 seconds, 30 seconds, and constant. The constant time setting can indicate to remain in the state selected using the USC 784 or the USC 785 while the GUI 756 is being displayed. Other GUIs described in this description can include a USC selectable to select an amount of time to control a component in the vehicle 12. The processor 250 can automatically send a VDM to the vehicle 12 including a request to change a state of a vehicle component after that vehicle component has operated in a different state as a result of selecting the USC 784 or the USC 785. The container 788 includes a time indicator 794 corresponding to a control time indicated by the USC 786. In FIG. 27, the time indicator 794 includes a shaded segment 795 that increasingly covers more of the time indicator 794 as the amount of time the fuel pump operates in the on-state increases after a selection of the USC 784. FIG. 27 represents that an electric fuel pump in the vehicle 12 has been in the on-state in response to a selection of the USC 784 for 15 seconds and is scheduled to remain in the on-state for another 15 seconds. In at least some implementations, the time indicator 794 can include a digital, numeric representation of the amount of time the fuel pump has operated in the on-state after a selection of the USC 784 or the off state after a selection of the USC 785.

The container 780, 781, 782, 783 includes a graph including an axis description 789, a PID identifier 790, a cursor 791, a flag 792, and a graphical representation 793. The graphical representation 793 in the container 780, 781, 782, 783 corresponds to parameter values received from the vehicle 12 for a PID indicated by the PID identifier 790 in that same container. The PID identifier 790 includes a digital, numeric present value (PV) of the corresponding PID. In at least some implementations, the PV corresponds to a PID parameter value at or closest in proximity to the cursor 791 within the graph for that PID. The PID identifier 790 also includes a minimum value and maximum value for parameter values corresponding to PID indicated by the PID identifier 790. In at least some implementations, the minimum value and the maximum value within the PID identifier 790 are limited to parameter values currently displayed in the container 780, 781, 782, 783 corresponding to that PID identifier. In at least some implementations, the minimum value and the maximum value within the PID identifier 790 can represent parameter values that were received prior to all of the parameter values currently displayed in the container 780, 781, 782, 783 corresponding to that PID identifier. The container 781 includes a flag 796 along a horizontal axis of the graph in the container 781 to indicate a time where a threshold value corresponding to a PID indicated by the PID identifier 790 in the container 781 was breached by a PID parameter value output by the vehicle 12.

Figure 28:
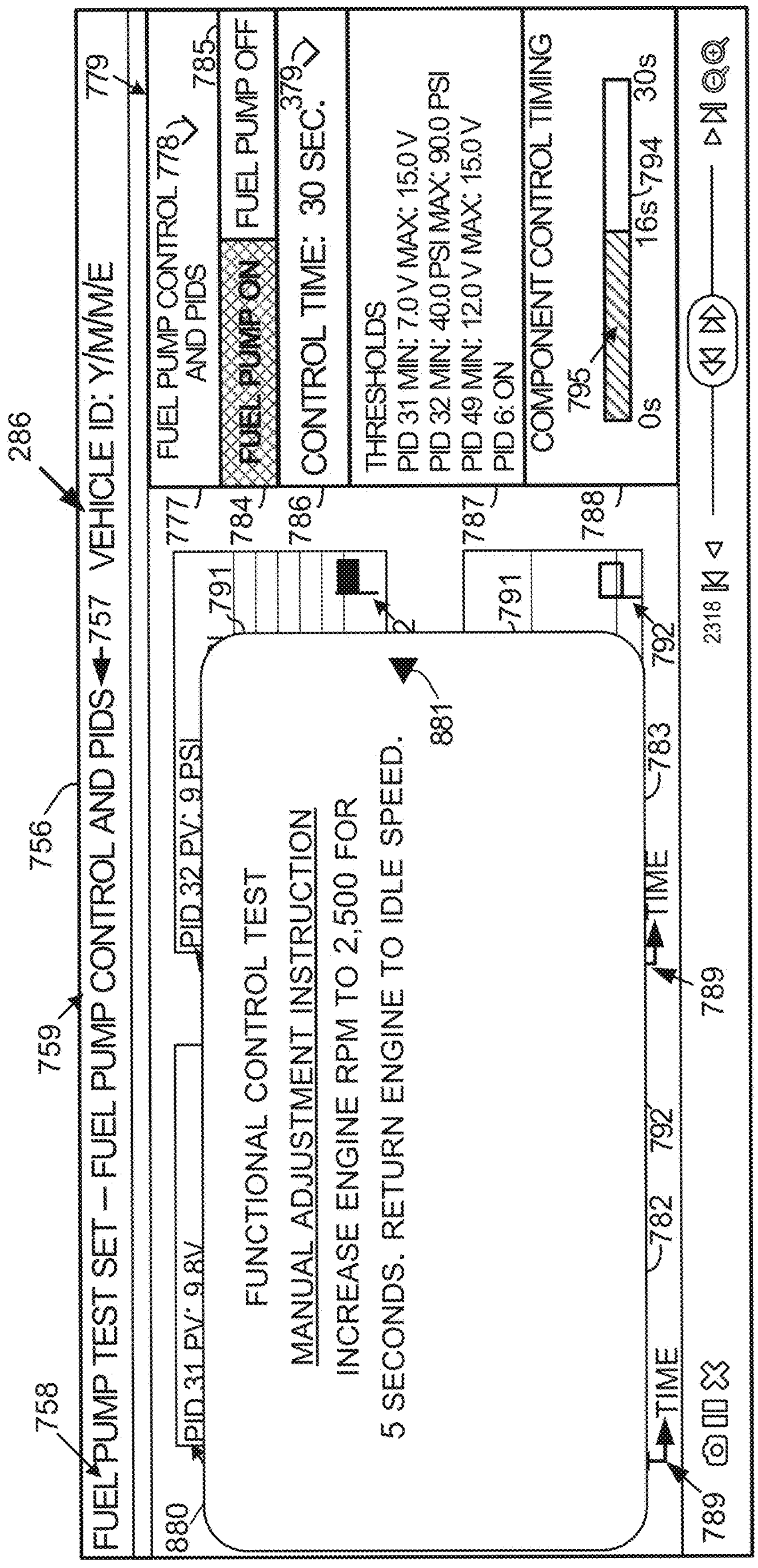
FIG. 28, FIG. 29, FIG. 30, FIG. 31, FIG. 32, FIG. 33, FIG. 34, FIG. 35, FIG. 36, FIG. 37, FIG. 38, FIG. 39, and FIG. 40 show an example GUI in accordance with the example implementations.

The container 880 includes a container resizing USC 881. The processor 250 can change a size of the container 880 in response to a selection of the container resizing USC 881. For example, the processor 250 can increase a size of the container 880. FIG. 28 shows an example of the container 880 in a larger size as compared to the size of the container 880 shown in FIG. 27. Likewise, the processor 250 can decrease a size of the container 880. For example, in response to a selection of the container resizing USC 881 as shown in FIG. 28, the processor 250 can decrease the size of the container 880 so that it has the size shown in FIG. 27. As another example, the processor 250 can automatically increase a size of the container 880 in response to an occurrence of a particular event. As an example, the particular event can be the timer corresponding to the time indicator 794 reaching a particular time, such as 16 seconds.

FIG. 28 shows an alternative view of the GUI 756. In this view, the time indicator 794 represents that a timer associated with the time indicator has reached 16 seconds. Additionally, the container 880 is in its expanded size relative to its size in FIG. 27. The container 880 includes a manual instruction corresponding to the test set indicated by the test set name 758 and the test set descriptor 759. A test set can include instructions the processor 250 executes to output a manual instruction at an appropriate time before, during or after running at least a portion of the test set.

The GUI 756 in FIG. 28 also shows that the threshold for PID (32) shown in the container 787 has changed with respect to the value of that threshold shown in FIG. 27. In at least some implementations, a threshold corresponding to a PID changes in response to the processor 250 determining the vehicle changes operating conditions. In at least some implementations, a threshold corresponding to a PID changes based on a request to change operating conditions of the vehicle, such as the request to change operating conditions of the vehicle in the container 880.

Next, FIG. 29 shows another alternative view of the GUI 756 (a first view is shown in FIG. 27). In FIG. 29, the GUI 756 shows the USC 785 has been selected rather than the USC 784 as shown in FIG. 27 and FIG. 28. Additionally, an amount of time shown in the USC 786 is 15 seconds instead of 30 seconds as shown in FIG. 27. In at least some implementations, the 15 second time is selectable by selecting the time via the drop-down arrow 379. As discussed above, the set of thresholds in the container 787 shown in FIG. 29 (when the fuel pump has been commanded to an off state) are different than the set of thresholds in the container 787 shown in FIG. 27 (when the fuel pump has been commanded to an on state).

The time indicator 794 in the container 788 corresponds to a control time indicated by the USC 786. In FIG. 29, the shaded segment 795 increasingly covers more of the time indicator 794 as the amount of time the fuel pump operates in the off-state increases after a selection of the USC 785. FIG. 29 represents that an electric fuel pump in the vehicle 12 has been in the off state in response to a selection of the USC 785 for about 2.5 seconds and is scheduled to remain in the on-state for another 12.5 seconds.

In FIG. 29, the container 780, 781, 782, 783 includes an icon 797 to indicate a transmission time corresponding to transmission of a functional test command to request turning the fuel pump off and/or a VDM including the functional test command, relative to the graphical representation 793.

A test set can include thresholds that correspond to a first PID and those thresholds are based on a state of a vehicle component indicated by a second PID different than the first PID. As an example, the parameter values corresponding to the first PID can represent different duty cycles. The thresholds corresponding to the first PID can include first and second minimum duty cycle thresholds and first and second maximum duty cycle thresholds. The parameter values corresponding to the second PID can indicate that the vehicle component is powered on or off. The first minimum duty cycle threshold and the first maximum duty cycle threshold are used when second PID parameter value(s) indicate the vehicle component is powered on. The second minimum duty cycle threshold and the second maximum duty cycle threshold are used when second PID parameter value(s) indicate the vehicle component is powered off. As an example, the vehicle component can be a solenoid, such as a canister purge solenoid within the vehicle 12.

Next, FIG. 30 shows a GUI 798 having a GUI identifier 799 that includes a test set name 807 (i.e., "Fuel Pump Test Set") and a test set descriptor 808 that indicates a component test (i.e., "Voltage Signature Test"), and that PIDs are requestable using the test set. In at least some implementations, the GUI 798 is displayed in response to selecting: the USC 240 shown in FIG. 18, the USC 646 shown in FIG. 13, or a component test referred to as "voltage signature test" using the USC 298 and a drop-down arrow 379 when the USC 298 does not indicate "voltage signature test" (see, for example, FIG. 24). The GUI 798 includes a container 816, 818, 820, 822, 824. The container 816 is identical to the container 287 shown in FIG. 22. The description of the content of the container 287 with respect to FIG. 22 is applicable to the content of the container 816. The container 822 includes the same content as the container 296 shown in FIG. 19 and FIG. 22. The description of the content of the container 296 is applicable to the content of the container 822.

The container 820 includes the USC 298, which is also shown in and described with respect to FIG. 19 and FIG. 22. That description of the USC 298 shown in FIG. 19 and FIG. 22 is applicable to the USC 298 shown in FIG. 30.

The container 818 is similar, but not identical to the container 288 shown in FIG. 22. The similarities include the container 288 and the container 818 both displaying the graph 344, the vertical axis 339, the horizontal axis 340, the waveform representation 347, the icon 348, the vertical cursor 294, and the cursor 694. As for differences, the container 818 includes a graphical representation 883 of parameter values corresponding to PID (31) and a legend 884 indicating that the graphical representation 883 corresponds to PID (31).

The container 824 is similar, but not identical to the container 297 shown in FIG. 22. The similarities include the container 297 and the container 824 both displaying the sub-container 333, 334, 335, 336. As for the differences, the container 824 includes a USC 882 for each of the sub-container 333, 334, 335, 336 and/or the PIDs within those containers. The USC 882 is selectable to cause the processor 250 to output within the graph 344 in the container 818 a graphical representation of parameter values corresponding to a PID. The "X" within the USC 882 adjacent the container 333 indicates that the USC 882 has been selected to request display of the corresponding parameter values. The USC 882 adjacent the sub-container 334, 335, 336 are empty (e.g., do not include an "X") to represent that the USC 882 has not yet been selected or has been selected while the container included an X and the graph 344 in the container 818 was displaying parameter values corresponding to a PID and that USC 882.

Figure 31:
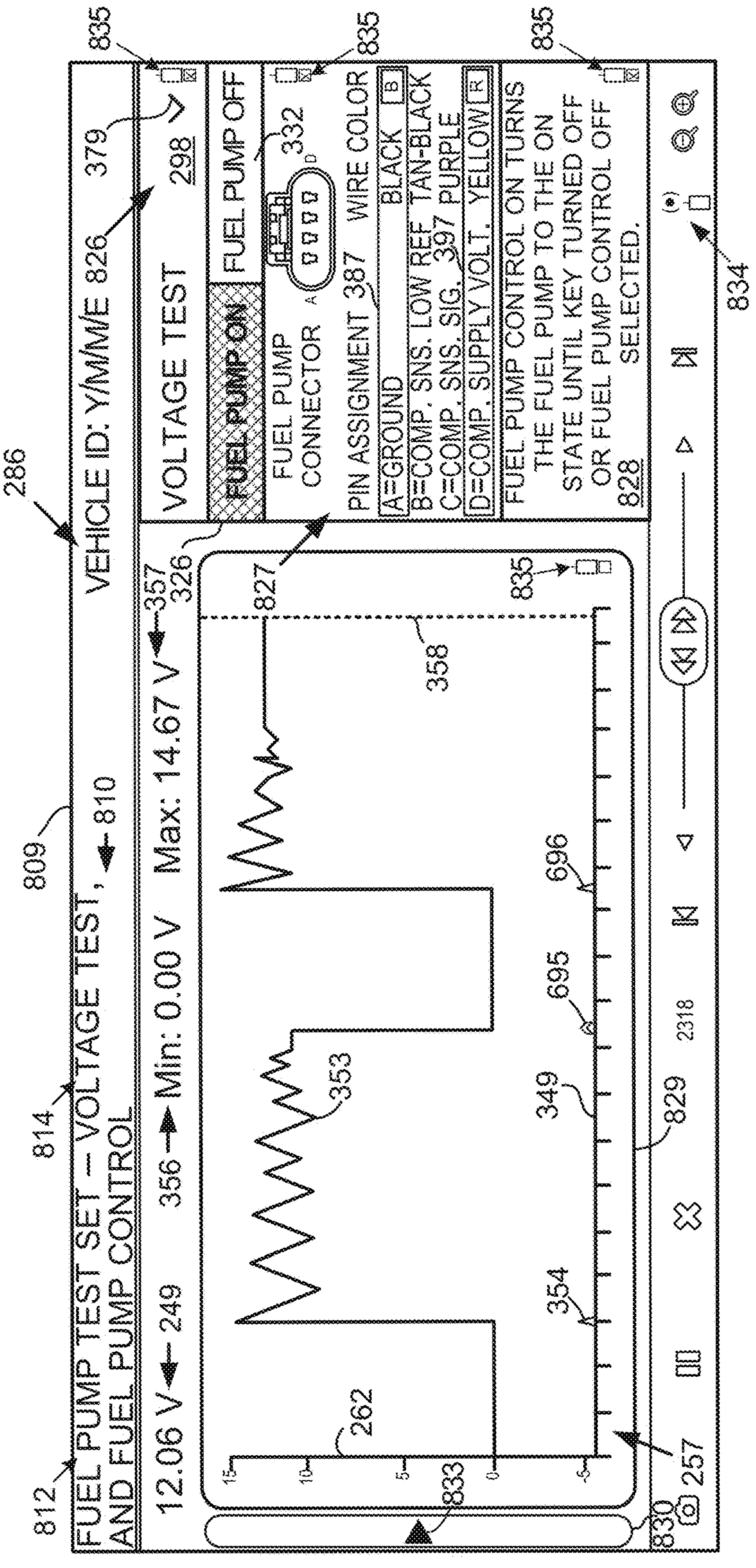

Next, FIG. 31 shows a GUI 809 having a GUI identifier 810 that includes a test set name 812 (i.e., "Fuel Pump Test Set") and a test set descriptor 814 that indicates a component test (i.e., "Voltage Test") and a functional component control (i.e., fuel pump control). In at least some implementations, the GUI 809 is displayed in response to selecting: the USC 240 shown in FIG. 18, the USC 647 shown in FIG. 13, or a component test referred to as "voltage test" using the USC 298 and the drop-down arrow 379 when the USC 298 does not indicate "voltage test" (see, for example, FIG. 19 and FIG. 22).

The GUI 809 includes a container 826, 827, 828, 829, 830. The container 826, 827 is identical to the container 295, 296, respectively (shown in FIG. 19), except that the container 826, 827 includes a USC 835. The description of the content of the container 295, 296 is applicable to the content of the container 826, 827, respectively.

As discussed previously, a GUI can include guidance regarding a test set. In at least some implementations, the guidance with a GUI can be contained within a container of the GUI. At least a portion of the guidance can be textual and/or graphical. Other forms of guidance within a GUI regarding a test set are also possible. As an example, the container 828 includes textual guidance regarding the functional control test of an electric fuel pump selectable using the USC 326, 332. The container 828 also includes the USC 835. The container 829 shown in FIG. 31 is identical to the container 355 shown in FIG. 24 except that the container 829 in FIG. 31 has a shorter width and includes the USC 835.

Figure 32:
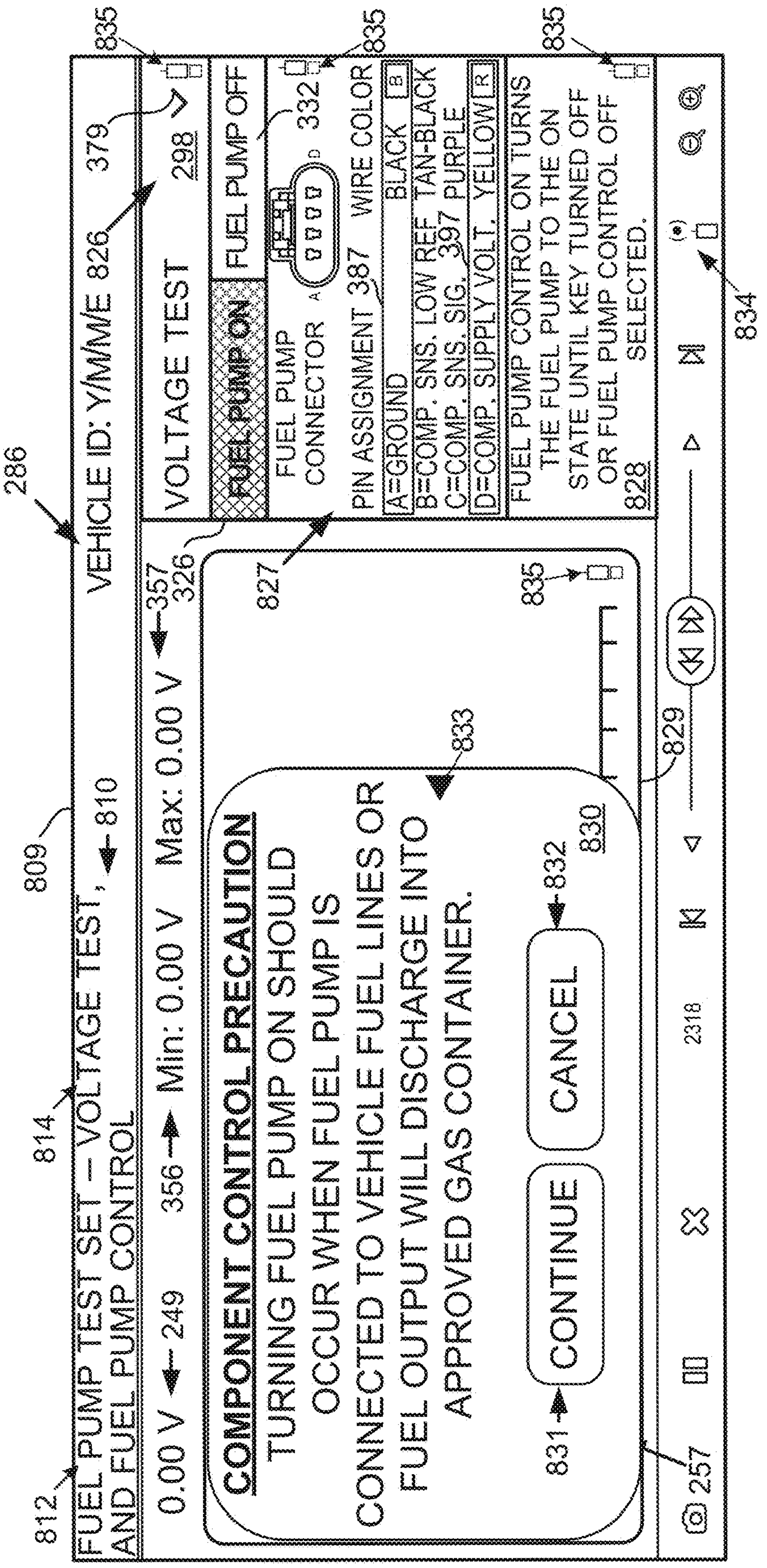

The container 830 includes a container resizing USC 833. The processor 250 can change a size of the container 830 in response to a selection of the container resizing USC 833. For example, the processor 250 can increase a size of the container 830. FIG. 32 shows an example of the container 830 in a larger size as compared to the size of the container 830 shown in FIG. 31. Likewise, the processor 250 can decrease a size of the container 830. For example, in response to a selection of the container resizing USC 833 as shown in FIG. 32, the processor 250 can decrease the size of the container 830 so that it has the size shown in FIG. 31.

The GUI 809 includes an icon 834 that indicates a companion device is operatively coupled to the computing system 4. As an example, the operative coupling can be a wireless communication connection using the BLUETOOTH® communication protocol or some other wireless communication protocol. As noted, the container 826, 827, 828, 829 includes the USC 835 which is selectable to cause the container including the USC 835 to be displayed on the companion device. In at least some implementations, the USC 835 is not displayed or is unelectable if the companion device and the computing system 4 are not operatively coupled to each other.

In FIG. 32, the GUI 809 shows the container 829 without the waveform representation 353. This can occur, for example, when the processor 250 has not yet transmitted a VDM including a request to turn the fuel pump on and/or when the USC 326 has not yet been selected. In FIG. 32, the textual measurement 249, 356, 357 is 0.0 volts. This can occur, for example, when the processor 250 has not yet transmitted a VDM including a request to turn the fuel pump on and/or when the USC 326 has not yet been selected. Additionally, FIG. 32 shows the container 830 expanded in size relative to a size of the container shown in FIG. 31.

The container 830 includes guidance regarding the functional control test of an electric fuel pump selectable using the USC 326. In at least some implementations, guidance output on the display 300 can include a precaution. The container 830 also includes a USC 831, 832. In at least some implementations, the processor 250 automatically displays the container 830 at an expanded size after detecting a section of the USC 326, but prior to the processor 250 transmitting a VDM to the vehicle 12 with a request to turn the fuel pump on.

A selection of the USC 831 can cause the processor 250 to decrease a size of the container 830 (such as a size of the container 830 shown in FIG. 31) and to transmit a VDM to the vehicle 12 with a request to turn the fuel pump on. In contrast, a selection of the USC 832 can also cause the processor 250 to decrease the size of the container 830, but without transmitting a VDM to the vehicle 12 with a request to turn the fuel pump on. Additionally, a selection of the USC 832 can cause the processor 250 to cancel the selection of the USC 326 that caused the container 830 to be displayed.

In at least some other implementations, a container can be configured as a pop-up container. The processor 250 can output a pop-up container on the display 300 after a selection of a USC corresponding to a functional control test of a vehicle component, but prior to transmitting a VDM with a request to perform that functional control. As an example, the container 830 can be configured as a pop-up container without the container resizing USC 833. A pop-up container can include a USC selectable to cause the processor 250 to remove the pop-up container from the display.

Figure 33:
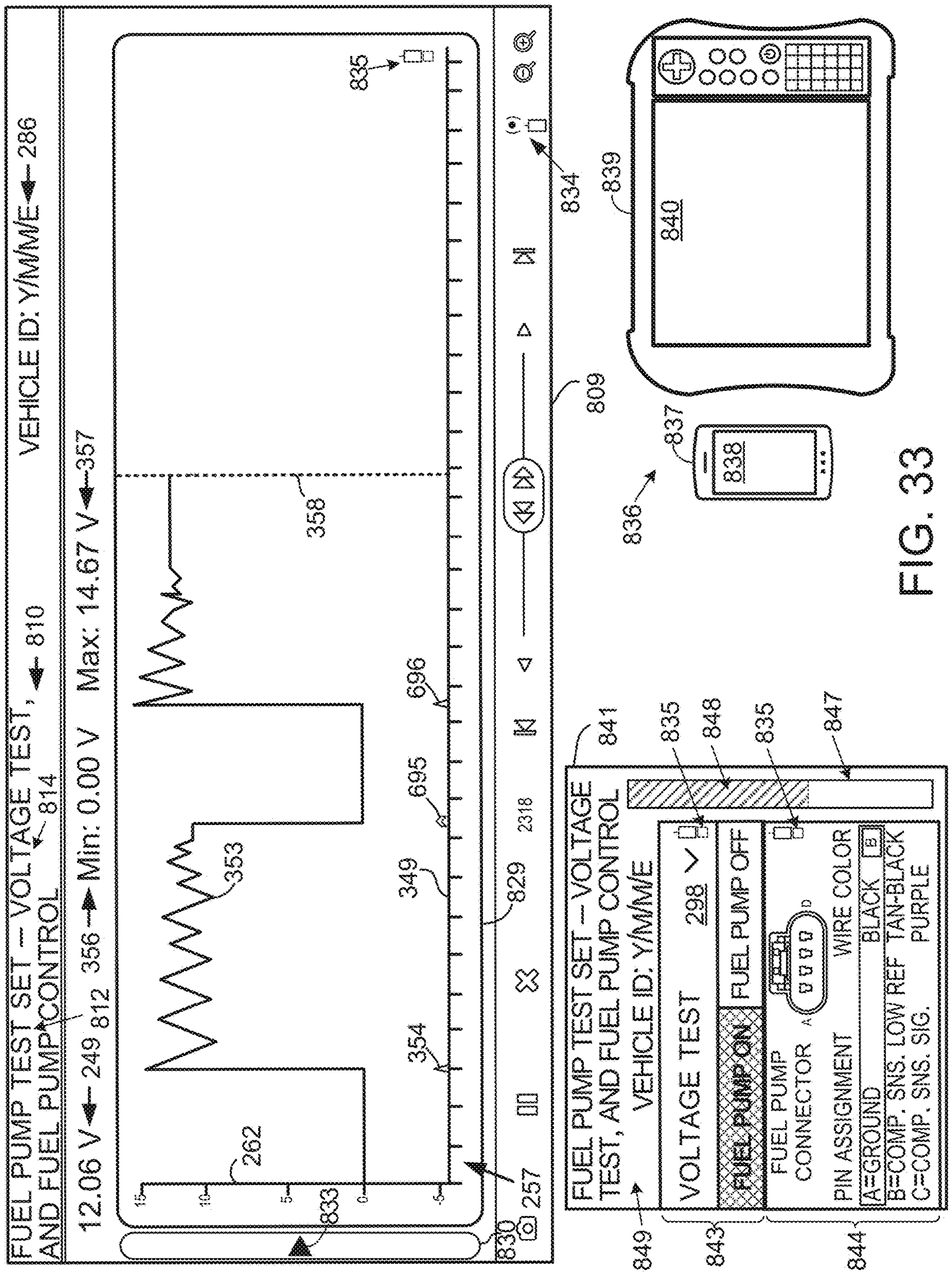

Next, FIG. 33 shows a computing system 836 including a computing device 839 and a companion device 837. The computing device 839 can be configured like the computing system 4. The computing device 839 includes a display 840. The companion device 837 includes a display 838. FIG. 33 also shows an alternative view of the GUI 809, which can be displayed on the display 840. The GUI 809 includes the icon 834 to indicate that the computing device 839 and the companion device 837 are operatively coupled to each other. Compared to the view of the GUI 809 in FIG. 31, the container 829 in FIG. 33 is displayed in an expanded size due to removal of the container 826, 827, 828 as a result of a selection of the USC 835 within the container 826, 827, 828.

FIG. 33 also shows a GUI 841 that includes a container 843, 843. The GUI 841 is displayed on the display 838 in response to a selection of the USC 835 in the GUI 809 shown in FIG. 31. The container 843, 844 corresponds to the container 826, 827, respectively, both shown in FIG. 31. The GUI 841 includes a scroll bar 847 and a selector 848. The selector 848 can be moved (e.g., downward) within the scroll bar 847 to cause the GUI 841 to show a portion of the container 844 that includes a portion of the container 827 not shown in FIG. 33, as well as a container that includes the content of the container 828 shown in FIG. 31.

Figure 34:
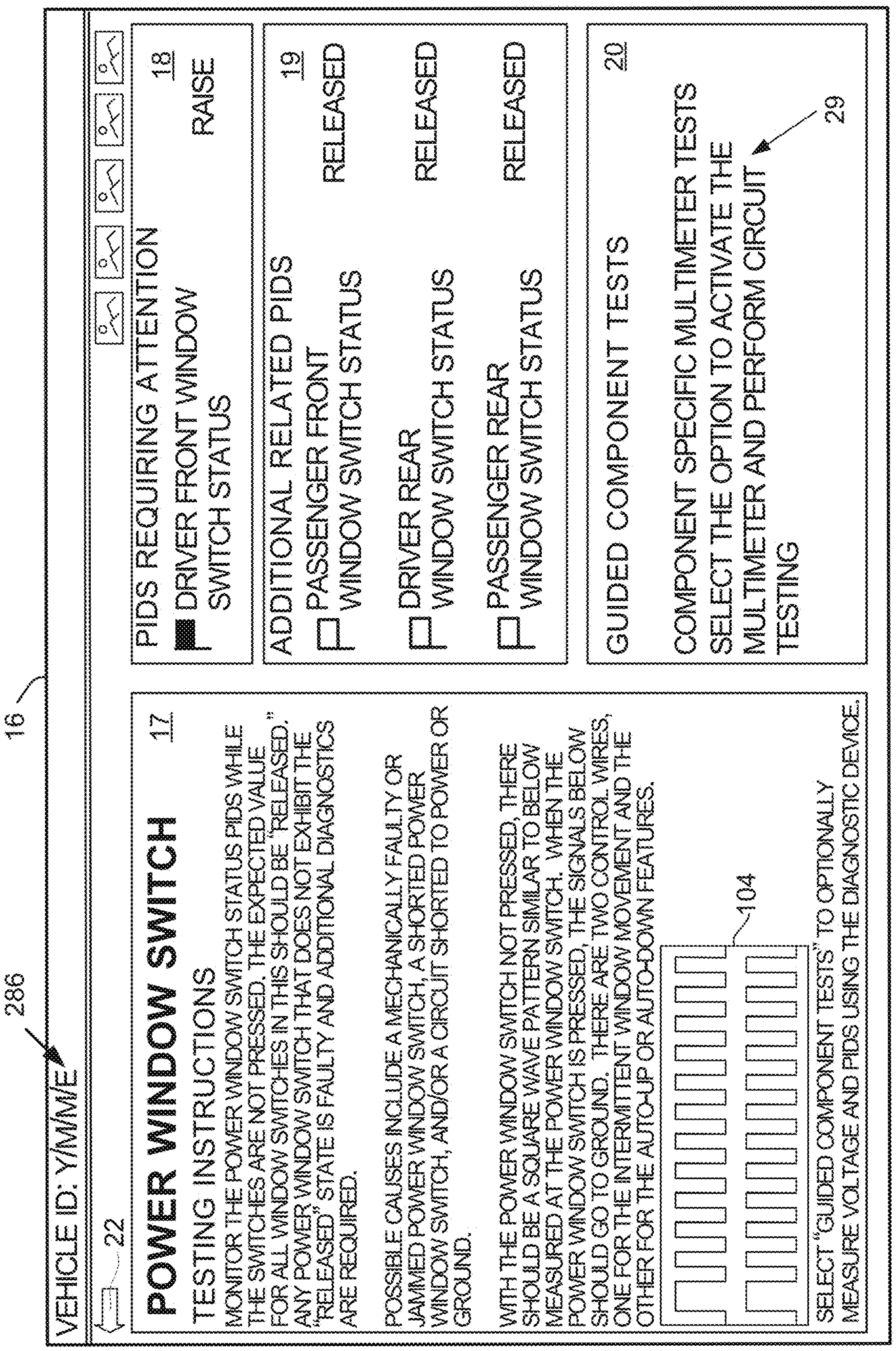

Next, FIG. 34 shows a GUI 16 for a test set corresponding to power windows in a vehicle identified by the vehicle identifier 286. In at least some implementations, the GUI 16 is displayed in response to selecting: the test sets USC 726 shown in FIG. 9, the USC 642 shown in FIG. 13, or the USC 240 shown in FIG. 18. Other examples of selecting a USC in another GUI to cause the GUI 16 to be displayed are also possible. The test set corresponding to power windows, as shown in FIG. 34, provides for performing a component test (e.g., a voltage measurement via the meter 328 or the oscilloscope 329) and requesting PIDs pertaining to a status of a window switch.

The GUI 16 includes a USC 22 selectable to cause the processor 250 to display the GUI displayed on the display 300 before the GUI 16 is displayed. The GUI 16 includes a container 17, 18, 19, 20. The container 17 includes testing instructions regarding a power window switch to guide a technician in servicing the vehicle. The container 17 includes a sub-container 104 showing a representation of signals that can be expected to be carried on window switch circuits connected to a power window switch. The signal representations in the sub-container 104 can include a representation indicative of the power window switch when malfunctioning and/or when the power window switch is not malfunctioning.

The container 18 is available to display information regarding PIDs requiring attention. That information includes a textual description of a PID and a textual value (i.e., Raise) of a parameter value corresponding to the PID. The information also includes a flag. Similar to other drawings, a flag that is black represents that one or more parameters for the corresponding PID has breached the threshold value(s).

The container 19 is available to display information regarding additional, related PIDs. That information includes a textual description of a PID and a textual value (i.e., Released) of a parameter value corresponding to the PID. The information also includes a flag. Similar to other drawings, a flag that white represents that the parameter values corresponding to the PID have not breached the threshold value(s).

The container 20 includes a USC 29 selectable to cause the processor 250 to configure the meter 328 or the oscilloscope 329 to be in a mode for measuring signal(s) corresponding to a vehicle component (e.g., a power window switch) associated with the test set. The USC 29 can be the text within the container 20 or some other portion of the container 20. In at least some implementations, in response to a selection of the USC 29, the processor 250 modifies the GUI 16 to appear as shown in FIG. 35.

Figure 35:
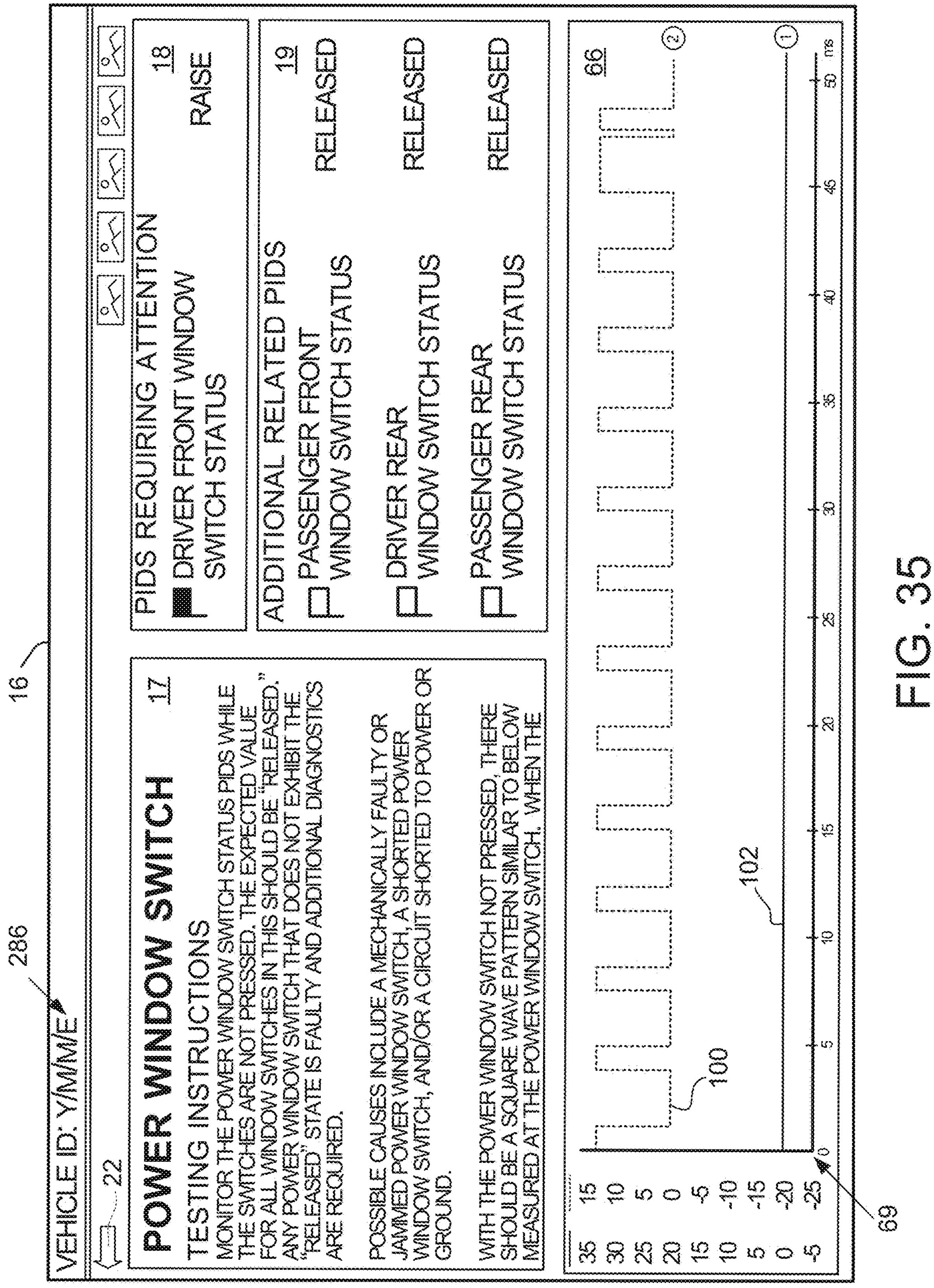

Next, FIG. 35 shows an alternative view of the GUI 16 for the test set corresponding to power windows in a vehicle identified by the vehicle identifier 286. As shown in FIG. 35, the GUI 16 includes the container 17, 18, 19, and 66. The container 17 has been resized to allow for displaying the container 66. The container 17 shown in FIG. 35 shows less information than the container 17 shown in FIG. 34. In at least some implementations, the container 17 can include a scroll bar useable to scroll within the container 17 such that portions of the information in the container 17 is shown on the display 300. In at least some implementations, the container 17 can be resized such that the container 17 can display more information than what is shown in FIG. 35. As an example, the processor 250 can increase a size of the container 17 and decrease a size of one or more other containers in the GUI 16 to make room for the container 17 when increased in size.

The description in this paragraph pertains to the use of FIG. 34 and FIG. 35. A driver of the vehicle 12 states that the driver side window in the vehicle 12 is not working. In some cases, a technician may proceed with replacing a power window switch in the vehicle 12 and then determine that replacing the power window switch did fix the driver's malfunctioning window. The technician then connects the computing system 4 to the vehicle to determine the DTC B1413 is set within the vehicle. As an example, the DTC can be determined in response to selecting the intelligent diagnostics USC 721 from the GUI 725 shown in FIG. 8. This can result in the GUI 722 shown in FIG. 9 to be displayed. The technician can then select the test sets USC 726 from the GUI 722. This can cause the processor 250 to output the GUI 16 (shown in FIG. 34) on the display 300. The technician notes that the PID for the driver front window switch status indicates "Raise" when it should be reading "Released." The test instructions in the container 17 include guidance indicating that a signal should be measured at both of two power window switch terminal for the malfunctioning driver side window. The technician can then select the USC 29 within the container 20 to cause the container 66 to be displayed. With the meter 328 or the oscilloscope 329 connected to the window switch circuits, the signal representation 100, 102 is output in the container 66. Considering the signal representation 100, 102 shows that the signals on one of the switch circuits is constantly at 0.0 volts, which, for example, can indicate that one of window switch circuits is shorted to ground. Accordingly, this example shows that diagnostic information, PIDs, and the meter 328 or the oscilloscope 329 in one GUI can guide the technician and provide the technician with diagnostic functionality helpful to repair the vehicle 12.

Figure 36:
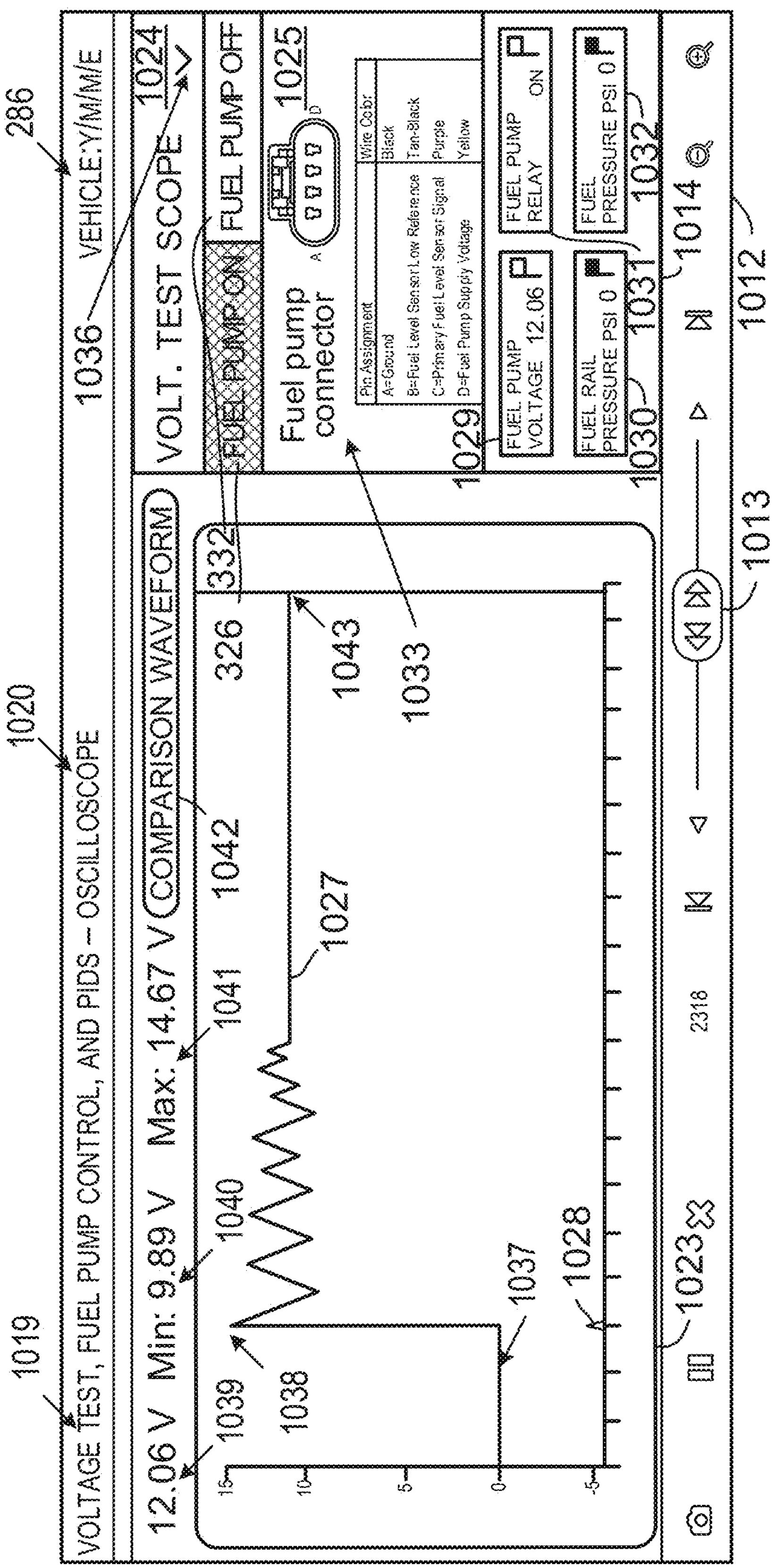
Figure 37:
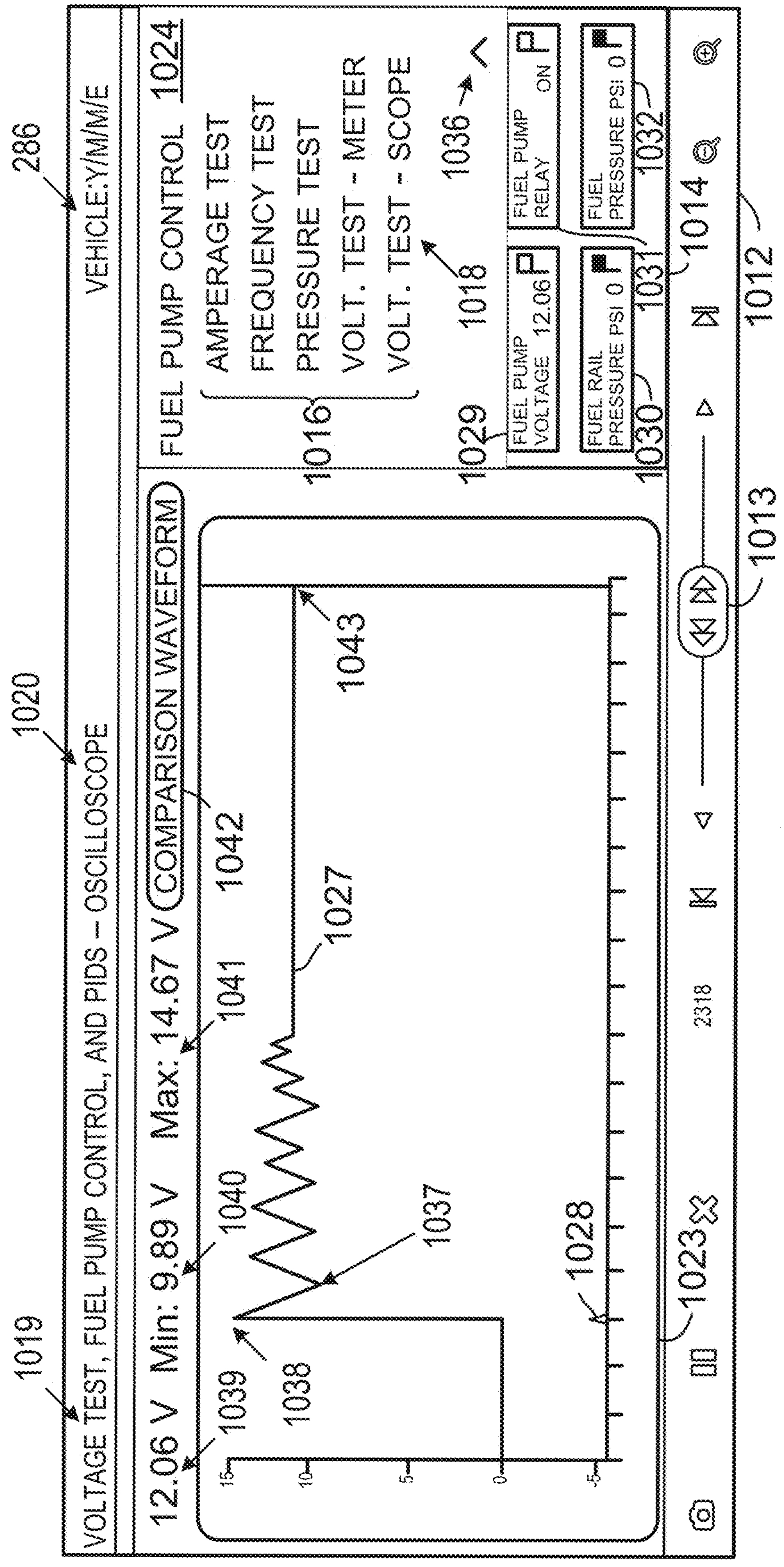

Next, FIG. 36 and FIG. 37 show a GUI 1012. The GUI 1012 shown in FIG. 36 can be displayed in response to a selection of the USC 698 shown in FIG. 13. As another example, the GUI 1012 shown in FIG. 36 can be displayed in response to a selection of a component test selection 1018 shown in FIG. 37.

The GUI 1012 includes a test set identifier 1019, a test device identifier 1020, and the vehicle identifier 286. The GUI 1012 includes a container 1014, 1023, 1024, 1025. In at least some implementations, the GUI 1012 is displayed if the computing system 4 does not have access to a known signal signature for displaying a waveform representation, such as the waveform representation 345 shown in FIG. 22 or in response to selection of a USC 1042 while a GUI is displaying a container including a waveform representation of a known signal signature.

The USC 1042 is selectable to insert a waveform representation of the known signal signature into the GUI 1012, such as in the container 1023 along with a waveform representation 1027, or in a different container such as the way a known good signal signature is shown in the container 287 in FIG. 22. The container 1023 includes a waveform marker 1028 to represent a time when the USC 326 was selected and/or a time when the computing system 4 transmitted a vehicle data message to the vehicle 12 in order to initiate performance of a functional test corresponding to the USC 326.

The container 1024 includes a USC 326, 332, 1036. The descriptions of the USC 326, 332 shown in FIG. 22 are applicable to the USC 326, 332 shown in FIG. 36. The USC 1036 is configured to allow a user to select a component test to be performed via the computing system 4. In at least some implementations, the USC 1036 is selectable to cause the processor 250 to display within the USC 1036 a list of one or more component tests that can be performed for the vehicle identified by the vehicle identifier 286. In at least some implementations, the USC 1036 includes a name of a currently-selected component test and allows for a user to select a different component test from the list of one or more component tests. FIG. 37 shows the GUI 1012 with a list of component test(s) 1016 that can be displayed in response to selection of a USC 1036. A test within the list of component test(s) 1016 can be selected and the processor 250 can configure a test device corresponding to the selected component test based on test device configuration parameters in the test set requested to be performed.

FIG. 36 shows that a GUI displayed during performance of a test set can include textual measurements 1039, 1040, 1041 that correspond to a current value 1043 of the waveform representation 1027, a minimum value 1037 of the waveform representation 1027, and a maximum value 1038 of the waveform representation 1027, respectively.

The container 1014 includes a sub-container 1029, 1030, 1031, 1032. The sub-container 1029, 1030, 1031, 1032 includes the same type information contained in the sub-container 333, 334, 335, 336 shown in FIG. 22, respectively, although the parameter values can be different because the waveform representations shown in FIG. 22 and FIG. 36 are different.

The container 1025 includes an image 1033 showing a fuel pump connector and pinout to a guide a user in connecting the probe 305 to the fuel pump connector. In at least some implementations, the processor 250 can determine content to populate in the container 1025 from the test set file (e.g., from the waveform identifier 968 in the test set file 802 shown in FIG. 84).

A GUI displayed while performing a test set, such as the GUI 1012, can include a USC 1013 that is usable such that the display 300 shows a different portion of a waveform representation within a container. As an example, if a left-most portion of the waveform representation 1027 displayed on the display 300 is not an initial portion of the underlying waveform corresponding to the waveform representation 1027, the USC 1013 can be moved leftwards to cause a portion of the underlying waveform corresponding to a time prior to a time corresponding to the left-most portion of the waveform representation 1027 currently shown on the display 300 to be displayed on the display 300. As another example, if a right-most portion of the waveform representation 1027 displayed on the display 300 is not a most-recent portion of the underlying waveform corresponding to the waveform representation 1027, then the USC 1013 can be moved rightwards to cause a portion of the underlying waveform corresponding to a time later than a time corresponding to the right-most portion of the waveform representation 1027 currently shown on the display 300 to be displayed on the display 300.

Figure 38:
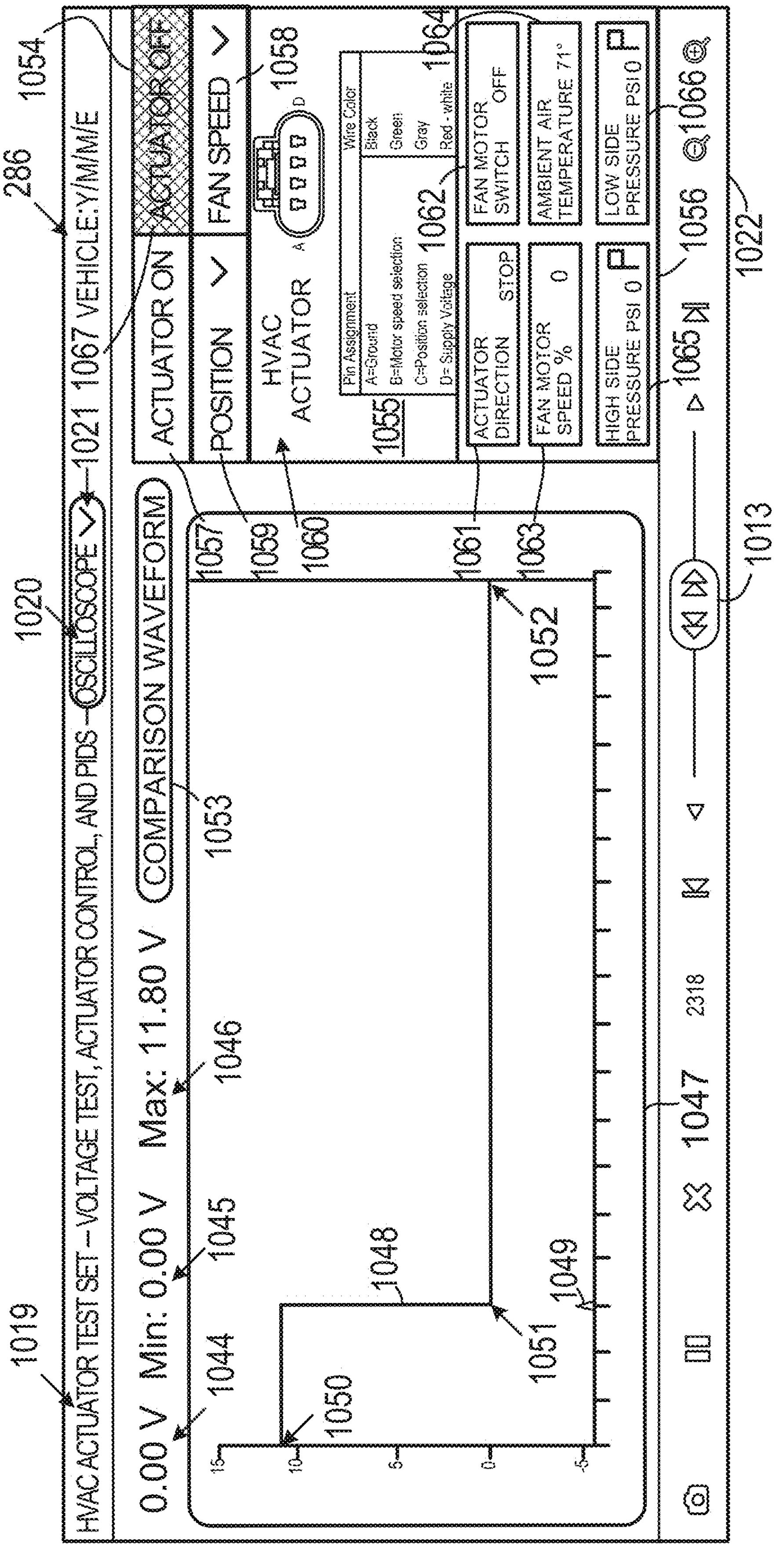

Next, FIG. 38 shows a GUI 1022 that can be displayed in accordance with the example implementations. The GUI 1022 can be displayed during performance of a test set, such as the test set file 614 (shown in FIG. 85). As an example, the GUI 1022 can be displayed in response to selection of: the USC 245 within the GUI 231 (shown in FIG. 21), the USC 698 shown in FIG. 13, or the USC 1021 in FIG. 40. In FIG. 38, the GUI 1022 is shown after a USC 1067 has been selected. The GUI 1022 can highlight the USC 1067 to indicate a current selected state of a functional test corresponding to the USC 1067. Such highlighting is represented by shading of the USC 1067 in FIG. 38. The GUI 1022 includes the test set identifier 1019, a test device identifier 1020, and the vehicle identifier 286. The GUI 1022 also includes the USC 1013 and a container 1047, 1054, 1055, 1056.

The container 1047 includes a waveform representation 1048 and a waveform marker 1049. The waveform representation 1048 is within a graph having a vertical axis indicative of volts and a horizontal axis indicative of time. The units for the vertical axis and the horizontal axis can be set based upon test device configuration parameters in a test set file. As an example, units for the vertical axis can be five volts per division and the units per horizontal division can be based on a number of seconds or some portion of a second. The waveform representation 1048 represents a measurement of a signal received on the probe 305. The waveform marker 1049 represents when the USC 1067 was selected and/or a time when the computing system 4 transmitted a vehicle data message to the vehicle 12 in order to initiate performance of a functional test corresponding to the USC 1067.

A GUI displayed during performance of a functional test can include a USC selectable to cause the computing system 4 to send a vehicle data message to request the vehicle 12 to change a performance of the functional test. As an example, the container 1054 includes a USC 1057, 1058, 1059, 1067. The USC 1057 is selectable to cause the computing system 4 to send a vehicle data message to request an ECU to switch an HVAC actuator to the ON state. The USC 1067 is selectable to cause the computing system 4 to send a vehicle data message to request an ECU to switch an HVAC actuator to the OFF state. The USC 1059 is selectable to cause the computing system 4 to send a vehicle data message to instruct the ECU to set the HVAC actuator to a particular position (e.g., stop, vent, or recirculate). The USC 1058 is selectable to cause the computing system 4 to send a vehicle data message to instruct the ECU to set a fan to a particular speed setting (e.g., off, low, medium, high, or 0%, 33%, 67% 100%).

The container 1055 includes an image 1060 showing an HVAC actuator connector and pinout to a guide a user in connecting the probe 305 to the HVAC actuator connector. In at least some implementations, the processor 250 can determine content to populate in the container 1055 from the instruction identifier in a test set file, such as the connector image identifier 622 and/or the instruction identifier 624 in the test set file 614 shown in FIG. 85.

The container 1056 includes a PID display indicator 1061, 1062, 1063, 1064, 1065, 1066. The PID display indicator 1061 includes the textual PID representation "Actuator Direction," the PID parameter value "Stop" indicative of a control direction of the HVAC actuator. The PID display indicator 1062 includes the textual PID representation "Fan Motor Switch," and a PID parameter "OFF" indicative of the fan motor switch being in an off position. The PID display indicator 1063 includes the textual PID representation "Fan Motor Speed," the PID parameter 0" indicative of a percentage of a motor speed from off (0%) to maximum speed (100%). The PID display indicator 1064 includes the textual PID representation "Ambient Air Temperature," the PID parameter "71°" indicative of a temperature specified on the Fahrenheit scale. The PID display indicator 1065 includes the textual PID representation "High Side Pressure PSI," the PID parameter "0" indicative of a pressure in pounds per square inch units, and a PID baseline icon (i.e., a white flag PID baseline indicator). The PID display indicator 1066 includes the textual PID representation "Low Side Pressure PSI," the PID parameter "0" indicative of a pressure in pounds per square inch units, and a PID baseline icon (i.e., a white flag PID baseline indicator). The PID display indicator 1061, 1062, 1063, 1064, 1065, 1066 corresponds to a PID associated with the index value 767, 768, 769, 770, 775, 776, respectively, in the test set file 614.

A GUI displayed while performing a test set and without a waveform representation of a known signal signature, such as the GUI 1022, can include a USC 1053 selectable to insert such a waveform representation into the GUI. That waveform representation can be added to an existing container within the GUI, such as the container 1047. Alternatively, a size of the container 1047 can be reduced to accommodate displaying another container within the container 1047 to display the waveform representation of a known signal signature.

FIG. 38 also shows that a GUI displayed during performance of a test set can include textual measurements 1044, 1045, 1046 that correspond to a current value 1052 of the waveform representation 1048, a minimum value 1051 of the waveform representation 1048, and a maximum value 1050 of the waveform representation 1048, respectively. Additionally, the container 1047 includes a waveform marker 1049 to represent a time when the USC 1067 was selected and/or a time when the computing system 4 transmitted a vehicle data message to the vehicle 12 in order to initiate performance of a functional test corresponding to the USC 1067.

The GUI 1022 also includes the USC 1021 (described above). In at least some of those implementations, the USC 1021 is configured for selecting the meter 328 or the oscilloscope 329. Selecting the meter 328 using the USC 1021 within the GUI 1022 can cause the processor 250 to output a GUI in which the voltage test for the HVAC actuator test set is performed by the meter 328.

Figure 39:
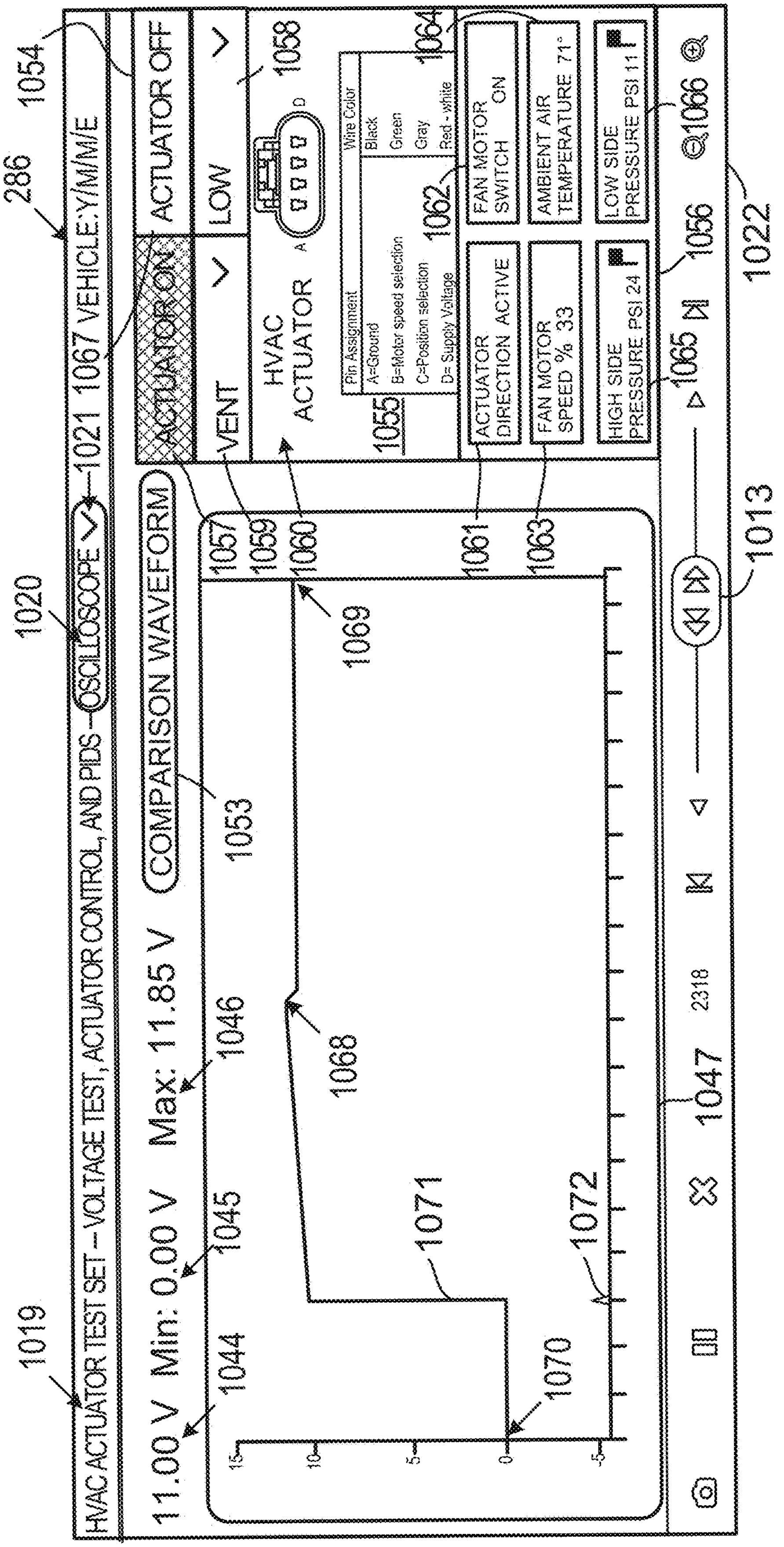

Next, FIG. 39 shows another view of the GUI 1022. In FIG. 39, the GUI 1022 is shown after the USC 1057 has been selected. The GUI 1022 can highlight the USC 1057 to indicate a current selected state of a functional test corresponding to the USC 1057. Such highlighting is represented by shading of the USC 1057 in FIG. 39. With the HVAC actuator turned on, the USC 1059 indicates the particular position of the HVAC actuator is a vent position, and the USC 1058 indicates the particular speed setting of the HVAC fan is a low-speed setting.

With the HVAC actuator turned on, the PID parameter value within the PID display indicator 1061 indicates the actuator direction is active, the PID parameter value for the PID display indicator 1062 is on, the PID parameter value for the PID display indicator 1063 is 33%, the PID parameter value for the PID display indicator 1064 is "71°", the PID parameter value for the PID display indicator 1065 is 24 PSI and the PID baseline icon for the PID display indicator 1065 is a black flag PID baseline indicator, and the PID parameter value for the PID display indicator 1066 is 11 PSI and the PID baseline icon for the PID display indicator 1066 is a black flag PID baseline indicator The container 1047 shows a waveform representation 1071. The waveform representation 1071 represents a measurement of a signal received on the probe 305 at a different time period as compared to a time period corresponding to the waveform representation 1048 shown in FIG. 38. The waveform representation 1071 can be a continuation of the waveform representation 1048. In particular, a time period corresponding to the waveform representation 1071 shown in FIG. 39 includes a time corresponding to a waveform marker 1072 that represents a time when the USC 1057 was selected and/or a time when the computing system 4 transmitted a vehicle data message to the vehicle 12 in order to initiate performance of a functional test corresponding to the USC 1057.

In FIG. 39, the textual measurement 1044, 1045, 1046 corresponds to a current value 1069 of the waveform representation 1071, a minimum value 1070 of the waveform representation 1048, and a maximum value 1068 of the waveform representation 1071, respectively.

Next, FIG. 40 shows the GUI 1022. Many aspects of the GUI 1022 are described elsewhere in this description. Further aspects of the GUI 1022 are now described. The USC 1021 includes a selectable test device identifier 1074 corresponding to the meter 328 and a selectable test device identifier 1073 corresponding to the oscilloscope 329. After selecting the selectable test device identifier 1074, the GUI 1022 includes a container 1080 showing a textual representation 1079 of a measurement made by the meter 328.

The GUI 1022 shown in FIG. 40 includes a textual representation of a test device configuration parameter 1078 to which the meter 328 is currently set. The textual representation of the test device configuration parameter 1078 is shown in the container 1080, but can be displayed elsewhere on the GUI 1022. The processor 250 can obtain the test device configuration parameters from the component test 625 shown in FIG. 85.

The GUI 1022 shown in FIG. 40 includes a textual measurement 1076, 1077 that corresponds to a minimum value and a maximum value measured by the meter 328 since the meter 328 has been measuring a signal for the test set file 614.

V. Example Configuration Parameter

FIG. 41 shows configuration parameters 360, 361 for an oscilloscope, such as the oscilloscope 329. The configuration parameters 360, 361 can be stored in the memory 252. For example, the configuration parameters 360, 361 can be stored in the component test 662. FIG. 41 shows memory addresses 362 at which the configuration parameters 360, 361 are stored to configure the oscilloscope 329 for operating in particular states. The memory addresses 362 include memory addresses 363 corresponding to a first channel of the oscilloscope and memory addresses 364 corresponding to a second channel of the oscilloscope. If the oscilloscope 329 includes more than two channels, then an addition block of memory addresses, similar to the block of memory addresses shown for the memory addresses 363, 364 can be included within the memory addresses 362. If the oscilloscope 329 includes only a single channel, then the memory addresses 364 can be omitted from the memory addresses 362.

For an implementation in which the computing system 4 receives the test set file 802 (shown in FIG. 84) from the server 2, the configuration parameters 360 can be stored in the memory 252 before the computing system 4 receives the test set file 802. After receiving the test set file 802, the test device configuration parameters 808 can be written into the memory 252 at the memory addresses 363, thereby overwriting the configurations parameters previously written into the memory addresses 363 and resulting in the configurations parameters 361 being stored in the memory 252. In at least some implementations, the configuration parameters 360 are default configurations parameters that the processor 250 writes into the memory 252 for the oscilloscope 329 under certain operating states, such in response to the computing system 4 powering on from an off state.

For an implementation in which the computing system 4 retrieves the test set file 802 from the database 258, the test device configuration parameters 808 can be written into the memory 252 at the memory addresses 363, thereby overwriting the configurations parameters previously written into the memory addresses 363. Since the test set file 802 includes test device configuration parameters for channel one only, the configuration parameters at the memory addresses 364 are identical to those stored in the memory addresses for the configuration parameters 360.

VI. Flow Diagrams

At least some example implementations include performing various communications. In this description, at least some of these communications are described with respect to a communication flow diagram or a workflow diagram.

Figure 42:
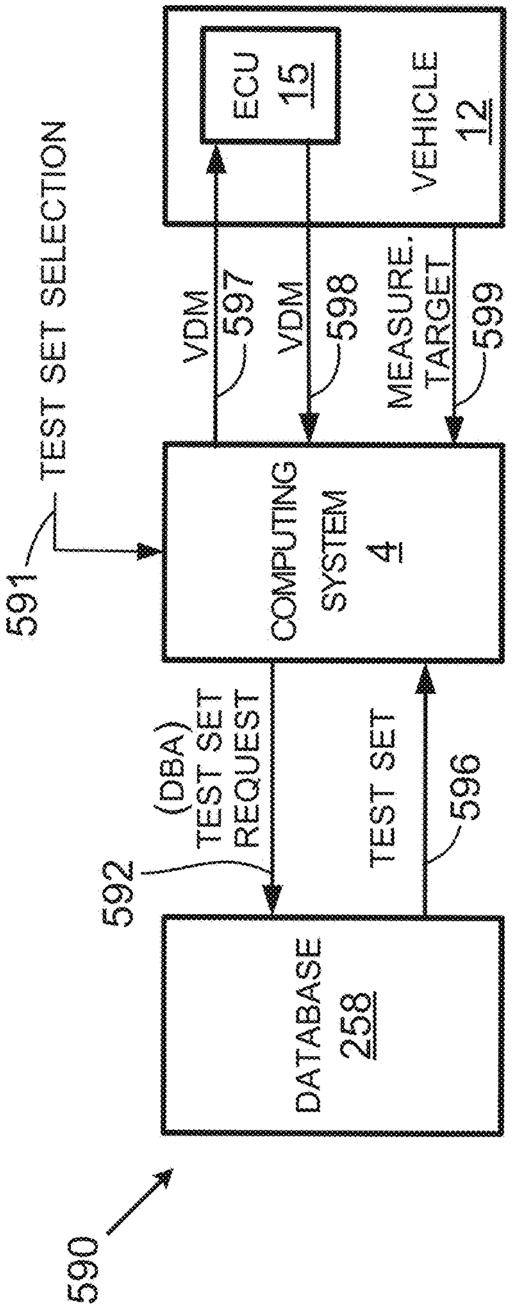
FIG. 42, FIG. 43, FIG. 44, FIG. 45, FIG. 46, FIG. 47, and FIG. 48 show a workflow diagram in accordance with the example implementations.

FIG. 42 illustrates a workflow 590 with respect to the computing system 4, the vehicle 12, and the database 258. In the workflow 590, a test set selection 591 is received at the computing system 4. In at least some implementations, the test set selection 591 and/or another test set selection discussed in this description is based on a vehicle identifier of the vehicle 12. In at least some of those implementations, the test set selection 591 is further based on a system, component and/or a symptom exhibited by of the vehicle 12. Furthermore in at least some implementations, the test set selection 591 is based on an identifier indicative of a particular test set.

The user interface 299 can be used to select the test set from a GUI (such as the GUI 150 shown in FIG. 13) or from a menu (such as the navigable menu 930 shown in FIG. 71A and FIG. 71B). The processor 250 can receive the test set selection 591 from the user interface 299.

In the workflow 590, the computing system 4 performs a database access 592 of the database 258 to request a test set based on the test set selection 591. The database access 592 can further be based on other information, such as a vehicle identifier of the vehicle 12 and/or a malfunction symptom of the vehicle 12. A response to the computing system 4 from the database 258 includes a test set communication 596. As an example, the test set communication 596 can include a test set file, such as a test set file stored in the test set 58 shown in FIG. 2.

After receiving the test set communication 596, the computing system 4 transmits a VDM 597 to the vehicle 12. The VDM 597 includes one or more VDM. In at least some implementations, the VDM 597 includes a VDM with a functional test command for a functional test corresponding to the test set file contained in the test set communication 596, and/or a VDM with a PID for requesting a PID parameter value corresponding to the test set file contained in the test set communication 596. The VDM with a PID can include multiple VDMs with the PID. In at least some implementations, the ECU 15 transmits a VDM 598 in response to the VDM 597. In at least some implementations, the VDM 598 includes the PID parameter value corresponding to a PID within the VDM 597. In at least some implementations, the test device 199 performs a component test to measure a measurement target 599. The component test can be performed before, during, and/or after performance of a functional test corresponding to a functional test command within the VDM 597 and/or before, during, and/or after performance of requesting PID parameter values via the VDM 597. As an example, the measurement target 599 is an electrical signal received on the probe 305 of the computing system 4.

Figure 43:
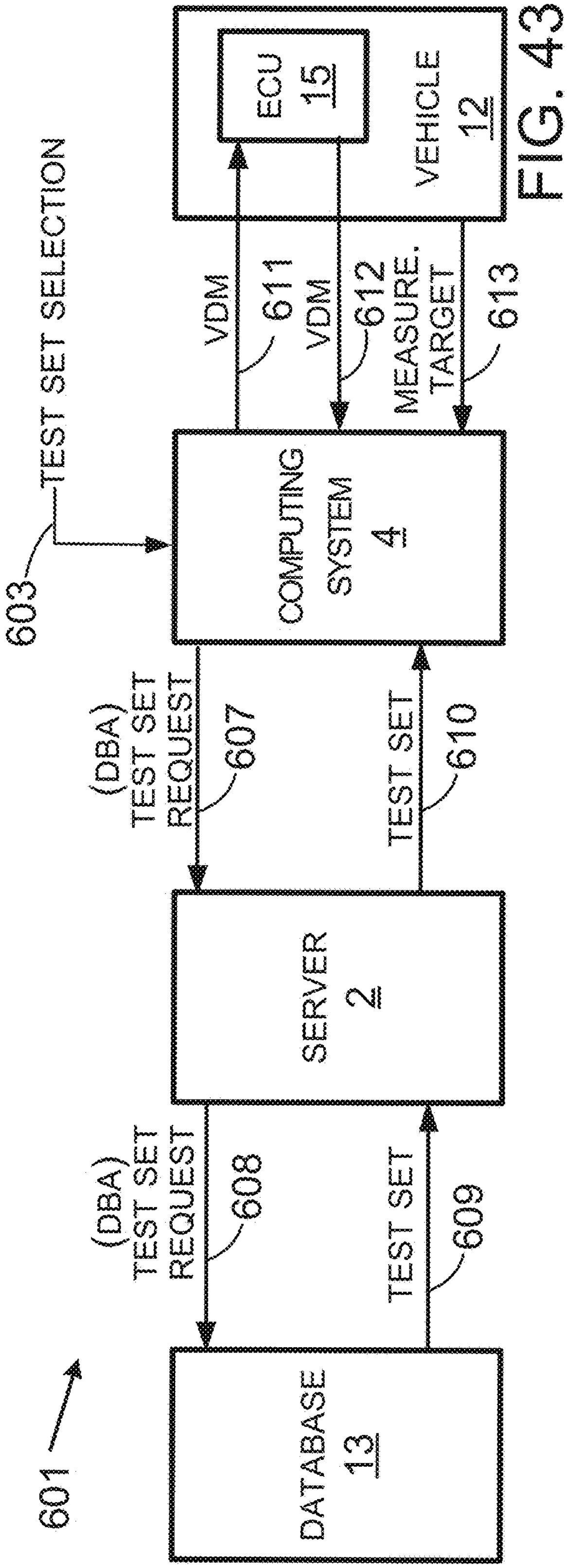

Next, FIG. 43 illustrates a workflow 601 with respect to the computing system 4, the vehicle 12, the server 2, and the database 13. In the workflow 601, a test set selection 603 is received at the computing system 4. In at least some implementations, the test set selection 603 and/or another test set selection discussed in this description is based on a vehicle identifier of the vehicle 12. In at least some of those implementations, the test set selection 603 is further based on a system, component and/or a symptom exhibited by of the vehicle 12. Furthermore, in at least some implementations, the test set selection 603 is based on an identifier indicative of a particular test set.

The user interface 299 can be used to select the test set from a GUI (such as the GUI 150 shown in FIG. 13) or from a menu (such as the navigable menu 930 shown in FIG. 71A and FIG. 71B). The processor 250 can receive the test set selection 603 from the user interface 299. In at least some implementations, the computing system 4 does not include the identifier of the particular test set prior to receipt of the test set selection 603.

In the workflow 601, the computing system 4 transmits a communication 607 to the server 2 including a test set request based on the test set selection 603. The server 2 performs a database access 608 of the database 13 based on the test set selection 603. The database access 608 can further be based on other information, such as a vehicle identifier of the vehicle 12, a system identifier, a component identifier, and/or a symptom identifier.

In at least some implementations, the test set selection 603 includes an identifier of the particular test set file. In those implementations, a test set communication 609 to the server 2 includes a test set file corresponding to the identifier of the particular test set file and the server 2 transmits to the computing system 4 a test set communication 610 including the test set file corresponding to the identifier of the particular test set.

In at least some implementations, the test set selection 603 does not include an identifier of the particular test set file. In those implementations, a test set communication 609 to the server 2 includes an identifier of a test set file based on the test set selection 603 and the server 2 transmits to the computing system 4 a test set communication 610 including the identifier of the test set file based on the test set selection 603. In response to receiving that the test set communication 610, the computing system 4 outputs a GUI (such as the GUI 150 shown in FIG. 13). Accordingly, the identifier of the test set file in the test set communication 609, 610 can include more than one identifier of a test set file.

After receiving the test set communication 610, the computing system 4 transmits a VDM 611 to the vehicle 12. The VDM 611 includes one or more VDM. In at least some implementations, the VDM 611 includes a VDM with a functional test command for a functional test corresponding to the test set file contained in the test set communication 610, and/or a VDM with a PID for requesting a PID parameter value corresponding to the test set file contained in the test set communication 610. The VDM with a PID can include multiple VDMs with the PID. In at least some implementations, the ECU 15 transmits a VDM 612 in response to the VDM 611. In at least some implementations, the VDM 612 includes the PID parameter value corresponding to a PID within the VDM 611. In at least some implementations, the test device 199 performs a component test to measure a measurement target 613. The component test can be performed before, during, and/or after performance of a functional test corresponding to a functional test command within the VDM 611 and/or before, during, and/or after performance of requesting PID parameter values via the VDM 611. As an example, the measurement target 613 is an electrical signal received on the probe 305 of the computing system 4.

Figure 44:
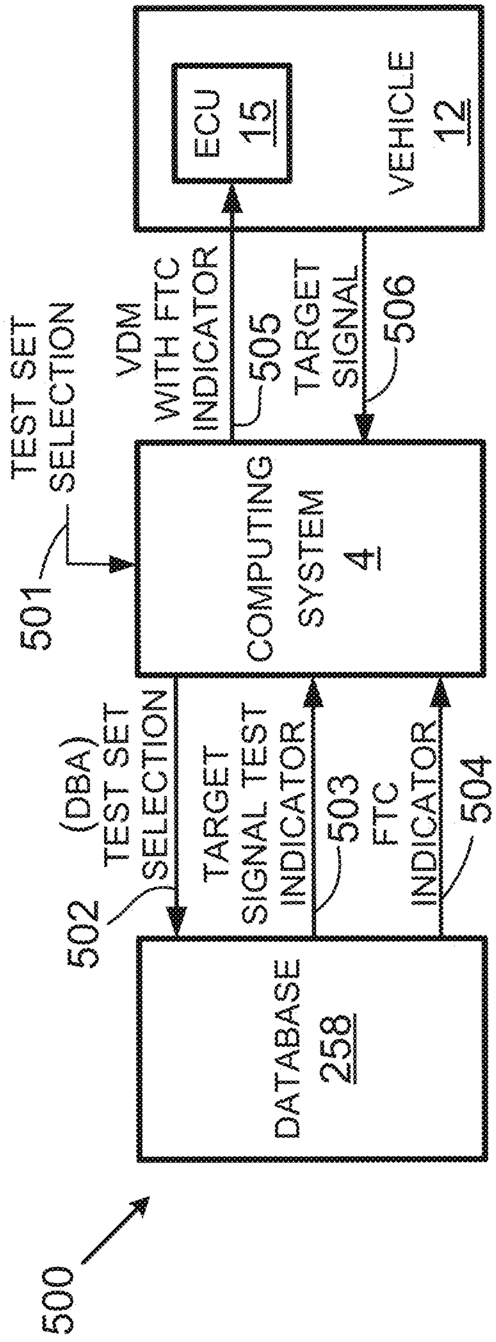

FIG. 44 shows a workflow 500 with respect to the computing system 4, the vehicle 12, and the database 258. In the workflow 500, a test set selection 501 is received and/or determined at the computing system 4. In at least some implementations, the test set selection 501 includes and/or corresponds to a particular vehicle identifier, such as a vehicle identifier of the vehicle 12. Additionally, or alternatively, the test set selection 501 can be based on a component identifier, a symptom identifier, or a PID (such as a PID corresponding to parameter value that has breached a threshold within the PID threshold 68 shown in FIG. 2). In some implementations, the test set selection includes a selection of a test set from a GUI using the user interface 299. For example, the user interface 299 can be used to select the USC 738 shown in FIG. 10 and FIG. 11, or to select one of the USC 642, 643, 644, 645, 646, 647, 679, 698 shown in FIG. 13. Alternatively, the test set selection 501 can include a selection from the navigable menu 930 shown in FIG. 71A and FIG. 71B. The processor 250 can receive the test set selection 501 from the user interface 299. The computing system 4 performs a database access (DBA) 502 of the database 258 based on the test set selection 501. Accordingly, a database access based on a test set selection, such as the DBA 502, can be based on one or more from among the vehicle identifier of the vehicle 12, a component identifier, a symptom identifier, a PID, or a user selection.

The database 258 provides the computing system 4 with a response to the DBA 502. The response to the DBA 502 can include a database response 503, 504. The database response 503 includes a target signal test indicator. The database response 504 includes a functional test command indicator. In some implementations, the database response 503, 504 are separate responses. In some other implementations, the response to the DBA 502 comprises a test set file that includes the target signal test indicator of the database response 503 and the functional test command indicator of the database response 504.

As an example, the target signal test indicator in the database response 503 can include an index value from a component test index, such as the index value "1A" within the component test index 95 shown in FIG. 59. As another example, the target signal test indicator can include a name of a component test (e.g., "Frequency Test') or a component test identifier (e.g., CT1) used by the computing system 4. As yet another example, the target signal test indicator can include a memory address for CRPI executable by the processor 250 to configure a test device 199 for performing a component test indicated by the target signal test indicator.

As an example, the functional test command indicator in the database response 504 can include an index value from a functional test index, such as the index value "4A" within the functional test index 101 shown in FIG. 60. As another example, the functional test command indicator can include a name of a functional test (e.g., "Fuel Pump Engagement"), a functional test identifier (e.g., FT1) used by the computing system 4, an indicator of a functional test that is to be populated in a VDM, or the data to generate a VDM 505 including the indicator of the functional test (i.e., a functional test command). As yet another example, the functional test command indicator can include a memory address for CRPI executable by the processor 250 to generate and cause transmission of a VDM including a functional test command, such as a VDM 505. In at least some implementations, the address can be an address for a functional test command that corresponds to the menu selection of the navigable menu 930 (such as the menu selection 950 shown in FIG. 71A).

The VDM 505 includes the functional test command within and/or indicated by the database response 504. The computing system 4 can determine a test device measurement performed by the test device 199 on a target signal 506 output by the vehicle 12. The measurement of the target signal 506 can occur using a target signal test (e.g., a component test or a test based on reading a PID parameter) corresponding to the target signal test indicator within the database response 503. The measurement of the target signal 506 can occur before, during, and after the vehicle 12 performs a functional control in response to receiving the VDM 505. In response to receiving the test device measurement and/or the PID parameter values, the processor 250 can compare the test device measurement and/or the PID parameter values to the baseline characteristics 60 in order to determine the diagnostic status indicator 64.

Next, FIG. 45 shows a workflow 520 with respect to the computing system 4, the vehicle 12, the server 2, and the database 13. In the workflow 520, a test set selection 511 is received and/or determined at the computing system 4. The test set selection 511 can be similar to the test set selection 501 described above. The processor 250 can receive and/or determine the test set selection 511 similar to how processor 250 receives and/or determines the test set selection 501. The computing system 4 transmits a database access request (DBAR) 512 based on the test set selection 511. The server 2 performs a database access 513 of the database 13 based on the test set selection 511 and/or the DBAR 512. Accordingly, the database access 513 can be based on one or more from among the vehicle identifier of the vehicle 12, a component identifier, a symptom identifier, a PID, or a user selection.

The database 13 provides the server 2 with a response to the DBA 513. The response to the DBA 513 can include a database response 514, 515. The database response 514 includes a target signal test indicator. The database response 515 includes a functional test command indicator. In some implementations, the database response 514, 515 are separate responses. In some other implementations, the response to the DBA 513 comprises a test set that includes the database response 514 and the database response 515. The target signal test indicator in the database response 514 can be similar to the target signal test indicator in the database response 503 described above with respect to FIG. 44. The functional test command indicator in the database response 515 can be similar to the functional test command indicator in the database response 504 described above with respect to FIG. 44.

The server 2 provides the computing system 4 with a response to the DBAR 512. In at least some implementations, the response to the DBAR 512 includes a communication 516 and a communication 517. The communication 516 includes the target signal test indicator received via the database response 514. The communication 517 includes the functional test command indicator received via the database response 515. The communication 516, 517 can be carried out as a single communication. As an example, the single communication can include a test set file that includes the target signal test indicator of the communication 516 and the functional test command indicator of the communication 517. The computing system 4 transmits to the ECU 15 and/or the vehicle 12 a VDM 518 including the functional test command included in and/or indicated by the communication 517.

The measurement of a target signal 519 output by the vehicle 12 can occur using a target signal test corresponding to the target signal test indicator within the communication 516. The measurement of the target signal 519 can occur before, during, and after the vehicle 12 performs a functional control in response to receiving the VDM 518. In response to receiving the test device measurement and/or the PID parameter values, the processor 250 can compare the test device measurement and/or the PID parameter values to the baseline characteristics 60 in order to determine the diagnostic status indicator 64.

Figure 46:
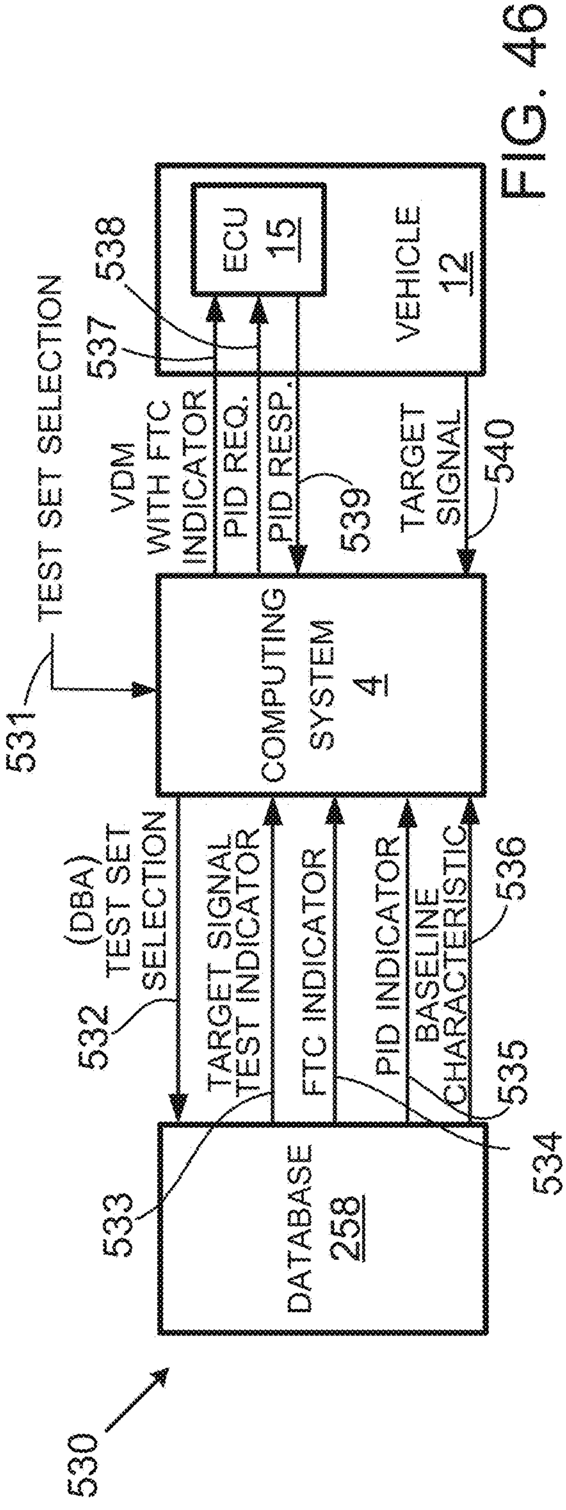

Next, FIG. 46 shows a workflow 530 with respect to the computing system 4, the vehicle 12, and the database 258. In the workflow 530, a test set selection 531 is received and/or determined at the computing system 4. The test set selection 531 can be similar to the test set selection 501 described above. The processor 250 can receive and/or determine the test set selection 531 similar to how processor 250 receives and/or determines the test set selection 501. The computing system 4 performs a database access (DBA) 532 of the database 258 based on the test set selection 531. Accordingly, the database access 532 can be based on one or more from among the vehicle identifier of the vehicle 12, a component identifier, a symptom identifier, a PID, or a user selection.

A database response 533 to the computing system 4 includes a target signal test indicator. A database response 534 to the computing system 4 includes a functional test command indicator. A database response 535 to the computing system 4 includes a PID indicator. A database response 536 to the computing system 4 includes a baseline characteristic. The target signal test indicator in the database response 533 can be similar to the target signal test indicator in the database response 503 described above with respect to FIG. 44. The functional test command indicator in the database response 534 can be similar to the functional test command indicator in the database response 504 described above with respect to FIG. 44. Accordingly, the computing system 4 can transmit a VDM 537 including or based on the functional test command indicator in the database response 534.

As an example, the PID indicator in the database response 535 can include a PID from a PID index, such as the index value "6" from the PID index 90 shown in FIG. 58A and FIG. 58B. As another example, the PID indicator can include a name of a PID (e.g., "Fuel Pump Pressure"), a PID identifier used by the computing system (such as the PID identifier "PID6"), a PID that is to be populated in a VDM, or the data to generate a VDM including the PID. As yet another example, the PID indicator can include a memory address for CRPI executable by the processor 250 to generate and cause transmission of a VDM including a PID, such as a VDM 538.

As an example, the baseline characteristic in the database response 536 can include a target signal characteristic and/or a PID threshold from the baseline characteristics 666. As an example, the target signal characteristic can include a characteristic as shown and described with respect to FIG. 65 and FIG. 66. As yet another example, the baseline characteristic can include a PID threshold including a range top and range bottom or an expected value, as shown in FIG. 68 and FIG. 82C.

FIG. 68 shows a set of PID thresholds 850 for a set of PIDs 851. At least some of the PID thresholds 850 depend on an operating condition 852. The PID thresholds 850 can include a threshold range top 853 and a threshold range bottom 854. The threshold range top 853 and threshold range bottom 854 can be specified in some units 855. Alternatively, the PID thresholds 850 can include an expected value 856. In FIG. 68, the term "Null" indicates that a range top, range bottom, unit, or expected value does not correspond to a particular PID.

As an example, the operating condition 852 for a PID can be a "key-on, engine off" condition or a "key-on, engine on" condition. Other examples of an operating condition corresponding to a PID threshold for a PID include an engine, an engine coolant temperature, an engine load condition, a selected transmission gear condition, an ambient air temperature, an elevation condition, among others. Based on those additional examples, there may be more than two different operating conditions corresponding to PID thresholds for a PID. For instance, the engine coolant temperature operating conditions may include a distinct operating condition for each whole degree between the range between −40° C. and 130° C., and the PID thresholds can include a threshold range top and bottom for each of those operating condition degrees.

PID threshold data for a particular PID can be included in a test set file. For example, see the threshold range top and bottom in FIG. 82C. A processor can determine an operating condition of a vehicle being tested, select the PID threshold (s) corresponding to the operating condition for a particular PID, and display parameter data and the selected PID thresholds for the particular PID within a GUI.

Returning to FIG. 46, the processor 250 can execute CRPI to generate and cause transmission of a VDM 538 including a PID request. The processor 250 can receive a VDM 539 including a PID response to the PID request of the VDM 538. The PID response can include a PID and a PID parameter value corresponding to the PID.

The measurement of a target signal 540 output by the vehicle 12 can occur using a target signal test corresponding to the target signal test indicator within the database response 533. The measurement of the target signal 540 can occur before, during, and after the vehicle 12 performs a functional test in response to receiving the VDM 537. In response to receiving the test device measurement and/or the PID parameter values, the processor 250 can compare the test device measurement and/or the PID parameter values to the baseline characteristics 60, 666 in order to determine the diagnostic status indicator 64, 658.

Next, FIG. 47 shows a workflow 550 with respect to the computing system 4, the vehicle 12, the server 2, and the database 13. In the workflow 550, a test set selection 551 is received and/or determined at the computing system 4. The test set selection 551 can be similar to the test set selection 501 described above. The processor 250 can receive and/or determine the test set selection 551 similar to how processor 250 receives and/or determines the test set selection 501. The computing system 4 transmits a database access request (DBAR) 552 based on the test set selection 551. The server 2 performs a DBA 553 of the database 13 based on the test set selection 551 and/or the DBAR 552. Accordingly, the DBA 553 can be based on one or more from among the vehicle identifier of the vehicle 12, a component identifier, a symptom identifier, a PID, or a user selection.

A database response 554 to the server 2 includes a target signal test indicator. A database response 555 to the server 2 includes a functional test command indicator. A database response 556 to the computing system 4 includes a PID indicator. A database response 557 to the computing system 4 includes a baseline characteristic. In some implementations, the database response 554, 555, 556, 557 are separate responses. In at least some implementations, two or more of the database response 554, 555, 556, 557 are in a single database response. In at least some implementations, the response to the DBA 553 comprises a test set file that includes one or more from among: the target signal test indicator of the database response 554, the functional test command indicator of the database response 555, the PID from the database response 556, or the baseline characteristic from the database response 557.

The target signal test indicator in the database response 554 can be similar to the target signal test indicator in the database response 503 described above with respect to FIG. 44. The functional test command indicator in the database response 555 can be similar to the functional test command indicator in the database response 504 described above with respect to FIG. 44. The PID in the database response 556 can be similar to the PID in the database response 535 described above with respect to FIG. 46. The baseline characteristic in the database response 557 can be similar to the baseline characteristic in the database response 536 described above with respect to FIG. 46.

The server 2 transmits to the computing system 4 a communication 558, 559, 560, 561. The communication 558 includes the target signal test indicator received via the database response 554. The communication 559 includes the functional test command indicator received via the database response 555. The communication 560 includes the PID indicator received via the database response 556. The communication 561 includes the baseline characteristic received via the database response 557. Two or more of the communication 558, 559, 560, 561 can be carried out as a single communication from the server 2 to the computing system 4. Transmitting two or more of the communication 558, 559, 560, 561 can include the server 2 transmitting a test set file to the computing system 4.

The target signal test indicator in the communication 558 can be similar to the target signal test indicator in the database response 503 described above with respect to FIG. 44. The functional test command indicator in the communication 559 can be similar to the functional test command indicator in the database response 504 described above with respect to FIG. 44. Accordingly, the computing system 4 can transmit a VDM 562 including or based on the functional test command indicator in the database response 555 and/or the communication 559. The PID indicator in the communication 560 can be similar to the PID in the database response 535 described above with respect to FIG. 46 and/or the database response 556. The baseline characteristic in the communication 561 can be similar to the baseline characteristic in the database response 536 described above with respect to FIG. 46 and/or the database response 557.

The functional test command indicator within the communication 559 and/or the communication 559 can include and/or correspond to a memory address for CRPI executable by the processor 250 to generate and cause transmission of a VDM 562 including the functional test command.

The processor 250 can execute CRPI to generate and cause transmission of a VDM 563 including a PID request based on the PID indicator received via the communication 560. The processor 250 can receive a VDM 564 including a PID response to the PID request of the VDM 563. The PID response can include a PID and a PID parameter value corresponding to the PID.

The measurement of a target signal 565 output by the vehicle 12 can occur using a target signal test corresponding to the target signal test indicator within the communication 558. The measurement of the target signal 565 can occur before, during, and after the vehicle 12 performs a functional test in response to receiving the VDM 562. In response to receiving the test device measurement and/or the PID parameter values, the processor 250 can compare the test device measurement and/or the PID parameter values to the baseline characteristics 60 in order to determine the diagnostic status indicator 64.

Any response from a database 13, 258 shown in FIG. 44 to FIG. 47 can include guidance for performing some aspect of a test set, such as a component test, manual adjustment, PID request or functional control test.

Figure 48:
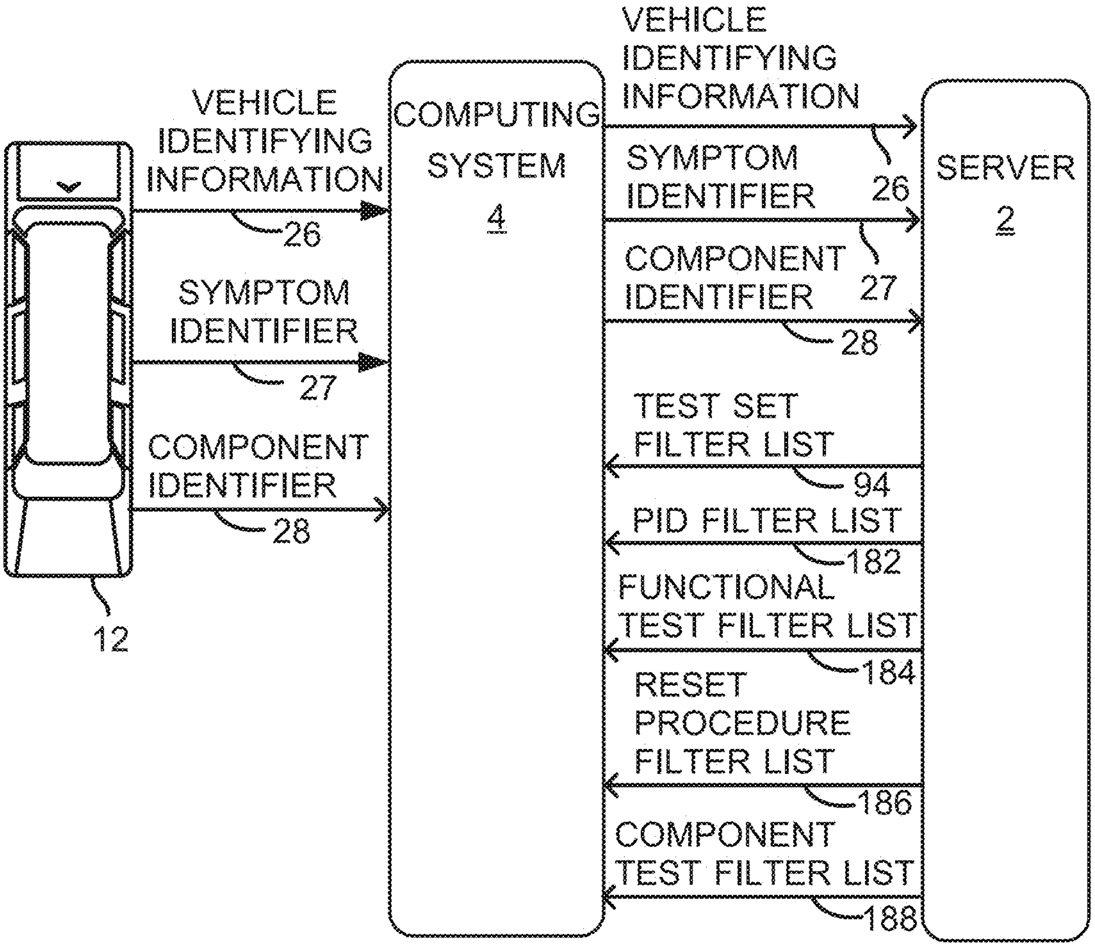

Next, FIG. 48 illustrates a workflow between the server 2, the computing system 4, and the vehicle 12 in accordance with the example implementations. In at least some implementations, the computing system 4 initially collects information from the vehicle 12 before communicating with the server 2. In particular, the computing system 4 can receive vehicle identifying information 26, a symptom identifier 27 (e.g., one or more symptom identifiers), and/or a component identifier 28 (e.g., one or more component identifiers) from the vehicle 12. Transmission of the vehicle identifying information 26, the symptom identifier 27, and/or the component identifier 28 can occur via a VDM. The vehicle identifying information 26 can include characteristics of the vehicle 12, such as the year, make, model, and engine.

In at least some implementations, the symptom identifier 27 includes one or more DTCs. In other implementations, the symptom identifier 27 includes one or more non-DTC symptom identifiers (such as, “engine misfire,” “misfire,” or “engine no start,” or “no start”). A non-DTC symptom identifier identifies a symptom other than by a DTC. In still other implementations, the symptom identifies 27 can be one or more DTCs and one or more non-DTC symptom identifiers. Moreover, any symptom identifier discussed within this application (including any one or more symptom identifiers and/or at least one symptom identifier) can be (i) one or more DTCs, (ii) one or more non-DTC symptom identifiers, or (iii) one or more DTCs and one or more non-DTC symptom identifiers.

The component identifier 28 can include an identifier of a vehicle component within the vehicle 12 exhibiting the symptom. The component identifier can be included within a VDM that includes a PID and PID parameter value and/or a DTC. In at least implementations, the vehicle identifying information 26, the symptom identifier 27, and/or the component identifier 28 can be received by the computing system 4 from a different source besides the vehicle 12. As an example, that different source can include the user interface 299.

In at least some implementations, receiving the one or more symptom identifiers 27 at the computing system 4 includes receiving one or more VDMs including a PID and a PID parameter value. In at least some of those implementations, the computing system 4 transmits the one or more VDMs to the server 2. In at least some other implementations, the computing system 4 transmits the PID and the PID parameter value from the one or more VDMs to the server 2. The one or more VDMs can be live VDMs as described elsewhere in this description.

The computing system 4 can transmit the vehicle identifying information 26, the symptom identifier 27, and/or the component identifier 28 to the server 2. The server 2 can process the vehicle identifying information 26, the symptom identifier 27, and/or the component identifier 28 in order to determine one or more contextually relevant diagnostic filter lists to provide back to computing system 4. In particular, the server 2 can provide any one or more from among a test set filter list 94, a PID filter list 182, a functional test filter list 184, a reset procedure filter list 186, or a component test filter list 188.

The test set filter list 94 indicates contextually relevant test sets for the vehicle 12 with the vehicle identifying information 26, a symptom corresponding to the symptom identifier 27, and/or a component identifier corresponding to the component identifier 28. The PID filter list 182 can indicate contextually relevant PIDs for the vehicle 12 with vehicle identifying information 26, a symptom corresponding to the symptom identifier 27, and/or a component identifier corresponding to the component identifier 28. The functional test filter list 184 can indicate contextually relevant functional tests for the vehicle 12 with vehicle identifying information 26, a symptom corresponding to the symptom identifier 27, and/or a component identifier corresponding to the component identifier 28. The reset procedure filter list 186 can indicate contextually relevant reset procedures for the vehicle 12 with vehicle identifying information 26, a symptom corresponding to the symptom identifier 27, and/or a component identifier corresponding to the component identifier 28. The component test filter list 188 can indicate contextually relevant component tests for the vehicle 12 with vehicle identifying information 26, a symptom corresponding to the symptom identifier 27, and/or a component identifier corresponding to the component identifier 28.

After receiving one or more diagnostic filter lists from the server 2, the computing system 4 can use the one or more diagnostic filter lists to determine and display contextually relevant subsets of data, information, or a GUI based on a test set file on the display 300. In particular, the computing system 4 can display a GUI based on a test set file corresponding to a symptom, a symptom-based subset of PIDs, a symptom-based subset of functional tests, a symptom-based subset of reset procedures, a symptom-based subset of component tests, a test set file corresponding to a component, a component-based subset of PIDs, a component-based subset of functional tests, a component-based subset of reset procedures, a component-based subset of component tests, and/or a test set file corresponding to a symptom and a component.

VII. Example Mapping Data, Hierarchy Data, and Filter Lists

Next, FIG. 49 shows examples of the mapping data 63. As shown, the mapping data 63 can comprise symptom-to-PID mapping data (MD) 70, component-to-PID MD 71, symptom-to-component-test MD 72, component-to-component-test MD 73, symptom-to-functional-test MD 74, component-to-functional-test MD 75, symptom-to-reset-procedure MD 76, component-to-reset-procedure MD 77, functional-test-to-PID MD 78, reset-procedure-to-PID MD 79, functional-test-to-target-signal MD 80, component-test-to-PID MD 81, test-set-to-PID MD 82, symptom-to-test-set MD 83, component-to-test-set MD 84, and condition-to-component MD 89. Particular examples of the foregoing mapping data are discussed below.

The mapping data 659 can include any or all of the mapping data 63. A processor, such as the processor 48, 250 can traverse mapping data backward or forward. For example, a processor can determine a PID based on a given symptom using the symptom-to-PID MD 70. As another example, a processor can determine a symptom based on a PID using the symptom to PID MD 70. Mapping a PID, symptom, or component to a test set can include mapping that PID, symptom, or component to a test set file.

Next, FIG. 50 shows examples of different indices that can be stored within the index 62. As shown, the index 62 can comprise a PID index 581, a component test index (CTI) 582, a functional test index (FTI) 583, a reset procedure index (RPI) 584, a test set index 593, and a target signal index 595. Two or more of those indices can be combined (e.g., aggregated) and stored as a single index. More particular examples of the foregoing indices are discussed below.

Next, FIG. 51 shows example mapping data. In particular, FIG. 51 shows examples of the symptom-to-PID MD 70 for four symptoms: symptom S1 is mapped to one PID, symptom S2 is mapped to one PID, symptom S3 is mapped to one PID, and symptom S4 is mapped to two PIDs. FIG. 51 also shows examples of the symptom-to-component-test MD 72 for four symptoms: symptom S1 is mapped to two component tests, symptom S2 is mapped to two component tests, symptom S3 is mapped to zero component tests, and symptom S4 is mapped to two component tests. FIG. 51 also shows examples of the symptom-to-functional-test MD 74 for four symptoms: symptom S1 is mapped to four functional tests, symptom S2 is mapped to four functional tests, symptom S3 is mapped to four functional tests, and symptom S4 is mapped to four functional tests. FIG. 51 also shows examples of the symptom-to-reset-procedure MD 76 for five symptoms: symptom S1 is mapped to one reset procedure, symptom S2 is mapped to one reset procedure, symptom S3 is mapped to zero reset procedures, symptom S4 is mapped to one reset procedure, symptom S5 is mapped to two reset procedures, symptom S6 is mapped to one reset procedure, symptom S7 is mapped to one reset procedure, symptom S8 is mapped to one reset procedure, and symptom S9 is mapped to one reset procedure. FIG. 51 also shows examples of the symptom-to-test-set MD 83 for five symptoms: symptom S1 is mapped to two sets, symptom S2 is mapped to two sets, symptom S3 is mapped to one test set, symptom S4 is mapped to one test set, and symptom S5 is mapped to one test set. In FIG. 51, the example symptoms are shown in parenthesis and the PIDs, component tests, functional tests, reset procedures, and test sets are listed after the colons. The mapping data 63, 659 can include the mapping data shown in FIG. 51.

Figure 52:
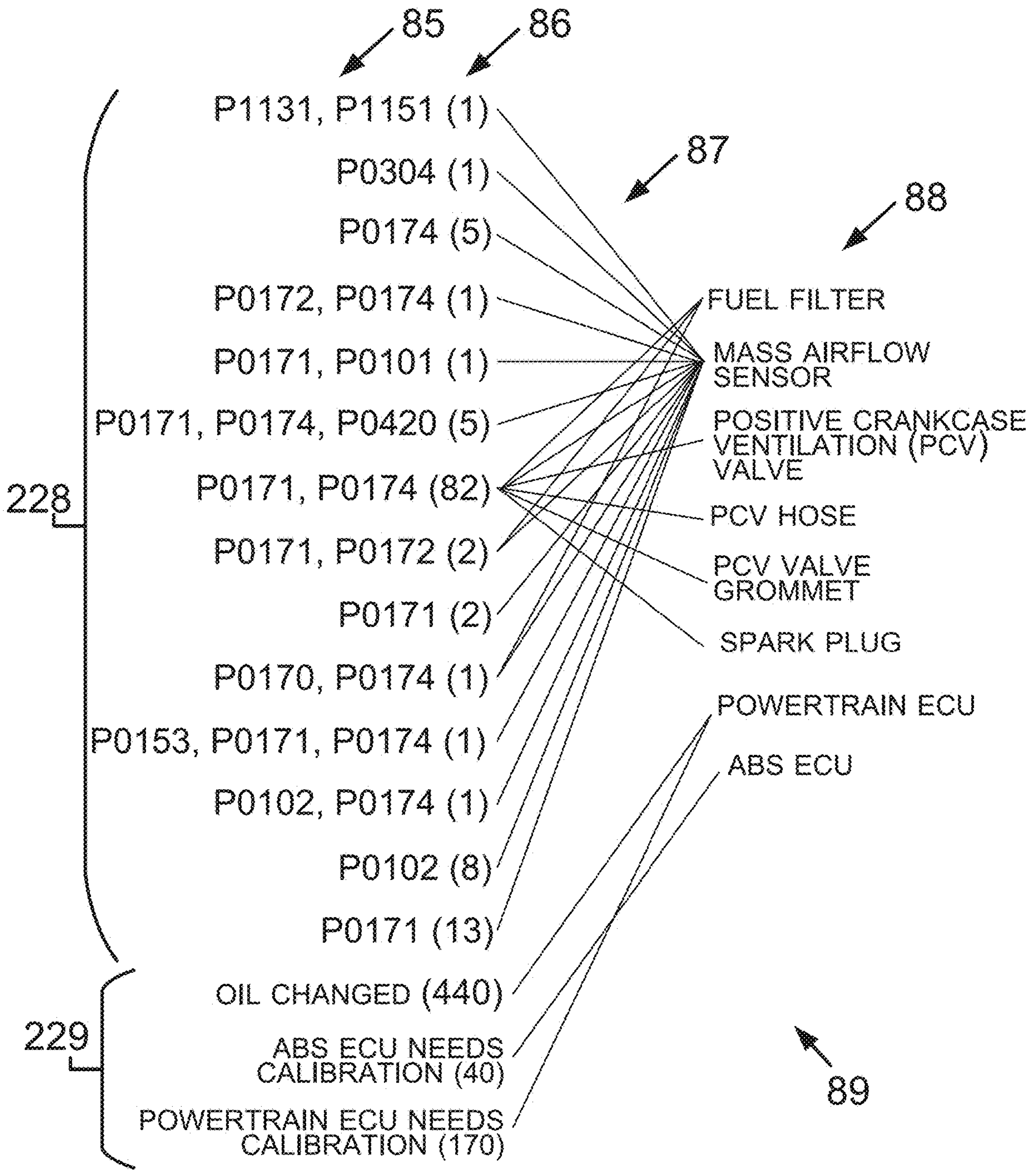
FIG. 52 is a diagram showing symptom-to-component mapping data in accordance with the example implementations.

Next, FIG. 52 is a diagram showing example condition-to-component MD 89 stored in the mapping data 63. The conditions 85 in FIG. 52 include symptoms 228 in the form of DTCs, but as shown in FIG. 51, a mapped symptom can comprise a symptom other than a DTC. The conditions 85 shown in FIG. 52 also include operating states 229 that do not result in setting a DTC. The condition-to-component MD 89 includes a count 86 within parenthesis for each symptom or operating state. The count 86 can indicate how many times each symptom, group of symptoms, or operating state in the same line as the count 86 has occurred. If the condition-to-component MD 89 does not include an operating state, the condition-to-component MD 89 can be referred to as symptom-to-component mapping data.

The DTCs shown in FIG. 52 can be referred to a "P-codes" from a powertrain controller ECU. As shown in FIG. 52, one symptom (such as the symptom P0171 and P0172) can be mapped to multiple components. The mapping between the symptom and component(s) is represented in FIG. 52 by the mapping lines 87. In addition to P-codes, symptoms can be identified by a "C-code" that represents a DTC for a chassis electrical component, a "B-code" that represents a DTC for body electrical component, or a "U-code" that represents a DTC for a user network code. In at least some implementations, a U-code can set when an ECU detects a condition on the vehicle network 36 (shown in FIG. 78).

Next, FIG. 53 shows additional example mapping data. In particular, FIG. 53 shows examples of the component-to-PID MD 71 for four components: component C1 is mapped to three PIDs, component C2 is mapped to three PIDs, component C3 is mapped to two PIDs, and component C4 is mapped to one PID. FIG. 53 also shows examples of the component-to-component-test MD 73 for five components: component C1 is mapped to two component tests, component C2 is mapped to three component tests, component C3 is mapped to three component tests, component C4 is mapped to two component tests, and component C5 is mapped to one component test. FIG. 53 also shows examples of the component-to-functional-test MD 75 for six components: component C1 is mapped to two functional tests, component C2 is mapped to zero functional tests, component C3 is mapped to two functional tests, component C4 is mapped to zero functional tests, component C5 is mapped to zero tests, and component C6 is mapped to one functional test. FIG. 53 also shows examples of the component-to-reset-procedure MD 77 for eight components: components C1, C2, C3, C4, C5, and C6 are each mapped to zero reset procedures, component C7 is mapped to two reset procedures, and component C8 is mapped to two reset procedures. FIG. 53 also shows examples of the component-to-test-set MD 84 for eight components: components C3, C5, C7, and C8 are each mapped to one test set, component C1 is mapped to one test set, components C2 and C6 are mapped to four test sets, and component C4 is mapped to zero test sets. In FIG. 53, the example components are shown in parenthesis and the PIDs, component tests, functional tests, reset procedures, and test sets are listed after the colons.

Next, FIG. 54 shows additional example mapping data. In particular, FIG. 54 shows examples of the functional-test-to-PID MD 78 for nineteen functional tests. Each row of the functional-test-to-PID MD 78 includes a functional test identifier before a textual description of the functional test within parenthesis and one or more PIDs or a null value if no PID is related to the functional test. As an example, the functional test identifier can include an identifier assigned to the functional test by the manufacturer that built the vehicle configured to perform the functional test. In at least some implementations, a VDM sent to the vehicle to request performance of the functional test includes the functional test identifier. In at least some implementations, the functional test identifier includes the data needed for the processor 250 to generate a VDM that can be sent to the vehicle to request performance of the functional test. The PIDs in FIG. 54 correspond to the PIDs having the same numbers in the PID index 90 shown in FIG. 58A and FIG. 58B. Additionally, the functional test identifiers (e.g., FT1) correspond to the functional test identifiers in the functional test index 101 shown in FIG. 60. In at least some implementations, the processor 250 receives an index value that corresponds to a functional test, determines a functional test identifier that corresponds to the received index value using the functional test index 101, and further determines whether any or which one or more PIDs correspond to the identified functional test. In at least some implementations, the functional test index 101 includes the functional-test-to-PID MD 78.

Next, FIG. 55 shows additional example mapping data. In particular, FIG. 55 shows examples of the reset-procedure-to-PID MD 79 for sixteen reset procedures. Each row of the reset-procedure-to-PID MD 79 includes a reset procedure identifier before a textual description of the reset procedure within parenthesis and one or more PIDs or a null value if no PID is related to the reset procedure. As an example, the reset procedure identifier can include an identifier assigned to the reset procedure by the manufacturer that built the vehicle configured to perform the reset procedure. In at least some implementations, a VDM sent to the vehicle to request performance of the reset procedure includes the reset procedure identifier. In at least some implementations, the reset procedure identifier includes the data needed for the processor 250 to generate a VDM that can be sent to the vehicle to request performance of the reset procedure. The PID numbers in FIG. 55 correspond to the PIDs having the same numbers in the PID index 90 shown in FIG. 58A and FIG. 58B. Additionally, the reset procedure identifiers (e.g., RP1) correspond to the reset procedure identifiers in the reset procedure index (RPI) 111 shown in FIG. 61. In at least some implementations, the processor 250 receives an index value that corresponds to a reset procedure, determines a reset procedure identifier that corresponds to the received index value using the RPI 111, and further determines whether any or which one or more PIDs correspond to the identified reset procedure. In at least some implementations, the RPI 111 includes the reset-procedure-to-PID MD 79.

Next, FIG. 56 shows additional example mapping data. In particular, FIG. 56 shows examples of the component-test-to-PID MD 81 for seven components. Each row of the component-test-to-PID MD 81 includes a component test identifier before a textual description of the component test within parenthesis and one or more PIDs (but could include a null value if no PID is related to the component test). As an example, the component test identifier can include an identifier assigned to the component test by the manufacturer that built the computing system 4 configured to perform the component test. The PID numbers in FIG. 56 correspond to the PIDs having the same numbers in the PID index 90 shown in FIG. 58A and FIG. 58B. Additionally, the component test identifiers (e.g., CT12) correspond to the component test identifiers in the component test index 95 shown in FIG. 59. In at least some implementations, the processor 250 receives an index value that corresponds to a component test, determines a component test identifier that corresponds to the received index value using the component test index 95, and further determines whether any or which one or more PIDs correspond to the identified component test. In at least some implementations, the component test index 95 includes the component-test-to-PID MD 81.

Next, FIG. 57 shows additional example mapping data. In particular, FIG. 57 shows examples of the test-set-to-PID MD 82 for seventeen test sets. Each row of the test-set-to-PID MD 82 includes a test set identifier before a textual description of the test set within parenthesis and one or more PIDs or a null value if no PID is related to the test set. As an example, the test set identifier can include an identifier assigned to the test set by the manufacturer that built the computing system 4 configured to perform the test set. The PID numbers in FIG. 57 correspond to the PIDs having the same numbers in the PID index 90 shown in FIG. 58A and FIG. 58B. Additionally, the test set identifiers (e.g., TS1) correspond to the test set identifiers in the test set index 648 shown in FIG. 62. In at least some implementations, the processor 250 receives an index value that corresponds to a test set, determines a test set identifier that corresponds to the received index value using the test set index 648, and further determines whether any or which one or more PIDs correspond to the identified test set. In at least some implementations, the test set index 648 includes the test-set-to-PID MD 82. The following abbreviations are used in FIG. 57: "act" for actuator, "volt" for voltage, 'TS" for test set, "tar. sig." for target signal. An identifier of a test set can include an identifier of a test set file.

Furthermore, the test-set-to-PID MD 82 can include PID-to-test-set MD 261. The PID-to-test-set MD 261 can include identifiers of one or more test sets that correspond to each PID in the vehicle 12. FIG. 57 shows example PID-to-test-set MD for four PIDs. Each row of the PID-to-test-set MD 261 includes a PID before a textual description of the PID within parenthesis and one or more test set identifiers or a null value if no test set is related to the PID. As an example, the processor 250 can use the PID-to-test-set MD 261 to determine a test set that corresponds to a PID displayed on the display 300 during a mode in which the display 300 is displaying live vehicle data. The test set corresponding to the USC 738 in FIG. 10 can be determined using the PID-to-test-set MD 261.

Next, FIG. 58A and FIG. 58B show a PID index 90. These figures show three example representations of PIDs within the PID index 90. As shown in FIG. 58A and FIG. 58B, the PID index 90 can represent PIDs using an ordered list of PIDs 91, index values 92, and PID names 93 (i.e., at least one word describing a PID). A different PID index (for use with the example implementations) can represent PIDs using only one of those three example representations, a combination of any two of those three example representations, or with a different example PID representation. The index values 92 can, for example, comprise alphanumeric, decimal, hexadecimal, or numbers of some other base to represent PIDs within the PID index 90. The PID index 581 (shown in FIG. 50) can comprise multiple PID indices, such as a separate PID index for each of multiple different sets of particular identifying information (e.g., a separate PID index for each Y/M/M, Y/M/M/E, Y/M/M/F, or Y/M/M/E/F). Those separate PID index can be arranged like the PID index 90 or in another manner. The PID index 90 can comprise or be associated with particular vehicle identifying information.

Moreover, a first computing system, such as the computing system 4, can include the PID index 90 and can include, for each PID of the ordered list of PIDs and/or PID name, a memory address indicative of where a PID command is stored in memory, such as a PID command within the PID command 670 within the memory 252. The PID request message can be sent to a vehicle in order to request a PID parameter value corresponding to a particular PID. The first computing system can receive from a second computing system, such as the server 2, a subset of index values (from among the index values 92). The computing system 4 can determine based on the subset of index values and the PID names 93 a subset of the PID names to display on the display 300. A benefit of communicating with the computing system 4 in this manner is that the server 2 can communicate to the computing system 4 which PIDs are relevant to a particular set of circumstances (e.g., a particular symptom) by providing the subset of index values (from among the index values 92) and without having to provide the computing system 4 with memory address information or the PID names.

In accordance with the example implementations, the computing system 4 can provide the server 2 with a symptom identifier for a particular vehicle, and the server 2 can refer to the symptom-to-PID mapping data 70 to determine a PID applicable to the symptom identifier. Additionally, or alternatively, the computing system 4 can provide the server 2 with a component identifier for a particular vehicle, and the server 2 can refer to the component-to-PID mapping data 71 to determine a PID applicable to the component identifier.

Once the server 2 determines a PID, the server 2 can refer to the PID index 90 to determine an index value for the determined PID and thereafter provide the index value to the computing system 4 so that the computing system 4 can output to the vehicle 12 a VDM including the PID. The computing system 4 can determine the VDM to be sent by referring to the PID command 670.

Next, FIG. 59 shows a component test index (CTI) 95. This figure shows three example representations of component tests within the CTI 95. As shown in FIG. 59, the CTI 95 can represent component tests using an ordered list of component tests 96, index values 97, and component test names 98 (i.e., at least one word describing a component test). A different CTI (for use with the example implementations) can represent component tests using only one of those three example representations, a combination of any two of those three example representations, or with a different example component test representation. The index values 97 can, for example, comprise alphanumeric, decimal, hexadecimal, or numbers of some other base to represent the component tests within the CTI 95. The CTI 582 (shown in FIG. 50) can comprise multiple component test indices, such as a separate CTI for each of multiple different sets of particular identifying information (e.g., a separate CTI for each Y/M/M, Y/M/M/E, Y/M/M/F, or Y/M/M/E/F). Those separate CTI can be arranged like the CTI 95 or in another manner. The CTI 95 can comprise or be associated with particular vehicle identifying information.

Moreover, a first computing system, such as the computing system 4, can include the CTI 95 and can include, for each component test of the ordered list of component tests 96 and/or component test name, a memory address indicative of where an executable component test module is stored in memory, such as a component test module within the component test 662 within the memory 252. The first computing system can receive from a second computing system, such as the server 2, a subset of index values (from among the CTI 95). The computing system 4 can determine based on the subset of index values and the component test names 98 a subset of the component test names to display on the display 300. A benefit of communicating with the computing system 4 in this manner is that the server 2 can communicate to the computing system 4 which component tests are relevant to a particular set of circumstances (e.g., a particular symptom) by providing the subset of index values (from among the index values 97) and without having to provide the computing system 4 with memory address information or the component test names.

In accordance with the example implementations, the computing system 4 can provide the server 2 with a symptom identifier for a particular vehicle, and the server 2 can refer to the symptom-to-component-test mapping data 72 to determine a component test applicable to the symptom identifier. Additionally, or alternatively, the computing system 4 can provide the server 2 with a component identifier for a particular vehicle, and the server 2 can refer to the component-to-component-test mapping data 73 to determine a component test applicable to the component identifier. Once the server 2 determines a component test, the server 2 can refer to the CTI 95 to determine an index value for the determined component test and thereafter provide the index value to the computing system 4 so that the computing system 4 can output user-selectable control(s) for the component test on the display 300.

Next, FIG. 60 shows a functional test index (FTI) 101. This figure shows three example representations of functional tests within the FTI 101. As shown in FIG. 60, the FTI 101 can represent functional tests using functional test identifiers 103, index values 105, and functional test names 107 (i.e., at least one word describing a functional test). A different FTI (for use with the example implementations) can represent functional tests using only one of those three example representations, a combination of any two of those three example representations, or with a different example functional test representation. The index values 105 can, for example, comprise alphanumeric, decimal, hexadecimal, or numbers of some other base to represent the functional tests within the FTI 101. The FTI 583 (shown in FIG. 50) can comprise multiple functional test indices, such as a separate FTI for each of multiple different sets of particular identifying information (e.g., a separate FTI for each Y/M/M, Y/M/M/E, Y/M/M/F, or Y/M/M/E/F). Those separate FTI can be arranged like the FTI 101 or in another manner. The FTI 101 can comprise or be associated with particular vehicle identifying information.

Moreover, a first computing system, such as the computing system 4, can include the FTI 101 and can include, for each functional test of the functional test identifiers 103 and/or functional test name, a memory address indicative of where a functional test command is stored in memory, such as a functional test command within the functional test command 671 within the memory 252. A VDM including a functional test command can be sent to the vehicle 12 in order to request the vehicle 12 to perform the functional test. The first computing system can receive from a second computing system, such as the server 2, a subset of index values (from among the index values 105). The computing system 4 can determine based on the subset of index values and the functional test names 107 a subset of the functional test names to display on the display 300. A benefit of communicating with the computing system 4 in this manner is that the server 2 can communicate to the computing system 4 which functional tests are relevant to a particular set of circumstances (e.g., a particular symptom) by providing the subset of index values (from among the index values 105) and without having to provide the computing system 4 with memory address information or the functional test names.

In accordance with the example implementations, the computing system 4 can provide the server 2 with a symptom identifier for a particular vehicle, and the server 2 can refer to the symptom-to-functional-test mapping data 74 to determine a functional test applicable to the symptom identifier. Additionally, or alternatively, the computing system 4 can provide the server 2 with a component identifier for a particular vehicle, and the server 2 can refer to the component-to-functional-test mapping data 75 to determine a functional test applicable to the component identifier. Once the server 2 determines a functional test, the server 2 can refer to the FTI 101 to determine an index value for the determined functional test and thereafter provide the index value to the computing system 4 so that the computing system 4 can output user-selectable control(s) for the functional test on the display 300.

Next, FIG. 61 shows a reset procedure index (RPI) 111. This figure shows three example representations of reset procedures within the RPI 111. As shown in FIG. 61, the RPI 111 can represent reset procedures using an ordered list of reset procedures 113, index values 115, and reset procedures names 117 (i.e., at least one word describing a reset procedure). A different RPI (for use with the example implementations) can represent reset procedures using only one of those three example representations, a combination of any two of those three example representations, or with a different example reset procedure representation. The index values 115 can, for example, comprise alphanumeric, decimal, hexadecimal, or numbers of some other base to represent the reset procedures within the RPI 111. The RPI 584 (shown in FIG. 50) can comprise multiple reset procedure indices, such as a separate RPI for each of multiple different sets of particular identifying information (e.g., a separate RPI for each Y/M/M, Y/M/M/E, Y/M/M/F, or Y/M/M/E/F). Those separate RPI can be arranged like the RPI 111 or in another manner. The RPI 111 can comprise or be associated with particular vehicle identifying information.

Moreover, a first computing system, such as the computing system 4, can include the RPI 111 and can include, for each reset procedure of the ordered list of reset procedures 113 and/or reset procedure name, a memory address indicative of where a reset procedure command is stored in memory, such as a reset procedure command within the reset procedure command 672 within the memory 252. A VDM including a reset procedure command can be sent to the vehicle 12 in order to request the vehicle 12 to perform the reset procedure. The first computing system can receive from a second computing system, such as the server 2, a subset of index values (from among the index values 105). The computing system 4 can determine based on the subset of index values and the reset procedure names 117 a subset of the reset procedure names to display on the display 300. A benefit of communicating with the computing system 4 in this manner is that the server 2 can communicate to the computing system 4 which reset procedure(s) are relevant to a particular set of circumstances (e.g., a particular symptom or vehicle state) by providing the subset of index values (from among the index values 115) and without having to provide the computing system 4 with memory address information or the reset procedure names.

In accordance with the example implementations, the computing system 4 can provide the server 2 with a symptom identifier for a particular vehicle, and the server 2 can refer to the symptom-to-reset-procedure mapping data 76 to determine a reset procedure applicable to the symptom identifier. Additionally, or alternatively, the computing system 4 can provide the server 2 with a component identifier for a particular vehicle, and the server 2 can refer to the component-to-reset-procedure mapping data 77 to determine a reset procedure applicable to the component identifier. Once the server 2 determines a reset procedure, the server 2 can refer to the reset procedure index 111 to determine an index value for the determined reset procedure and thereafter provide the index value to the computing system 4 so that the computing system 4 can output the user-selectable control(s) corresponding to the determined reset procedure on the display 300.

Next, FIG. 62 shows a test set index 648. FIG. 62 shows three example representations of test set identifiers within the test set index 648. As shown in FIG. 62, the test set index 648 can represent test sets using an ordered list of test set identifiers 649, index values 650 (e.g., using hexadecimal values), and test set names 651 (i.e., at least one word describing a test set). A different test set index (for use with the example implementations) can represent test sets using only one of those three example representations, a combination of any two of those three example representations, or with a different example test set representation. The index values 650 can, for example, comprise alphanumeric, decimal, hexadecimal, or numbers of some other base to represent the test sets within the test set index 648. The test set index 593 (shown in FIG. 50) can comprise multiple test set indices, such as a separate test set index for each of multiple different sets of particular identifying information (e.g., a separate test set index for each Y/M/M, Y/M/M/E, Y/M/M/F, or Y/M/M/E/F). Those separate test set index can be arranged like the test set index 648 or in another manner. The test set index 648 can comprise or be associated with particular vehicle identifying information.

In at least some implementations, the index values 650 are different than the index values of other indices (such as the PID index 90, the CTI 95, FTI 101, and the reset procedure index 111) so that a single index using the index numbers of multiple indices can be formed without any overlap of the index values.

Moreover, a first computing system, such as the computing system 4, can include the test set index 648 and can include, for each test set identifier and/or test set name, a memory address indicative of where a particular test set file is stored in memory, such as a test set file within the test set 663 stored in the memory 252. The first computing system can receive from a second computing system, such as the server 2, a subset of index values (from among the index values 650). The computing system 4 can determine based on the subset of index values and the test set names 651 a subset of the test sets names to display on the display 300. A benefit of communicating with the computing system 4 in this manner is that the server 2 can communicate to the computing system 4 which test sets are relevant to a particular set of circumstances (e.g., a particular symptom) by providing the subset of index values (from among the index values 650) and without having to provide the computing system 4 with memory address information or the test set names.

In accordance with the example implementations, the computing system 4 can provide the server 2 with a symptom identifier for a particular vehicle, and the server 2 can refer to the symptom-to-test-set MD 83 to determine a test set applicable to the symptom identifier. Additionally, or alternatively, the computing system 4 can provide the server 2 with a component identifier for a particular vehicle, and the server 2 can refer to the component-to-test-set MD 84 to determine a test set applicable to the component identifier. Once the server 2 determines a test set, the server 2 can refer to the test set index 648 to determine an index value for the determined test set and thereafter provide the index value to the computing system 4 so that the computing system 4 can output the test set on the display 300 (e.g., output a GUI of or based on a test set file).

Next, FIG. 63 shows a first set of PID parameter values 815 for a PID 813 (e.g., PID6 representing fuel pump pressure) from a first set of vehicles 811 with all DTCs 817 for a particular ECU (e.g., a powertrain control system ECU) set to inactive. FIG. 63 shows a second set of PID parameter values 821 for the PID 813 (e.g., PID6) from a second set of vehicles 819 with one or more particular DTCs (e.g., DTC (5) and DTC (9)) for the particular ECU (e.g., a powertrain control system ECU) set to active. The units associated with the PID parameter values 815, 821 can be PSI, kPa or some other units. The first set of PID parameter values 815 can include and/or be associated with data that that indicates the first set of vehicles, the status of DTC within the first set of vehicles for the particular ECU, and the PID 813. Likewise, the second set of PID parameter values 821 can include and/or be associated with data that that indicates the second set of vehicles, the status of DTC within the second set of vehicles for the particular ECU, and the PID 813.

The processor 250 can write a received VDM or at least a portion of data within the VDM (such as a PID, a PID parameter value, or DTC information shown in FIG. 63) into the vehicle data message 665. The processor 250 can determine whether a PID parameter value breaches a PID threshold and thereafter determine a test set corresponding to the PID. The processor 250 may transmit the VDM and/or the PID and PID parameter value to the server 2 so that the processor 48 can determine whether the PID parameter value breaches the PID threshold and thereafter determine the test set corresponding to the PID. Afterwards, the processor 48 can transmit a test set file corresponding to the determined test set, an index value corresponding to the determined test set, or an identifier of the determined test set to the computing system 4. The computing system 4 can thereafter output a GUI for the determined test set on the display 300.

Figure 64:
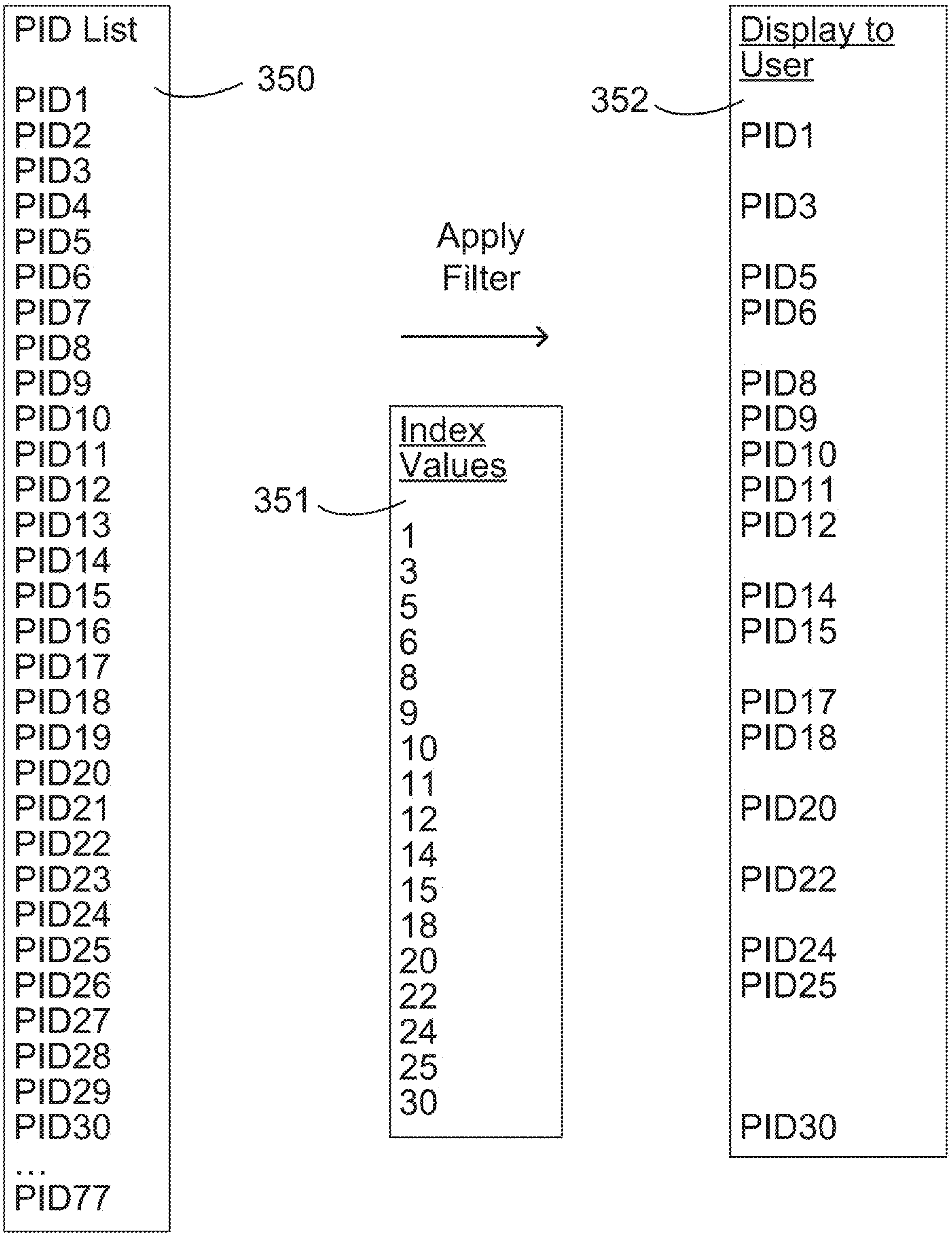
FIG. 64 shows a PID filter list in accordance with the example implementations.

Next, FIG. 64 shows application of a PID filter list to display a subset of PIDs. More specifically, an ordered list 350 of PIDs can be stored within memory of computing system 4, such as the ordered list of PIDs 91 shown in FIG. 58A and FIG. 58B. In some examples, the ordered list 350 can be a single ordered list of PIDs for all vehicle types. In other examples, the ordered list 350 can be determined and/or stored specifically for vehicles sharing certain identifying information. The ordered list 350 can be the same as a corresponding ordered list stored at the server 2 in order to facilitate the application of a PID filter list by the computing system 4 that has been received from the server 2. The ordered list 350 of PIDs extending from PID1 to PID77 can correspond to PID1 to PID77, respectively in the ordered list of PIDs 91.

The computing system 4 can receive index values 351 from the server 2 that make up a PID filter list. The index values 351 can represent entries from the ordered list 350 of PIDs stored within memory of computing system 4. The computing system 4 can select PIDs from the ordered list 350 that correspond to index values 351 in order to determine a subset 352 of PIDs to display within display 300. In this manner, a minimal amount of information can be transmitted over a network connection between server 2 and computing system 4. The computing system 4 can locally store information about individual PIDs as part of ordered list 350. For example, this stored information can include full PID descriptors to display within display 300. The stored information can also include instructions for requesting corresponding PID parameters from the vehicle 12. As an example and as shown in FIG. 59, the PID descriptors can include PID names.

A processor (e.g., the processor 48, 250) can refer to mapping data (e.g., the mapping data 63, 659) to determine a subset of index values to be applied against the ordered list of PIDs 91 or the ordered list 350. For example, if the processor 48 determines a symptom, the processor 48 can traverse the symptom-to-PID MD 70 to determine PID(s) applicable to the symptom and then traverse the ordered list 350 or the PID index 90, 581 to determine the subset of index values (i.e., index values corresponding to applicable PIDs). The processor 48 can transmit the subset of index values to the processor 250. The processor 250 can filter the ordered list 350 or the PID index stored in the memory 252 (e.g., the PID index 90, 581) using the subset of index values to determine a symptom-based subset of PIDs for displaying on the display 300 and/or requesting from the vehicle 12. The display 300 can display parameter values received in response to requesting the PIDs.

As another example, if the processor 48 determines a component, the processor 48 can traverse the component-to-PID MD 71 to determine PID(s) applicable to the component and then traverse the ordered list 350 or the PID index 90, 581 to determine the subset of index values (i.e., index values corresponding to applicable PIDs). The processor 48 can transmit the subset of index values to the processor 250. The processor 250 can filter the ordered list 350 or the PID index stored in the memory 252 (e.g., the PID index 90, 581) using the subset of index values to determine a component-based subset of PIDs sets for displaying on the display 300 and/or requesting from the vehicle 12. The display 300 can display parameter values received in response to requesting the PIDs.

As another example, if the processor 48 determines a functional test, the processor 48 can traverse the functional-test-to-PID MD 78 to determine PID(s) applicable to the functional test and then traverse the ordered list 350 or the PID index 90, 581 to determine the subset of index values (i.e., index values corresponding to applicable PIDs). The processor 48 can transmit the subset of index values to the processor 250. The processor 250 can filter the ordered list 350 or the PID index 90, 581 using the subset of index values to determine a functional-test-based subset of PIDs for displaying on the display 300 and/or requesting from the vehicle 12. The display 300 can display parameter values received in response to requesting the PIDs.

As another example, if the processor 48 determines a component test, the processor 48 can traverse the component-test-to-PID MD 81 to determine PID(s) applicable to the component test and then traverse the ordered list 350 or the PID index 90, 581 to determine the subset of index values (i.e., index values corresponding to applicable PIDs). The processor 48 can transmit the subset of index values to the processor 250. The processor 250 can filter the ordered list 350 or the PID index 90, 581 using the subset of index values to determine a component-test-based subset of PIDs for displaying on the display 300 and/or requesting from the vehicle 12. The display 300 can display parameter values received in response to requesting the PIDs.

As another example, if the processor 48 determines a reset procedure, the processor 48 can traverse the reset-procedure-to-PID MD 79 to determine PID(s) applicable to the reset procedure and then traverse the ordered list 350 or the PID index 90, 581 to determine the subset of index values (i.e., index values corresponding to applicable PIDs). The processor 48 can transmit the subset of index values to the processor 250. The processor 250 can filter the ordered list of PIDs 91 or the ordered list 350 using the subset of index values to determine a reset procedure-based subset of PIDs for displaying on the display 300 and/or requesting from the vehicle 12. The display 300 can display parameter values received in response to requesting the PIDs.

As another example, if the processor 48 determines a test-set, the processor 48 can traverse the test-set-to-PID MD 82 to determine PID(s) applicable to the test set and then traverse the ordered list 350 or the PID index 90, 581 to determine the subset of index values (i.e., index values corresponding to applicable PIDs). The processor 48 can transmit the subset of index values to the processor 250. The processor 250 can filter the ordered list 350 or the PID index 90, 581 using the subset of index values to determine a test-set-based subset of PIDs for displaying on the display 300 and/or requesting from the vehicle 12. The display 300 can display parameter values received in response to requesting the PIDs.

In further implementations, an ordered list of functional tests stored on the computing system 4 can be the same as a corresponding ordered list of functional tests stored at the server 2. A functional test filter list received by the computing system 4 from the server 2 can include a subset of index values that represent entries from the ordered list of functional tests. For example, if the processor 48 determines a symptom, the processor 48 can traverse the symptom-to-functional-test MD 74 to determine functional tests applicable to the symptom and then traverse a functional test index stored in the database 13, 55 (e.g., the FTI 101, 583) to determine the subset of index values (i.e., index values corresponding to applicable functional tests). The processor 48 can transmit the subset of index values to the processor 250. The processor 250 can filter a functional test index stored in the memory 252 (e.g., the FTI 101, 583) using the subset of index values to determine a symptom-based subset of functional tests for displaying on the display 300.

Similarly, if the processor 48 determines a component, the processor 48 can traverse the component-to-functional-test MD 75 to determine functional tests applicable to the component and then traverse a functional test index stored in the database 13, 55 (e.g., the FTI 101, 583) to determine the subset of index values (i.e., index values corresponding to applicable functional tests). The processor 48 can transmit the subset of index values to the processor 250. The processor 250 can filter a functional test index stored in the memory 252 (e.g., the FTI 101, 583) using the subset of index values to determine a component-based subset of functional tests for displaying on the display 300.

In further implementations, an ordered list of reset procedures stored on the computing system 4 can be the same as a corresponding ordered list of reset procedures stored at the server 2. A reset procedure filter list received by the computing system 4 from the server 2 can include index values that represent entries from the ordered list of reset procedures. For example, if the processor 48 determines a symptom, the processor 48 can traverse the symptom-to-reset procedure MD 76 to determine reset procedures applicable to the symptom and then traverse a functional test index stored in the database 13, 55 (e.g., the FTI 101, 584) to determine the subset of index values (i.e., index values corresponding to applicable reset procedures). The processor 48 can transmit the subset of index values to the processor 250. The processor 250 can filter a reset procedure index stored in the memory 252 (e.g., the RPI 111, 583) using the subset of index values to determine a symptom-based subset of reset procedures for displaying on the display 300.

Similarly, if the processor 48 determines a component, the processor 48 can traverse the component-to-reset procedure MD 77 to determine reset procedures applicable to the component and then traverse a reset procedure index stored in the database 13, 55 (e.g., the RPI 111, 584) to determine the subset of index values (i.e., index values corresponding to applicable reset procedures). The processor 48 can transmit the subset of index values to the processor 250. The processor 250 can filter a reset procedure index stored in the memory 252 (e.g., the RPI 111, 584) using the subset of index values to determine a component-based subset of reset procedures for displaying on the display 300.

In further implementations, an ordered list of component tests stored on the computing system 4 can be the same as a corresponding ordered list of component tests stored at the server 2. A component test filter list received by the computing system 4 from the server 2 can include index values that represent entries from the ordered list of component tests. For example, if the processor 48 determines a symptom, the processor 48 can traverse the symptom-to-component-test MD 72 to determine component tests applicable to the symptom and then traverse a component test index stored in the database 13, 55 (e.g., the CTI 95, 582) to determine the subset of index values (i.e., index values corresponding to applicable component tests). The processor 48 can transmit the subset of index values to the processor 250. The processor 250 can filter a component test index stored in the memory 252 (e.g., the CTI 95, 582) using the subset of index values to determine a symptom-based subset of component tests for displaying on the display 300.

Similarly, if the processor 48 determines a component, the processor 48 can traverse the component-to-component-test MD 73 to determine component tests applicable to the component and then traverse a component test index stored in the database 13, 55 (e.g., the CTI 95, 582) to determine the subset of index values (i.e., index values corresponding to applicable component tests). The processor 48 can transmit the subset of index values to the processor 250. The processor 250 can filter a component test index stored in the memory 252 (e.g., the CTI 95, 582) using the subset of index values to determine a component-based subset of component tests for displaying on the display 300.

Additionally, if the processor 48 determines a condition corresponding to a vehicle 12, the processor 48 can traverse the condition-to-component MD 89 to determine component tests applicable to the condition and then traverse a component test index stored in the database 13, 55 (e.g., the CTI 95, 582) to determine the subset of index values (i.e., index values corresponding to applicable component tests). The processor 48 can transmit the subset of index values to the processor 250. The processor 250 can filter a component test index stored in the memory 252 (e.g., the CTI 95, 582) using the subset of index values to determine a condition-based subset of component tests for displaying on the display 300.

In further implementations, an ordered list of test set files stored on the computing system 4 can be the same as a corresponding ordered list of test set files stored at the server 2. A test set filter list received by the computing system 4 from the server 2 can include index values that represent entries from the ordered list of test set files. For example, if the processor 48 determines a symptom, the processor 48 can traverse the symptom-to-test-set MD 83 to determine test sets applicable to the symptom and then traverse a test set index stored in the database 13, 55 (e.g., the test set index 593, 648) to determine the subset of index values (i.e., index values corresponding to applicable test sets). The processor 48 can transmit the subset of index values to the processor 250. The processor 250 can filter a test set index stored in the memory 252 (e.g., the test set index 593, 648) using the subset of index values to determine a symptom-based subset of test sets for displaying on the display 300.

Similarly, if the processor 48 determines a component, the processor 48 can traverse the component-to-test-set MD 84 to determine test sets applicable to the component and then traverse a test set index stored in the database 13, 55 (e.g., the test set index 593, 648) to determine the subset of index values (i.e., index values corresponding to applicable test sets). The processor 48 can transmit the subset of index values to the processor 250. The processor 250 can filter a test set index stored in the memory 252 (e.g., the test set index 593, 648) using the subset of index values to determine a component-based subset of test sets for displaying on the display 300.

In further implementations, an ordered list of target signals stored on the computing system 4 can be the same as a corresponding ordered list of target signals stored at the server 2. A target signal filter list received by the computing system 4 from the server 2 can include index values that represent entries from the ordered list of target signals. For example, if the processor 48 determines a functional test, the processor 48 can traverse the functional-test-to-target-signal MD 80 to determine target signals applicable to the functional test and then traverse a target signal index stored in the database 13, 55 (e.g., the target signal index 595, 917) to determine the subset of index values (i.e., index values corresponding to applicable target signals). The processor 48 can transmit the subset of index values to the processor 250. The processor 250 can filter a target signal index stored in the memory 252 (e.g., the target signal index 595, 917) using the subset of index values to determine a functional-test-based subset of target signals for displaying on the display 300 and/or measuring before, during, and/or after performance of the functional test.

In yet further implementations, a single ordered list can include multiple types of entries, including any combination of PIDs, functional tests, reset procedures, component tests, test sets, or target signals. A diagnostic filter list sent by the server 2 to computing system 4 can then include index values for multiple types of entries. For instance, the diagnostic filter list can include index values corresponding to both PIDs and component tests based on an identified symptom. In that case, the diagnostic filter list can be applied by the computing system 4 to determine both a symptom-based subset of PIDs and a symptom-based subset of component tests for display.

Alternatively, an ordered list of any combination of PIDs, functional tests, reset procedures, component tests, test sets, or target signals can be based on an identified component, functional test, component test, reset procedure, test set, PID, or condition.

In yet further implementations, a diagnostic filter list can be embodied within a test set file, such as the test set file 825 shown in FIG. 82A to FIG. 82C. In at least some of those implementations, the test set file includes instructions indicative of how to display (within a GUI) a subset of PIDs, a subset of functional tests, and subset of component tests determined from index values (e.g., the diagnostic filter list) in a test set file. As an example, the GUI 390 can be output by the processor 250 based on the test set file 825. In contrast, a list of index values (6), (31), (32), (33), (2F), (4A) that corresponds to PIDs PID6, PID31, PID32, PID33, component test CT12, and functional test (4A) (from the PID index 90, the component test index 95, and the functional test index 101) by themselves do not include the display instructions.

Next, FIG. 67 shows a thumbnail image 140. The thumbnail image represents a target signal for a vehicle component referred to as a "fuel injector" on the vehicle 12. A fuel injector is typically controlled by an engine control ECU. As an example, the target signal can be a signal on an electrical circuit that connects the fuel injector and an engine control ECU that sinks current supplied to the fuel injector via another electrical circuit connected to the fuel injector. The thumbnail image 140 includes a waveform 141 and a target signal reference 142. For the thumbnail image 140, the target signal reference 142 is engine revolutions per minute (i.e., RPM). Although FIG. 67 shows the target signal reference 142 within the thumbnail image 140, additionally or alternatively, the target signal reference 142 can be arranged as metadata included with the thumbnail image 140. The thumbnail image 140 can be configured as an image file, such as an image file with a BMP, JPG, PNG or some other file extension. A thumbnail image, such as the thumbnail image 140, can be included within or referenced by mapping data. For purposes of this description and with reference to FIG. 65, the thumbnail image 140 is referred to as "TN #1."

Next, FIG. 65 shows functional-test-to-target-signal mapping data 80 in accordance with the example implementations. The functional-test-to-target-signal mapping data 80 includes functional test (FT) numbers 915 that correspond to the functional test identifiers 103 in FIG. 60. Additionally, or alternatively the functional test numbers 915 can include the index values 105 in FIG. 60 that correspond to functional tests. The functional-test-to-target-signal mapping data 80 includes target signal identifiers 916, a target signal index 917, target signal characteristics 918, functional test commands 919, PIDs 920, and PID index values 226, some of which are shown in FIG. 58A. The target signal(s), a target signal index value, target signal characteristic(s), functional test command(s), and PID(s) in each row corresponds to the functional test identified by the functional test number in the same row.

The target signal identifiers 916 can identify target signals in various ways. For example, the target signal identifiers 916 can include circuit descriptors. In one respect, the circuit descriptors can identify the target signal that is expected to be on the circuit on which the target signal can be present. For example, those circuit descriptors could include circuit descriptors such as battery voltage or five-volt reference voltage. In another respect, the circuit descriptors can indicate a node to which the circuit on which the target signal can be present is connected. For example, those circuit descriptors could include circuit descriptors such as electrical ground, chassis ground, battery negative terminal, or the circuit descriptors for the functional tests FT1 to FT18 in FIG. 65. As another example, the target signal identifiers 916 can include PID(s). In FIG. 65, the target signal identifier for the functional test FT17 is the PID48: air conditioning (A/C) switch. As still yet another example, the target signal identifier 916 can identify target signals by circuit numbers that correspond to circuits on which the target signal can be present. In FIG. 65, the circuit numbers are identified using the terminology "Ckt. XXX," where XXX represents a numeric or alphanumeric circuit identifier typically found on an electrical schematic provided by or on behalf of a vehicle manufacturer. The circuit on which a target signal can be present can include an electrical circuit or an optical circuit.

The target signal index 917 includes index values corresponding to the target signal identifiers 916. The target signal index 917 includes base ten whole numbers. Alternatively, the target signal index 917 can include alphanumeric characters, or decimal, hexadecimal, or numbers of some other base to represent target signals.

The target signal characteristics 918 include characteristics of a target signal that can be measured or compared against reference characteristics. In FIG. 65, the baseline characteristics include voltage references (e.g., battery voltage), a signal type (e.g., a square wave with a duty cycle between 0 and 100%, a battery voltage pulse signal, and a thumbnail reference image (i.e., TN #1) discussed with respect to FIG. 67. FIG. 66 shows other examples of baseline characteristics of a target signal.

The functional test commands 919 include functional test commands that the computing system 4 can use to generate a VDM having a functional test command for a functional test that can be performed by the vehicle 12. As an example, the functional test commands for a corresponding functional test can identify the functional test command using an ECU identifier and a command to include a VDM for an ECU that corresponds to the ECU identifier. In some instances, the command includes a sub-command. In FIG. 65, the ECU identifiers, the commands, and the sub-commands are shown as hexadecimal numbers in that the ECU identifier, the commands, and the sub-command use a $ prefix. As an example, the ECU ID ($10) can represent an identifier of the engine control ECU, the ECU ID ($30) can represent an identifier of an HVAC control ECU, and the ECU ID ($40) can represent an identifier of a body control module ECU.

As another example, the functional test command for a functional test can include a module address. The module address indicates a memory address in the memory 252 to access a software module that corresponds to the functional test. In FIG. 65, module addresses, in a hexadecimal format, are listed for two functional tests (i.e., functional tests FT15 and FT18). As an example, the computing system 4 can receive the memory address ($B4578A) and the processor 250 can execute a software module beginning at that memory address to cause the vehicle communication transceiver 256 to send a VDM to the body control module ECU having ECU ID ($40) with the command ($01) to cause the lock driver door functional test FT15 to be performed.

The PIDs 920 corresponding to a functional test can include a directly-correlated PID, an indirectly-correlated PID, and/or a related PID. A directly-correlated PID is a PID that corresponds to PID parameters that are representative of a measureable characteristic of a target signal. For example, PID48: A/C switch voltage is representative of a voltage measurement characteristic of a target signal that can be present on an electrical circuit that is operatively connectable to an air conditioning system switch in the vehicle 12. An indirectly-correlated PID is a PID that corresponds to a PID parameter that is indirectly indicative of a characteristic of a target signal. For example, a PID: A/C compressor clutch is indirectly correlated to the PID48: A/C switch voltage in that if the PID parameter value corresponds to the A/C compressor clutch PID indicates that an A/C compressor clutch in the vehicle 12 is engaged/activated, then that PID parameter value is indicative that PID parameter value corresponds to the PID48 A/C switch voltage should be representative of a voltage that indicates an A/C switch in the vehicle is in the on state. A related PID is a PID that is useful for servicing the vehicle 12 with respect to a circuit on which the target signal is expected to be present. As an example, a related PID can include a PID from an ECU that generates and/or receives the target signal. As another example, a related PID can include a PID that pertains to the same vehicle component that generates and/or receives the target signal. As yet another example, a related PID can include a PID that pertains to the same vehicle system that generates and/or receives the target signal. As another example, a related PID can include a PID that technicians have historically been interested in when servicing a circuit on which the target signal is expected to be present. In FIG. 65, the PID: A/C compressor solenoid valve can be a related PID to the target signal A/C switch voltage for any of the reasons listed above or for some other reason.

The PIDs 920 can include PID baseline data. In one respect, the PID baseline data can include a minimum and/or maximum PID parameter value for a corresponding PID. In another respect, the PID baseline data can include conditional PID parameters. The conditional PID parameters are indicate of expected PID parameters when the vehicle is operating under one or more predefined operating conditions. Some typical predefined operating conditions include engine RPM, engine coolant temperature, and engine load. Other examples of the typical predefined operating conditions are also possible.

Next, FIG. 71A and FIG. 71B show a navigable menu 930 that includes a home screen 927. The home screen 927 includes multiple USC to make menu selections, such as a menu selection 931, 932, 933, 934 for selecting a guided component tests mode, a multi-meter and oscilloscope mode, a scanner mode, and a service information mode, respectively. Other examples of a menu selection that can be made using a USC on the home screen 927 are also possible. The navigable menu 930 can be contained within the memory 252 (e.g., within the CRPI 260, the GUI 661, and/or the navigable menu 664). GUIs based on the navigable menu 930 can be displayed on the display 300. The processor 250 can output a different GUI in response to each menu selection.

The navigable menu 930 includes multiple levels. As an example, the multiple levels of the navigable menu 930 can be arranged as a tree structure where the home screen 927 is the root node (e.g., root level or top level) and the menu selection 931, 932, 933, 934 are in a next level of the tree structure. FIG. 71A and FIG. 71B show six further levels under the menu selection 933. In FIG. 71A, four of those further levels are under a menu selection 937 for selecting vehicle V2, whereas in FIG. 71B, four of those further levels are under a menu selection 938 for selecting vehicle V3. The navigable menu 930 may include one or more further levels under the menu selection 931, 932, 934.

A first level under the menu selection 933 is a menu selection 935 for selecting a vehicle. As an example, upon selecting the menu selection 935, a GUI such as the GUI 725 shown in FIG. 8 can be displayed. The first level under the menu selection 933 also includes a menu section 892 that is selectable to cause the navigable menu 930 to return to the home screen 927.

Upon entering information to identify a vehicle, a menu selection to select the identified vehicle can be selected. For the example shown in FIG. 71A and FIG. 71B, the navigable menu 930 includes a menu selection 936, 937, 938 for selecting vehicle V1, vehicle V2, vehicle V3, respectively. As an example, the vehicle V2 can be the 2014 Acme Mamba vehicle selected via the GUI 725 shown in FIG. 8. The menu including the menu selection 936, 937, 938 also includes a menu section 898 that is selectable to cause the navigable menu 930 to return to the most-recent prior displayed menu.

Upon selecting the menu selection 937 for selecting the vehicle V2, a GUI showing a menu selection 939, 940, 941, 507, 508 for selecting a select component mode, a select system mode, a specification mode, a functional tests mode, or a component tests mode, respectively, can be displayed. That GUI can also include a menu selection 899 that is selectable to cause the navigable menu 930 to return to the most-recent prior displayed menu.

Upon selecting the menu selection 940 for selecting the select system mode, a GUI showing a menu selection 942, 943, 944, 945 for selecting an ABS system, a body controls system, an engine system, and an entertainment system, respectively, can be displayed. That GUI can also include a menu selection 999 that is selectable to cause the navigable menu 930 to return to the most-recent prior displayed menu.

Upon selecting the menu selection 943 for selecting the body controls system from the select system level of the navigable menu 930, a GUI showing a menu selection 979, 980, 981, 982, 983, 976 for selecting a component test mode, a functional test mode, a read DTC mode, a reprogram mode, a reset mode, and a test sets mode, respectively, can be displayed. That GUI can also include a menu selection 993 that is selectable to cause the navigable menu 930 to return to the most-recent prior displayed menu.

Upon selecting the menu selection 976 for selecting the test sets mode, a GUI showing a menu selection 977, 978 for selecting test set TS9, TS10, respectively can be displayed. Selecting the menu selection 977, 978 can cause the processor to output a GUI corresponding to test set TS9, TS10, respectively. That GUI can also include a menu selection 928 that is selectable to cause the navigable menu 930 to return to the most-recent prior displayed menu. TS9 and TS10 are test set identifiers within the test set index 648 shown in FIG. 62.

In at least some implementations, each test set corresponding to the menu selection 977, 978 corresponds to a memory address. FIG. 71A and FIG. 71B show example memory addresses in hexadecimal form within square brackets. Each memory address can indicate a source of program code or data for use in outputting a GUI showing a test set. As an example, the memory address ($AB551F) can indicate an address of a test set file for outputting a GUI for TS9.

Returning to the menu for selecting the system level of the navigable menu 930 (i.e., the menu that includes the menu selection 943, 944, 945, 999), instead of selecting the menu selection 943, the engine system can be selected using the menu selection 944. In response to selecting the menu selection 944, a GUI showing a menu selection 929, 946, 947, 948, 949, 901 for selecting a component test menu, a functional test menu, a read DTC menu, a reprogram menu, a reset menu, and a test sets menu, respectively, can be displayed. That GUI can also include a menu selection 998 that is selectable to cause the navigable menu 930 to return to the most-recent prior displayed menu.

Upon selecting the menu selection 929 from the component test menu for the Engine system of the navigable menu 930, a GUI including USC to make a menu selection 984, 985, 986, 987 to select the component test CT2, CT4, CT12, CT14, respectively, can be displayed. That GUI can also include a menu selection 994 that is selectable to cause the navigable menu 930 to return to the most-recent prior displayed menu. CT2, CT4, CT12, CT14 are component test identifiers within the component test index 95 shown in FIG. 59.

In at least some implementations, each component test corresponding to the menu selection 984, 985, 986, 987 corresponds to a memory address. Each memory address can indicate a source of program code or data for use in outputting a GUI showing a test set. As an example, the memory address ($AF071F) indicates an address of a software module (e.g., computer-readable instructions) executable by the processor 250 to output a GUI for performing the component test CT2 for vehicle V2.

Instead of selecting the menu selection 929 from the Engine level of the navigable menu 930, upon selecting the menu selection 946 to select the functional test menu, a GUI including a USC that is selectable to make a menu selection 950, 951, 952, 953, 954, 955 to select the functional test FT1, FT9, FT10, FT13, FT14, FT16, respectively, can be displayed. That GUI can also include a menu selection 995 that is selectable to cause the navigable menu 930 to return to the most-recent prior displayed menu.

For at least some implementations, a GUI showing the menu selection 950, 951, 952, 953, 954, 955 includes a USC selectable to trigger the computing system 4 to send a VDM to the vehicle 12 in order to request performance of the FT1, FT9, FT10, FT13, FT14, FT16, respectively. For at least some other implementations, the menu selection 950, 951, 952, 953, 954, 955 is a menu selection that is higher level than a menu selection that includes a USC selectable to trigger the computing system 4 to send a VDM to the vehicle 12 in order to request performance of the FT1, FT9, FT10, FT13, FT14, FT16, respectively for vehicle V2.

In at least some implementations, each functional test corresponding to the menu selection 950, 951, 952, 953, 954, 955 corresponds to a memory address. Each memory address can indicate a source of program code or data for use in generating a VDM to request performance of a functional test. As an example, the memory address ($AA31F4) indicates program code or data 974 for use in generating a VDM to request performance of the functional test FT1 by vehicle V2. In accordance with this example, the functional test FT1 for vehicle V2 selectable via the menu selection 950 can be requested by sending a VDM directed to an ECU having an ECU ID ($10) (e.g., an engine control ECU), a functional test command ($04), and a functional test sub-command of ($00) to turn on (e.g., engage) an electric fuel pump in the vehicle 12 or a functional test sub-command of ($01) to turn off (e.g., disengage) the fuel pump in the vehicle 12. The program code or data 974 shows that the VDM to the engine control ECU with the ECU ID ($10) is VDM protocol P1 (e.g., the ISO® 15764-4 controller area network (CAN) VDM protocol).

Instead of selecting the menu selection 929, 946 from the Engine level of the navigable menu 930, upon selecting the menu selection 949 to select the reset menu, a GUI including a USC that is selectable to make a menu selection 988, 989, 990, 991, 992 to select the reset procedure RP1, RP2, RP3, RP5, RP10, respectively, can be displayed. That GUI can also include a menu selection 996 that is selectable to cause the navigable menu 930 to return to the most-recent prior displayed menu. RP1, RP2, RP3, RP5, RP10 are reset procedure identifiers within the RPI 111 shown in FIG. 61.

In at least some implementations, each reset procedure corresponding to the menu selection 988, 989, 990, 991, 992 corresponds to a memory address. Each memory address can indicate a source of program code or data for use in outputting a GUI showing a reset procedure. As an example, the memory address ($AA3001) indicates an address of a software module (e.g., computer-readable instructions) executable by the processor 250 to output a GUI for performing the reset procedure RP1 for vehicle V2.

Instead of selecting the menu selection 929, 946, 949 from the Engine level of the navigable menu 930, upon selecting the menu selection 901 to select the test set menu, a GUI including a USC that is selectable to make a menu selection 902, 903, 904, 905, 906, 907, 908, 909, 910 to select the test set TS1, TS3, TS5, TS6, TS7, TS8, TS13, TS14, TS15, respectively, can be displayed. That GUI can also include a menu selection 997 that is selectable to cause the navigable menu 930 to return to the most-recent prior displayed menu. TS1, TS3, TS5, TS6, TS7, TS8, TS13, TS14, TS15 are test set identifiers within the test set index 648 shown in FIG. 62.

In at least some implementations, each test set corresponding to the menu selection 902, 903, 904, 905, 906, 907, 908, 909, 910 corresponds to a memory address. Each memory address can indicate a source of program code or data for use in outputting a GUI showing a test set. As an example, the memory address ($94AA01) indicates an address of a software module (e.g., computer-readable instructions) executable by the processor 250 to output a GUI for performing the test set TS1 for vehicle V2.

Returning to the menu level with the menu selection 936, 937, 938, upon selecting the menu selection 938 for selecting vehicle V3, a GUI showing a menu selection 956, 957, 958 for selecting a select component mode, a select system mode, and specification mode, respectively, can be displayed. That GUI can also include a menu selection 897 that is selectable to cause the navigable menu 930 to return to the most-recent prior displayed menu. The menu selection 956, 957, 958, 897 are shown in FIG. 71B.

Upon selecting the menu selection 957 for selecting the select system mode for vehicle V3, a GUI showing a menu selection 959, 960, 961, 962 for selecting an ABS system, a body controls system, an engine system, and an entertainment system, respectively, can be displayed. That GUI can also include a menu selection 896 that is selectable to cause the navigable menu 930 to return to the most-recent prior displayed menu.

Upon selecting the menu selection 961 for selecting the engine system, a GUI showing a menu selection 963, 964, 965, 966, 967, 911 for selecting a component test menu, a functional test menu, a read DTC menu, a reprogram menu, a reset menu, a test set menu, respectively, can be displayed. That GUI can also include a menu selection 895 that is selectable to cause the navigable menu 930 to return to the most-recent prior displayed menu.

Upon selecting the menu selection 964 to select the functional test menu, a GUI showing a menu selection 886, 887, 888, 889, 890, 891 for selecting functional test FT1, FT9, FT10, FT13, FT14, FT16, respectively, can be displayed. That GUI can also include a menu selection 893 that is selectable to cause the navigable menu 930 to return to the most-recently prior displayed menu. Accordingly, a different group of functional tests can be available for the engine system of vehicle V3 as compared to the group of functional tests available for the engine system for vehicle V2.

In at least some implementations, each functional test corresponding to the menu selection 886, 887, 888, 889, 890, 891 corresponds to a memory address. Each memory address can indicate a source of program code or data for use in generating a VDM to request performance of a functional test. As an example, the memory address ($D90066) indicates CRPI or data 975 for use in generating a VDM to request performance of a functional test by vehicle V3. In accordance with this example, the functional test FT1 for vehicle V3 selectable via the menu selection 886 can be requested by sending a VDM directed an ECU having an ECU ID ($10) (e.g., an engine control ECU), a functional test command ($B3), and a functional test sub-command of ($00) to turn on (e.g., engage) an electric fuel pump in the vehicle 12 or a functional test sub-command of ($01) to turn off (e.g., disengage) the fuel pump in the vehicle 12. The CRPI or data 975 shows that the VDM to the engine control ECU with the ECU ID ($10) is VDM protocol P2 (e.g., the SAE® J1850 VDM protocol).

Instead of selecting the menu selection 964, the menu selection 911 can be selected to display a GUI showing a menu selection 912, 913, 914, 921, 922, 923, 924, 925, 926 for selecting test set TS1, TS3, TS5, TS6, TS7, TS8, TS13, TS14, TS15, respectively, can be displayed. That GUI can also include a menu selection 894 that is selectable to cause the navigable menu 930 to return to the most-recent prior displayed menu.

In at least some implementations, each test set corresponding to the menu selection 912, 913, 914, 921, 922, 923, 924, 925, 926 corresponds to a memory address. Each memory address can indicate a source of program code or data for use in outputting a GUI showing a test set. As an example, the memory address ($34AB61) indicates an address of a software module (e.g., computer-readable instructions) executable by the processor 250 to output a GUI for performing the test set TS1 for vehicle V3.

FIG. 71A and FIG. 71B represent that the navigable menu 930 allows a user to separately select a component test or a functional test to be performed. For example, from the home screen 927, the menu selection 933, 937, 940, 944, 929, 984 can be selected in order to cause the processor 250 to output a GUI to perform the component test CT10. From the GUI from which the component test CT10 can be performed, a user can select a menu selection (not shown) to cause the processor 250 to display a GUI based on the menu selection 929 to allow the user to select the component test CT10, CT12, CT14, or CT16 or the menu selection 994. In response to selecting the menu selection 994, the processor 250 can display a GUI to show the menu selection 929, 946, 947, 948, 949, 901, 998. From that GUI, the menu selection 946 can be selected to display a GUI that shows the menu selection 950, 951, 952, 953, 954, 955, 995. In response to a selection of one of the menu selection 950, 951, 952, 953, 954, 955, 995, the processor 250 can output another GUI from which a USC to cause transmission of a VDM to the vehicle 12 to request performance of a functional test, or the processor 250 can cause transmission of a VDM to the vehicle 12 to request performance of a functional test without displaying another GUI.

In any event, within implementations in which a component test and a functional test can be separately selected, those selections do not permit simultaneous performance of the component test and the functional test. Moreover, as shown in FIG. 71A and FIG. 71B, multiple menu selections within a navigable menu would typically need to be made to show a component test and the functional test (although not simultaneously).

Although FIG. 71A and FIG. 71B show that test sets are selectable from the navigable menu, in at least some implementations, a navigable menu that includes menu selections to separately select a component test and a functional test does not include menu selections for test sets. In those implementations, for example, a test set can be performed by downloading a test set file from the server 2. Downloading of the test set file can occur in response to a selection made from a GUI provided by the server 2, rather than from the navigable menu 930.

Figure 72:
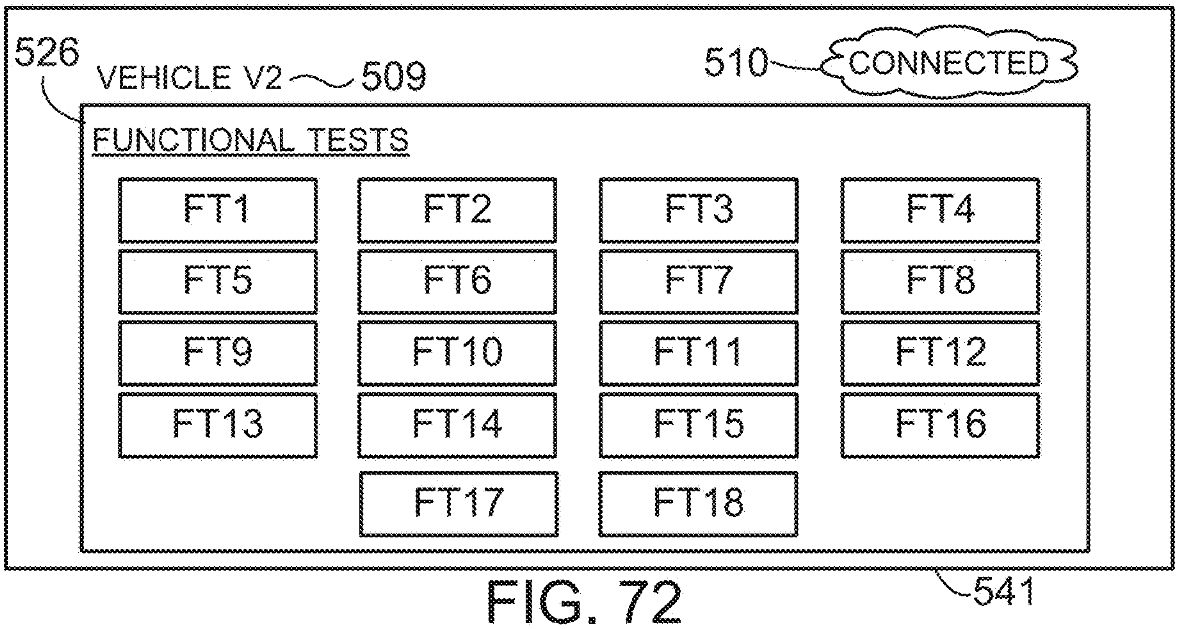
FIG. 72, FIG. 73, FIG. 74, FIG. 75, FIG. 76, FIG. 77 show an example graphical user interface (GUI) in accordance with the example implementations.

Turning to FIG. 72, a GUI 541 is shown. The GUI 541 can be displayed on the display 300 in response to selection of the menu selection 507 from the navigable menu 930 shown in FIG. 71A. The GUI 541 includes a vehicle identifier 509 and a status indicator 510 indicative of whether the computing system 4 is operatively connected to the communication network 3. The GUI 541 also includes a container 526 including user-selectable controls for selecting a performance of a functional test FT 1 to FT18. The mapping data 80 (shown in FIG. 65) includes examples of those functional tests as well as memory addresses that correspond to the user-selectable controls shown in FIG. 72.

Figure 73:
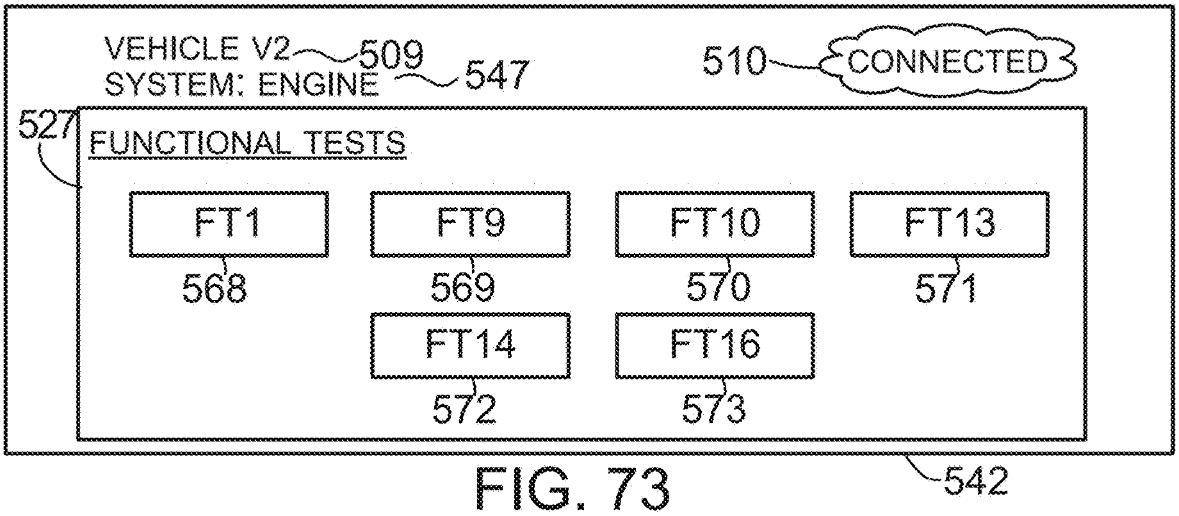

Next, FIG. 73 shows a GUI 542. The GUI 542 can be displayed in response to a selection of the menu selection 946 in the navigable menu 930. The GUI 542 includes the vehicle identifier 509, the status indicator 510, and a system identifier 547 indicating a vehicle system (e.g., engine). The GUI 542 includes a container 527 including a USC 568, 569, 570, 571, 572, 573 for selecting a performance of a functional test FT1, FT9, FT10, FT13, FT14, FT16 shown in FIG. 65, respectively.

Figure 74:
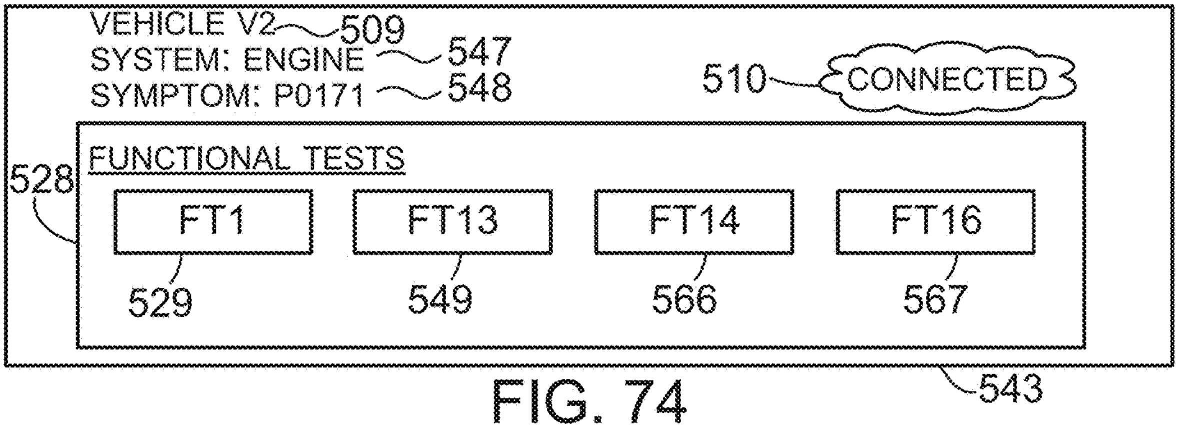

Next, FIG. 74 shows a GUI 543. The GUI 543 can be displayed in response to selection of the menu selection 947 in the navigable menu 930 when the DTC P0171 is set within the vehicle 12. The GUI 543 includes the vehicle identifier 509, the status indicator 510, the system identifier

547, and a symptom identifier 548 showing that a DTC is set. The GUI 543 also includes a container 528 including a USC 529, 549, 566, 567 for selecting a performance of a functional test FT1, FT13, FT14, FT16 shown in FIG. 65, respectively.

Figure 75:
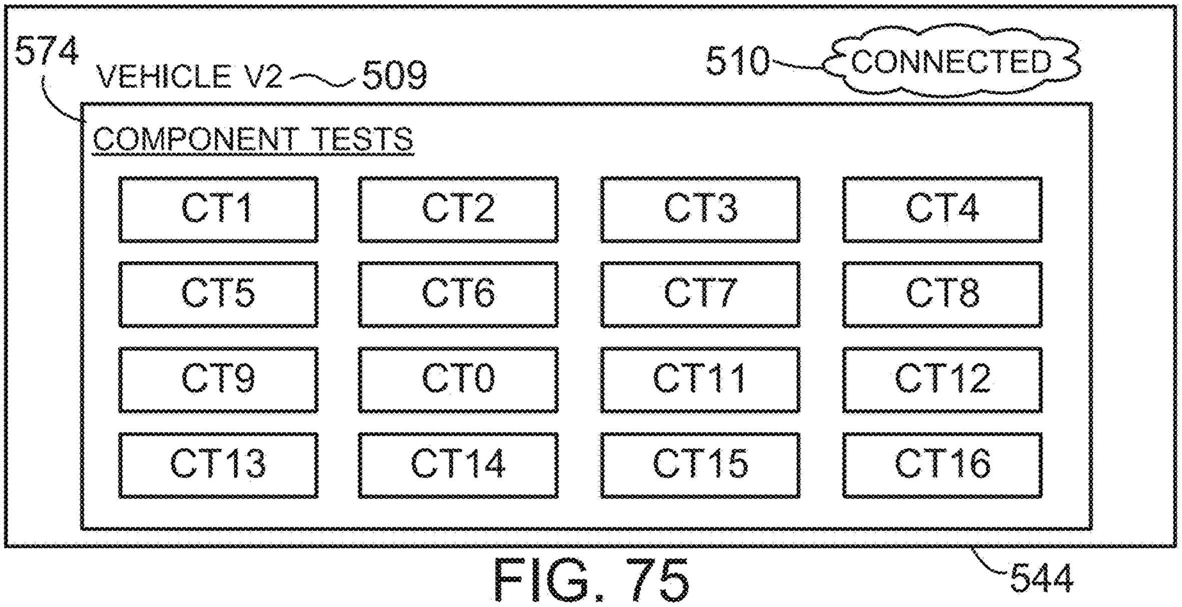

Turning to FIG. 75, a GUI 544 is shown. The GUI 544 can be displayed on the display 300 in response to selection of the menu selection 508 from the navigable menu 930 shown in FIG. 71A. The GUI 544 includes the vehicle identifier 509 and the status indicator 510. The GUI 544 also includes a container 574 including user-selectable controls for selecting a performance of a component test CT1 to CT16. The component test index shown in FIG. 59 (i.e., the CTI 95) includes examples of those component tests. As noted with respect to the CTI 95, the CTI 95 can include memory address indicative of where an executable component test module is stored in memory, such as a component test module within the component test 662 within the memory 252. A respective component text module (e.g., CRPI) can be executed by the processor 250 in response to selection of a USC within the container 574.

Figure 76:
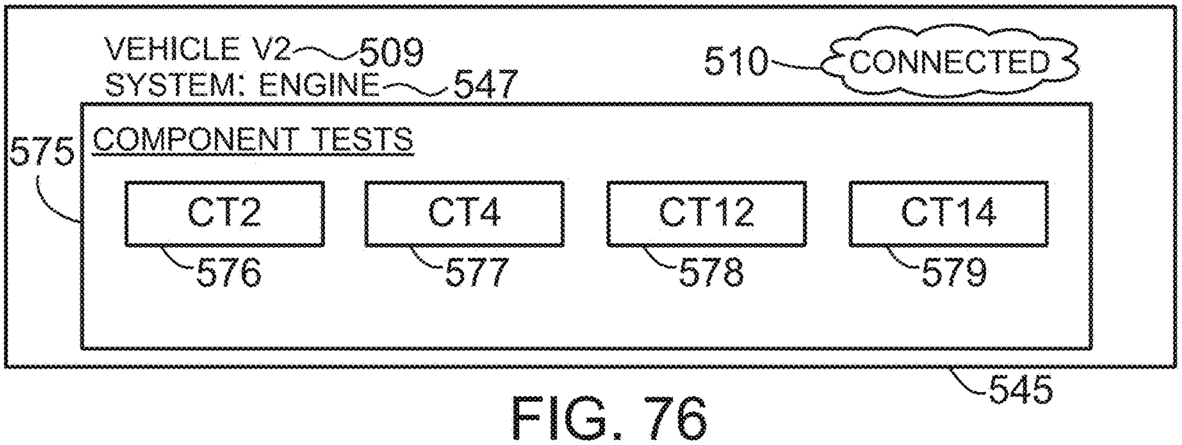

Next, FIG. 76 shows a GUI 545. The GUI 545 can be displayed in response to a selection of the menu selection 944 in the navigable menu 930 (shown in FIG. 71A). The GUI 545 includes the vehicle identifier 509, the status indicator 510, and the system identifier 547. The GUI 545 also includes a container 575 including a USC 576, 577, 578, 579 for selecting a performance of a component test CT2, CT4, CT12, CT14 shown in the CTI 95. FIG. 71A shows a menu selection 984, 985, 986, 987 that corresponds to the component test CT2, CT4, CT12, CT14, respectively, and a memory address corresponding to the component test CT2, CT4, CT12, CT14.

Figure 77:
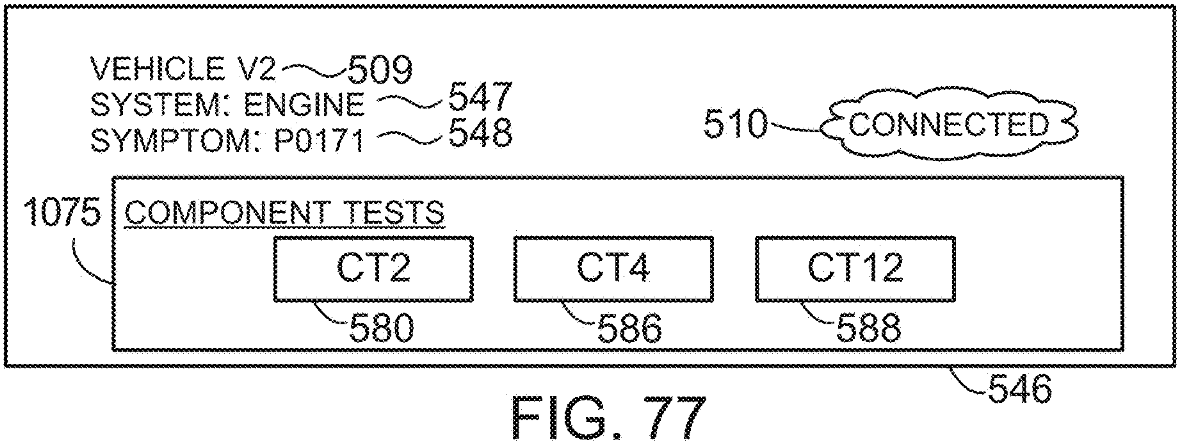

Next, FIG. 77 shows a GUI 546. The GUI 546 can be displayed in response to selection of the menu selection 947 in the navigable menu 930 when the DTC P0171 is set within the vehicle 12. The GUI 546 includes the vehicle identifier 509, the status indicator 510, the system identifier 547, and the symptom identifier 548. The GUI 546 also includes a container 1075 including a USC 580, 586, 588 for selecting a performance of the component test CT2, CT4, CT12 shown in FIG. 65, respectively. The description states that the GUI 543, 546 can be displayed in response to a selection of the menu selection 947. In some implementations, only one of the GUI 543, 546 is displayed in response to a selection of the menu selection 947. In other implementations, separate menu selections corresponding to READ DTC for functional tests or component tests like the menu selection 947 can be arranged in the navigable menu 930 in the menu level including (1) the menu selection 950, 951, 952, 953, 954, 955, or (2) the menu selection 984, 985, 986, 987, respectively.

Next, FIG. 69 shows mapping data 203 in accordance with the example implementations. The mapping data 203 includes index values 213 for PIDs, vehicle data message protocol identifiers 214, PID requests 215 corresponding to a respective PID index value, and PID descriptors 220 corresponding to respective index value. The PID requests 215 represent vehicle data messages that can be sent to an ECU in the vehicle 12 to request PID parameters. The vehicle data message protocol identifiers 214 indicate which vehicle data message protocol is to be used to generate a PID request. The PID requests 215 include hexadecimal values. The first two values (from left to right) represent an ECU identifier, the middle two values represent an instruction to send a PID parameter, and the last two values represent a PID. A vehicle data message to request PID parameters would typically include more than three bytes of data. FIG. 69 represents that a PID can be identified using a PID index. A test set transmitted by the server 2 to the computing system 4 can include a PID index to identify a PID without having to transmit the PID request, because the computing system 4 can determine the PID request by referring to the mapping data 203 based on the PID index sent from the server 2.

Although the mapping data 203, 80, and 221 are shown in separate drawings (i.e., FIG. 72, FIG. 65 and FIG. 70, respectively), the mapping data 63, 659 shown in FIG. 2 and FIG. 3 can store the mapping data 203, 80, and/or 221 in a combined fashion. Additional or alternatively, the processor 48, 250 can traverse the mapping data 63, 659 to find an aspect mapped to particular index value in one of the mapping data 203, 80, 221 to locate an aspect mapped to the particular index value in another one of the mapping data 203, 80, 221.

FIG. 70 shows mapping data 221 in accordance with the example implementations. The mapping data 221 includes index values 224 corresponding to functional tests 222 performable on the vehicle 12. Functional test commands corresponding to the functional tests are stored within the memory 252 at memory addresses including the memory addresses 225. The mapping data 221 includes vehicle identifiers 223 to identify a vehicle that corresponds to a functional test. As an example, the fuel pump on/off functional test for a vehicle corresponding to a first vehicle identifier (e.g., YMME_1) that corresponds to the index value 4A starts at a memory address $AA31F4. The mapping data 221 includes index values B1, B2 and BA to BF for a vehicle corresponding to a vehicle corresponding a corresponding to vehicle identifier (e.g., YMME_2). That vehicle is referred to as "Vehicle C" in at least some of the drawings. Vehicles corresponding to the vehicle identifier YMME_1 are referred to as "Vehicle B" in at least some of the drawings. Upon determining a functional test (e.g., the functional test 4A) is to be performed, the processor 250 can determine the starting point of instructions to execute to generate and transmit a vehicle data message with a functional test command by referring to the mapping data 221.

In at least some implementations, the memory 252 includes an executable software module starting at the memory address corresponding to a functional test. As an example, execution of a software module that starts at memory address $2F3E4D causes the vehicle communications transceiver 256 to send a vehicle data message to the body control module ECU having the ECU ID ($40) with the command ($01) to cause the lock driver door functional test 9C to be performed.

VIII. Example Test Set File

A test set file includes content for configuring the computing system 4 to perform aspects of a test set, such as outputting a GUI on a display, setting up the meter 328 or the oscilloscope 329 for performing a component test, or transmitting (via the vehicle communications transceiver 256) a particular set of vehicle data messages to perform functional control of a controllable component and/or to request parameter values corresponding to a PID. The processor 250 can receive a test set file from the server 2 in response to a request, such as a request for the test set file, a request for a test set, or otherwise. As an example, a request for a test set or test set file can include a symptom identifier for determining a test set file from the symptom-to-test-set MD 83, or a component identifier for determining a test set file from the component-to-test-set MD 84. A request for a test set or a test set file can include vehicle identifying information. A request for a test set or a test set file can include a test set file identifier within the test set index 593, 648. Upon or after receiving a test set file, the processor 250 can read the test set file and write the test set file into the memory 252.

In at least some implementations, the processor 250 includes separate processor(s) for the meter 328, the oscilloscope and/or the vehicle communications transceiver 256. The separate processor(s) can read a test set file to determine the portion(s) of the test set file that are applicable to the meter 328, the oscilloscope and/or the vehicle communications transceiver 256.

A test set file can include data that indicates how a GUI representing a test set is to be displayed. As an example, a test set file can indicate where elements of the GUI are to be positioned within the GUI. Those elements can, for example, include a container, a user-selectable control, a graph, or a list. Moreover, a test set file can include data that indicates how data within a container is to be displayed, such as data that indicates PID parameters are to be displayed in a graph mode or a list mode. In at least some implementations, although a test set file can define how a test set is to be displayed, where that definition can be for a default view and the GUI can be configured to allow a user to select alternative ways to display the test set. For instance, the test set file could define that parameter values corresponding to a particular PID are to be displayed in a list mode, and the GUI could allow a user to make a selection that causes the GUI to display the parameter values corresponding to the particular PID using a different view mode, such as a graph mode or a heat map mode.

Turning to FIG. 81A, FIG. 81B, and FIG. 81C, these figures show content of a test set file 106. The test set file 106 is arranged as an XML file. For clarity of FIG. 81A to FIG. 81C, some portions of an XML file, such as an XML file reference, version identifier, and schema identifier typically located at a beginning of the XML file are not shown. Examples of such reference and identifiers are, however, shown in FIG. 82A. The test set file 106 includes an element 108 that indicates a title of the test set is "Fuel Pump." The test set name 652 shown in FIG. 19 can be based on the element 108. Additionally, or alternatively, the element 108 or another element in the test set file 106 can include the test set name 652 and the set descriptor 653 shown in FIG. 19.

The test set file 106 includes an element 109 including guidance content 127, 128, 130 that can be displayed in a GUI. The guidance content 127, 128, 130 includes a testing instruction, a component location, and connector information. Each of the guidance content 127, 128, 130 can be displayed within a separate container within the GUI or two or more of the guidance content can be displayed in a common container within the GUI. Other examples of guidance content that can be specified within a test set file are also possible.

The test set file 106 includes an element 110. The element 110 includes element 112, 114, 116, 144, each of which includes elements pertaining to a PID. The element 112, 114, 116, 144 includes an element 131 including an identifier of a PID. In FIG. 81A and FIG. 81B, the identifier of the PID includes readable words. In other implementations, the identifier of the PID can be defined based on a hexadecimal value corresponding to the PID. The element 112, 114, 116, 144 includes an element 132 including an identifier of the units corresponding to the identified PID. The element 112 includes an element 133, 134, the element 114 includes an element 138, and the element 116 includes an element 139. The element 133, 134, 138 includes an element 135 indicative of a state corresponding to a minimum baseline value and a maximum baseline value. The element 133, 134, 138 includes an element 136 indicative of the minimum baseline value and an element 137 indicative of the maximum baseline value. The element 139 includes an element 135 indicative of a state corresponding to text value. The element 139 includes an element 143 indicative of the text value.

The processor 250 can use the element 135 to determine which baseline values represented by the element 136, 137 are to be used to determine whether parameter values received from the vehicle 12 and corresponding to a PID identified by the element 112, 114, 116 indicate a malfunction and whether a flag within a GUI should indicate a baseline value for the identified PID has been breached.

The test set file 106 includes an element 118 that includes an element 147, 148, 149, 151 defining a name of a functional test of a component, a textual description of the functional test, an identifier of a test type, and a label for the functional test, respectively. The textual description of the functional test and the label for the functional test can be displayed within a GUI for the test set. The processor 250 can generate within the GUI a USC selectable to cause performance of the functional test indicated by the element 118.

The test set file 106 includes an element 120 that includes an element 152, 153, 154, 155, 156 that corresponds to a component test. The element 152, 153, 154, 155, 156 defines a name of the component test, a sequence indicating which systems in the vehicle contain the component to be tested, a system for the component test, guidance about a location of the component to be tested, and guidance about a connector of the component to be tested, respectively.

The test set file 106 includes an element 122 regarding meter settings (i.e., "test device configuration parameters" or more simply, "configuration parameters"). The element 122 can include content for setting up the meter 328, the oscilloscope 329, and/or the vehicle communication transceiver 256. The element 122 includes an element 145 indicating a quantity of channels that are to be set up for the component test. The element 122 includes an element 124, 126 for channel one and channel two, respectively. The element 124 includes an element 157, 158, 159, 163 that defines a meter type (e.g., the meter 328), a horizontal axis including a time base and units for the meter 328, a vertical axis of the meter 328, and a trigger including a slope type and scale, respectively. The element 159 includes an element 160, 161, 162 defining units for the vertical axis of the meter 328, an offset for the meter 328, and a scale for the meter 328, respectively.

The test set file 106 includes an element 126 for configuring channel two of the meter 328. The element 126 includes an element 164, 146 that defines channel two of the meter 328 is to display PID parameter values and a name of the PID (e.g., fuel pump), respectively. Accordingly, instead of displaying an input received on channel two of the meter 328, the display 300 is to display a graph of PID parameter values in lieu of the channel two input of the meter 328.

Turning to FIG. 82A, FIG. 82B, and FIG. 82C, these figures show content of a test set file 825. The test set file 825 is arranged as an XML file. The test set file 825 includes header elements 165 that define an encoding attribute of the XML file, a schema location, and a style sheet reference. Other examples of data contained within the header elements of an XML file are also possible. The test set file includes an element 166 that is shown to extend across FIG. 82A, FIG. 82B, and FIG. 82C. The element 166 includes an element 167 that indicates a name of a test set. The element 166 includes an element 168, 169, 170, 171 that defines a container displayable within a GUI representing a test set. An example of that GUI is shown in FIG. 14 to FIG. 17, such that the GUI identifier 389 corresponds to the name indicated by the element 167 and the element 168, 169, 170 defines aspects of and/or within the container 365, 388, 366, respectively. Those containers are shown in FIG. 14 to FIG. 17.

The element 168, 169, 170 includes an element 172, 173, 174, 175 that defines a height of a container, a width of a container, a vertical position of a container, and a horizontal position of a container, respectively. The element 168, 170 includes an element 176 that defines text for including at and/or within a container. The element 169 includes an element 177 that defines units for a vertical axis of a graph, a scale of the vertical axis, a range of the vertical axis, units for a horizontal axis of the graph, and a scale of the horizontal axis. As an example, the element can define aspects of the graph 209 shown in FIG. 14 to FIG. 17. The element 170 includes an element 178 defining that a container includes standard GUI controls.

The element 171 includes an element 179, 180, 181, 183 defining content the processor 250 can parse to implement a USC within a container. The element 179, 180, 181, 183 includes an element 185 that defines a type of USC. As an example, the type of USC can indicate a shape of a USC. The element 179, 180, 181, 183 includes the element 187, 189 a vertical position of a USC, and a horizontal position of a USC, respectively. The element 179 includes an element 190 that includes text the processor 250 can parse from the test set file 825 to use within an executable rule to define the USC 392 within the GUI 390. The element 179 also includes an element 499 defining a functional test corresponding to the USC defined by the element 179. After parsing "4A" from the element 179, the processor 250 the functional test index 101 shown in FIG. 60 to determine that the USC defined by the element 179 corresponds to a fuel pump engagement functional test 99.

The element 180 includes an element 191, 192 that indicates an icon to be used within a USC, such as the icon used within the USC 405, and that the USC pertains to an instruction corresponding to the test set defined by the test set file 825, respectively. The element 180 includes an element 193, 194, 195 that includes textual guidance corresponding to the USC defined by the element 180. The element 180 includes 196, 197 that defines that a component to be tested is an electric fuel pump and a voltage is to be measured using an oscilloscope. The element 198 includes settings for an oscilloscope, such as the oscilloscope 329. A processor that controls the oscilloscope can read the elements defining settings within the element 198 and configure the oscilloscope according to those settings.

The element 181 also includes an element 200, 201 that indicates an icon to be used within a USC, such as the icon used with the USC 407, and that the USC pertains to an instruction corresponding to bitmap images that are to be retrieved and displayed within a GUI. Examples of those images are shown in the additional information 408, 409, 410 shown in FIG. 16.

The element 183 also includes an element 202 that indicates an icon to be used within a USC, such as the icon used with the USC 396. The element 183 also includes an element 204, 205, 206, 207 that identify PIDs that are to be requested for performing the test set. Each of the element 204, 205, 206, 207 includes an element 208 indicating a particular PID and that a parameter value is to be displayed with the PID. Each of the element 204, 205, 206, 207 also includes an element 210 indicating a unit that corresponds to a parameter value and PID. Each of the element 204, 205 includes an element 211, 212 that indicates a maximum threshold value and a minimum threshold value, respectively for the parameter values and PID.

The element 166 also includes an element 845 that includes an identifier of a component test corresponding to the test set file. The processor 250 can determine that the component test identifier pertains to a particular component test by referring to the component-test-to-PID MD 81 shown in FIG. 56. As an example, the processor 250 can determine that the component test CT12 corresponds to a fuel pump voltage test. Additionally, the element 166 includes an element 846 that includes a YMME indicator. The processor 250 can use the YMME indicator to determine various aspects regarding the test set, such as which VDM to send to request parameter values corresponding to the PID indicated by the element 204, 205, 206, 207.

Turning to FIG. 83A and FIG. 83B, these figures show content of a test set file 400. The test set file 400 is arranged as a file including data structures and objects, such as a JSON file. In FIG. 83A and FIG. 83B, the objects are contained with curly brackets (i.e., { }) and arrays are contained within square brackets (i.e., [ ]). The test set file 400 includes objects that define containers displayable within a GUI representing a test set. As an example, the test set file 400 includes objects that define containers shown in the GUI 390 shown in FIG. 14 to FIG. 17.

The test set file 400 includes an object 440 including a name of a test set, and a YMME of a vehicle for which the test set pertains. The test set file 400 can be located amongst the test set 58, 663 by searching for the test set based at least in part on the YMME and name of the test set.

The test set file 400 includes an object 441, 442, 443 including data defining three separate containers, such as the container 365, 388, 366 (all shown in FIG. 14 to FIG. 17), respectively. The object 441 defines the same aspects defined by the element 168 in the test set file 825. The object 442 defines the same aspects defined by the element 169 in the test set file 825. The object 443 defines the same aspects defined by the element 170 in the test set file 825.

The test set file 400 includes an object 444, 445, 446, 493 including data defining four separate USC, such as the USC 392, 405, 407, 396 shown in FIG. 14 to FIG. 17. The object 444 defines the same aspects defined by the element 179 in the test set file 825. The object 445 defines the same aspects defined by the element 180 in the test set file 825. The object 446 defines the same aspects defined by the element 181 in the test set file 825. The object 493 defines the same aspects defined by the element 183 in the test set file 825.

Next, FIG. 84 shows a test set file 802 in accordance with the example implementations. The test set file 802 corresponds to and/or includes a test set identifier 803. The test set file 802 also corresponds to and/or includes a vehicle identifier 804 (e.g., one or more vehicle identifiers). More than one vehicle identifier can be included if the test set file 802 corresponds to multiple vehicle types. The test set identifier 803 and/or the vehicle identifier 804 can be used to locate the test set file 802 within the database 13, 258. Additionally, or alternatively, the test set identifier 803 and/or the vehicle identifier 804 can be used to populate a test set name and a vehicle identifier within a GUI, such as a GUI 242 shown in FIG. 19.

A component test within a test set file can include information regarding a component test. For example, a component test can include a test device identifier, test device configuration parameters, target information, image information, instructions, and/or adapter information.

The test set file 802 includes a component test 814 including a component test identifier 805. The component test identifier 805 identifies a voltage test configured to be performed using a test device corresponding to a test device identifier 806. The component test 814 includes test device configuration parameters 808. A benefit of including test device configuration parameters in a component test (as well as a test set file) is that the computing system 4 can configure a test device using the test device configuration parameters. For example, the computing system 4 (e.g., the processor 250) can configure an oscilloscope using the test device configuration parameters 808.

The component test 814 includes a target signal identifier 823, a connector image identifier 842, an adapter identifier 885, a waveform identifier 968, and an instruction identifier 969. In this example, the component test does not require any adapter, but other component tests may require use of an adapter, such as a pressure transducer or a temperature transducer. Such transducers(s) can be identified by the adapter information in the component test.

A test set file can include one or more functional test commands. The test set file 802 includes a functional test command 970 having one functional test command. The functional test command 970 identifies a functional test using an index value (i.e., functional test command for the functional test "4A." Identifying a functional test command using an index value can reduce the burden on the communication network 3 to transport the information corresponding to an index value representative of a functional test command. In other implementations, instead of or in addition to including an index value to a functional test command, a test set file can include the content needed for the computing system 4 to be able to send a vehicle data message with a functional test command, such as the information included in the program code or data 974, 975 shown in FIG. 71A and FIG. 71B.

A test set file can include one or more PIDs. In at least some implementations, the PID(s) in a test set file are specified using an index value(s) for the PID(s), such as the index values 971, 972, 973, 1006 for a PID. Mapping data, such as the mapping data 203 shown in FIG. 69, can include index values for PIDs. The mapping data can include information corresponding to the index value for a PID, such as information indicating which vehicle data message protocol to use to request the PID and a device identifier of an ECU from which parameter values corresponding to the PID can be requested. In other implementations, a test set file can include the content needed for the computing system 4 to be able to send a vehicle data message to request parameters for a particular PID.

A test set file can include a baseline that corresponds to a PID. A baseline can include a baseline range, such as a range extending between a minimum PID value and a maximum PID value. A baseline can also correspond to a state, such as an operating state of a component and/or a state of a functional test. The test set file 802 includes a baseline 1000, 1001. The baseline 1000 includes PID baseline values 1003 for an operating state 1002 of a fuel pump, and PID baseline values 1005 for an operating state 1004 of a fuel pump. The baseline 1001 includes PID baseline values 1008 for an operating state 1007 of a fuel pump, and PID baseline values 1010 for an operating state 1009 of a fuel pump. The baseline 1000 corresponds to a PID associated with the index value 973. The baseline 1001 corresponds to a PID associated with the index value 1006.

A test set file can include a template identifier the processor 250 can use to determine a template for outputting a GUI for showing aspects of a test set. The test set file 802 includes a template identifier 1011 that corresponds to a template identifier CF discussed with respect to Table C.

Next, FIG. 85 shows a test set file 614 in accordance with the example implementations. The test set file 614 corresponds to and/or includes a test set identifier 615. The test set file 614 also corresponds to and/or includes a vehicle identifier 616 (e.g., one or more vehicle identifiers). More than one vehicle identifier can be included if the test set file 614 corresponds to multiple vehicle types. The test set identifier 615 and/or the vehicle identifier 616 can be used to locate the test set file 614 within the database 13, 258. Additionally, or alternatively, the test set identifier 615 and/or the vehicle identifier 616 can be used to populate the test set name 594 and the vehicle identifier 286 within a GUI, such as a GUI 491 shown in FIG. 25.

The test set file 614 is an example of a test set file with multiple component tests. A component test 617 is performable by the oscilloscope 329. A component test 625 is performable by the meter 328.

The component test 617 includes a component test identifier 618. The component test identifier 618 identifies a voltage test configured to be performed using a test device corresponding to a test device identifier 619. The component test 617 includes test device configuration parameters 620. In response to selection of the component test 617, the processor 250 can configure the oscilloscope 329 by setting configuration parameters of the oscilloscope 329 to match the test device configuration parameters 620.

The component test 617 includes a target signal identifier 621, a connector image identifier 622, an adapter identifier 623, and an instruction identifier 624. In this example, the component test 617 does not require any adapter.

The component test 625 includes a component test identifier 697. The component test identifier 697 identifies a voltage test configured to be performed using a test device corresponding to a test device identifier 699. The component test 625 includes test device configuration parameters 754. In response to selection of the component test 625, the processor 250 can configure the meter 328 by setting configuration parameters of the meter 328 to match the test device configuration parameters 754.

The component test 625 includes a target signal identifier 761, an image identifier 762, an adapter identifier 763, and an instruction identifier 764. In this example, the component test identifier 697 does not require any adapter.

The test set file 614 includes an index value 765 corresponding to a functional test command B3 shown in FIG. 70. Additionally, or alternatively, the test set file 614 can include the functional test command that corresponds to the index value 765.

The test set file 614 includes a set of index values 766 including an index value 767, 768, 769, 770, 775, 776 for a PID. The PID corresponding to the index value 775 includes baseline 800. The PID corresponding to the index value 776 includes baseline 801.

IX. Example Gui Template

Next, FIG. 86 shows a GUI template 857, 858, 859, 860, 876, 877, 878, 879 that correspond to GUI template identifier CA, CB, CC, CD, CE, CF, CG, CH, respectively. A GUI template identifier can be used as an index value to a GUI template. A test set file can include a GUI template identifier for instructing a computing system how to display a test set defined by the test set file. A GUI template identifier can be referred to as a page structure identifier.

TABLE C

| GUI Temp. ID | Test Set ID | Vehicle ID | Wave-forms | Text Measure. | FT USC | Inst. | PIDs | Image | TD |
|---|---|---|---|---|---|---|---|---|---|
| CA | 1 | 1 | 2 | 0 | 1 to N | 0 | 0 | 0 | O |
| CB | 1 | 1 | 2 | 0 | 1 to N | 1 | 0 | 0 | O |
| CC | 1 | 1 | 2 | 0 | 1 to N | 1 | 1 to N | 0 | O |
| CD | 1 | 1 | 0 | 0 | 0 | 2 | 0 | 0 | O, M |
| CE | 1 | 1 | 1 | 0 | 1 to N | 1 | 1 to N | 1 | O |
| CF | 1 | 1 | 1 | 0 | 1 to N | 1 | 1 to N | 0 | O |
| CG | 1 | 1 | 0 | 1 | 1 to N | 1 | 1 to N | 0 | M |
| CH | 1 | 1 | 1 | 1 | 1 to N | 1 | 1 to N | 0 | O, M |

Table C shows mapping data including an indexed list of GUI templates that correspond to features of a test set. A processor, such as the processor 48, 250 can refer to the mapping data in Table C to select a GUI template from the GUI template 674, 675 respectively. The columns of Table C, from left to right, represent a GUI template identifier, a quantity of test set identifiers, a quantity of vehicle identifiers, a quantity of waveforms, a quantity of text representations of measurements, a quantity of functional test user-selectable controls, a quantity of instructions, a quantity of PIDs, a quantity of images, and a type of test device. Examples of a type of test device indicated in Table C include "O" for oscilloscope, and "M" for multi-meter. The mapping data 63, 659 can include mapping data like the mapping data in Table C.

The GUI template 857, 858, 859, 860, 876, 877, 878, 879 include a container 861 for populating with a test set identifier and a test set descriptor, and a container 862 for populating with a vehicle identifier.

The GUI template 857, 879 includes three containers besides the container 861, 862. The GUI template 857 includes a container 863, 864, 865. As an example, a processor can populate the container 863, 864 in the GUI template 857 with an image, a waveform, or a textual representation of a measurement, and populate the container 865 with a functional test USC for the test set to be performed. As another example, a processor can populate the container 875 in the GUI template 879 with a waveform and a graph of PID parameter values, and populate the container 866, 867 with a functional test USC for the test set to be performed and a component test instruction or a PID display indicator.

The GUI template 858, 877, 878 includes four containers besides the container 861, 862. As an example, a processor can populate the container 863, 864 in the GUI template 858 with an image, a waveform, or a textual representation of a measurement, and populate the container 866, 867 with a functional test USC for the test set to be performed and a component test instruction or a PID display indicator. As another example, a processor can populate the container 875 in the GUI template 877 with an image, a waveform, or a textual representation of a measurement, and populate the container 868, 869, 870 with a functional test USC for the test set to be performed, a component test instruction, and a PID display indicator. As yet another example, a processor can populate the container 873, 874 in the GUI template 878 with an image, a waveform, or a textual representation of a measurement, and populate the container 866, 867 with a functional test USC for the test set to be performed and a component test instruction or a PID display indicator.

The GUI template 859, 876 includes five containers besides the container 861, 862. As an example, a processor can populate the container 863, 864 in the GUI template 859 with an image, a waveform, or a textual representation of a measurement, and populate the container 868, 869, 870 with a functional test USC for the test set to be performed, a component test instruction, and a PID display indicator. As another example, a processor can populate the container 873, 874 in the GUI template 876 with an image, a waveform, or a textual representation of a measurement, and populate the container 868, 869, 870 with a functional test USC for the test set to be performed, a component test instruction, and a PID display indicator.

The GUI template 860 includes a container 871, 872, 900. The GUI template can be used to generate a first GUI to be displayed after requesting performance of a test set. The GUI 237 shown in FIG. 18 is an example of a GUI that can be generated using the GUI template 860. In accordance with that example, the container 900 is populated with the USC 240. In at least some implementations, the container 871 is to be populated with information indicative of how to test a component corresponding to a test set, and the container 872 is to be populated with information indicative of where to test the component corresponding to a test set.

As another example, a GUI template can include a template that defines a particular quantity of containers for displaying PID parameters for a respective number of PIDs. Each container can be defined to indicate placement of a textual PID name, a PID parameter value, one or more baseline threshold values and one or more icons configured to indicate whether a PID parameter value corresponding to textual PID name has breached a baseline threshold value for that PID. The GUI template can define which font(s) and font size(s) to use to display the textual PID name, PID parameter value and one or more threshold baseline values. The GUI 740 shown in FIG. 11 can be generated based on use of such a template. Other examples of GUI templates and aspects of a test set file that can be populated in a GUI template to generate a GUI corresponding to the test set file are also possible.

X. Example Vehicle

A vehicle is a mobile machine that can be used to transport a person, people, and/or cargo. A vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle (e.g., a two or three wheel motorcycle), an all-terrain vehicle (ATV) defined by ANSI/SVIA-1-2007, a snowmobile, a watercraft (e.g., a JET SKI® personal watercraft), a light-duty truck, a medium-duty truck, a heavy-duty truck, an on-highway truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, and the like. A vehicle can, but need not necessarily, include and/or use any system and/or engine to provide its mobility. Those systems and/or engines can include vehicle components that use fossil fuels, such as gasoline, diesel, natural gas, propane, and the like, electricity, such as that generated by a battery, magneto, fuel cell, solar cell and the like, wind and hybrids and/or combinations thereof. A vehicle can, but need not necessarily, include an ECU, an OBDC, and a vehicle network that connects the OBDC to the ECU. A vehicle can be configured to operate as an autonomous vehicle.

A vehicle manufacturer can build various quantities of vehicles each calendar year (i.e., January $1^{st}$ to December $31^{st}$). In some instances, a vehicle manufacturer defines a model year for a particular vehicle model to be built. The model year can start on a date other than January $1^{st}$ and/or can end on a date other than December $31^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMMEF or Y/M/M/E/F, where each letter in the order shown represents a model year identifier, vehicle make identifier, vehicle model name identifier, engine type identifier, and fuel type identifier, respectively, or YMMF or Y/M/M/F, where each letter in the order shown represents a model year identifier, vehicle make identifier, vehicle model name identifier, and fuel type identifier, respectively, or YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively.

An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. Another example Y/M/M/E is 2016/Freightliner/Cascadia/Cummins ISX15 EPA, in which "2016" represents the model year the vehicle was built, "Freightliner" represents the name of the vehicle manufacturer Daimler Trucks North America, Cleveland, North Carolina, "Cascadia" represents a vehicle model built by that manufacturer, and "Cummins ISX15 EPA" represents an engine manufacturer and model within the vehicle. An example Y/M/M is 2016/Freightliner/Cascadia. An example Y/Mis 2016/Freightliner. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

Some vehicles, such as automobiles and on-highway trucks, are associated with a unique VIN. Some VINs include seventeen alpha-numeric characters. For at least some seventeen character VINs, the last six characters represent a unique serial number associated with a particular type of vehicle represented by the first eleven alpha-numeric characters of those VINs. The first eleven alpha-numeric characters typically represent at least a YMME, a YMM, and/or a YM. In some instances, a vehicle includes a one-dimensional bar code and/or a multi-dimensional code indicative of a VIN associated with that vehicle.

As an example, a VIN such as 3AKJHHDR9JSJV5535 is for a particular on-highway truck referred to as a 2018 FREIGHTLINER® CASCADIA® 14.8L L6 diesel, conventional cab. In some countries, a particular digit of a VIN is used as a check digit. For instance, for Canada, the United States, and Mexico, the ninth digit of a VIN is used as a check digit. A processor can be programmed to CRPI arranged as a check digit calculator to determine whether a VIN is valid.

Figure 78:
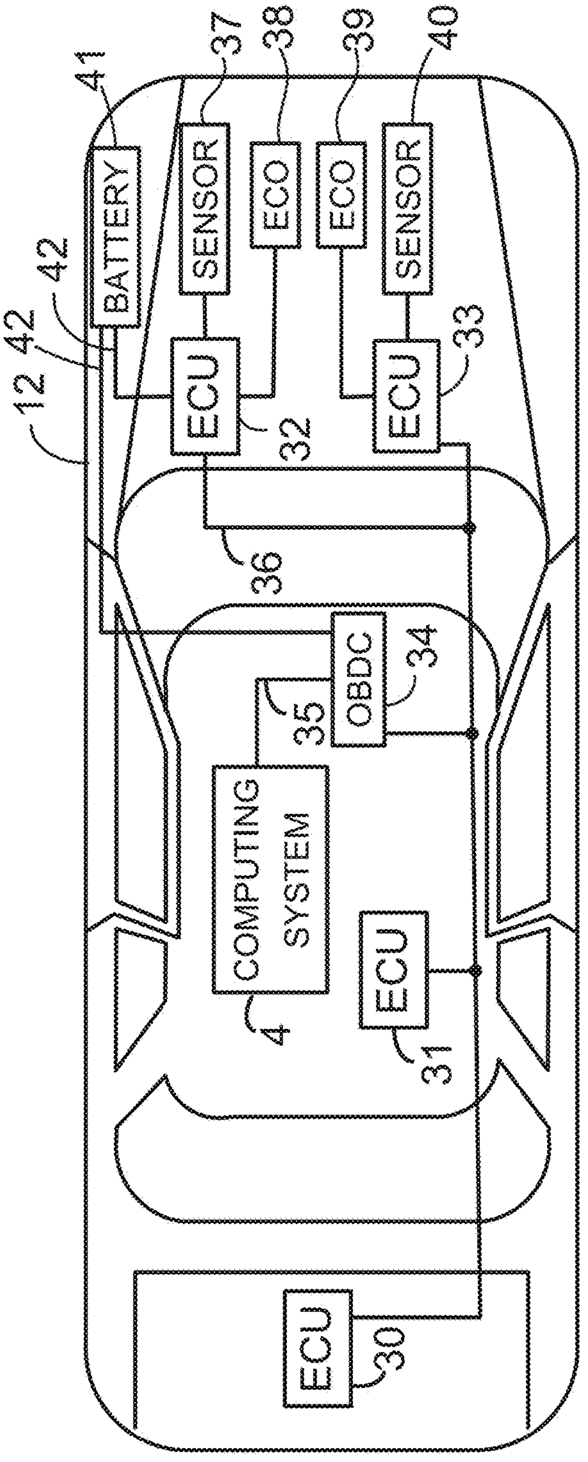
FIG. 78 is a diagram of a vehicle showing example placement of a computing system in accordance with the example implementations.
Figure 79:
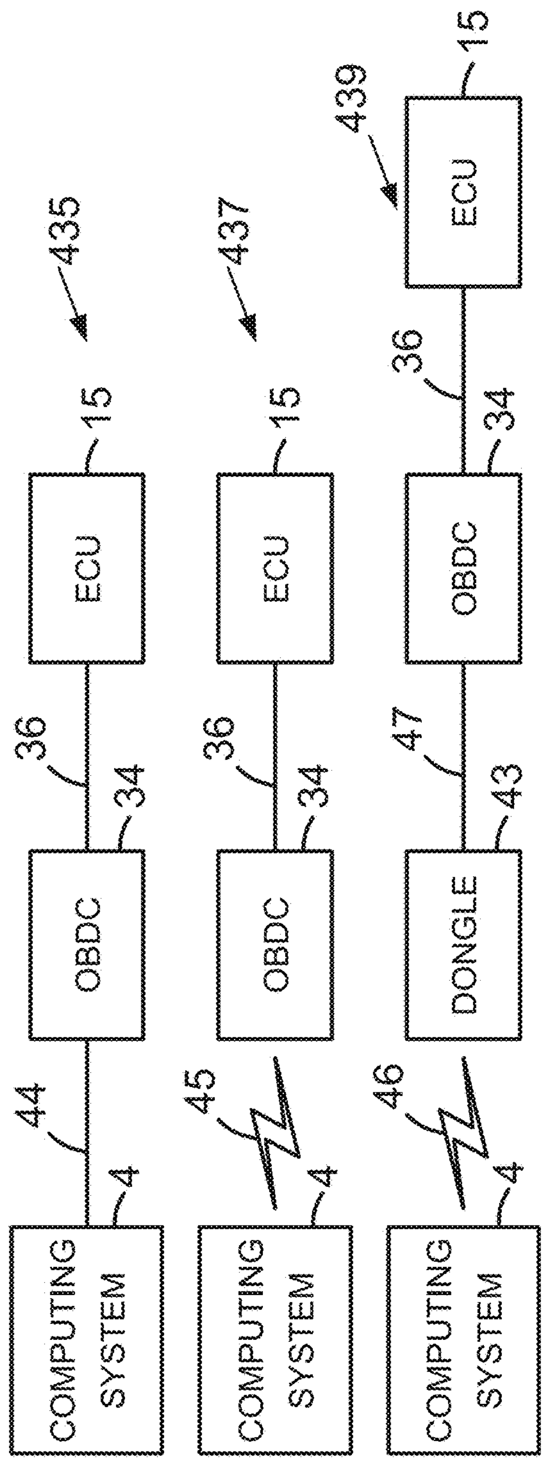
FIG. 79 shows arrangements for operatively connecting a computing system to a vehicle in accordance with at least some of the example implementations.

A vehicle network, such as a vehicle network 36 shown in FIG. 78 and FIG. 79, can include one or more conductors (e.g., copper wire conductors) and/or can be wireless. As an example, a vehicle network can include one or two conductors for carrying VDMs in accordance with a VDM protocol, such as a bi-directional VDM protocol. A bi-directional VDM protocol can include a SAE® J1850 (PWM or VPW) VDM protocol, an SAE® J1939 VDM protocol based on the SAE® J1939_201808 serial control and communications heavy duty vehicle network—top level document, and/or any other core J1939 standard, an ISO® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a CAN 2.0 VDM protocol, standardized in part using an ISO® 11898-1:2015 road vehicle—CAN—Part I: data link layer and physical signaling protocol, a CAN FD VDM protocol (i.e., CAN with flexible data rate VDM protocol), a MOST® Cooperation VDM protocol (such as the MOST Specification Rev. 3.0 E2, or the MOST® Dynamic Specification, Rev. 3.0.2), an Ethernet VDM protocol (e.g., an Ethernet 802.3 protocol using a BROADR-REACH® physical layer transceiver specification for Automotive Applications by Broadcom Inc., San Jose, California), or some other VDM protocol defined for performing communications with or within the vehicle 12. Each and every VDM discussed in this description is arranged according to a VDM protocol.

Instead of being bidirectional, a VDM protocol can be a unidirectional. For example, a SENT VDM protocol (i.e., a single-edge nibble transmission VDM protocol) is a unidirectional VDM protocol. The SENT VDM protocol has been standardized as the SAE J2716 VDM protocol. A sensor in a vehicle can include a transmitter configured to communicate using the SENT VDM protocol (i.e., a SENT VDM transmitter). A vehicle network can operatively connect the SENT VDM transmitter and an ECU within the vehicle. The transceiver 251 (e.g., the vehicle communications transceiver 256) can include a SENT VDM receiver connectable to the vehicle communication bus operatively connected to the SENT VDM transmitter. The SENT VDM receiver can receive SENT VDM protocol messages representing sensor values output by the sensor with the SENT VDM transmitter.

An OBDC, such as an OBDC 34 shown in FIG. 78 and FIG. 79 can include an on-board diagnostic (OBD) connector, such as a J1939 connector, an OBD-I connector, or an OBD-II connector. A J1939 connector is a connector that complies with the SAE J1939 standard. As an example, a J1939 connector can include a J1939 type-1 connector with nine connector terminals, such as a J1939 type-1 connector; part number AHD10-9-1939P, supplied by Amphenol Sine Systems, Clinton Township, Michigan. As another example, a J1939 connector can include a J1939 type-2 connector, such as a J1939 type-2 connector with nine connector terminals; part number AHD10-9-1939P80, supplied by Amphenol Sine Systems. An OBD-I connector, for example, can include slots for retaining up to twelve connector terminals. As an example, an OBD-I connector can include a connector part number 12101918 available from dealerships selling products manufactured by General Motors, Detroit, Michigan. An OBD-II connector can include slots for retaining up to sixteen connector terminals. An OBD-II connector that meets the SAE J1962 specification includes a connector 16M, part number 12110252, available from Aptiv LLC of Dublin, Ireland. Other examples of the OBDC 34 are also possible. An OBDC can be referred to as a "data link connector."

An OBDC can include conductor terminals that connect to a conductor in a vehicle. For instance, an OBDC can include connector terminals that connect to conductors that connect to positive and negative terminals of the power supply, such as a battery 41 shown in FIG. 78, and/or a power supply circuit, such as a battery-connected circuit 42 shown in FIG. 78. An OBDC can include one or more conductor terminals that connect to a conductor of the vehicle network 36 such that the OBDC is operatively connected to one or more ECUs in the vehicle 12. A computing system, such as the computing system 4, can operatively connect directly to an OBDC in order to receive VDM from the vehicle including that OBDC.

A VDM can carry VDM data. The VDM data can, but need not necessarily, include a PID and a parameter value associated with the PID. The VDM data can, but need not necessarily, include a DTC. A VDM can be transmitted over a physical communication link, such as a copper wire or an optical cable, or using radio signals over an air interface. In many implementations, the PID and parameter value are transmitted as binary data. A processor can parse a received VDM to recover a binary representation of a PID and parameter value. The processor can translate the binary representation of a PID and parameter value into a textual a PID and parameter value displayable on a display device.

An ECU, such as the ECU 15 shown in FIG. 1, can control various aspects of vehicle operation and/or components within a vehicle system. For example, an ECU can include a powertrain (PT) system ECU, an engine control module (ECM) ECU, a supplemental inflatable restraint (SIR) system (i.e., an air bag system) ECU, an entertainment system ECU, a brake system ECU, an advanced driver-assistance system (ADAS) ECU, a cab climate system ECU, an instrument cluster, ECU, or some other ECU. An ECU can receive an electrical or optical input from an ECU-connected input device (e.g., a sensor input), control an ECU-connected output device (e.g., a solenoid) via an electrical or optical signal output by the ECU, generate a VDM (such as a VDM based on a received input or a controlled output), and set a DTC to a state (such as active or history). An ECU can perform a functional test in response to receiving a VDM requesting performance of the functional test. The functional test can be used to test an ECU-connected output device. As an example, the functional test can include a diesel particulate filter regeneration procedure.

Turning to FIG. 78, example details of the vehicle 12 and example placement of the computing system 4 within the vehicle 12 are shown. In particular, FIG. 78 shows the vehicle 12 includes an ECU 30, 31, 32, 33, an OBDC 34, a sensor 37, 40, an ECU controlled output (ECO) 38, 39, a battery 41, and a battery-connected circuit 42. The ECU 30, 31, 32, 33 are shown in FIG. 78 to represent that the ECU 15 shown in FIG. 1 can include multiple ECUs. The ECU 30, 31, 32, 33 are operatively connected to the OBDC 34 via the vehicle network 36 to allow transmission of a VDM between the OBDC 34 and the ECU connected to the vehicle network 36. The ECU 30, 31, 32, 33 can be arranged as one of ECU described in the preceding paragraph or an ECU of some other vehicle system. The vehicle network 36 can include a wired and/or wireless network.

The OBDC 34 can, for example, be located within a passenger compartment of the vehicle 12, within an engine compartment of the vehicle 12, or within a storage compartment within the vehicle 12 in front of or behind the passenger compartment. The computing system 4 is removably attachable to the OBDC 34. The computing system 4 can connect to the OBDC 34 via a communication link 35. The computing system can include the communication link 35 (e.g., a harness). The computing system 4 is typically removed after the vehicle 12 has been serviced at the repair shop 11. In that way, the computing system 4 can be used to diagnose other vehicles after those vehicles arrive at the repair shop 11.

The battery-connected circuit 42 can include one or more electrical circuits. For example, the battery-connected circuit 42 can include the power circuits described previously. FIG. 78 shows the battery-connected circuit 42 extending between the battery 41 and the ECU 32 and between the battery 41 and the OBDC 34. For clarity of FIG. 78, other examples of the battery-connected circuit 42 that extend between the battery and some other vehicle component of the vehicle, such as the ECU 30, 31, 33, the sensor 37, 40, and the ECO 38, 39 are not shown in FIG. 78. The battery-connected circuit 42 between the battery 41 and the OBDC 34 can provide an electrical current to provide operational power for the computing system 4.

The sensor 37, 40 is a device that provides a signal to the ECU 32, 33, respectively. The signal represents some characteristic of a vehicle the ECU 32, 33 is configured to monitor. As an example, the sensor 37, 40 can include one from among: an accelerometer, a camshaft position sensor, a crankshaft position sensor, a current sensor, a fluid level sensor, a fluid pressure sensor, a fluid temperature sensor, a hall effect sensor, an infrared sensor, a knock sensor, a mass air flow sensor, an oil pressure sensor, an oxygen sensor, a photo transistor, a piezoelectric sensor, a position sensor, a pressure sensor, a rain sensor, a refrigerant sensor, a temperature sensor, a thermistor, a throttle position sensor, a tire pressure sensor, a vehicle speed sensor, a voltage sensor, a wheel speed sensor, a yaw rate sensor, or some other typo of sensor. The signal provided by the sensor 37, 40 can be a target signal that corresponds to a selected functional test.

The ECO 38, 39 is a device controlled by the ECU 32, 33, respectively. The ECU 32, 33 can control the ECO 38, 39, respectively, using an output signal or an output condition. The output signal from an ECU can be a target signal that corresponds to a selected functional test. As an example, the ECO 38, 39 can include one from among: a fuel injector, a motor, a pump, a relay, solenoid, a transformer, or a valve. In accordance with at least some implementations, an ECU is selectable to perform a functional test and/or provide a DTC in accordance with an industry standard, such as the SAE J1979_201202 and/or ISO 15031-5 standards for E/E diagnostic test modes. As an example, the output condition can include establishing a particular voltage level on an electrical circuit operatively connected or connectable to the ECO 38, 39. For instance, the particular voltage level can be a nominal 5-volt reference signal, a nominal 12-volt reference signal, or an electrical ground level signal (e.g., a nominal 0-volt reference level).

The output signal of the ECU 32, 33 (i.e., the ECU output signal) can be any of a variety of electrical or output signals. As an example, the ECU output signal can include an analog or digital electrical signal. As a more particular example, the ECU output signal can include a pulse-width modulated signal, a triangular waveform signal, a saw tooth waveform signal, a rectangular waveform signal, a square waveform signal, or a sinusoidal waveform signal, among others. As another example, the ECU output signal can include a video signal or an audio signal. As yet another example, the digital electrical signal can include a data transmission. As an example, a data transmission can be communicated using a serial peripheral interface (SPI) interface, an inter-integrated circuit ($I^2C$) interface, or a universal asynchronous receiver transmitter (UART) interface, among others. In response to receiving a functional test command, a processor in the ECU can execute program instructions or logic to cause the ECU output condition or output signal to appear at and/or on the ECO 38, 39.

Turning to FIG. 79, arrangement 435, 437, 439 for operatively connecting the computing system 4 to the vehicle 12 via the communication link 35 represented in FIG. 78 are shown. In the arrangement 435, 437, 439, the OBDC 34 is operatively connected to the ECU 15 within the vehicle 12 using the vehicle network 36. In FIG. 79, the ECU 15 represents one or more ECUs in the vehicle 12, such as the ECU 30, 31, 32, 33 shown in FIG. 78.

In the arrangement 435, the computing system 4 is directly connected to the OBDC 34 using a wired network 44. As an example, the wired network 44 can be contained within a harness with multiple wires, at least one of which is configured to carry a VDM between the computing system 4 and the OBDC 34. The harness can include a connector removably attachable to the OBDC 34. The wired network 44 can include one or more wires.

In the arrangement 437, the computing system 4 is directly connected to the OBDC 34 using a wireless network 45. The wireless network 45 can include an air interface established to carry a VDM between the computing system 4 and the OBDC 34. The wireless network 45 and the air interface can be configured in accordance with a wireless communication standard or protocol, such as any wireless communication standard or protocol described in this description.

In the arrangement 439, the computing system 4 is indirectly connected to the OBDC 34 using a wireless network 46 and a dongle 43. The dongle 43 includes a connector 47 removably attachable to the OBDC 34 and a wireless transceiver and a wired transceiver. The wireless network 46 can include an air interface established to carry a VDM between the computing system 4 and the dongle 43. The wireless network 46 and the air interface can be configured in accordance with a wireless communication standard or protocol, such as any wireless communication standard or protocol described in this description. The wired transceiver of the dongle 43 can receive a VDM transmitted to the OBDC 34 over the vehicle network 36 from an ECU and can transmit a VDM onto the vehicle network 36 for transmission to an ECU in the vehicle 12.

Figure 80:
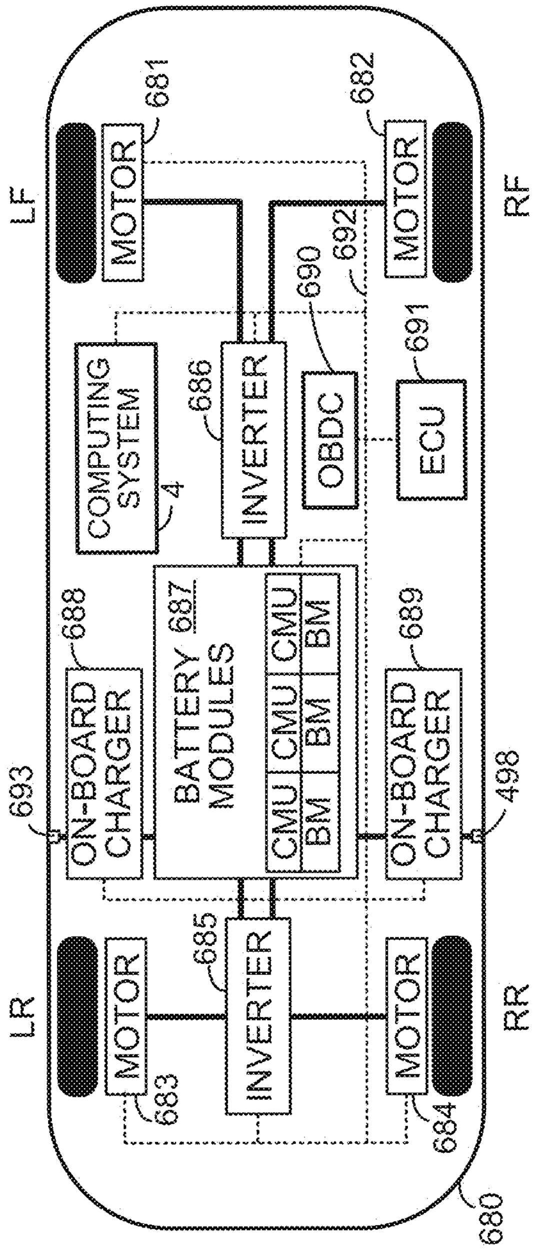
FIG. 80 is a diagram of a vehicle showing example placement of a computing system in accordance with at least some of the example implementations.

Next, FIG. 80 shows a vehicle 680 and example placement of the computing system 4 within the vehicle 680. The vehicle 12 shown in FIG. 1 can be arranged like the vehicle 680. The vehicle 680 is an electric vehicle. In at least some implementations, the vehicle 680 includes an internal combustion engine (ICE) such that the vehicle 680 is a hybrid vehicle.

As shown in FIG. 80, the vehicle 680 includes a motor 681 at a left front location of the vehicle 680, a motor 682 at a right front location of the vehicle 680, a motor 683 at a left rear location of the vehicle 680, and a motor 684 at a right rear location of the vehicle 680. The vehicle 680 also includes an inverter 685, 686, an on-board charger 688, 689, a charge port 693, 498, an ECU 691, an on-board diagnostic connector 690, and a vehicle network 692. As an example, the charge port 693 can include an AC voltage charge port and the charge port 498 can include a DC voltage charge port. The vehicle 680 can further include battery modules 687 including multiple battery modules (BM) and multiple cell monitoring units (CMU). The CMU can determine parameters regarding the battery modules, such as a battery voltage, a battery temperature, or a battery internal resistance.

XI. Incorporation by Reference

This application incorporates by reference, in its entirety, U.S. Patent Application Publication number 2018/0047222. The application that published as U.S. Patent Application Publication number 2018/0047222 is numbered Ser. No. 15/236,060 and was filed Aug. 12, 2016, and is entitled "Method and System for Displaying PIDs based on a PID Filter List."

XII. Further Definitions

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of" and "one or more of" immediately preceding a list of at least two components or functions is to cover each implementation including a listed component or function independently and each implementation comprising a combination of the listed components or functions. For example, an implementation described as comprising A, B, and/or C, or at least one of A, B, and C, or one or more of A, B, and C is intended to cover each of the following possible implementations: (i) an implementation comprising A, but not B and not C, (ii) an implementation comprising B, but not A and not C, (iii) an implementation comprising C, but not A and not B, (iv) an implementation comprising A and B, but not C, (v) an implementation comprising A and C, but not B, (v) an implementation comprising B and C, but not A, and (vi) an implementation comprising A, B, and C. For the implementations comprising component or function A, the implementations can comprise one A or multiple A. For the implementations comprising component or function B, the implementations can comprise one B or multiple B. For the implementations comprising component or function C, the implementations can comprise one C or multiple C. The use of ordinal numbers such as "first," "second," "third" and so on is to distinguish respective elements rather than to denote a particular order of those elements unless the context of using those terms explicitly indicates otherwise.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can include transmitting the data over an air interface (e.g., using radio signals (i.e., wirelessly)). The transmission of any of the data described herein can include transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates. As another example, data received by a processor can represent a vehicle component. The processor can determine what type of vehicle component is represented by the data by comparing the data to a structure that defines a variety of vehicle components.

XIII. Conclusion

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable memory to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing particular implementations only, and is not intended to be limiting. Implementations of the present disclosure may thus relate to one of the enumerated example embodiments (EEEs) listed below.

EEE 1 is a method comprising: determining, by a processor of a computing system, a test set that is to be performed on a vehicle corresponding to a particular vehicle identifier; determining, by the processor based at least in part on the test set and the particular vehicle identifier, a component test corresponding to a particular component of the vehicle and a functional test command for requesting control of a controllable component of the vehicle; configuring, by the processor, a test device to be in a mode to perform the component test corresponding to the particular component of the vehicle; outputting, by the processor on a display, a first graphical user interface including a first user-selectable control corresponding to the functional test command; transmitting, by the processor in response to a selection of the first user-selectable control, a first vehicle data message including the functional test command, wherein the first vehicle data message is directed to an electronic control unit of the vehicle; and outputting, by the processor within the first graphical user interface, a representation of a performance of the component test corresponding to the particular component of the vehicle during a time period while the controllable component is controlled in response to transmitting the first vehicle data message.

EEE 2 is a method according to EEE 1, wherein: the first graphical user interface further includes a first container and a second container, the representation of the performance of the component test output within the first graphical user interface is output within the first container, and the method further comprises: determining, by the processor based at least in part on the test set and the particular vehicle identifier, a first parameter-identifier corresponding to the electronic control unit; transmitting, by the processor to the electronic control unit, a second vehicle data message including a request for a parameter value corresponding to the first parameter-identifier; and outputting, by the processor within the second container, a representation of the first parameter-identifier and a parameter value corresponding to the first parameter-identifier received in response to the request.

EEE 3 is a method according to EEE 2, further comprising: determining, by the processor based at least in part on the test set and the particular vehicle identifier, a threshold value corresponding to the first parameter-identifier, and determining, by the processor, whether the parameter value corresponding to the first parameter-identifier received in response to the request breaches the threshold value; and outputting, by the processor within the second container, a threshold indicator that indicates whether the parameter value corresponding to the first parameter-identifier received in response to the request breaches the threshold value.

EEE 4 is a method according to EEE 3, wherein: the threshold value includes a threshold range, the threshold range includes a maximum threshold range value and a minimum threshold range value, and the parameter breaches the threshold value if the parameter is less than the minimum threshold value or greater than the maximum threshold value.

EEE 5 is a method according to EEE 3, wherein the threshold value corresponding to the first parameter-identifier includes: (i) a first threshold value corresponding to the first parameter-identifier and a first threshold range of parameter values corresponding to a second parameter-identifier, and (ii) a second threshold value corresponding to the first parameter-identifier and a second threshold range of the parameter values corresponding to the second parameter-identifier, wherein the first threshold range of parameter values corresponding to the second parameter-identifier is different than the second threshold range of the parameter values corresponding to the second parameter-identifier, and wherein determining whether the parameter that corresponds to the first parameter-identifier breaches the threshold value corresponding to the first parameter-identifier includes the processor comparing: (i) the parameter that corresponds to the first parameter-identifier to the first threshold range if a parameter that corresponds to the second parameter-identifier is within the first threshold range of parameter values corresponding to the second parameter-identifier, or (ii) the parameter that corresponds to the first parameter-identifier to the second threshold range if the parameter that corresponds to the second parameter-identifier is within the second threshold range of parameter values corresponding to the second parameter-identifier.

EEE 6 is a method according to any one of EEE 1 to 5, wherein: the test device includes an oscilloscope having one or more test leads, and configuring the test device includes configuring the oscilloscope to operate with one or more from among: a particular sample rate from among multiple sample rates, a particular vertical scale setting from among multiple vertical scale settings, a particular horizontal scale setting from among multiple horizontal scale settings, a particular trigger mode from among multiple trigger modes, or a particular trigger source from among multiple trigger sources.

EEE 7 is a method according to EEE 6, further comprising: generating, by the processor, a scaled signal by scaling a signal received on the one or more test leads during the time period, wherein: the representation of the performance includes a representation of the scaled signal, and scaling the signal includes scaling the signal received on the one or more test leads to conform to one or more from among the particular vertical scale setting or the particular horizontal scale setting.

EEE 8 is a method according to any one of EEE 1 to 7, wherein: the test device includes a meter having multiple test leads, configuring the test device includes configuring the meter to operate with a particular measurement mode from among multiple measurement modes, and the multiple measurement modes include two or more from among: an amperage measurement mode, a capacitance measurement mode, a continuity measurement mode, a duty cycle measurement mode, a frequency measurement mode, a pulse width measurement mode, a resistance measurement mode, a temperature measurement mode, or a voltage measurement mode.

EEE 9 is a method according to EEE 8, wherein configuring the test device further includes configuring the meter to operate with a particular measurement range from among multiple measurement ranges.

EEE 10 is a method according to EEE 8, wherein: the representation of the performance of the component test includes a representation of a signal received on the test leads during the time period, and the representation of the signal includes one or more from among: a digital numeric representation of the signal, or a graphical representation of the signal.

EEE 11 is a method according to any one of EEE 1 to 10, wherein: the representation of the performance of the component test includes a representation of a target signal measured by the test device, and the method further comprises: determining, by the processor, one or more characteristics of the target signal; determining, by the processor, a diagnostic status corresponding to the vehicle by comparing the one or more characteristics of the target signal to one or more baseline characteristics; and outputting, by the processor on the display, the diagnostic status while the representation of the performance of the component test is output within the first container.

EEE 12 is a method according to EEE 11, further comprising: transmitting, by the processor, a second vehicle data message to the electronic control unit, wherein the second vehicle data message includes a request for a parameter value corresponding to a first parameter-identifier, and receiving, by the processor from the electronic control unit in response to transmitting the second vehicle data message, a third vehicle data message, wherein the third vehicle data message includes the parameter value corresponding to a first parameter-identifier, wherein comparing one or more characteristics of the target signal to the threshold value includes comparing the parameter value corresponding to a first parameter-identifier to the threshold value.

EEE 13 is a method according to EEE 11, further comprising: transmitting, by the processor to the electronic control unit, a first set of vehicle data messages, wherein each vehicle data message of the first set of vehicle data messages includes a request for a parameter value corresponding to a parameter-identifier, wherein the parameter-identifier corresponds directly to the target signal; receiving, by the processor in response to transmitting the first set of vehicle data messages, one or more parameter values corresponding to the parameter-identifier, wherein the one or more parameters are contained with one or more vehicle data messages received in response to transmitting the first set of vehicle data messages; and determining, by the processor, the one or more characteristics of the target signal based on the one or more parameter values corresponding to a parameter-identifier.

EEE 14 is a method according to EEE 11, further comprising: receiving, by the processor from a signal detector, one or more samples of the target signal during the time period, wherein the one or more characteristics of the target signal are based on the one or more samples of the target signal, and the signal detector includes one or more from among: an analog-to-digital converter, a probe, a meter, or an oscilloscope.

EEE 15 is a method according to EEE 11, wherein: the representation of the target signal measured by the first device is contained within a graph on the display, the graph includes an axis corresponding to time, and the method further comprises: outputting, by the processor on the display, an icon along the axis, and the icon is indicative of a time of transmitting the first vehicle data message.

EEE 16 is a method according to EEE 11, wherein: determining the one or more characteristics of the target signal includes determining one or more characteristics for a first portion of the target signal and one or more characteristics for a second portion of the target signal, the first portion of the target signal occurs before the second portion of the target signal, the first portion of the target signal occurs before transmission of the first vehicle data message, and the second portion of the target signal occurs after transmission of the first vehicle data message.

EEE 17 is a method according to EEE 11, wherein: the target signal includes a signal output by the electronic control unit or by a vehicle component operatively connected to the electronic control unit, the method further comprises: determining, by the processor based at least in part on the test set and the particular vehicle identifier, a parameter-identifier corresponding to the target signal; transmitting, by the processor to the electronic control unit, one or more additional vehicle data messages, wherein each additional vehicle data message includes a request for a parameter value corresponding to the parameter-identifier; and receiving, by the processor from the electronic control unit in response to transmitting the one or more additional vehicle data messages, one or more received parameter values corresponding to the parameter-identifier, the one or more characteristics of the target signal include the one or more received parameters, and the one or more baseline characteristics corresponding to the target signal further correspond to the parameter-identifier.

EEE 18 is a method according to any one of EEE 1 to 17, wherein: configuring the test device to be in a mode to perform the component test includes configuring the test device to generate a representation of a target signal corresponding to the particular component of the vehicle, the method further comprises: determining, by the processor based at least in part on the test set and the particular vehicle identifier, a known-good representation of the target signal, and outputting, the representation of the performance of the component test includes displaying, on the display, the representation of the target signal corresponding to the particular component of the vehicle and the known-good representation of the target signal in proximity to one another.

EEE 19 is a method according to any one of EEE 1 to 18, further comprising: receiving, by the processor prior to transmitting the first vehicle data message, one or more other vehicle data messages including parameter values corresponding to one or more parameter-identifiers; determining, by the processor based at least in part on the parameter values corresponding to one or more parameter-identifiers and the particular vehicle identifier, a group of test sets that includes the test set; and outputting, by the processor on the display, a second graphical user interface including a respective user-selectable control corresponding to each test set of the group of tests; wherein determining the test set includes receiving, by the processor, an indication that a user-selectable control corresponding to the test set was selected from the second graphical user interface.

EEE 20 is a method according to any one of EEE 1 to 19, wherein: the test set corresponds to a test set file, determining the component test and the functional test command includes the processor determining the component test and the functional test command from the test set file, the processor is also configured to determine, for an occurrence of performing the component test without performing the test set, the component test based on a selection of the component test from a navigable menu output on the display, and the processor is also configured to determine for an occurrence of transmitting the first vehicle data message including the functional test command without performing the test set, the functional test command based on a selection of the functional test command from the navigable menu output on the display.

EEE 21 is a method according to any one of EEE 1 to 20, further comprising: transmitting, by the processor to a server in response to determining the test set, a request for a test set file corresponding to the test set; and receiving, by the processor in response to the request, the test set file.

EEE 22 is a method according to any one of EEE 1 to 21, further comprising: receiving, by the processor, a vehicle data message transmitted by the vehicle, wherein the vehicle data message transmitted by the vehicle includes a first parameter identifier and a parameter value corresponding to the first parameter identifier; determining, by the processor, the parameter value corresponding to the first parameter identifier breaches a threshold corresponding to the first parameter identifier; wherein determining the test set occurs in response to determining the parameter value corresponding to the first parameter identifier breaches the threshold, and wherein determining the test set that is to be performed on the vehicle includes determining that the test set corresponds to the first parameter identifier.

EEE 23 is a method according to any one of EEE 1 to 22, wherein the graphical user interface includes a first graphical user interface, and the user-selectable control includes a first user-selectable control. Additionally, the method further comprises: outputting, by the processor onto the display, a second graphical user interface including a second user-selectable control, wherein the second user-selectable control corresponds to the test set, and wherein determining the test set that is to be performed on the vehicle includes the processor receiving a signal that indicates a selection of the second user-selectable control on the second graphical user interface has occurred.

EEE 24 is a method according to EEE 23, further comprising: outputting, by the processor onto the display before outputting the first graphical user interface onto the display, one or more other graphical user interfaces, wherein the first graphical user interface and the one or more other graphical user interfaces are part of a navigable menu at the computing system, wherein at least one of the one or more other graphical user interfaces is configured to enter one or more from among: a year identifier, a make identifier, a model identifier, or an engine identifier, wherein at least one other of the one or more graphical user interfaces is configured to enter one or more from among: a system identifier, a component identifier, or a symptom identifier, wherein the vehicle and the test set both correspond to whichever of the year identifier, the make identifier, the model identifier, the engine identifier, the system identifier, the component identifier, and the symptom identifier is entered using the one or more other graphical user interfaces correspond to the vehicle, wherein the navigable menu further includes a second user-selectable control and a third user-selectable control, wherein the second user-selectable control is configured to enter a menu selection that causes the processor to output onto the display a second graphical user interface from which the test device can be configured to be in a mode to perform the component test corresponding to the particular component of the vehicle, and wherein the third user-selectable control is configured to enter a menu selection that causes the processor to output onto the display a third graphical user interface including another user-selectable control corresponding to the functional test command.

EEE 25 is a method according to any one of EEE 1 to 24, further comprising: receiving, by the processor from a server, a communication including data indicative of the test set, wherein determining the test set includes the processor determining the test set from the data indicative of the test set.

EEE 26 is a method according to EEE 25, wherein the data indicative of the test set includes a test set file corresponding to the test set, an identifier of a test set file stored with a non-transitory memory accessible to the computing system, or an index value indicative of the test set file stored with the non-transitory memory accessible to the computing system.

EEE 27 is a method comprising: (A) determining, by a processor of a computing system, a test set that is to be performed on a vehicle corresponding to a particular vehicle identifier; (B) determining, by the processor based at least in part on the test set and the particular vehicle identifier, a component test and a functional test command, the component test and a first set of parameter identifiers, or the functional test command and a second set of parameter identifiers, wherein the component test corresponds to a particular component of the vehicle, wherein the functional test command is for requesting control of a controllable component of the vehicle, and wherein: (1) if the processor determines the component test and the functional test command, then the method further includes: (C) configuring, by the processor, a test device to be in a mode to perform the component test corresponding to the particular component of the vehicle, (D) outputting, by the processor on a display, a first graphical user interface including a first user-selectable control corresponding to the functional test command, (E) transmitting, by the processor in response to a selection of the first user-selectable control, a first vehicle data message including the functional test command, the first vehicle data message being directed to an electronic control unit of the vehicle, and (F) outputting, by the processor within the first graphical user interface, a representation of a performance of the component test during a time period while the controllable component is controlled in response to transmitting the first vehicle data message, (2) if the processor determines the component test and the first set of parameter identifiers, then the method further includes: (G) configuring, by the processor, the test device to be in the mode to perform the component test corresponding to the particular component of the vehicle, (H) outputting, by the processor on the display, a second graphical user interface, (I) receiving, by the processor in response to transmitting a set of vehicle data messages to the vehicle during a performance of the component test, a first set of parameter values corresponding to the first set of parameter identifiers, and (J) outputting, by the processor within the second graphical user interface, the first set of parameter values corresponding to the first set of parameter identifiers, and a representation of a performance of the component test during a time period in which the processor receives the first set of parameter values, or (3) if the processor determines the functional test command and the second set of parameter identifiers, then the method further includes: (K) outputting, by the processor on the display, a third graphical user interface including a second user-selectable control corresponding to the functional test command, (L) transmitting, by the processor in response to a selection of the second user-selectable control, a second vehicle data message including the functional test command, the second vehicle data message being directed to the electronic control unit of the vehicle, (M) receiving, by the processor in response to transmitting a set of vehicle data messages to the vehicle during a time period while the controllable component is controlled in response to transmitting the second vehicle data message, a first set of parameter values corresponding to the second set of parameter identifiers, and (N) outputting, by the processor within the third graphical user interface, the first set of parameter values corresponding to the second set of parameter identifiers received in response to transmitting the set of vehicle data messages to the vehicle during the time period while the controllable component is controlled in response to transmitting the second vehicle data message.

EEE 28 is a method according to EEE 27, wherein the test device includes an electrical measurement meter, the test device includes an electrical measurement meter, and configuring the test device includes configuring the electrical measurement meter to operate with a particular measurement mode from among multiple measurement modes, and the multiple measurement modes include two or more from among: (a) an amperage measurement mode, (b) a capacitance measurement mode, (c) a continuity measurement mode, (d) a duty cycle measurement mode, (e) a frequency measurement mode, (f) a pulse width measurement mode, (g) a resistance measurement mode, (h) a temperature measurement mode, or (i) a voltage measurement mode.

EEE 29 is a method according to EEE 28, wherein the computing system and the electrical measurement meter are contained within a single housing.

EEE 30 is a method according to any one of EEE 27 to 29, wherein configuring the test device to be in the mode to perform the component test includes one or more from among the following: setting a display unit, setting a time scale, setting an upper range and/or lower range for a vertical axis, setting a unit and/or time scale for a horizontal axis, setting a measurement sample rate, setting an oscilloscope trigger mode, setting an oscilloscope trigger voltage, or setting a voltage offset.

EEE 31 is a method according to any one of EEE 27 to 30, wherein determining the test set includes the processor receiving a test set file that includes: (a) identifiers of the component test and the functional test command, (b) identifiers of the component test and the first set of parameter identifiers, (c) identifiers of the functional test command and the second set of parameter identifiers, or (d) identifiers of the component test, the functional test command, and the first or second set of parameter identifiers.

EEE 32 is a method according to any one of EEE 27 to 30, wherein the computing system includes a non-transitory computer-readable memory and a navigable menu from which two or more from among the following are selectable: the component test, a functional test corresponding to the functional test command, or the test set, wherein a selection to the test set within the navigable menu includes a pointer to a test set file stored within the non-transitory computer-readable memory, and wherein determining the test set includes the processor receiving the pointer to the test set file from a server.

EEE 33 is a method according to any one of EEE 27 to 32, wherein the processor determines the component test and the functional test command, wherein the method further comprises outputting, by the processor on the display, a prompt for manually adjusting an operating condition of the vehicle during the time period while the controllable component is controlled in response to transmitting the first vehicle data message, and wherein the representation of the performance of the component test output within the first graphical user interface changes in response to manually adjusting the operating condition of the vehicle during the time period.

EEE 34 is a method according to EEE 33, wherein the method further comprises (a) determining, by the processor, a third set of parameter identifiers, and (b) receiving, by the processor in response to transmitting a third set of vehicle data messages to the vehicle during a performance of the component test, a third set of parameter values corresponding to the third set of parameter identifiers, and wherein outputting the first graphical user interface includes displaying the third set of parameter values corresponding to the third set of parameter identifiers while the controllable component is controlled in response to transmitting the first vehicle data message.

EEE 35 is a method according to EEE 34, wherein the representation of the performance of the component test during the time period while the controllable component is controlled in response to transmitting the first vehicle data message includes a first waveform within a graph.

EEE 36 is a method according to EEE 35, wherein displaying the third set of parameter values corresponding to the third set of parameter identifiers includes displaying a second waveform within the graph.

EEE 37 is a method according to any one of EEE 27 to 32, wherein: the processor determines the component test and the functional test command, and (a) the method further comprises: outputting, by the processor on the display, a prompt for manually adjusting an operating condition of the vehicle during the time period while the controllable component is controlled in response to transmitting the first vehicle data message, and the representation of the performance of the component test output within the first graphical user interface changes in response to manually adjusting the operating condition of the vehicle during the time period, and/or (b) the method further comprises: determining, by the processor, a third set of parameter identifiers, and receiving, by the processor in response to transmitting a third set of vehicle data messages to the vehicle during a performance of the component test, a third set of parameter values corresponding to the third set of parameter identifiers, and outputting the first graphical user interface includes displaying the third set of parameter values corresponding to the third set of parameter identifiers while the controllable component is controlled in response to transmitting the first vehicle data message.

EEE 38 is a method according to EEE 37, wherein the representation of the performance of the component test during the time period while the controllable component is controlled in response to transmitting the first vehicle data message includes a first waveform within a graph.

EEE 39 is a method according to EEE 38, wherein displaying the third set of parameter values corresponding to the third set of parameter identifiers includes displaying a second waveform within the graph.

EEE 40 is a method according to any one of EEE 27 to 32, wherein (a) if the processor determines the component test and the functional test command, then: outputting the representation of the performance of the component test during the time period while the controllable component is controlled in response to transmitting the first vehicle data message includes outputting the representation of the performance of the component test during the time period while the controllable component is controlled in response to transmitting the first vehicle data message within a first graph including a first axis representing time, and the method further includes outputting within the first graphical user interface a first indicator in proximity to the first axis, the first indicator corresponding to a particular time at which performance of the component test during the time period while the controllable component is controlled in response to transmitting the first vehicle data message was initiated or ended, (b) if the processor determines the component test and the first set of parameter identifiers, then: outputting the first set of parameter values corresponding to the first set of parameter identifiers and the representation of the performance of the component test during the time period in which the processor receives the first set of parameter values includes outputting the first set of parameter values corresponding to the first set of parameter identifiers and the representation of the performance of the component test during the time period in which the processor receives the first set of parameter values within a second graph including a second axis representing time, and the method further includes outputting within the second graphical user interface a second indicator in proximity to the second axis, the second indicator corresponding to a particular time at which performance of the component test was initiated or ended, or (c) if the processor determines the functional test command and the second set of parameter identifiers, then outputting the first set of parameter values corresponding to the second set of parameter identifiers includes outputting the first set of parameter values corresponding to the second set of parameter identifiers within a third graph including a third axis representing time, and wherein the method further includes outputting within the third graphical user interface a third indicator in proximity to the third axis, the third indicator corresponding to a particular time at which performance of the component test during the time period while the controllable component is controlled in response to transmitting the first vehicle data message was initiated or ended.

EEE 41 is a method according to any one of EEE 27 to 32, wherein the processor determines the component test and the functional test command, wherein the method further comprises: (a) determining, by the processor, a third set of parameter identifiers; and (b) receiving, by the processor in response to transmitting a third set of vehicle data messages to the vehicle during a performance of the component test, a third set of parameter values corresponding to the third set of parameter identifiers, and wherein outputting the first graphical user interface includes displaying the third set of parameter values corresponding to the third set of parameter identifiers while the controllable component is controlled in response to transmitting the first vehicle data message.

EEE 42 is a method according to any one of EEE 27 to 32, wherein the processor determines the component test and the first set of parameter identifiers, wherein outputting the first set of parameter values corresponding to the first set of parameter identifiers includes displaying a first baseline threshold corresponding to a particular parameter identifier of the first set of parameter identifiers and to a first operating condition of the vehicle, and wherein the method further comprises: (a) outputting, by the processor on the display, a prompt for manually adjusting an operating condition of the vehicle to a second operating condition of the vehicle during the time period while the controllable component is controlled in response to transmitting the first vehicle data message, and (b) displaying, in response to manually adjusting the operating condition of the vehicle to the second operating condition of the vehicle during the time period, a second baseline threshold corresponding to the particular parameter identifier and to the second operating condition of the vehicle.

EEE 43 is a method according to any one of EEE 27 to 32, wherein the processor determines the component test and the first set of parameter identifiers, wherein the first set of parameter identifiers includes a particular parameter identifier that corresponds to parameter values representing a signal measurable by performance of the component test, and wherein the method further comprises: (a) determining, by the processor, a particular time corresponding to a first parameter value representing the signal measurable by performance of the component test, (b) determining, by the processor, a measurement value based on the performance of the component test during the time period in which the processor receives the first set of parameter values, (c) determining, by the processor, a difference between the measurement value and the first parameter value, and (d) outputting, by the processor within the second graphical user interface, a representation of the difference.

EEE 44 is a method according to any one of EEE 27 to 32, wherein: the processor determines the component test and the first set of parameter identifiers, and (a) the method further comprises: outputting, by the processor on the display, a prompt for manually adjusting an operating condition of the vehicle to a second operating condition of the vehicle during the time period while the controllable component is controlled in response to transmitting the first vehicle data message, and displaying, in response to manually adjusting the operating condition of the vehicle to the second operating condition of the vehicle during the time period, a second baseline threshold corresponding to the particular parameter identifier and to the second operating condition of the vehicle, and/or (b) the method further comprises: outputting, by the processor within the second graphical user interface, a third user-selectable control corresponding to a particular functional test command, transmitting, by the processor in response to a selection of the third user-selectable control, a third vehicle data message including the particular functional test command, the third vehicle data message being directed to a particular electronic control unit of the vehicle, and outputting, by the processor within the second graphical user interface, a representation of a performance of a component test corresponding to the third user-selectable control during a time period while a particular controllable component is controlled in response to transmitting the third vehicle data message.

EEE 45 is a method according to any one of EEE 27 to 32, wherein if the processor determines the component test and the first set of parameter identifiers, the method further includes: (a) receiving, by the processor in response to transmitting a set of vehicle data messages to the vehicle prior to the performance of the component test, a second set of parameter values corresponding to the first set of parameter identifiers, and outputting, by the processor within the second graphical user interface, the second set of parameter values corresponding to the first set of parameter identifiers, and the representation of the performance of the component test during the time period in which the processor receives the first set of parameter values corresponding to the first set of parameter identifiers, and/or (b) receiving, by the processor in response to transmitting a set of vehicle data messages to the vehicle after the performance of the component test, a third set of parameter values corresponding to the first set of parameter identifiers, and outputting, by the processor within the second graphical user interface, the third set of parameter values corresponding to the first set of parameter identifiers, and wherein the representation of the performance of the component test during the time period in which the processor receives the first set of parameter values corresponding to the first set of parameter identifiers.

EEE 46 is a method according to any one of EEE 27 to 32, wherein the processor determines the functional test command and the second set of parameter identifiers, wherein outputting the second set of parameter values corresponding to the first set of parameter identifiers includes displaying a first baseline threshold corresponding to a particular parameter identifier of the second set of parameter identifiers and to a first operating condition of the vehicle, and wherein the method further comprises: (a) outputting, by the processor on the display, a prompt for manually adjusting an operating condition of the vehicle to a second operating condition of the vehicle during the time period while the controllable component is controlled in response to transmitting the second vehicle data message, and (b) displaying, in response to manually adjusting the operating condition of the vehicle to the second operating condition of the vehicle during the time period, a second baseline threshold corresponding to the particular parameter identifier and to the second operating condition of the vehicle.

EEE 47 is a method according to any one of EEE 27 to 32, wherein: the processor determines the functional test command and the second set of parameter identifiers, and the method further comprises: configuring, by the processor, the test device to be in the mode to perform the component test corresponding to the particular component of the vehicle, and outputting, by the processor within the third graphical user interface, a representation of a performance of the component test during a time period while the controllable component is controlled in response to transmitting the second vehicle data message.

EEE 48 is a method according to EEE 47, wherein: the second set of parameter identifiers includes a particular parameter identifier that corresponds to parameter values representing a signal measurable by performance of the component test, and the method further comprises: determining, by the processor, a particular time corresponding to a first parameter value representing the signal measurable by performance of the component test, determining, by the processor, a measurement value based on the performance of the component test during the time period in which the processor receives the second set of parameter values, determining, by the processor, a difference between the measurement value and the first parameter value, and outputting, by the processor within the third graphical user interface, a representation of the difference.

EEE 49 is a method according to any one of EEE 27 to 32, wherein: the processor determines the functional test command and the second set of parameter identifiers, and (a) the method further comprises: outputting, by the processor on the display, a prompt for manually adjusting an operating condition of the vehicle to a second operating condition of the vehicle during the time period while the controllable component is controlled in response to transmitting the second vehicle data message, and displaying, in response to manually adjusting the operating condition of the vehicle to the second operating condition of the vehicle during the time period, a second baseline threshold corresponding to a particular parameter identifier and to the second operating condition of the vehicle, and/or (b) the method further comprises: configuring, by the processor, the test device to be in the mode to perform the component test corresponding to the particular component of the vehicle, and outputting, by the processor within the third graphical user interface, a representation of a performance of the component test during a time period while the controllable component is controlled in response to transmitting the second vehicle data message.

EEE 50 is a method according to any one of EEE 27 to 32, wherein if the processor determines the functional test command and the second set of parameter identifiers, the method further includes: (a) receiving, by the processor in response to transmitting a set of vehicle data messages to the vehicle during a time period prior to the time period while the controllable component is controlled in response to transmitting the second vehicle data message, a second set of parameter values corresponding to the second set of parameter identifiers, and outputting, by the processor within the third graphical user interface, the second set of parameter values corresponding to the second set of parameter identifiers, and/or (b) receiving, by the processor in response to transmitting a set of vehicle data messages to the vehicle during a time period after the time period while the controllable component is controlled in response to transmitting the second vehicle data message, a third set of parameter values corresponding to the second set of parameter identifiers, and wherein outputting, by the processor within the third graphical user interface, the third set of parameter values corresponding to the second set of parameter identifiers.

EEE 51 is a method according to any one of EEE 27 to 50, wherein the first set of parameter identifiers is identical to the second set of parameter identifiers, and/or wherein the first vehicle data message is identical to the second vehicle data message.

EEE 52 is a method according to any one of EEE 27 to 51, wherein the computing system includes a menu system having a navigable menu including separate menu selections to cause the display to show a fourth graphical user interface, a fifth graphical user interface, or a sixth graphical user interface, wherein the fourth graphical user interface includes a third user-selectable control corresponding to the functional test command without any representation of performance of a component test or any parameter values corresponding to a parameter identifier, wherein the fifth graphical user interface includes a representation of performance of the first component test during a time when the processor does not receive any parameter values corresponding to a parameter identifier or during a time an electronic control unit of the vehicle is controlled in response to a functional test command, and wherein the sixth graphical user interface includes a set of parameter values corresponding to a set of parameter identifiers without any representation of performance of a component test or any user-selectable control corresponding to a functional test command.

EEE 53 is a method according to EEE 52, further comprising: outputting, within the first graphical user interface, the second graphical user interface, or the third graphical user interface, first guidance for performing the test set, and outputting, within the fourth graphical user interface, the fifth graphical user interface, or the sixth graphical user interface, first guidance for performing the test set, wherein the first guidance includes guidance not contained in the second guidance.

EEE 54 is a method according to any one of EEE 1 to 53, wherein the display includes a first display and a second display, wherein the first graphical user interface includes a first portion including the first user-selectable control and a second portion including the representation, and wherein the first portion is output on the first display and the second portion is output on the second display.

EEE 55 is a method according to any one of EEE 54, wherein the first display is disposed within a smart phone or a tablet device, and the second display is disposed within a vehicle scan tool.

EEE 56 is a method comprising: determining, by a processor of a computing system, a test set that is to be performed on a vehicle corresponding to a particular vehicle identifier; determining, by the processor based at least in part on the test set and the particular vehicle identifier, a component test corresponding to a particular component of the vehicle and a set of parameter identifiers; configuring, by the processor, a test device to be in a mode to perform the component test corresponding to the particular component of the vehicle; outputting, by the processor on the display, a graphical user interface; receiving, by the processor in response to transmitting a set of vehicle data messages to the vehicle during a performance of the component test, a set of parameter values corresponding to the set of parameter identifiers; and outputting, by the processor within the graphical user interface, the set of parameter values corresponding to the set of parameter identifiers, and a representation of a performance of the component test during a time period in which the processor receives the set of parameter values.

EEE 57 is a method according to EEE 56, wherein: the test set corresponds to a test set file, determining the component test and the set of parameter identifiers includes the processor determining the component test and the set of parameter identifiers from the test set file, and the processor is configured to determine for an occurrence of performing the component test without performing the test set, the component test based on a selection of the component test from a navigable menu output on the display.

EEE 58 is a method according to EEE 56, further comprising: receiving, by the processor, a vehicle data message transmitted by the vehicle, wherein the vehicle data message transmitted by the vehicle includes a first parameter identifier and a parameter value corresponding to the first parameter identifier; determining, by the processor, the parameter value corresponding to the first parameter identifier breaches a threshold corresponding to the first parameter identifier; wherein determining the test set occurs in response to determining the parameter value corresponding to the first parameter identifier breaches the threshold, and wherein determining the test set that is to be performed on the vehicle includes determining that the test set corresponds to the first parameter identifier.

EEE 59 is a method according to any one of EEE 56 to 58, further comprising: transmitting, by the processor to a server in response to determining the test set, a request for a test set file corresponding to the test set; and receiving, by the processor in response to the request, the test set file.

EEE 60 is a method according to any one of EEE 56 to 59, further comprising: receiving, by the processor from a server, a communication including data indicative of the test set, wherein determining the test set includes the processor determining the test set from the data indicative of the test set.

EEE 61 is a method according to any one of EEE 56 to 60, wherein the set of parameter identifiers includes a single parameter identifier.

EEE 62 is a method according to any one of EEE 56 to 61, wherein: the test device includes an oscilloscope having one or more test leads, and configuring the test device includes configuring the oscilloscope to operate with one or more from among: a particular sample rate from among multiple sample rates, a particular vertical scale setting from among multiple vertical scale settings, a particular horizontal scale setting from among multiple horizontal scale settings, a particular trigger mode from among multiple trigger modes, or a particular trigger source from among multiple trigger sources.

EEE 63 is a method according to any one of EEE 56 to 61, wherein: the test device includes a meter having multiple test leads, configuring the test device includes configuring the meter to operate with a particular measurement mode from among multiple measurement modes, and the multiple measurement modes include two or more from among: an amperage measurement mode, a capacitance measurement mode, a continuity measurement mode, a duty cycle measurement mode, a frequency measurement mode, a pulse width measurement mode, a resistance measurement mode, a temperature measurement mode, or a voltage measurement mode.

EEE 64 is a method according to any one of EEE 56 to 63, wherein: the representation of the performance of the component test includes a representation of a target signal measured by the test device, and the method further comprises: determining, by the processor, one or more characteristics of the target signal; determining, by the processor, a diagnostic status corresponding to the vehicle by comparing the one or more characteristics of the target signal to one or more baseline characteristics; and outputting, by the processor on the display, the diagnostic status while the representation of the performance of the component test is output within the first container.

EEE 65 is a method according to any one of EEE 56 to 64, wherein: configuring the test device to be in a mode to perform the component test includes configuring the test device to generate a representation of a target signal corresponding to the particular component of the vehicle, the method further comprises: determining, by the processor based at least in part on the test set and the particular vehicle identifier, a known-good representation of the target signal, and outputting, the representation of the performance of the component test includes displaying, on the display, the representation of the target signal corresponding to the particular component of the vehicle and the known-good representation of the target signal in proximity to one another.

EEE 66 is a method comprising: determining, by a processor of a computing system, a test set that is to be performed on a vehicle corresponding to a particular vehicle identifier; determining, by the processor based at least in part on the test set and the particular vehicle identifier, a functional test command for requesting control of a controllable component of the vehicle and a set of parameter identifiers; outputting, by the processor on a display, a graphical user interface including a user-selectable control corresponding to the functional test command; transmitting, by the processor in response to a selection of the user-selectable control, a vehicle data message including the functional test command, wherein the vehicle data message is directed to an electronic control unit of the vehicle; receiving, by the processor in response to transmitting a set of vehicle data messages to the vehicle during a time period while the controllable component is controlled in response to transmitting the vehicle data message, a set of parameter values corresponding to the set of parameter identifiers; and outputting, by the processor within the graphical user interface, the set of parameter values corresponding to the set of parameter identifiers received in response to transmitting the set of vehicle data messages to the vehicle during the time period while the controllable component is controlled in response to transmitting the vehicle data message.

EEE 67 is a method according to EEE 66, further comprising: transmitting, by the processor to a server in response to determining the test set, a request for a test set file corresponding to the test set; and receiving, by the processor in response to the request, the test set file.

EEE 68 is a method according to any one of EEE 66 to 67, wherein the set of parameter identifiers includes a single parameter identifier.

EEE 69 is a method according to any one of EEE 66 to 68, further comprising: receiving, by the processor prior to transmitting the vehicle data message, one or more other vehicle data messages including parameter values corresponding to one or more parameter-identifiers; determining, by the processor based at least in part on the parameter values corresponding to one or more parameter-identifiers and the particular vehicle identifier, a group of test sets that includes the test set; and outputting, by the processor on the display, a second graphical user interface including a respective user-selectable control corresponding to each test set of the group of tests; wherein determining the test set includes receiving, by the processor, an indication that a user-selectable control corresponding to the test set was selected from the second graphical user interface.

EEE 70 is a method according to any one of EEE 66 to 69, further comprising: receiving, by the processor, a vehicle data message transmitted by the vehicle, wherein the vehicle data message transmitted by the vehicle includes a first parameter identifier and a parameter value corresponding to the first parameter identifier; determining, by the processor, the parameter value corresponding to the first parameter identifier breaches a threshold corresponding to the first parameter identifier; wherein determining the test set occurs in response to determining the parameter value corresponding to the first parameter identifier breaches the threshold, and wherein determining the test set that is to be performed on the vehicle includes determining that the test set corresponds to the first parameter identifier.

EEE 71 is a method according to any one of EEE 66 to 70, wherein the graphical user interface includes a first graphical user interface, and the user-selectable control includes a first user-selectable control. Additionally, the method further comprises: outputting, by the processor onto the display, a second graphical user interface including a second user-selectable control, wherein the second user-selectable control corresponds to the test set, and wherein determining the test set that is to be performed on the vehicle includes the processor receiving a signal that indicates a selection of the second user-selectable control on the second graphical user interface has occurred.

EEE 72 is a method according to any one of EEE 66 to 71, further comprising: receiving, by the processor from a server, a communication including data indicative of the test set, wherein determining the test set includes the processor determining the test set from the data indicative of the test set.

EEE 73 is a method according to any one of EEE 20, 21, 26, 31, 32, 57, 59, or 67, wherein the test set file includes an extensible markup language file.

EEE 74 is a method according to any one of EEE 20, 21, 26, 31, 32, 57, 59, or 67, wherein the test set file includes a JavaScript Object Notation file.

EEE 75 is a method according to any one of EEE 20, 21, 26, 31, 32, 57, 59, or 67, wherein the test set file includes a comma separated variable file.

EEE 76 is a method according to any one of EEE 20, 21, 26, 31, 32, 57, 59, or 67, wherein the test set file includes a portable document format (PDF) file.

EEE 77 is a method according to any one of EEE 1 to 65, wherein the computing system and the test device are disposed in a single housing.

EEE 78 is a method according to any one of EEE 1 to 55, wherein the particular component is the controllable component and the electronic control unit.

EEE 79 is a method according to any one of EEE 1 to 55, wherein the particular component is the controllable component, and wherein the particular component is operatively connected to the electronic control unit.

EEE 80 is a method according to any one of EEE 1 to 55, wherein the particular component is the electronic control unit, and wherein the particular component is operatively connected to the controllable component.

EEE 81 is a method according to any one of EEE 1 to 55, wherein the controllable component is the electronic control unit, and wherein the particular component is operatively connected to the controllable component.

EEE 82 is a method according to any one of EEE 1 to 55, wherein the controllable component is the electronic control unit, and wherein the particular component is operatively connected to the controllable component, wherein the particular component, the controllable component, and the electronic control unit are separate from each other.

EEE 83 is a method according to any one of EEE 1 to 55 or 66 to 77, wherein transmitting the vehicle data message includes transmitting the vehicle data message over an air interface directly to the electronic control unit or a vehicle component operatively connected to the electronic control unit, or indirectly to a dongle operatively connected to an on-board diagnostic port in the vehicle.

EEE 84 is a method according to any one of EEE 66 to 77, wherein the display includes a first display and a second display, wherein the graphical user interface includes a first portion including the user-selectable control and a second portion including the set of parameter values corresponding to the set of parameter identifiers received in response to transmitting the set of vehicle data messages, and wherein the first portion is output on the first display and the second portion is output on the second display.

EEE 85 is a method according to EEE 84, wherein the first display is disposed within a smart phone or a tablet device, and the second display is disposed within a vehicle scan tool.

EEE 86 is a computing system comprising: a display; a processor; and a non-transitory computer-readable memory having stored thereon instructions executable by the processor to perform functions, the set of functions comprising a method in accordance with any one of EEE 1 to 85.

EEE 87 is a non-transitory computer-readable medium storing program instructions, that when executed by a computing device, cause a set of functions to be performed, the set of functions comprising a method in accordance with any one of EEE 1 to 85.

The invention claimed is:

1. A computing system comprising:
- a processor;
- a display;
- a test meter or scope; and
- a non-transitory computer-readable memory having stored thereon a test set and instructions executable by the processor to perform functions comprising:
- determining, by the processor, the test set is selected for performance on a vehicle, wherein:
  - the vehicle and the test set correspond to a particular vehicle identifier,
  - the vehicle includes a particular component, a controllable component, and an electronic control unit,
  - the test set includes first, second, and third test set elements,
  - the first test set element defines a component test for measuring a target signal corresponding to the particular component,
  - the second test set element defines a functional test identifying a functional test command for controlling the controllable component, and
  - the third test set element defines a parameter identifier (PID) reading task;
- configuring the test meter or scope automatically to establish a configured test meter or scope by changing existing configuration parameters of the test meter or scope to match configuration parameters contained in the test set, the configured test meter or scope being in a mode to perform the component test for measuring the target signal corresponding to the particular component;
- initiating, by the configured test meter or scope, a performance of the component test;
- transmitting, by the processor to the electronic control unit during the performance of the component test, a first vehicle data message including the functional test command;
- transmitting, by the processor to the electronic control unit, a set of vehicle data messages during the performance of the component test and while the controllable component is controlled after transmitting the first vehicle data message;
- receiving, in response to transmitting the set of vehicle data messages, a set of parameter values received during the performance of the component test and while the controllable component is controlled after transmitting the first vehicle data message including the functional test command, the set of parameter values corresponding to a set of parameter identifiers; and
- outputting, on the display, a graphical user interface including:
  - a first user-selectable control corresponding to the functional test command,
  - a representation of the target signal measured by the configured test meter or scope during the performance of the component test, and
  - the set of parameter values received during the performance of the component test and while the controllable component is controlled after transmitting the first vehicle data message including the functional test command.

2. The computing system according to claim 1, wherein:
- the graphical user interface includes a second user-selectable control for selecting an amount of time to control the controllable component, and
- the functions further comprise:
  - initiating a timer to count the amount of time; and
  - transmitting by the processor to the vehicle upon expiration of the timer after counting the amount of time, a second vehicle data message including a functional test command to request the controllable component to operate in a state different than a state requested via transmission of the first vehicle data message.

3. The computing system according to claim 1, wherein the functions further comprise:
- initiating a timer to count a fixed amount of time automatically in response to receiving a particular vehicle data message from the vehicle or in response to selection of the first user-selectable control; and
- transmitting by the processor to the vehicle upon expiration of the timer after counting the fixed amount of time, a second vehicle data message including a functional test command to request the controllable component to operate in a state different than a state requested via transmission of the first vehicle data message.

4. The computing system according to claim 1, wherein the first, second, and third test set elements are arranged according an extensible markup language.

5. The computing system according to claim 1, wherein:

configuring the test meter or scope includes configuring an electrical measurement meter to operate with at least one particular measurement mode selected from the group consisting of:

an amperage measurement mode,
a capacitance measurement mode,
a continuity measurement mode,
a duty cycle measurement mode,
a frequency measurement mode,
a pulse width measurement mode,
a resistance measurement mode,
a temperature measurement mode, and
a voltage measurement mode.

6. The computing system according to claim 1, wherein configuring the test meter or scope automatically includes changing one or more configuration parameters from the group consisting of:

a display unit,
a time scale,
an upper range and/or lower range for a vertical axis,
a unit and/or time scale for a horizontal axis,
a measurement sample rate,
a trigger source,
a trigger position,
an oscilloscope trigger mode,
an oscilloscope trigger voltage, and
a voltage offset.

7. The computing system according to claim 1, wherein the functional test command for controlling the controllable component comprises a command selected from the group consisting of:

a command to set a level of activity of the controllable component to a specified level, a command to change a level of activity of the controllable component by a specified absolute or relative amount, and a command to activate or deactivate the controllable component.

8. The computing system according to claim 1, wherein the target signal includes a signal output by the electronic control unit or by a vehicle component operatively connected to the electronic control unit.

9. The computing system according to claim 8, wherein the target signal is selected from the group consisting of: a square wave signal, a triangular wave signal, a rectangular wave signal, a saw-toothed wave signal, a sinusoidal wave signal, a pulse width modulated signal, an analog electrical signal, and a digital electrical signal.

10. The computing system according to claim 1, wherein:

the representation of the target signal measured by the configured test meter or scope during the performance of the component test comprises a waveform within a graph including an axis representing time, the graphical user interface includes an indicator in proximity to the axis, and the indicator corresponds to a particular time at which performance of the component test and while the controllable component is controlled after transmitting the first vehicle data message including the functional test command was initiated or ended.

11. The computing system according to claim 1, wherein the functions further comprise:

displaying a first baseline threshold corresponding to a particular parameter identifier of the set of parameter identifiers and to a first operating condition of the vehicle, outputting, by the processor on the display, a prompt for manually adjusting an operating condition of the vehicle to a second operating condition of the vehicle during the performance of the component test and while the controllable component is controlled after transmitting the first vehicle data message including the functional test command, and displaying, in response to manually adjusting the operating condition of the vehicle to the second operating condition of the vehicle, a second baseline threshold corresponding to the particular parameter identifier and to the second operating condition of the vehicle.

12. The computing system according to claim 1, wherein:

the set of parameter identifiers includes a particular parameter identifier that corresponds to parameter values representing the target signal, and the functions further comprise:

determining, by the processor, a particular time corresponding to a first parameter value representing the target signal, determining, by the processor, a measurement value based on the performance of the component test during a time period in which the processor receives the set of parameter values, determining, by the processor, a difference between the measurement value and the first parameter value, and outputting, by the processor within the graphical user interface, a representation of the difference.

13. The computing system according to claim 1, wherein the functions further comprise:

outputting, by the processor on the display, a prompt for manually adjusting an operating condition of the vehicle to a second operating condition of the vehicle while the controllable component is controlled after transmitting the first vehicle data message including the functional test command, and displaying, in response to manually adjusting the operating condition of the vehicle to the second operating condition of the vehicle, a baseline threshold corresponding to a particular parameter identifier and to the second operating condition of the vehicle.

14. The computing system according to claim 1, wherein the functions further comprise:

receiving, by the processor in response to transmitting a set of vehicle data messages to the vehicle prior to the performance of the component test, a second set of parameter values corresponding to the set of parameter identifiers, and outputting, by the processor within the graphical user interface, the second set of parameter values corresponding to the set of parameter identifiers, and the representation of the target signal measured by the configured test meter or scope during the performance of the component test.

15. The computing system according to claim 1, wherein:

the set of parameter values are output within a graph including an axis representing time, the graphical user interface includes an indicator in proximity to the axis, and the indicator corresponds to a particular time at which performance of the component test and while the controllable component is controlled after transmitting the first vehicle data message including the functional test command was initiated or ended.

16. The computing system according to claim 1, wherein:

the test set is contained in a test set file, the test set file includes or references a template for generating the graphical user interface, and the test set file includes content for displaying within the graphical user interface.

17. The computing system according to claim 1, further comprising:

determining a diagnostic status of the vehicle via performance of the test set; and outputting a diagnostic status indicator of the diagnostic status on the display, wherein the diagnostic status indicator is selected from the group consisting of:

an indicator indicating whether the functional test passed or failed, an indicator indicating whether a parameter identifier parameter value breached a threshold, an indicator indicating whether a diagnostic trouble code set active in the vehicle, an indicator indicating whether the controllable component is malfunctioning, and an indicator indicating whether the target signal is within or outside an expected signal range.

18. The computing system according to claim 1, wherein:

the computing system is configured to operatively couple to a companion computing device via a wireless communication protocol, the graphical user interface is configured to display an icon that indicates the computing system is operatively coupled to the companion computing device, and the graphical user interface includes a user-selectable control selectable to cause a portion of the graphical user interface to be removed from display and then output on a display of the companion computing device.

19. The computing system according to claim 1, wherein the particular component is the controllable component.

20. The computing system according to claim 1, wherein the particular component is separate from but operatively connected to the controllable component.

21. A method comprising:

determining, by a processor, a test set is selected for performance on a vehicle, wherein:

the vehicle and the test set correspond to a particular vehicle identifier, the vehicle includes a particular component, a controllable component, and an electronic control unit, the test set includes first, second, and third test set elements, the first test set element defines a component test for measuring a target signal corresponding to the particular component, the second test set element defines a functional test identifying a functional test command for controlling the controllable component, and the third test set element defines a parameter identifier (PID) reading task;

configuring a test meter or scope automatically to establish a configured test meter or scope by changing existing configuration parameters of the test meter or scope to match configuration parameters contained in the test set, the configured test meter or scope being in a mode to perform the component test for measuring the target signal corresponding to the particular component;

initiating, by the configured test meter or scope, a performance of the component test;

transmitting, by the processor to the electronic control unit during the performance of the component test, a first vehicle data message including the functional test command;

transmitting, by the processor to the electronic control unit, a set of vehicle data messages during the performance of the component test and while the controllable component is controlled after transmitting the first vehicle data message;

receiving, in response to transmitting the set of vehicle data messages, a set of parameter values received during the performance of the component test and while the controllable component is controlled after transmitting the first vehicle data message including the functional test command, the set of parameter values corresponding to a set of parameter identifiers; and outputting, on a display, a graphical user interface including:

a first user-selectable control corresponding to the functional test command, a representation of the target signal measured by the configured test meter or scope during the performance of the component test, and the set of parameter values received during the performance of the component test and while the controllable component is controlled after transmitting the first vehicle data message including the functional test command.

22. A non-transitory computer-readable medium having stored thereon a test set and instructions executable by a processor to cause a computing system including a processor, a display, and a test meter or scope to perform functions comprising:

determining, by the processor, the test set is selected for performance on a vehicle, wherein:

the vehicle and the test set correspond to a particular vehicle identifier, the vehicle includes a particular component, a controllable component, and an electronic control unit, the test set includes first, second, and third test set elements, the first test set element defines a component test for measuring a target signal corresponding to the particular component, the second test set element defines a functional test identifying a functional test command for controlling the controllable component, and the third test set element defines a parameter identifier (PID) reading task;

configuring the test meter or scope automatically to establish a configured test meter or scope by changing existing configuration parameters of the test meter or scope to match configuration parameters contained in the test set, the configured test meter or scope being in a mode to perform the component test for measuring the target signal corresponding to the particular component;

initiating, by the configured test meter or scope, a performance of the component test;

transmitting, by the processor to the electronic control unit during the performance of the component test, a first vehicle data message including the functional test command;

transmitting, by the processor to the electronic control unit, a set of vehicle data messages during the performance of the component test and while the controllable component is controlled after transmitting the first vehicle data message;

receiving, in response to transmitting the set of vehicle data messages, a set of parameter values received during the performance of the component test and while the controllable component is controlled after transmitting the first vehicle data message including the functional test command, the set of parameter values corresponding to a set of parameter identifiers; and outputting, on the display, a graphical user interface including:

a first user-selectable control corresponding to the functional test command, a representation of the target signal measured by the configured test meter or scope during the performance of the component test, and the set of parameter values received during the performance of the component test and while the controllable component is controlled after transmitting the first vehicle data message including the functional test command.

* * * * *